US009365774B2

(12) United States Patent
Yano et al.

(10) Patent No.: US 9,365,774 B2
(45) Date of Patent: Jun. 14, 2016

(54) LIQUID CRYSTAL COMPOUND HAVING $CF_2OCF_3$ AT TERMINAL, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Tomohiro Yano, Ichihara (JP); Junichi Yamashita, Minamata (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/091,013

(22) Filed: Nov. 26, 2013

(65) Prior Publication Data

US 2014/0145113 A1 May 29, 2014

(30) Foreign Application Priority Data

Nov. 27, 2012 (JP) ................................. 2012-258763

(51) Int. Cl.

| | |
|---|---|
| ***C09K 19/34*** | (2006.01) |
| ***C09K 19/12*** | (2006.01) |
| ***C09K 19/20*** | (2006.01) |
| ***C09K 19/30*** | (2006.01) |
| ***C09K 19/04*** | (2006.01) |

(52) U.S. Cl.

CPC ............. *C09K 19/3458* (2013.01); *C09K 19/04* (2013.01); *C09K 19/12* (2013.01); *C09K 19/20* (2013.01); *C09K 19/3028* (2013.01); *C09K 19/3048* (2013.01); *C09K 19/3059* (2013.01); *C09K 19/3066* (2013.01); *C09K 19/3068* (2013.01); *C09K 19/3402* (2013.01); *C09K 2019/044* (2013.01); *C09K 2019/0444* (2013.01); *C09K 2019/0466* (2013.01)

(58) Field of Classification Search

CPC .... C09K 19/3458; C09K 19/12; C09K 19/20; C09K 19/3028; C09K 19/33048; C09K 19/3059; C09K 19/3066; C09K 19/3068; C09K 19/3402; C09K 19/04; C09K 2019/044; C09K 2019/0466; C09K 2019/0444

USPC ............... 252/299.01, 299.6, 299.63, 299.66; 428/1.1; 568/661, 643, 645, 647; 549/363, 374, 427

See application file for complete search history.

(56) References Cited

U.S. PATENT DOCUMENTS

| | | | | |
|---|---|---|---|---|
| 5,032,313 | A | 7/1991 | Goto et al. | |
| 7,029,731 | B2 * | 4/2006 | Tarumi et al. | 428/1.1 |

FOREIGN PATENT DOCUMENTS

| | | | |
|---|---|---|---|
| JP | H2-233626 | A | 9/1990 |
| WO | 91/03450 | A1 | 3/1991 |

* cited by examiner

*Primary Examiner* — Geraldina Visconti
(74) *Attorney, Agent, or Firm* — Hogan Lovells US LLP

(57) ABSTRACT

A liquid crystal compound having high stability to heat, light and so forth, a high clearing point, a low minimum temperature of a liquid crystal phase, small viscosity, suitable optical anisotropy, large dielectric anisotropy, a suitable elastic constant and excellent compatibility with other liquid crystal compounds, a liquid crystal composition containing the compound, and a liquid crystal display device including the composition. The compound is represented by formula (1-1):

(1)

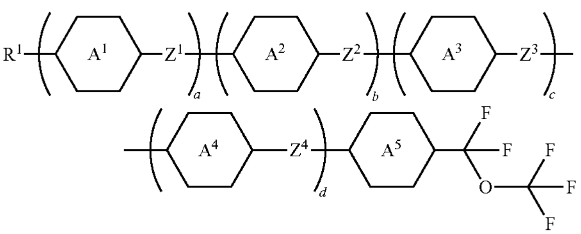

wherein, for example, $R^1$ is hydrogen, halogen or alkyl having 1 to 20 carbons; ring $A^1$, ring $A^2$, ring $A^3$, ring $A^4$ and ring $A^5$ are independently 1,4-cyclohexylene or 1,4-phenylene; $Z^1$, $Z^2$, $Z^3$ and $Z^4$ are independently a single bond, $-(CH_2)_2-$, $-CH{=}CH-$ or $-CF{=}CF-$: and a, b, c and d are independently 0 or 1, and a sum of a, b, c and d is one or more.

15 Claims, No Drawings

LIQUID CRYSTAL COMPOUND HAVING $CF_2OCF_3$ AT TERMINAL, LIQUID CRYSTAL COMPOSITION AND LIQUID CRYSTAL DISPLAY DEVICE

This is a Non-Provisional application, which claims priority to Japanese Patent Application No. 2012-258763, filed on Nov. 27, 2012; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a liquid crystal compound, a liquid crystal composition and a liquid crystal display device. More specifically, the invention relates to a compound having $CF_2OCF_3$ at a terminal thereof, a liquid crystal composition that contains the compound and has a nematic phase, and a liquid crystal display device including the composition.

BACKGROUND ART

A liquid crystal display device is widely utilized for a display of a personal computer, television and so forth. The device utilizes optical anisotropy, dielectric anisotropy and so forth of a liquid crystal compound. As an operating mode of the liquid crystal display device, such modes are known as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode.

For such a liquid crystal display device, a liquid crystal composition having suitable physical properties is used. In order to further improve characteristics of the liquid crystal display device, a liquid crystal compound contained in the composition preferably has physical properties described in items (1) to (8) below.

(1) High stability to heat, light and so forth, (2) a high clearing point, (3) a low minimum temperature of a liquid crystal phase, (4) a small viscosity (η), (5) a suitable optical anisotropy (Δn), (6) a large dielectric anisotropy (Δ∈), (7) a suitable elastic constant (K), and (8) an excellent compatibility with other liquid crystal compounds.

An effect of physical properties of the liquid crystal compound on the characteristics of the device is as described below. A compound having a high stability to heat, light and so forth as described in (1) increases a voltage holding ratio of the device. Thus, a service life of the device becomes longer. A compound having a high clearing point as described in (2) extends a temperature range in which the device can be used. A compound having a low minimum temperature of the liquid crystal phase such as a nematic phase and a smectic phase, as described in (3), in particular, a compound having a low minimum temperature of the nematic phase, also extends a temperature range in which the device can be used. A compound having a small viscosity as described in (4) decreases a response time of the device.

A compound having a suitable optical anisotropy as described in (5) improves a contrast of the device. In accordance with a design of the device, a compound having a large optical anisotropy or a small optical anisotropy, more specifically, a compound having a suitable optical anisotropy, is required. When decreasing the response time by decreasing a cell gap of the device, a compound having a large optical anisotropy is suitable. A compound having a large negative dielectric anisotropy as described in (6) decreases a threshold voltage of the device. Thus, an electric power consumption of the device is decreased.

With regard to (7), a compound having a large elastic constant decreases a response time of the device. A compound having a small elastic constant decreases the threshold voltage of the device. Therefore, a suitable elastic constant is required according to characteristics that are desirably improved. A compound having an excellent compatibility with other liquid crystal compounds as described in (8) is preferred because physical properties of a composition are adjusted by mixing a liquid crystal compound having different physical properties.

A variety of liquid crystal compounds having a large dielectric anisotropy have so far been prepared because excellent physical properties that are not found in conventional compounds are expected, and because a suitable balance between two of physical properties required upon preparing the liquid crystal composition is expected from a new compound. Patent literature No. 1 and so forth describe a compound having a 3,4,5-trifluorophenyl group replaced at a terminal, for example, a compound represented by formula (S-1). However, the compound does not have a sufficiently large dielectric anisotropy and therefore a liquid crystal composition containing the compound seems to be quite difficult to meet a threshold voltage required by a commercially available device.

(S-1)

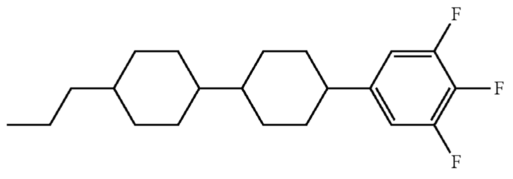

Patent literature No. 2 describes a compound having a 3,5-difluoro-4-trifluoromethylphenyl group replaced at a terminal thereof, for example, a compound represented by formula (S-2), and a compound having a 3,5-difluoro-4-trifluoromethoxyphenyl group replaced at a terminal thereof, for example, a compound represented by formula (S-3). However, the compound represented by formula (S-2) shows a sufficiently large dielectric anisotropy, but has an insufficient compatibility with other liquid crystal compounds, and the compound represented by formula (S-3) has a sufficiently excellent compatibility with other liquid crystal compounds, but no sufficiently large dielectric anisotropy.

(S-2)

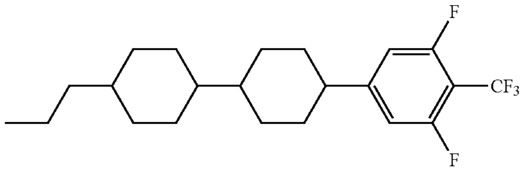

-continued (S-3)

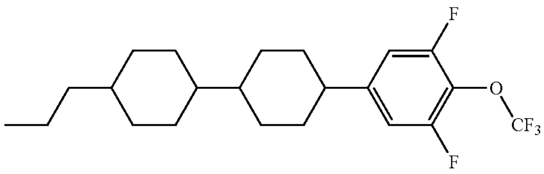

Under such circumstances, development has been desired for a compound having excellent physical properties and a suitable balance with regard to items (1) to (8) described above.

CITATION LIST

Patent Literature

Patent literature No. 1: JP H2-233626 A.
Patent literature No. 2: JP H4-501575 A.

SUMMARY OF INVENTION

Technical Problem

A first object of the invention is to provide a liquid crystal compound having a high stability to heat, light and so forth, a high clearing point, a low minimum temperature of a liquid crystal phase, a small viscosity, a suitable optical anisotropy, a large dielectric anisotropy, a suitable elastic constant and an excellent compatibility with other liquid crystal compounds. The object is to provide a compound having a particularly excellent compatibility with other liquid crystal compounds. The object is to provide a compound having a particularly large dielectric anisotropy. A second object is to provide a liquid crystal composition that contains the compound and has a high maximum temperature of a nematic phase, a low minimum temperature of the nematic phase, a small viscosity, a suitable optical anisotropy, a large dielectric anisotropy and a suitable elastic constant. The object is to provide a liquid crystal composition having a suitable balance regarding at least two of the physical properties. A third object is to provide a liquid crystal display device that includes the composition, and has a wide temperature range in which a device can be used, a short response time, a large voltage holding ratio, a large contrast ratio and a long service life.

Solution to Problem

The invention relates to a compound represented by formula (1), a liquid crystal composition containing the compound, and a liquid crystal display device including the composition.

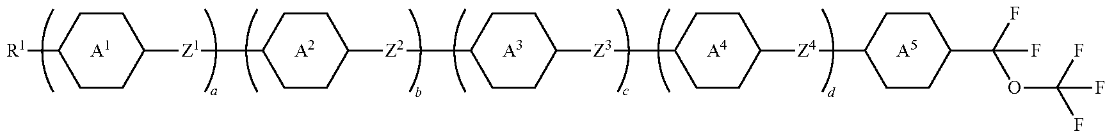

(1)

In formula (1), $R^1$ is hydrogen, halogen or alkyl having 1 to 20 carbons, and in the alkyl, at least one of $—CH_2—$ may be replaced by —O— or —S—, at least one of $—(CH_2)_2—$ may be replaced by —CH=CH—, and in the groups, at least one of hydrogen may be replaced by halogen;

ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, naphthalene-2,6-diyl in which at least one of hydrogen is replaced by halogen or a pyridine-2,5-diyl;

$Z^1$, $Z^2$, $Z^3$ and $Z^4$ are independently a single bond, $—(CH_2)_2—$, —CH=CH—, —CF=CF—, —C≡C—, —COO—, —OCO—, $—CF_2O—$, $—OCF_2—$, $—CH_2O—$, $—OCH_2—$, $—(CH_2)_4—$, $—(CH_2)_2CF_2O—$, $—(CH_2)_2OCF_2—$, $—CF_2O(CH_2)_2—$, $—OCF_2(CH_2)_2—$, $—CH=CH—(CH_2)_2—$ or $—(CH_2)_2—CH=CH—$; and a, b, c and d are independently 0 or 1, and a sum of a, b, c and d is one or more.

Advantageous Effects of Invention

A first advantage of the invention is to provide a liquid crystal compound having a high stability to heat, light and so forth, a high clearing point, a low minimum temperature of a liquid crystal phase, a small viscosity, a suitable optical anisotropy, a large dielectric anisotropy, a suitable elastic constant and an excellent compatibility with other liquid crystal compounds. The advantage is to provide a compound having a particularly excellent compatibility with other liquid crystal compounds. The advantage is to provide a compound having a particularly large dielectric anisotropy. A second advantage is to provide a liquid crystal composition that contains the compound and has a high maximum temperature of a nematic phase, a low minimum temperature of the nematic phase, a small viscosity, a suitable optical anisotropy, a large dielectric anisotropy and a suitable elastic constant. The advantage is to provide a liquid crystal composition having a suitable balance regarding at least two of physical properties. A third advantage is to provide a liquid crystal display device that includes the composition and has a wide temperature range in which the device can be used, a short response time, a large voltage holding ratio, a large contrast ratio and a long service life.

DESCRIPTION OF EMBODIMENTS

Usage of terms herein is as described below. A liquid crystal compound is a generic term for a compound having a liquid crystal phase such as a nematic phase or a smectic phase, and also for a compound having no liquid crystal phases but being useful as a component for a liquid crystal composition. The liquid crystal compound, the liquid crystal composition and a liquid crystal display device may be occasionally abbreviated as "compound," "composition" and "device," respectively. The liquid crystal display device is a generic term for a liquid crystal display panel and a liquid crystal display module. A clearing point is a transition temperature between the liquid crystal phase and an isotropic phase in the liquid crystal compound. A minimum temperature of the liquid crystal phase is a transition temperature between a solid and the liquid crystal phase (the smectic phase, the nematic phase or the like) in the liquid crystal compound. A maximum temperature of the nematic phase is a transition temperature between the nematic phase and the isotropic phase in the liquid crystal composition, and may be occasionally abbreviated as a maximum temperature. A minimum temperature of the nematic phase may be occasionally abbreviated as a minimum temperature. "Compound represented by formula (1)" may be occasionally abbreviated as "compound (1)." The abbreviation may also apply to a compound represented by formula (2) or the like. A group represented by formula (R-1) may be occasionally abbreviated as group (R-1). The abbreviation may also apply to a compound represented by formula (R-2) or the like. In formulas (1) to (14), symbol $A^1$ or the like surrounded by a hexagonal shape corresponds to ring $A^1$ or the like, respectively. A plurality of ring $A^1$ are described in an identical formula or a different formula. In the compounds, two groups represented by two of arbitrary ring $R^1$ may be identical or different. A same rule also applies to ring $A^1$, $Z^1$ or the like. Moreover, the rule also applies to two of ring $C^1$ provided when i is 2. An amount of the compound expressed in terms of "percent" is expressed in terms of "weight percent (% by weight)" based on the total weight of the composition.

An expression "at least one of "A" may be replaced by "B"" means that a position of "A" is arbitrary when the number of "A" is 1, and also when the number of "A" is two or more, positions thereof can be selected without limitation. An expression "at least one of A may be replaced by B, C or D" means inclusion of a case where arbitrary A is replaced by B, a case where arbitrary A is replaced by C, an a case where arbitrary A is replaced by D, and also a case where a plurality of A are replaced by at least two of B, C or D. For example, alkyl in which at least one of $—CH_2—$ may be replaced by —O— or —CH═CH— includes alkyl, alkenyl, alkoxy, alkoxyalkyl, alkoxyalkenyl and alkenyloxyalkyl. In addition, In addition, such a case where replacement of two successive $—CH_2—$ by —O— results in forming —O—O— is not preferred. In alkyl or the like, a case where replacement of $—CH_2—$ of a methyl part ($—CH_2—H$) by —O— results in forming —O—H is not preferred, either.

The invention includes the content as described in item 1 to item 15 below.

Item 1. A compound represented by formula (1):

(1)

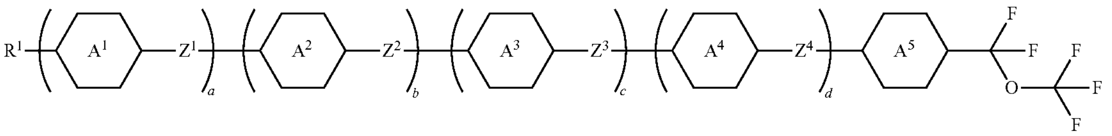

wherein, in formula (1), $R^1$ is hydrogen, halogen or alkyl having 1 to 20 carbons, and in the alkyl, at least one of $—CH_2—$ may be replaced by —O— or —S—, at least one of $—(CH_2)_2—$ may be replaced by —CH═CH—, and in the groups, at least one of hydrogen may be replaced by halogen;

ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, naphthalene-2,6-diyl in which at least one of hydrogen is replaced by halogen, or pyridine-2,5-diyl;

$Z^1$, $Z^2$, $Z^3$ and $Z^4$ are independently a single bond, $—(CH_2)_2—$, —CH═CH—, —CF═CF—, —C≡C—, —COO—, —OCO—, $—CF_2O—$, $—OCF_2—$, $—CH_2O—$, $—OCH_2—$, $—(CH_2)_4—$, $—(CH_2)_2CF_2O—$, $—(CH_2)_2OCF_2—$, $—CF_2O(CH_2)_2—$, $—OCF_2(CH_2)_2—$, $—CH═CH—(CH_2)_2—$ or $—(CH_2)_2—CH═CH—$; and a, b, c and d are independently 0 or 1, and a sum of a, b, c and d is one or more.

Item 2. The compound according to item 1, wherein, in formula (1), $Z^1$, $Z^2$, $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

Item 3. The compound according to item 1 or 2, wherein, in formula (1), $R^1$ is alkyl having 1 to 10 carbons, and in the alkyl, at least one of $—CH_2—$ may be replaced by —O— and at least one of $—(CH_2)_2—$ may be replaced by —CH═CH—; and ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or naphthalene-2,6-diyl in which at least one of hydrogen is replaced by halogen, or pyridine-2,5-diyl.

Item 4. The compound according to item 1, represented by any one of formulas (1-1-1) to (1-1-4):

(1-1-1)

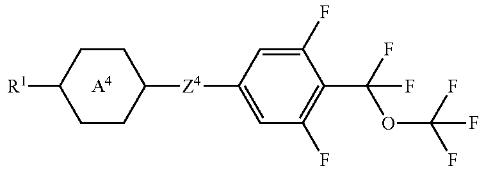

-continued (1-1-2)

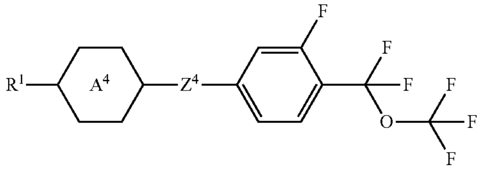

(1-1-3)

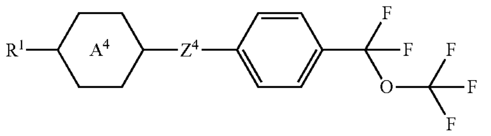

(1-1-4)

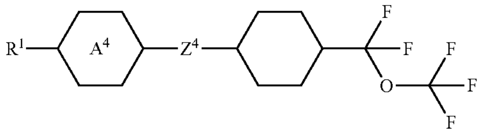

wherein, n formulas (1-1-1) to (1-1-4), $R^1$ is alkyl having 1 to 10 carbons, and in the alkyl, at least one of —$CH_2$— may be replaced by —O— and at least one of —$(CH_2)_2$— may be replaced by —CH═CH—;

ring $A^4$ is 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^4$ is a single bond, —$(CH_2)_2$—, —CH═CH—, —COO—, —OCO—, —$CF_2O$—, —$OCF_2$—, —$CH_2O$— or —$OCH_2$—.

Item 5. The compound according to item 1, represented by any one of formulas (1-2-1) to (1-2-4):

(1-2-1)

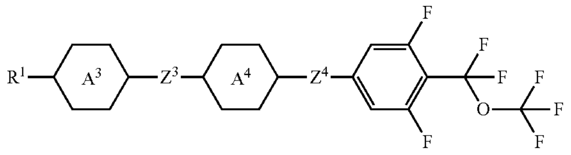

-continued (1-2-2)

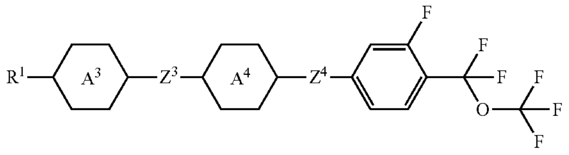

(1-2-3)

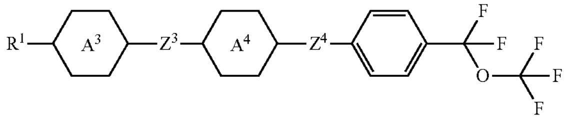

(1-2-4)

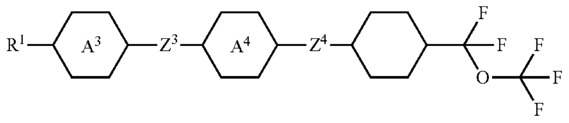

wherein, in formulas (1-2-1) to (1-2-4), $R^1$ is alkyl having 1 to 10 carbons, and in the alkyl, at least one of —$CH_2$— may be replaced by —O—, and at least one of —$(CH_2)_2$— may be replaced by —CH═CH—;

ring $A^3$ and ring $A^4$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^3$ and $Z^4$ are independently a single bond, —$(CH_2)_2$—, —CH═CH—, —COO—, —OCO—, —$CF_2O$—, —$OCF_2$—, —$CH_2O$— or —$OCH_2$—.

Item 6. The compound according to item 1 represented by any one of formulas (1-3-1) to (1-3-4):

(1-3-1)

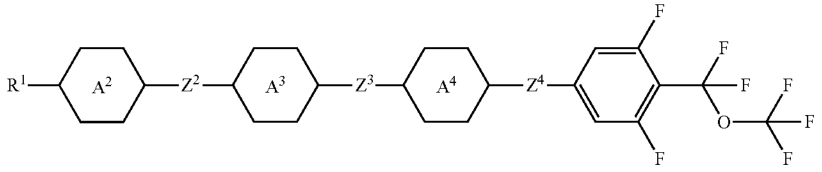

(1-3-2)

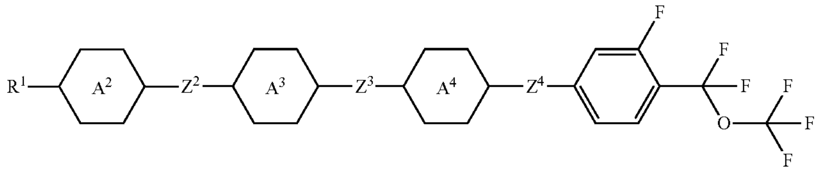

-continued (1-3-3)

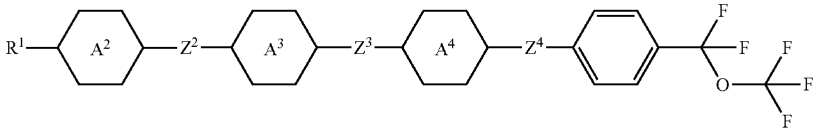

(1-3-4)

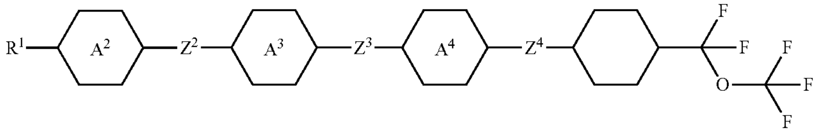

wherein, in formulas (1-3-1) to (1-3-4), $R^1$ is alkyl having 1 to 10 carbons, and in the alkyl, at least one of $—CH_2—$ may be replaced by —O— and at least one of $—(CH_2)_2—$ may be replaced by —CH═CH—;

ring $A^2$, ring $A^3$ and ring $A^4$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^2$, $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

Item 7. The compound according to item 1, represented by any one of formulas (1-4-1) to (1-4-4):

(1-4-1)

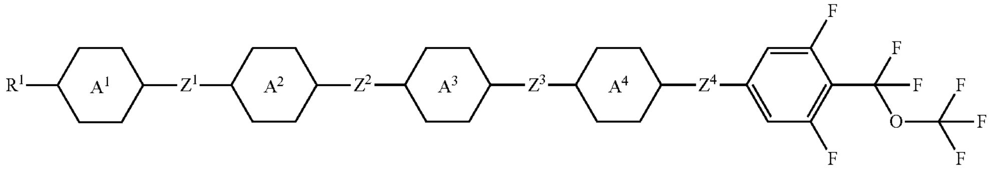

(1-4-2)

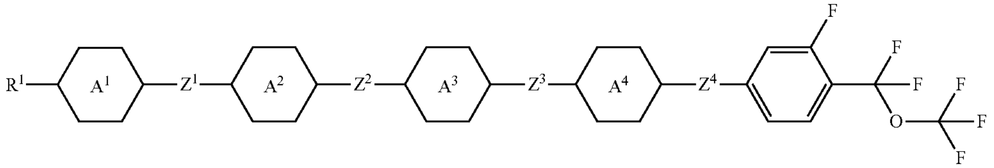

(1-4-3)

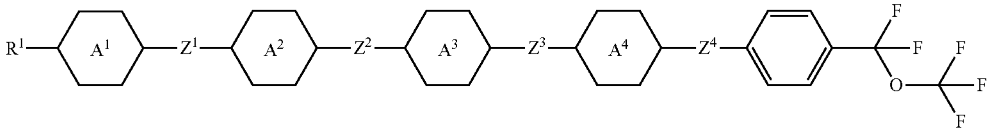

(1-4-4)

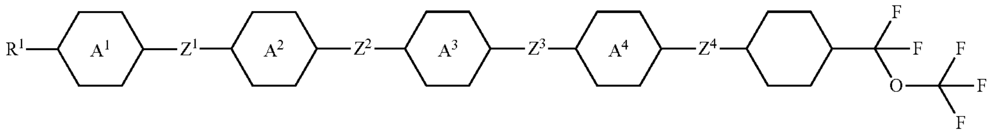

wherein, in formulas (1-4-1) to (1-4-4), $R^1$ is alkyl having 1 to 10 carbons, and in the alkyl, at least one of $—CH_2—$ may be replaced by —O— and at least one of $—(CH_2)_2—$ may be replaced by —CH═CH—;

ring $A^1$, ring $A^2$, ring $A^3$ and ring $A^4$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^1$, $Z^2$, $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

Item 8. A liquid crystal composition, containing at least one of the compounds according to any one of items 1 to 7.

Item 9. The liquid crystal composition according to item 8, further containing at least one compound selected from the group of compounds represented by formulas (2) to (4):

(2)

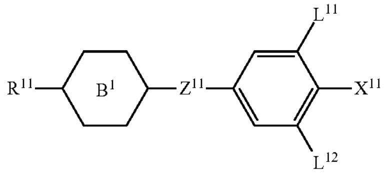

-continued (3)

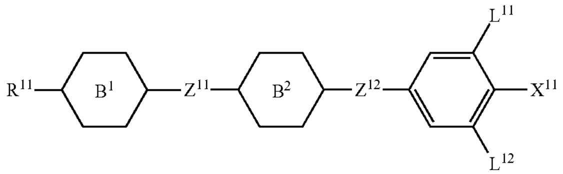

(4)

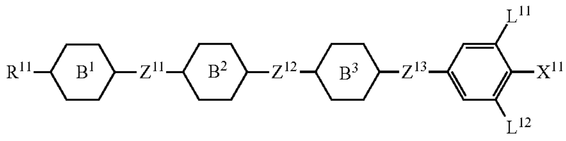

wherein, in formulas (2) to (3), $R^{11}$ is alkyl having 1 to 10 carbons or alkenyl having 2 to 10 carbons, and in the alkyl and the alkenyl, at least one of hydrogen may be replaced by fluorine and at least one of $—CH_2—$ may be replaced by —O—;

$X^{11}$ is fluorine, chlorine, $—OCF_3$, $—OCHF_2$, $—CF_3$, $—CHF_2$, $—CH_2F$, $—OCF_2CHF_2$ or $—OCF_2CHFCF_3$;

ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^{11}$, $Z^{12}$ and $Z^{13}$ are independently a single bond, $—CH_2CH_2—$, —CH═CH—, —C≡C—, —COO—, $—CF_2O—$, $—OCF_2—$, $—CH_2O—$ or $—(CH_2)_4—$; and $L^{11}$ and $L^{12}$ are independently hydrogen or fluorine.

Item 10. The liquid crystal composition according to item 8 or 9, further containing at least one compound selected from the group of compounds represented by formula (5):

(5)

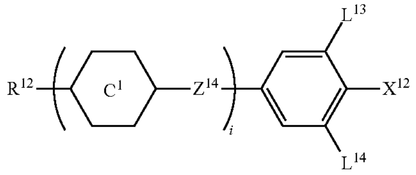

wherein, in formula (5), $R^{12}$ is alkyl having 1 to 10 carbons or alkenyl having 2 to 10 carbons, and in the alkyl and the alkenyl, at least one of hydrogen may be replaced by fluorine and at least one of $—CH_2—$ may be replaced by —O—;

$X^{12}$ is —C≡N or —C≡C—C≡N;

ring $C^1$ is 1,4-cyclohexylene, 1,4-phenylene in which at least one of hydrogen may be replaced by fluorine, tetrahydropyran-2,5-diyl, 1,3-dioxan-2,5-diyl or pyrimidine-2,5-diyl;

$Z^{14}$ is a single bond, $—CH_2CH_2—$, —C≡C—, —COO—, $—CF_2O—$, $—OCF_2—$ or $—CH_2O—$;

$L^{13}$ and $L^{14}$ are independently hydrogen or fluorine; and i is 1, 2, 3 or 4.

Item 11. The liquid crystal composition according to any one of items 8 to 10, further containing at least one compound selected from the group of compounds represented by formulas (6) to (12):

(6)

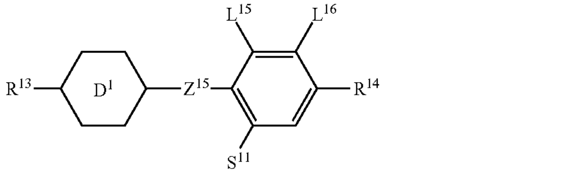

(7)

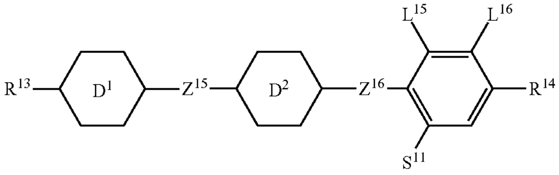

(8)

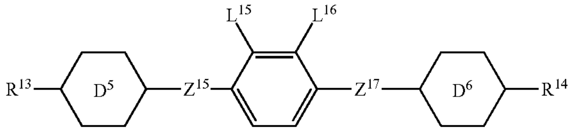

(9)

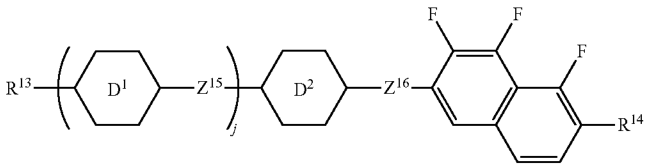

(10)

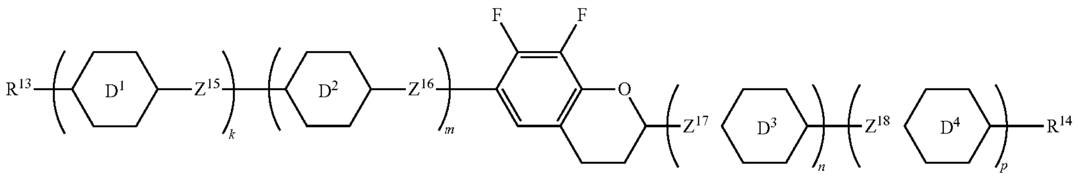

-continued (11)

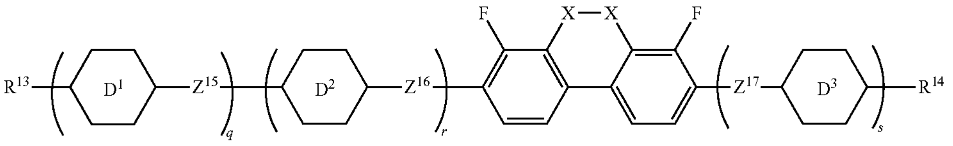

(12)

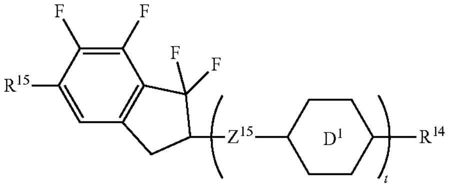

wherein in formulas (6) to (12), $R^{13}$ and $R^{14}$ are independently alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$S^{11}$ is hydrogen or methyl;

X is —$CF_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^{15}$ and $L^{16}$ are independently fluorine or chlorine;

j, k, m, n, p, q, r and s are independently 0 or 1, a sum of k, m, n and p is 1 or 2, a sum of q, r and s is 0, 1, 2 or 3, and t is independently 1, 2 or 3.

Item 12. The liquid crystal composition according to any one of items 8 to 11, further containing at least one compound selected from the group of compounds represented by formulas (13) to (15):

wherein, in formulas (13) to (15), $R^{16}$ and $R^{17}$ are independently alkyl having 1 to 10 carbons or alkenyl having 2 to 10 carbons, and in the alkyl or the alkenyl, at least one of —$CH_2$— may be replaced by —O— and at least one of hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —$CH_2CH_2$—, —CH═CH—, —C≡C— or —COO—.

Item 13. The liquid crystal composition according to any one of items 8 to 12, further containing at least one optically active compound and/or at least one polymerizable compound.

Item 14. The liquid crystal composition according to any one of items 8 to 13, further containing at least one antioxidant and/or at least one ultraviolet light absorber.

Item 15. A liquid crystal display device, including the liquid crystal composition according to any one of items 8 to 14.

1-1. Compound (1)

Compound (1) and a preferred example of compound (1) according to the invention will be explained. Preferred examples of a terminal group, a ring structure, a bonding group and a substituent in compound (1) are also applied to a compound represented by a subordinate formula of compound (1):

(13)

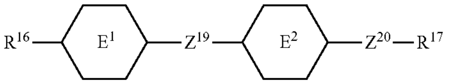

(14)

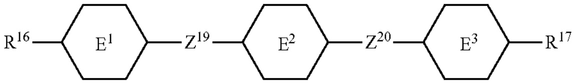

(15)

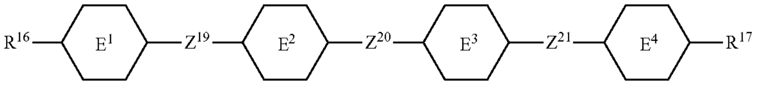

(1)

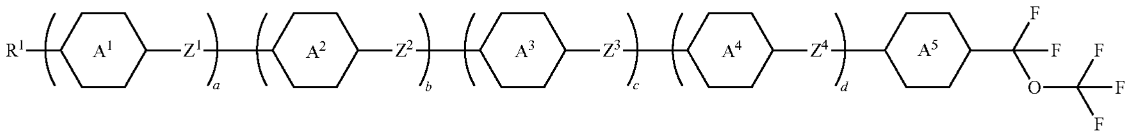

wherein, in formula (1), $R^1$ is hydrogen, halogen or alkyl having 1 to 20 carbons, and in the alkyl, at least one of $—CH_2—$ may be replaced by —O— or —S—, at least one of $—(CH_2)_2—$ may be replaced by —CH═CH—, and in the groups, at least one of hydrogen may be replaced by halogen; ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, naphthalene-2,6-diyl in which at least one of hydrogen is replaced by halogen, or pyridine-2,5-diyl;

$Z^1$, $Z^2$, $Z^3$ and $Z^4$ are independently a single bond, $—(CH_2)_2—$, —CH═CH—, —CF═CF—, —C≡C—, —COO—, —OCO—, $—CF_2O—$, $—OCF_2—$, $—CH_2O—$, $—OCH_2—$, $—(CH_2)_4—$, $—(CH_2)_2CF_2O—$, $—(CH_2)_2OCF_2—$, $—CF_2O(CH_2)_2$, $—OCF_2(CH_2)_2—$, $—CH═CH—(CH_2)_2—$ or $—(CH_2)_2—CH═CH—$; and a, b, c, and d are independently 0 or 1. A sum of a, b, c and d is one or more.

Examples of such $R^1$ include alkyl, alkoxy, alkoxyalkyl, alkoxyalkoxy, alkylthio, alkylthioalkoxy, alkenyl, alkenyloxy, alkenyloxyalkyl, alkoxyalkenyl and alkenylthio. The groups have a straight chain or a branched chain, and do not include a cyclic chain such as cyclohexyl. In the groups, a straight chain is preferred to a branched chain. Even when $R^1$ has a branched chain, a case where $R^1$ is optically active is preferred.

A preferred configuration of —CH═CH— in alkenyl depends on a position of a double bond. A trans configuration is preferred in alkenyl having the double bond in an odd-numbered position, such as $—CH═CHCH_3$, $—CH═CHC_2H_5$, $—CH═CHC_3H_7$, $—CH═CHC_4H_9$, $—C_2H_4CH═CHCH_3$ and $—C_2H_4CH═CHC_2H_5$. A cis configuration is preferred in alkenyl having the double bond in an even-numbered position, such as $—CH_2CH═CHCH_3$, $—CH_2CH═CHC_2H_5$ and $—CH_2CH═CHC_3H_7$. The alkenyl compound having a preferred configuration has a high clearing point or a wide temperature range of the liquid crystal phase. Detailed explanation is found in Mol. Cryst. Liq. Cryst., 1985, 131, 109 and Mol. Cryst. Liq. Cryst., 1985, 131, and 327.

Examples of alkyl include $—CH_3$, $—C_2H_5$, $—C_3H_7$, $—C_4H_9$, $—C_5H_{11}$, $—C_6H_{13}$, $—C_7H_{15}$, $—C_8H_{17}$, $—C_9H_{19}$, $—C_{10}H_{21}$, $—C_{11}H_{23}$, $—C_{12}H_{25}$, $—C_{13}H_{27}$, $—C_{14}H_{29}$ and $—C_{15}H_{31}$.

Examples of alkoxy include $—OCH_3$, $—OC_2H_5$, $—OC_3H_7$, $—OC_4H_9$, $—OC_5H_{11}$, $—OC_6H_{13}$, $—OC_7H_{15}$, $—OC_8H_{17}$, $—OC_9H_{19}$, $—OC_{10}H_{21}$, $—OC_{11}H_{23}$, $—OC_{12}H_{25}$, $—OC_{13}H_{27}$ and $—OC_{14}H_{29}$.

Examples of alkoxyalkyl include $—CH_2OCH_3$, $—CH_2OC_2H_5$, $—CH_2OC_3H_7$, $—(CH_2)_2—OCH_3$, $—(CH_2)_2—OC_2H_5$, $—(CH_2)_2OC_3H_7$, $—(CH_2)_3—OCH_3$, $—(CH_2)_4—OCH_3$ and $—(CH_2)_5—OCH_3$.

Examples of alkenyl include $—CH═CH_2$, $—CH═CHCH_3$, $—CH_2CH═CH_2$, $—CH═CHC_2H_5$, $—CH^2CH═CHCH^3$, $—(CH^2)^2—CH═CH^2$, $—CH═CHC^3H^7$, $—CH^2CH═CHC^2H^5$, $—(CH_2)_2—CH═CHCH_3$ and $—(CH_2)_3—CH═CH_2$.

Examples of alkenyloxy include $—OCH_2CH═CH_2$, $—OCH_2CH═CHCH_3$ and $—OCH_2CH═CHC_2H_5$.

Examples of alkyl in which at least one of hydrogen is replaced by halogen include $—CH_2F$, $—CHF_2$, $—CF_3$, $—(CH_2)_2—F$, $—CF_2CH_2F$, $—CF_2CHF_2$, $—CH_2CF_3$, $—CF_2CF_3$, $—(CH_2)_3—F$, $—(CF_2)_3—F$, $—CF_2CHFCF_3$, $—CHFCF_2CF_3$, $—(CH_2)_4—F$, $—(CF_2)_4—F$, $—(CH_2)_5—F$, $—(CF_2)_5—F$, $—CH_2Cl$, $—CHCl_2$, $—CCl_3$, $—(CH_2)_2—Cl$, $—CCl_2CH_2Cl$, $—CCl_2CHCl_2$, $—CH_2CCl_3$, $—CCl_2CCl_3$, $—(CH_2)_3—Cl$, $—(CCl_2)_3—Cl$, $—CCl_2CHClCCl_3$, $—CHClCCl_2CCl_3$, $—(CH_2)_4—Cl$, $—(CCl_2)_4—Cl$, $—(CH_2)_5—Cl$ and $—(CCl_2)_5—Cl$.

Examples of alkoxy in which at least one of hydrogen is replaced by halogen include $—OCH_2F$, $—OCHF_2$, $—OCF_3$, $—O—(CH_2)_2—F$, $—OCF_2CH_2F$, $—OCF_2CHF_2$, $—OCH_2CF_3$, $—O—(CH_2)_3—F$, $—O—(CF_2)_3—F$, $—OCF_2CHFCF_3$, $—OCHFCF_2CF_3$, $—O(CH_2)_4—F$, $—O—(CF_2)_4—F$, $—O—(CH_2)_5—F$, $—O—(CF_2)_5—F$, $—OCH_2Cl$, $—OCHCl_2$, $—OCCl_3$, $—O—(CH_2)_2—Cl$, $—OCCl_2CH_2Cl$, $—OCCl_2CHCl_2$, $—OCH_2CCl_3$, $—O—(CH_2)_3—Cl$, $—O—(CCl_2)_3—Cl$, $—OCCl_2CHClCCl_3$, $—OCHClCCl_2CCl_3$, $—O(CH_2)_4—Cl$, $—O—(CCl_2)_4—Cl$, $—O—(CH_2)_5—Cl$ and $—O—(CCl_2)_5—Cl$.

Examples of alkenyl in which at least one of hydrogen is replaced by halogen include —CH═CHF, $—CH═CF_2$, —CF═CHF, $—CH═CHCH_2F$, $—CH═CHCF_3$, $—(CH_2)_2—CH═CF_2$, $—CH_2CH═CHCF_3$, $—CH═CHCF_2CF_3$, —CH═CHCl, $—CH═CCl_2$, —CCl═CHCl, $—CH═CHCH_2Cl$, $—CH═CHCCl_3$, $—(CH_2)_2—CH═CCl_2$, $—CH_2CH═CHCCl_3$ and $—CH═CHCCl_2CCl_3$.

Preferred examples of $R^1$ include alkyl having 1 to 15 carbons and alkenyl having 2 to 15 carbons. Further preferred examples of $R^1$ include $—CH_3$, $—C_2H_5$, $—C_3H_7$, $—C_4H_9$, $—C_5H_{11}$, $—C_6H_{13}$, $—C_7H_{15}$, $—C_8H_{17}$, $—C_9H_{19}$, $—C_{10}H_{21}—C_{11}H_{23}$, $—C_{12}H_{25}$, $—C_{13}H_{27}$, $—C_{14}H_{29}$, $—C_{15}H_{31}$, $—CH═CH_2$, $—CH═CHCH_3$, $—CH_2CH═CH_2$, $—CH═CHC_2H_5$, $—CH_2CH═CHCH_3$, $—(CH_2)_2—CH═CH_2$, $—CH═CHC_3H_7$, $—CH_2CH═CHC_2H_5$, $—(CH_2)_2—CH═CHCH_3$ and $—(CH_2)_3—CH═CH_2$.

In formula (1), ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, naphthalene-2,6-diyl in which at least one of hydrogen is replaced by halogen, or pyridine-2,5-diyl.

Preferred examples of ring $A^1$, ring $A^2$, ring $A^3$, ring $A^4$ or ring $A^5$ include 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl or naphthalene-2,6-diyl. Cis and trans configurations exist in 1,4-cyclohexylene. From a viewpoint of a high maximum temperature, the trans configuration is referred. Preferred examples of 1,4-phenylene in which at least one of hydrogen is replaced by halogen include groups (R-1) to (R-5).

(R-1)

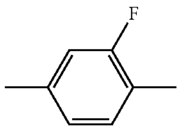

(R-2)

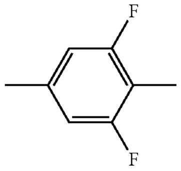

(R-3)

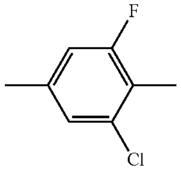

(R-4)

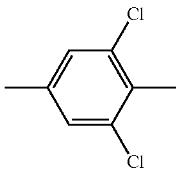

(R-5)

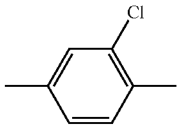

Then, 2-fluoro-1,4-phenylene is not left-right symmetric. Fluorine in a lateral position includes a case where the fluorine is located on a side of a left terminal group and a case where the fluorine is located on a side of a right terminal group (rightward: R-1). Preferred 2-fluoro-1,4-phenylene is rightward. Then, 2,6-difluoro-1,4-phenylene (R-2) is not left-right symmetric, either. Preferred 2,6-difluoro-1,4-phenylene is also rightward (R-2). When a group is not left-right symmetric also in any other group, the group is preferably rightward.

Further preferred examples of 1,4-phenylene in which at least one of hydrogen is replaced by halogen include 2-fluoro-1,4-phenylene and 2,6-difluoro-1,4-phenylene.

Further preferred examples of ring $A^1$, ring $A^2$, ring $A^3$, ring $A^4$ or ring $A^5$ include 1,4-cyclohexylene, 1,4-phenylene, 2-fluoro-1,4-phenylene, 2,6-difluoro-1,4-phenylene, tetrahydropyran-2,5-diyl and 1,3-dioxane-2,5-diyl. Most preferred examples of ring $A^1$, ring $A^2$, ring $A^3$, ring $A^4$ and ring $A^5$ include 1,4-cyclohexylene, 1,4-phenylene, 2-fluoro-1,4-phenylene and 2,6-difluoro-1,4-phenylene.

In formula (1), $Z^1$, $Z^2$, $Z^3$ and $Z^4$ are independently a single bond, $—(CH_2)_2—$, $—CH{=}CH—$, $—CF{=}CF—$, $—C{\equiv}C—$, $—COO—$, $—OCO—$, $—CF_2O—$, $—OCF_2—$, $—CH_2O—$, $—OCH_2—$, $—(CH_2)_4—$, $—(CH_2)_2CF_2O—$, $—(CH_2)_2OCF_2—$, $—CF_2O(CH_2)_2—$, $—OCF_2(CH_2)_2—$, $—CH{=}CH—(CH_2)_2—$ or $—(CH_2)_2—CH{=}CH—$.

Preferred examples of $Z^1$, $Z^2$, $Z^3$ or $Z^4$ include a single bond, $—(CH_2)_2—$, $—CH{=}CH—$, $—CF{=}CF—$, $—C{\equiv}C—$, $—COO—$, $—CF_2O—$, $—OCF_2—$, $—CH_2O—$, $—(CH_2)_4—$, $—CH{=}CH—(CH_2)_2—$ and $—(CH_2)_2—CH{=}CH—$.

1-2. Physical Properties of Compound (1)

In compound (1), physical properties such as a clearing point, optical anisotropy and dielectric anisotropy can be arbitrarily adjusted by suitably combining kinds of $R^1$, ring $A^1$, ring $A^2$, ring $A^3$, ring $A^4$, ring $A^5$, $Z^1$, $Z^2$, $Z^3$ and $Z^4$. Compound (1) may also contain an isotope such as $^2H$ (deuterium) and $^{13}C$ in an amount larger than an amount of natural abundance, because no significant difference is in the physical properties of the compound. A main effect of kinds of $R^1$ or the like on the physical properties of compound (1) will be explained below.

When left terminal group $R^1$ has a straight chain, the temperature range of the liquid crystal phase is wide and the viscosity is small. When $R^1$ has a branched chain, the compatibility with other liquid crystal compounds is good. A compound in which $R^1$ is optically active is useful as a chiral dopant. A reverse twisted domain to be generated in the device can be prevented by adding the compound to the composition. A compound in which $R^1$ is not optically active is useful as a component of the composition. When $R^1$ is alkenyl, a preferred configuration depends on a position of the double bond. An alkenyl compound having the preferred configuration has the high maximum temperature or the wide temperature range of the liquid crystal phase.

When all of ring $A^1$, ring $A^2$, ring $A^3$, ring $A^4$ and ring $A^5$ are 1,4-cyclohexylene, the clearing point is high and the viscosity is small. When at least one of ring $A^1$, ring $A^2$, ring $A^3$, ring $A^4$ and ring $A^5$ is 1,4-phenylene, or 1,4-phenylene in which at least one of hydrogen is replaced by halogen, the optical anisotropy is comparatively large and an orientation order parameter is comparatively large. When all of ring $A^1$, ring $A^2$, ring $A^3$, ring $A^4$ and ring $A^5$ are 1,4-phenylene, 1,4-phenylene in which at least one of hydrogen is replaced by halogen, or a combination thereof, the optical anisotropy is particularly large.

When $Z^1$, $Z^2$, $Z^3$ and $Z^4$ are a single bond, $—(CH_2)_2—$, $—CH{=}CH—$, $—CF_2O—$, $—OCF_2—$, $—CH_2O—$, $—OCH_2—$, $—CF{=}CF—$, $—(CH_2)_3—O—$, $—O—(CH_2)_3—$, $—(CH_2)_2—CF_2O—$, $—OCF_2—(CH_2)_2—$ or $—(CH_2)_4$, the viscosity is small. When the bonding groups are a single bond, $—(CH_2)_2—$, $—CF_2O—$, $—OCF_2—$ or $—CH{=}CH—$, the viscosity is smaller. When the bonding groups are $—CH{=}CH—$, the temperature range of the liquid crystal phase is wide, and an elastic constant (K) is large. When the bonding groups are $—C{\equiv}C—$, the optical anisotropy is large. When $Z^1$, $Z^2$ or $Z^3$ is a single bond, $—(CH_2)_2—$ or $—(CH_2)_4—$, chemical stability is high.

Compound (1) has $CF_2OCF_3$ at a terminal. Compound (1) has a low minimum temperature of the liquid crystal phase, a small viscosity, a suitable optical anisotropy, a large dielectric anisotropy and an excellent compatibility with other liquid crystal compounds due to an effect of such structure. The compound has an excellent compatibility due to an effect of $CF_2OCF_3$. The compound is particularly excellent from a viewpoint of the large positive dielectric anisotropy and the excellent compatibility.

As described above, a compound having objective physical properties can be obtained by suitably selecting a kind of the ring structure, the terminal group, the bonding group or the like. Accordingly, compound (1) is useful as a component of a composition to be used for a liquid crystal display device having such a mode as PC, TN, STN, ECB, OCB, IPS or VA.

1-3 Preferred Examples of Compound (1)

Preferred examples of compound (1) include compounds (1-1-1) to (1-1-4) shown in item 4, compounds (1-2-1) to (1-2-4) shown in item 5, compounds (1-3-1) to (1-3-4) shown in item 6 and compounds (1-4-1) to (1-4-4) shown in item 7.

1-4. Synthesis of Compound (1)

A method for synthesizing compound (1) will be explained. Compound (1) can be prepared by suitably combining methods in synthetic organic chemistry. Methods for introducing an objective terminal group, ring and bonding group into a starting material are described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.).

1-4-1. Formation of a Bonding Group

An example of a method for forming a bonding group in compound (1) is as described in the scheme below. In the scheme, MSG[1] (or MSG[2]) is a monovalent organic group having at least one ring. The monovalent organic groups represented by a plurality of MSG[1] (or MSG[2]) may be identical or different. Compounds (1A) to (1G) correspond to compound (1).

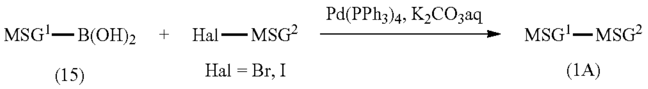

(15) Hal = Br, I (16) (1A)

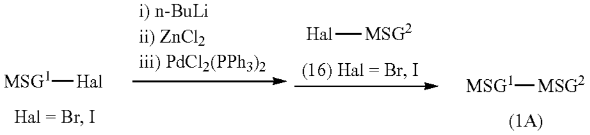

Hal = Br, I (17) (1A)

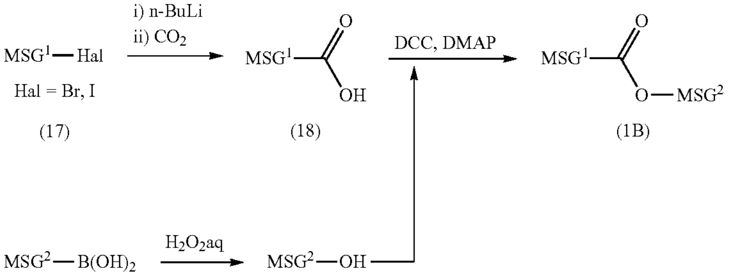

Hal = Br, I (17) (18) (1B) (15) (19)

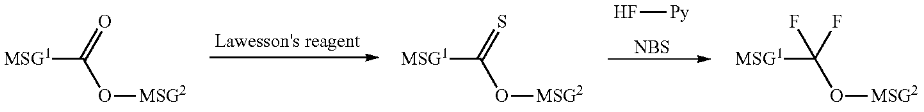

(1B) (20) (1C)

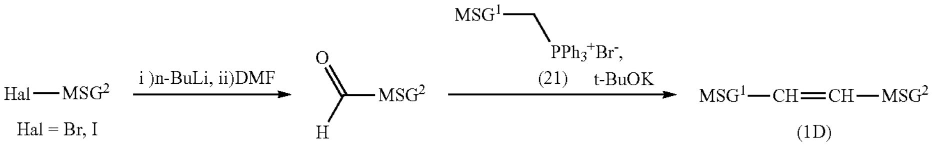

Hal = Br, I (17) (22) (1D)

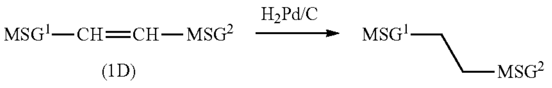

(1D) (1E)

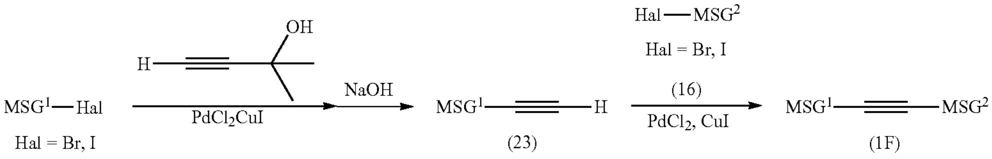

Hal = Br, I Hal = Br, I (17) (23) (1F)

-continued

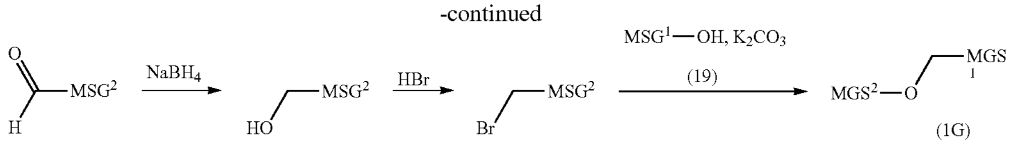

(22) (24) (25) (1G)

(I) Formation of a Single Bond

Compound (1A) is prepared by allowing aryl boronic acid (15) to react, in the presence of an aqueous carbonate solution and a catalyst such as tetrakis(triphenylphosphine)palladium, with compound (16) prepared according to a publicly known method. The compound (1A) is also prepared by allowing compound (17) prepared according to a publicly known method to react, in the presence of a catalyst such as dichlorobis(triphenylphosphine)palladium, with n-butyllithium and subsequently with zinc chloride, and further with compound (16).

(II) Formation of —COO— and —OCO—

Carboxylic acid (18) is obtained by allowing compound (17) to react with n-butyllithium and then with carbon dioxide. Compound (1B) having —COO— is prepared by performing, in the presence of 1,3-dicyclohexylcarbodiimide (DCC) and 4-dimethylaminopyridine (DMAP), dehydration of compound (18) and phenol (19) prepared according to a publicly known method. A compound having —OCO— is also prepared according to the method.

(III) Formation of —$CF_2O$ and $OCF_2$

Compound (20) is obtained by treating compound (1B) with a thiation reagent such as Lawesson's reagent. Compound (1C) having —CF2O- is prepared by fluorinating compound (20) with a hydrogen fluoride-pyridine complex and N-bromosuccinimide (NBS). See M. Kuroboshi et al., Chem. Lett., 1992, 827. Compound (1C) is also prepared by fluorinating compound (20) with (diethylamino)sulfur trifluoride (DAST). See W. H. Bunnelle et al., J. Org. Chem. 1990, 55, 768. A compound having —$OCF_2$— is also prepared according to the method. The bonding groups can also be formed according to the method described in Peer. Kirsch et al., Angew. Chem. Int. Ed. 2001, 40, 1480.

(IV) Formation of —CH=CH—

Aldehyde (22) is obtained by treating compound (17) with n-butyllithium and then allowing the treated product to react with formamide such as N,N-dimethylformamide (DMF). Compound (1D) is prepared by allowing phosphorus ylide generated by treating phosphonium salt (21) prepared according to a publicly known method with abase such as potassium tert-butoxide to react with aldehyde (22). A cis isomer is generated depending on reaction conditions, and therefore the cis isomer is isomerized into a trans isomer according to a publicly known method, when necessary.

(V) Formation of —$(CH_2)_2$—

Compound (1E) is prepared by hydrogenating compound (1D) in the presence of a catalyst such as palladium on carbon.

(VI) Formation of —C≡C—

Compound (23) is obtained by allowing compound (17) to react with 2-methyl-3-butyn-2-ol in the presence of a catalyst including dichloropalladium and copper halide, and then performing deprotection under basic conditions. Compound (1F) is prepared by allowing compound (23) to react with compound (16) in the presence of a catalyst including dichlorobistriphenylphosphine palladium and copper halide.

(VII) Formation of —$CH_2O$— and —$OCH_2$—

Compound (24) is obtained by reducing compound (22) with a reducing agent such as sodium boron hydride. Compound (25) is obtained by halogenating the compound (24) with hydrobromic acid or the like. Compound (1G) is prepared by allowing compound (25) to react with compound (19) in the presence of potassium carbonate or the like.

1-4-2. Formation of Ring $A^1$, Ring $A^2$, Ring $A^3$, Ring $A^4$ and Ring $A^5$ With regard to a ring such as 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, tetrahydropyran-2,5-diyl, 1,3-dioxane-2,5-diyl, pyrimidine-2,5-diyl, pyridine-2,5-diyl 2,6,7-trioxabicyclo[2.2.2]octane-1,4-diyl and naphthalene-2,6-diyl, a starting material is commercially available or a synthetic process is well known.

1-4-3. Synthesis Examples

An example of a method for preparing compound (1) is as described below. According to a method described in Journal of Fluorine Chemistry 131 (2010) 200-207, compound (1) is obtained by allowing compound (30) having a difluorobromomethyl group to react with trifluoromethyl triflate (occasionally, abbreviated as TFMT) and silver fluoride.

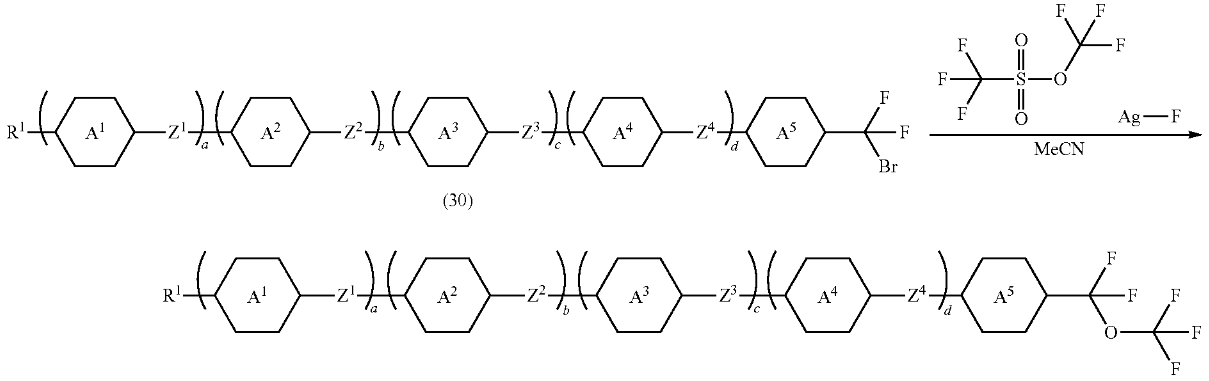

(30)

(1)

In the compounds, $R^1$, ring $A^1$, ring $A^2$, ring $A^3$, ring $A^4$, ring $A^5$, $Z^1$, $Z^2$, $Z^3$, $Z^4$, a, b, c and d are defined in a manner identical with the definitions in formula (1).

When ring $A^5$ is 1,4-cyclohexylene, compound (1) can be prepared by a method as shown below, for example.

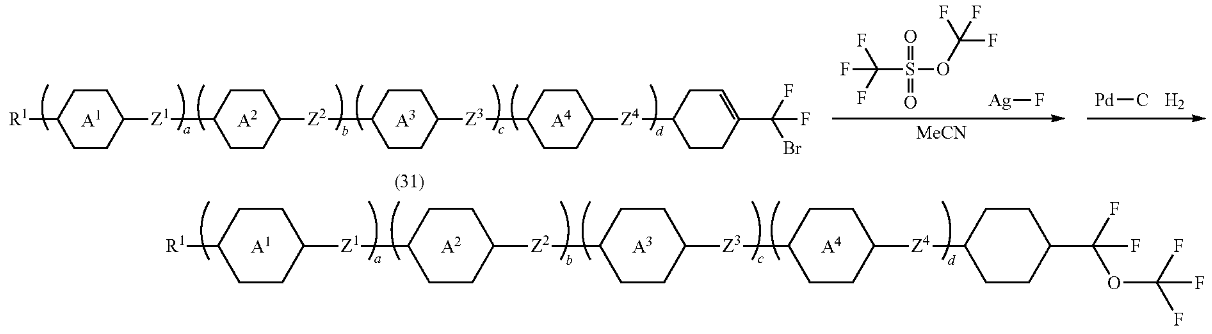

(31)

In the compounds, $R^1$, ring $A^1$, ring $A^2$, ring $A^3$, ring $A^4$, ring $A^5$, $Z^1$, $Z^2$, $Z^3$, $Z^4$, a, b, c and d are defined in a manner identical with the definitions in formula (1).

Compound (30), compound (31) or the like being a precursor of compound (1) can be prepared by a method as shown below depending on a difference of ring $A^5$, for example.

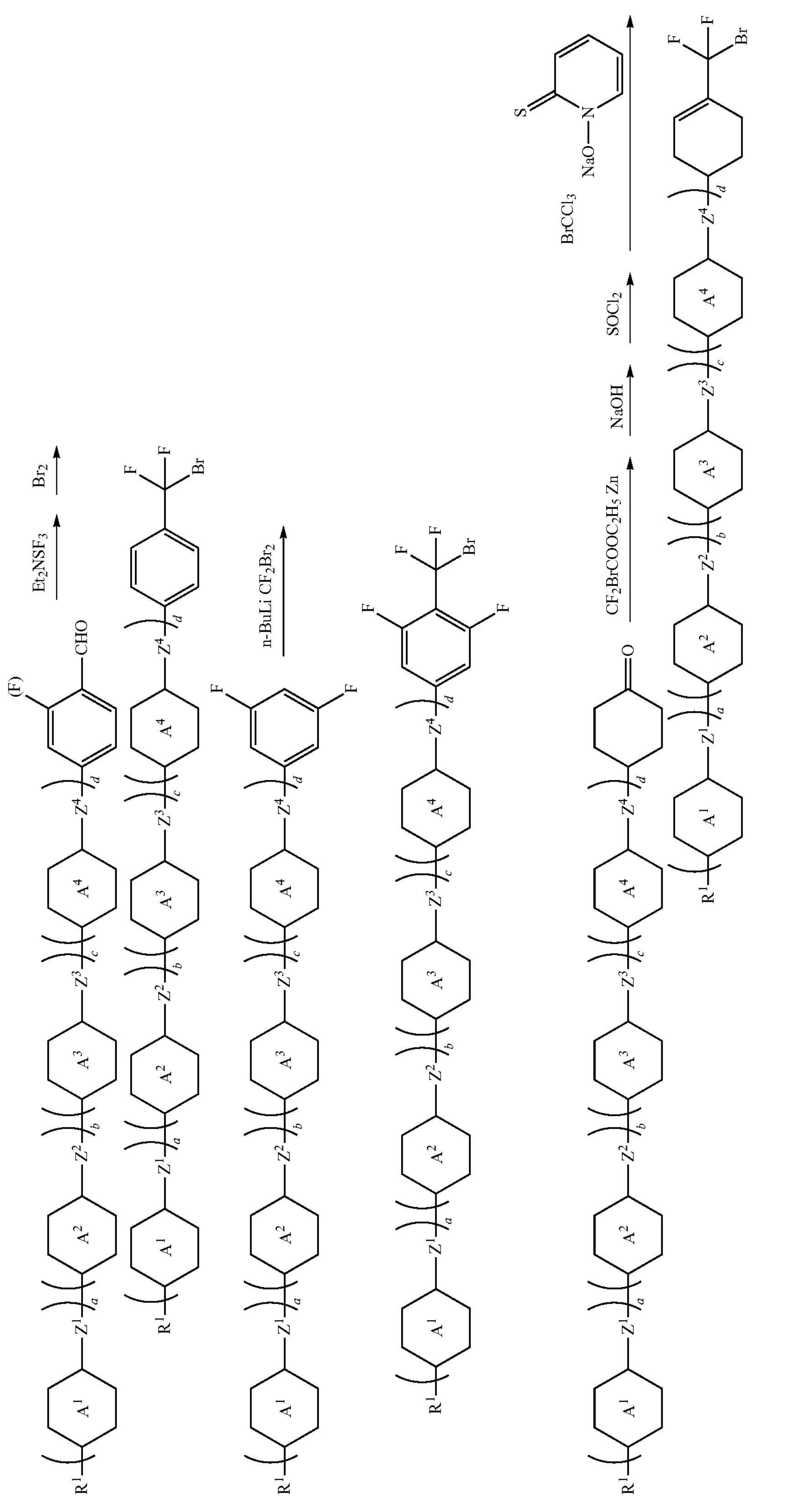
$Et_2NSF_3$
$Br_2$
n-BuLi $CF_2Br_2$
$CF_2BrCOOC_2H_5$ Zn
NaOH
$SOCl_2$
$BrCCl_3$ In the compounds, $R^1$, ring $A^1$, ring $A^2$, ring $A^3$, ring $A^4$, ring $A^5$, $Z^1$, $Z^2$, $Z^3$, $Z^4$, a, b, c and d are defined in a manner identical with the definitions in formula (1).

2. Composition (1)

The liquid crystal composition of the invention will be explained. Composition (1) contains at least one compound (1) as component A. Composition (1) may contain two or more compounds (1). A component of the liquid crystal compound may be compound (1) only. In order to develop excellent physical properties, composition (1) preferably contains at least one of compounds (1) in the range of approximately 1 to approximately 99% by weight. In a composition having a positive dielectric anisotropy, a preferred content of compound (1) is in the range of approximately 5 to approximately 60% by weight. In a composition having a dielectric anisotropy, a preferred content of compound (1) is approximately 30% by weight or less. Composition (1) may also contain compound (1) and various liquid crystal compounds that are not described herein.

A preferred composition contains a compound selected from components B, C, D and E shown below. When composition (1) is prepared, components can be selected, for example, by taking dielectric anisotropy of compound (1) into consideration. A composition prepared by suitably selecting components has a high maximum temperature of the nematic phase, a low minimum temperature of the nematic phase, a small viscosity, a suitable optical anisotropy, a large dielectric anisotropy and a suitable elastic constant.

Component B includes compounds (2) to (4). Component C includes compound (5). Component D includes compounds (6) to (12). Component E includes compounds (13) to (15). The components will be explained in the order.

Component B includes a compound having a halogen-containing group or a fluorine-containing group at a right terminal. Preferred examples of component B include compounds (2-1) to (2-16), compounds (3-1) to (3-113) and compounds (4-1) to (4-57).

(2-1)

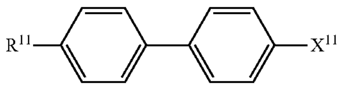

(2-2)

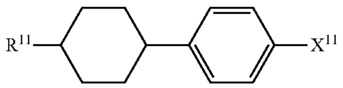

(2-3)

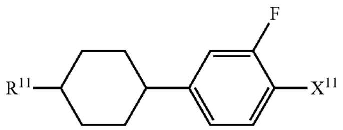

(2-4)

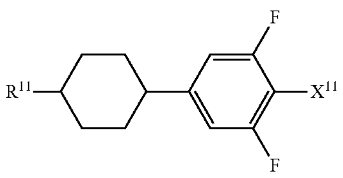

(2-5)

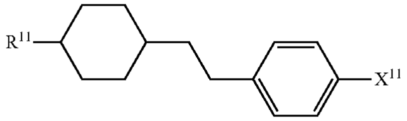

-continued (2-6)

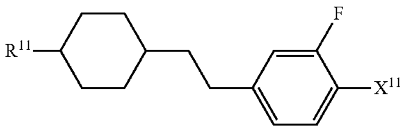

(2-7)

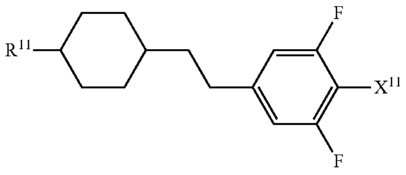

(2-8)

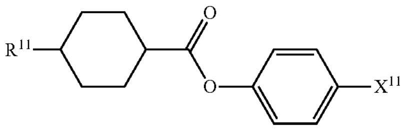

(2-9)

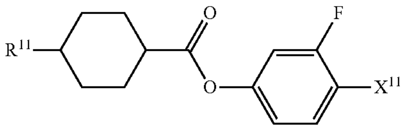

(2-10)

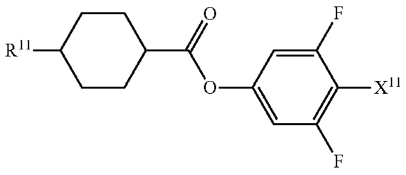

(2-11)

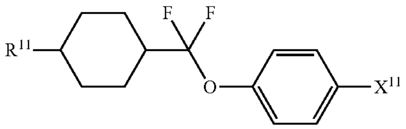

(2-12)

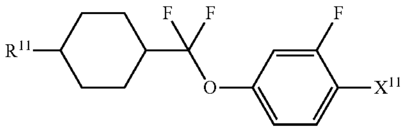

(2-13)

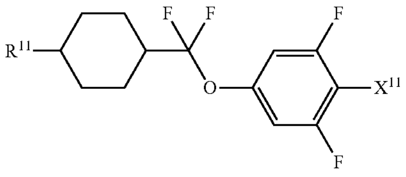

(2-14)

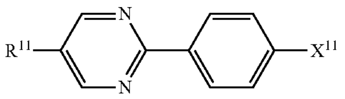

(2-15)

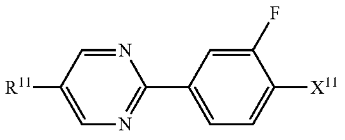

-continued
(2-16)
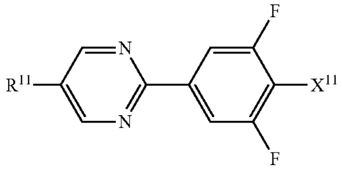
(3-1)
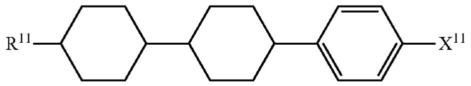
(3-2)
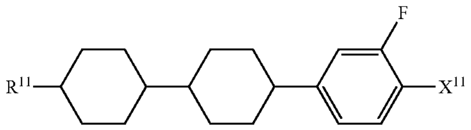
(3-3)
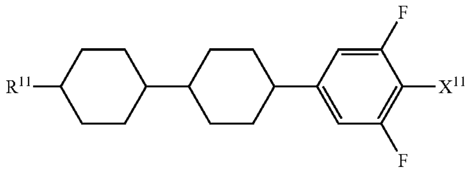
(3-4)
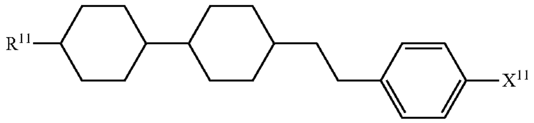
(3-5)
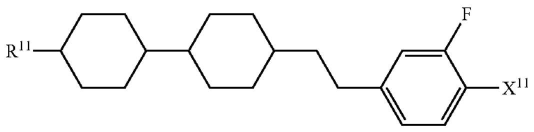
(3-6)
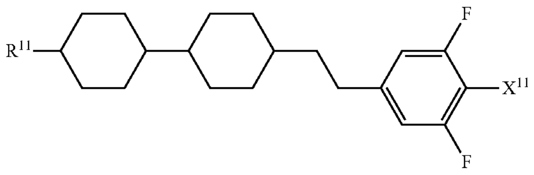
(3-7)
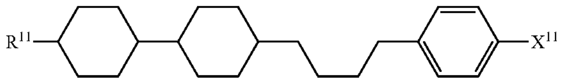
(3-8)
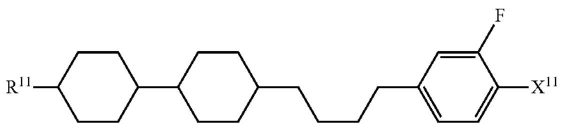
(3-9)
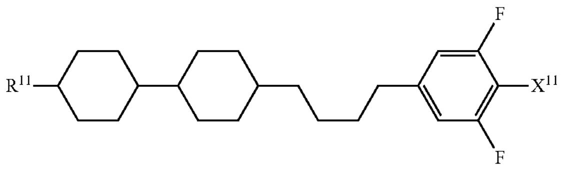
-continued
(3-10)
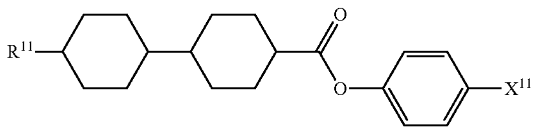
(3-11)
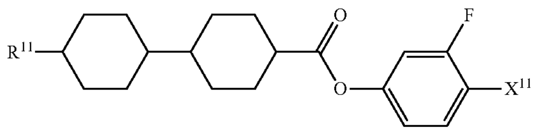
(3-12)
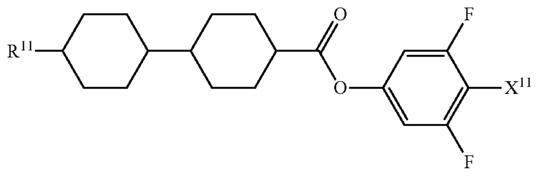
(3-13)
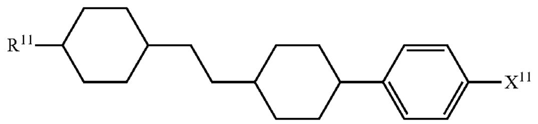
(3-14)
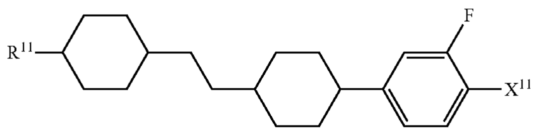
(3-15)
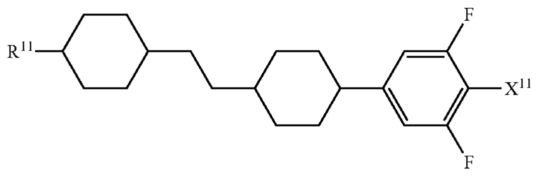
(3-16)
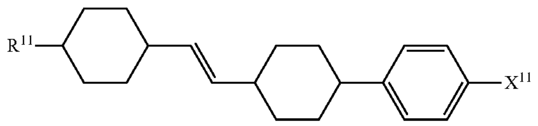
(3-17)
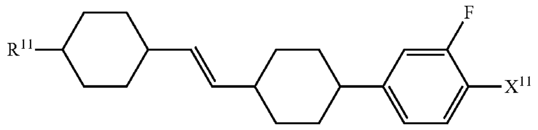
(3-18)
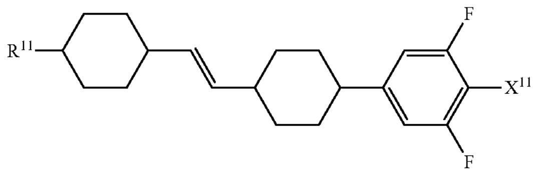

-continued
(3-19)
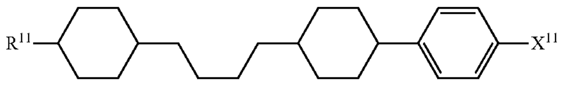
(3-20)
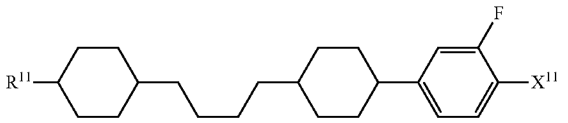
(3-21)
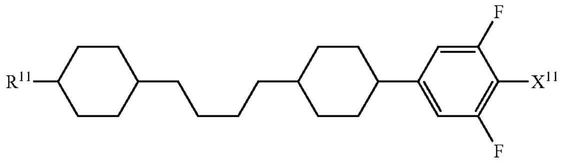
(3-22)
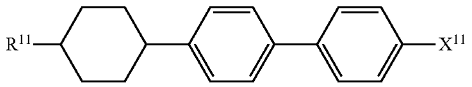
(3-23)
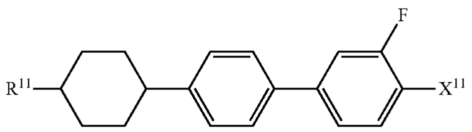
(3-24)
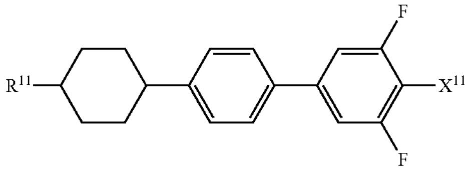
(3-25)
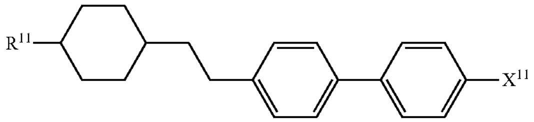
(3-26)
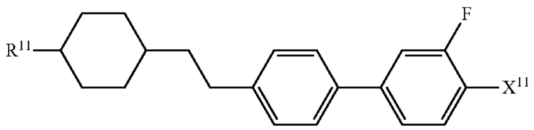
(3-27)
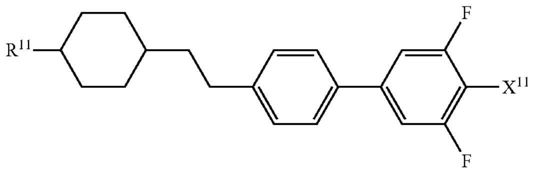
(3-28)
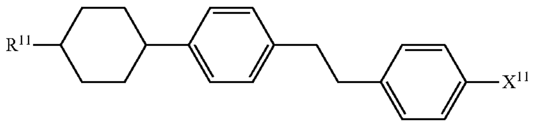
-continued
(3-29)
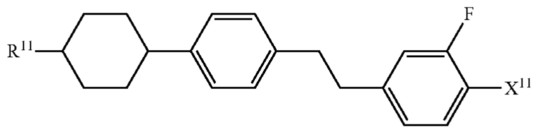
(3-30)
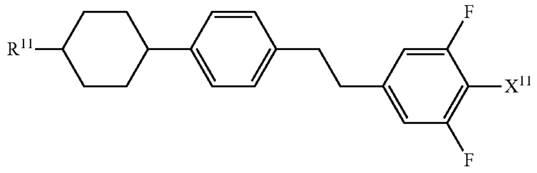
(3-31)
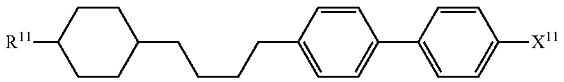
(3-32)
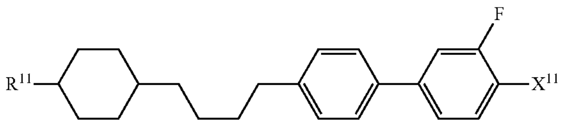
(3-33)
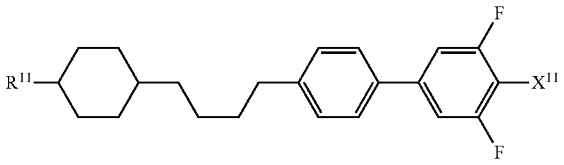
(3-34)
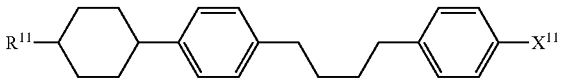
(3-35)
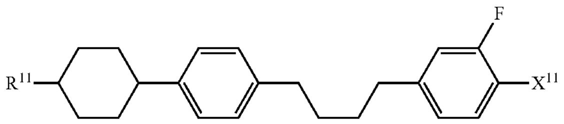
(3-36)
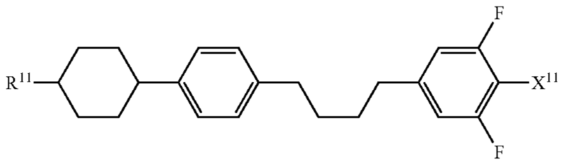
(3-37)
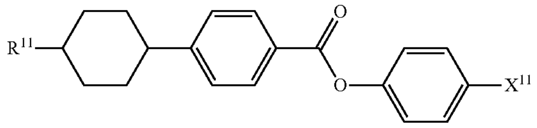
(3-38)
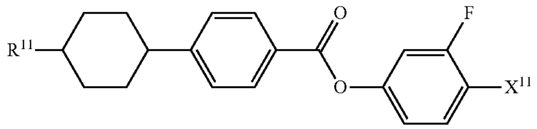

-continued
(3-39)
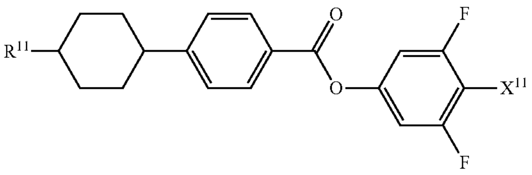
(3-40)
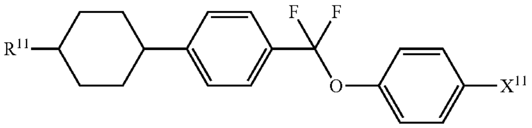
(3-41)
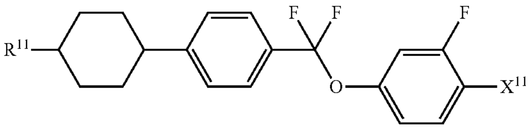
(3-42)
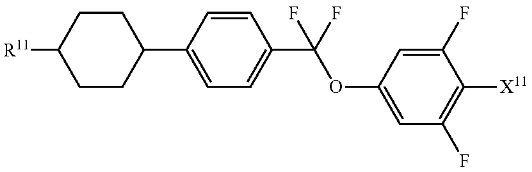
(3-43)
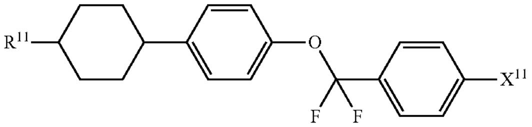
(3-44)
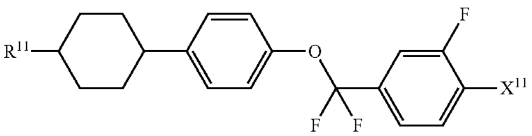
(3-45)
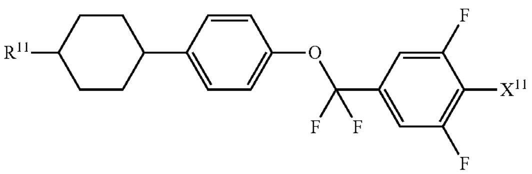
(3-46)
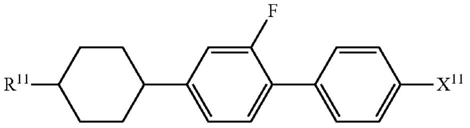
(3-47)
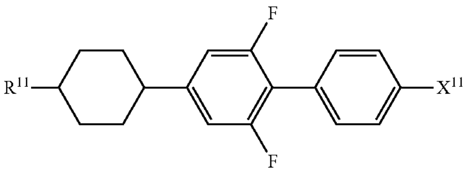
-continued
(3-48)
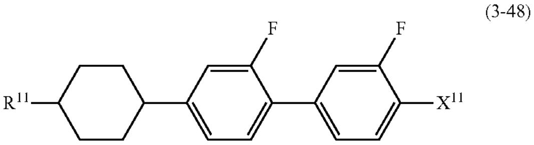
(3-49)
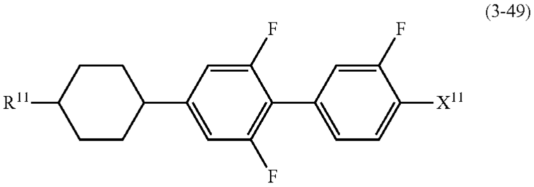
(3-50)
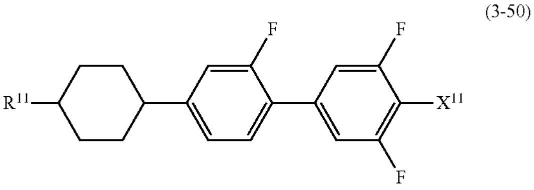
(3-51)
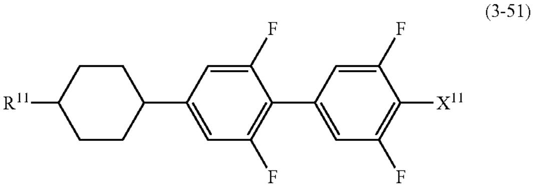
(3-52)
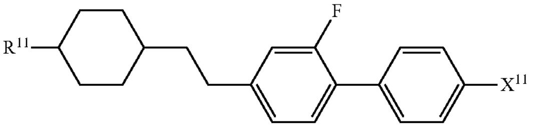
(3-53)
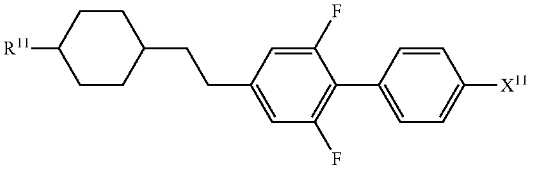
(3-54)
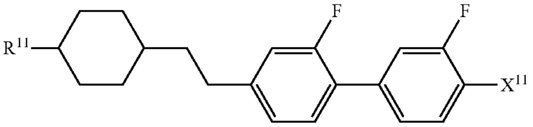
(3-55)
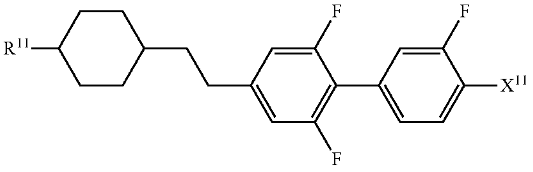
(3-56)
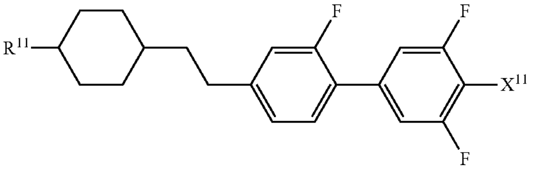

-continued
(3-57)
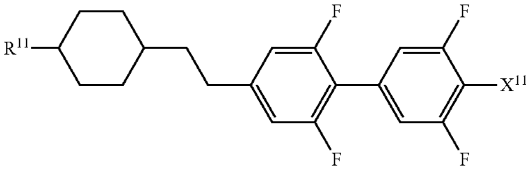
(3-58)
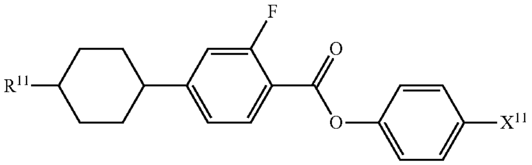
(3-59)
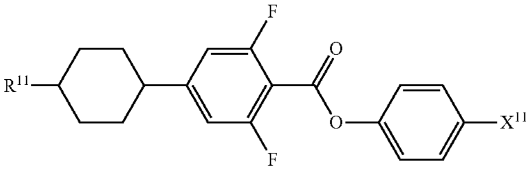
(3-60)
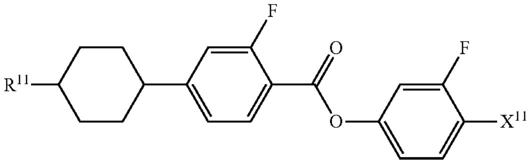
(3-61)
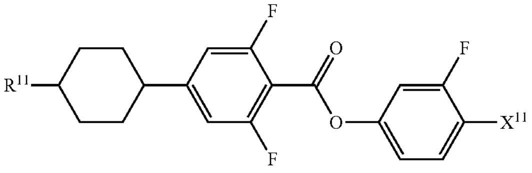
(3-62)
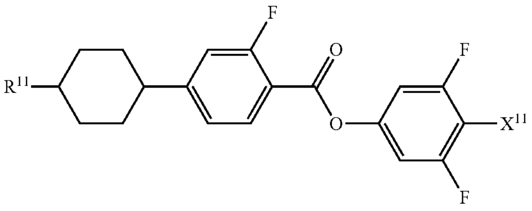
(3-63)
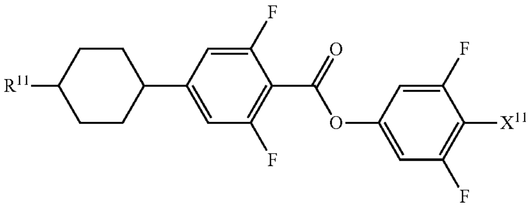
(3-64)
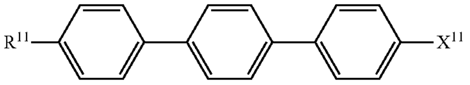
-continued
(3-65)
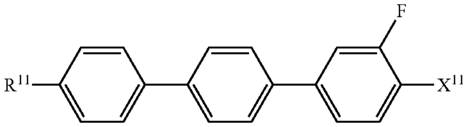
(3-66)
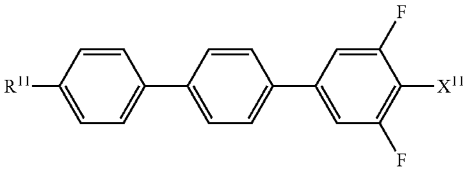
(3-67)
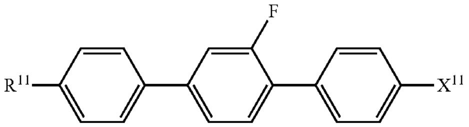
(3-68)
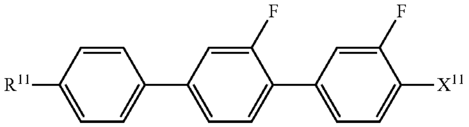
(3-69)
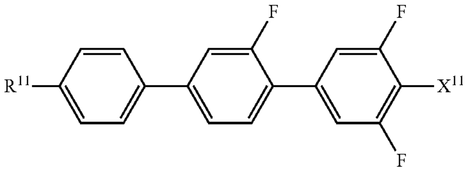
(3-70)
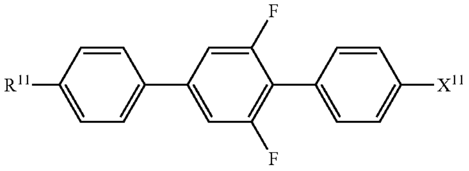
(3-71)
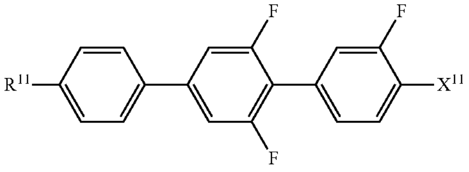
(3-72)
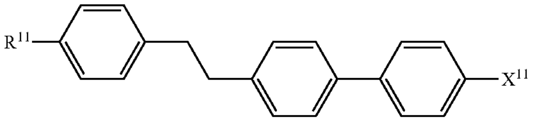
(3-73)
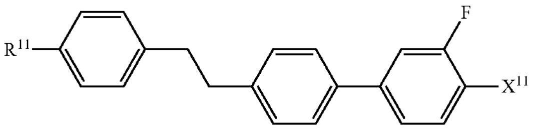

-continued
(3-74)
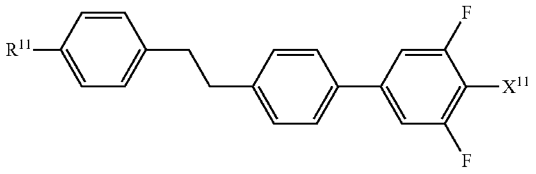
(3-75)
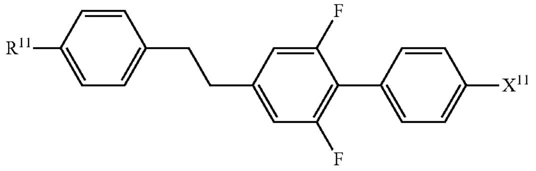
(3-76)
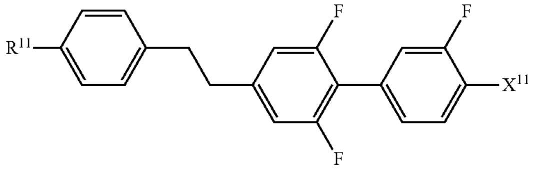
(3-77)
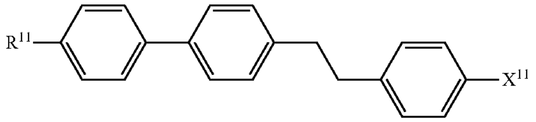
(3-78)
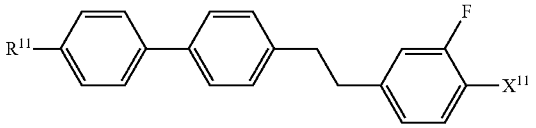
(3-79)
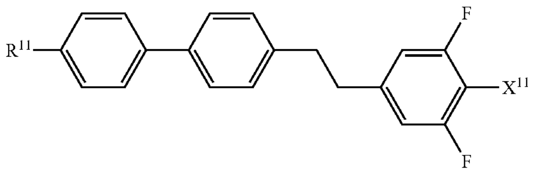
(3-80)
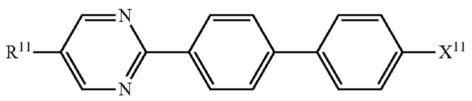
(3-81)
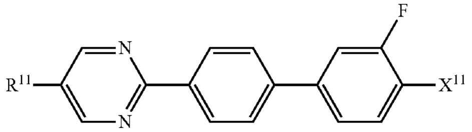
(3-82)
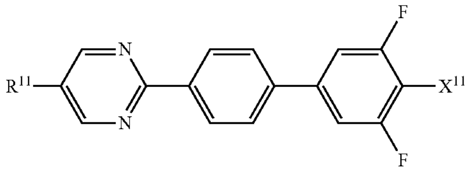
-continued
(3-83)
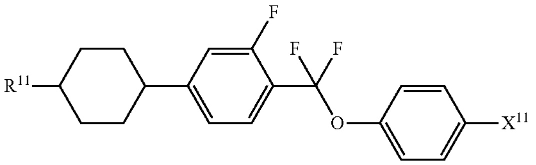
(3-84)
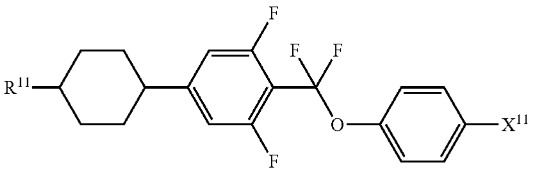
(3-85)
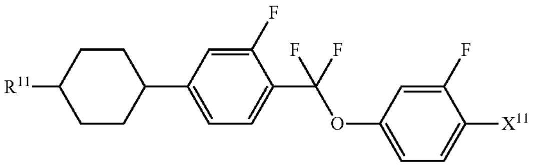
(3-86)
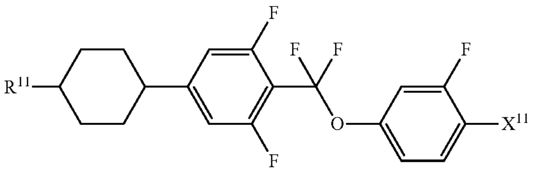
(3-87)
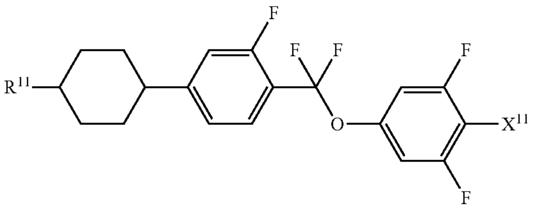
(3-88)
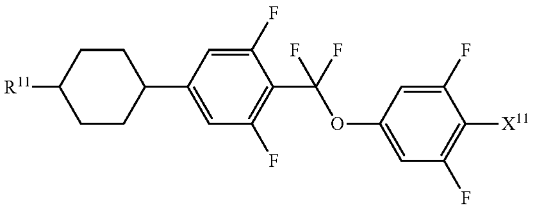
(3-89)
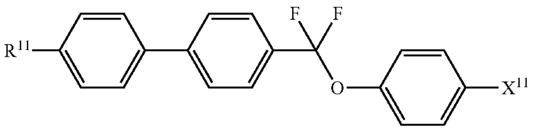
(3-90)
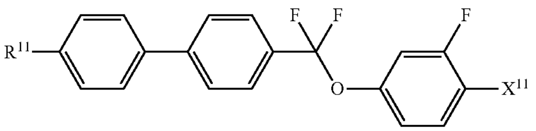

-continued
(3-91)
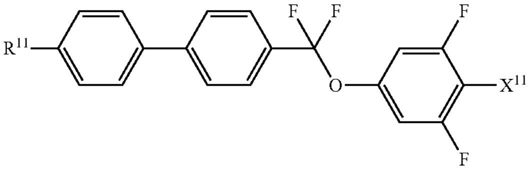
(3-92)
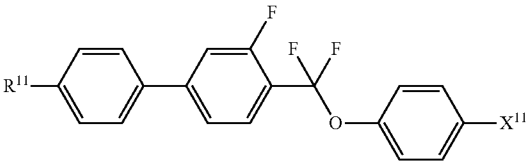
(3-93)
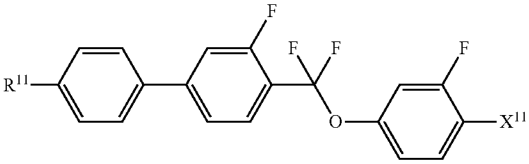
(3-94)
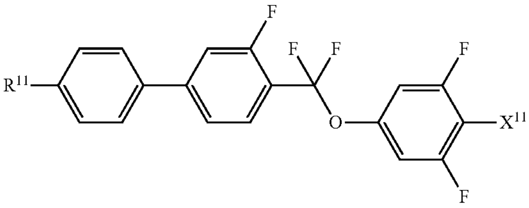
(3-95)
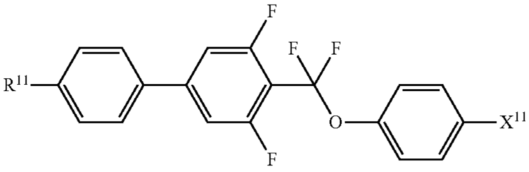
(3-96)
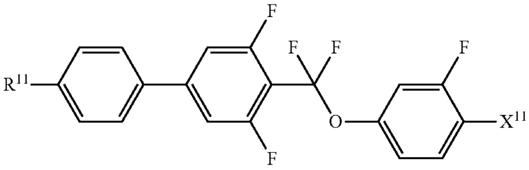
(3-97)
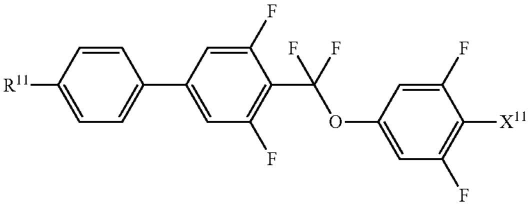
(3-98)
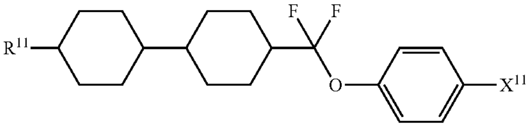
-continued
(3-99)
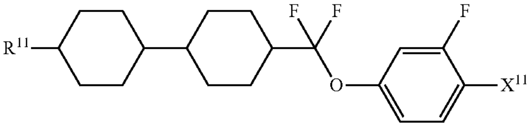
(3-100)
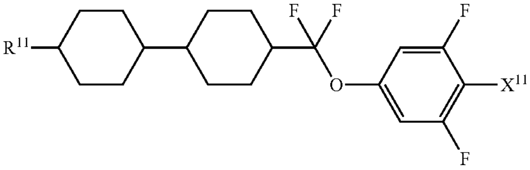
(3-101)
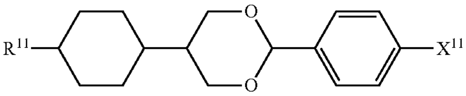
(3-102)
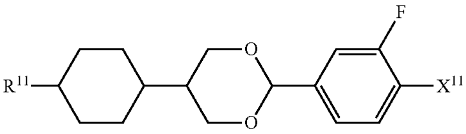
(3-103)
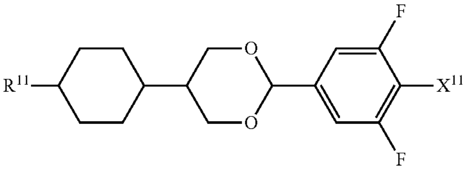
(3-104)
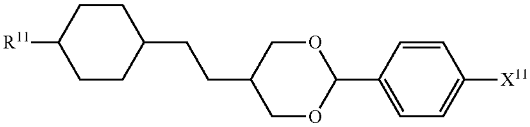
(3-105)
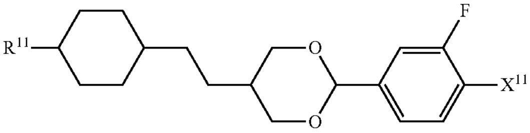
(3-106)
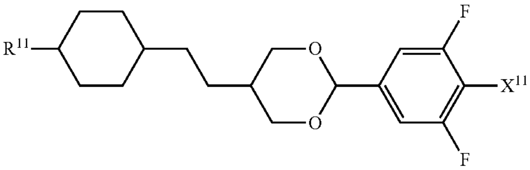
(3-107)
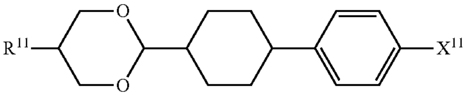

-continued
(3-108)
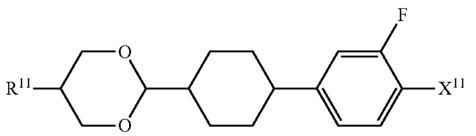
(3-109)
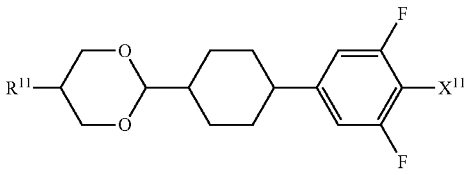
(3-110)
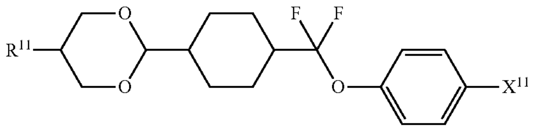
(3-111)
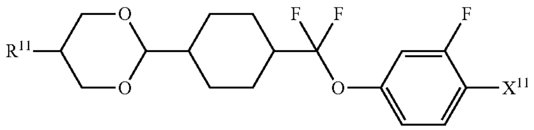
(3-112)
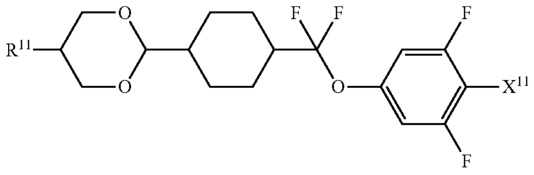
(3-113)
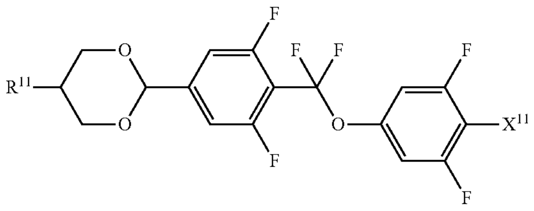
(4-1)
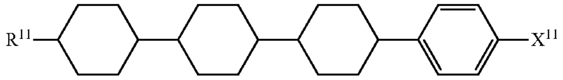
(4-2)
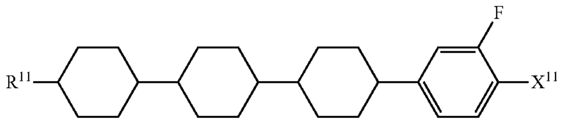
(4-3)
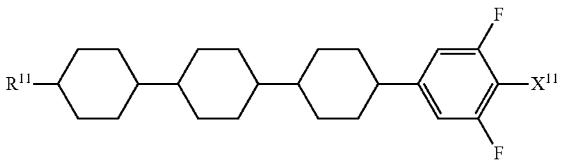
-continued
(4-4)
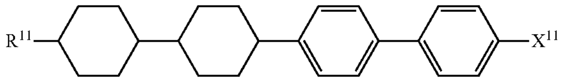
(4-5)
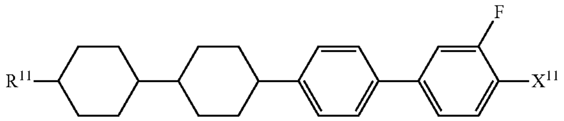
(4-6)
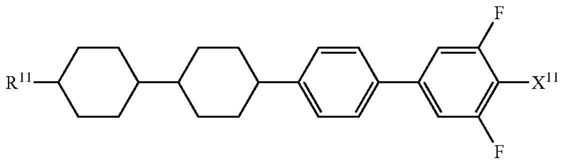
(4-7)
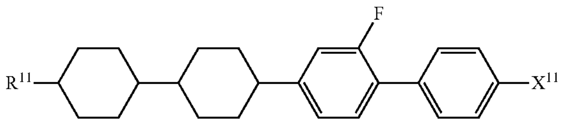
(4-8)
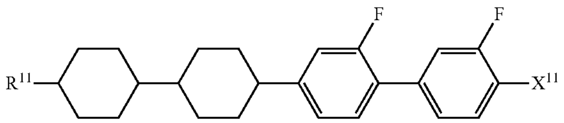
(4-9)
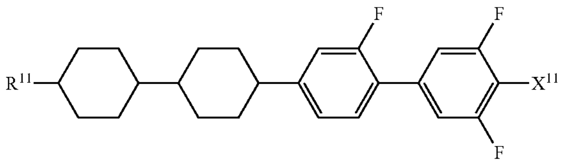
(4-10)
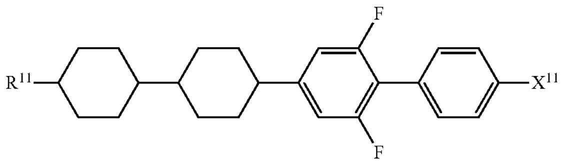
(4-11)
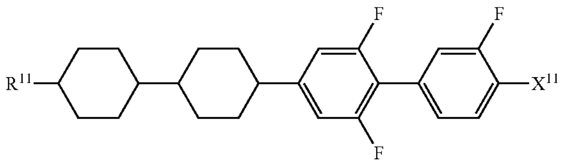
(4-12)
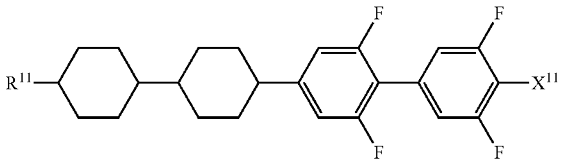

-continued
(4-13)
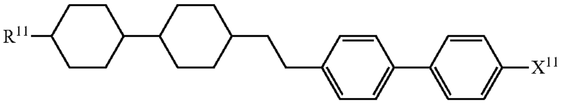
(4-14)
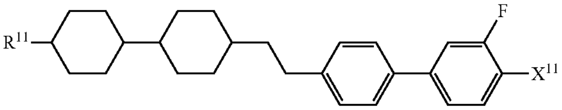
(4-15)
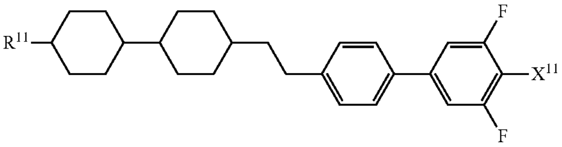
(4-16)
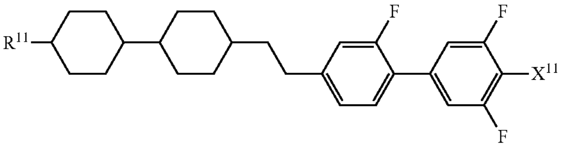
(4-17)
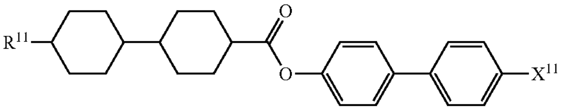
(4-18)
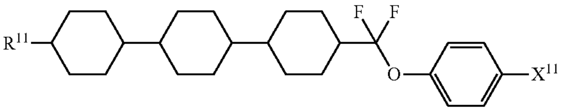
(4-19)
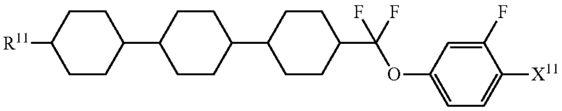
(4-20)
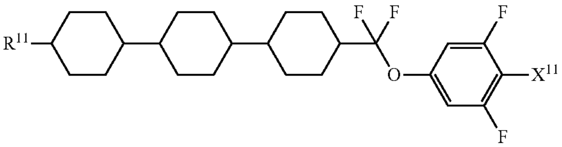
(4-21)
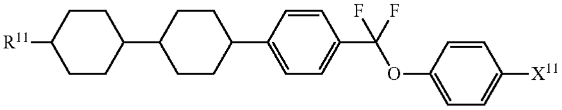
(4-22)
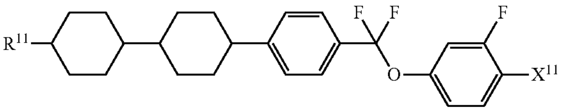
-continued
(4-23)
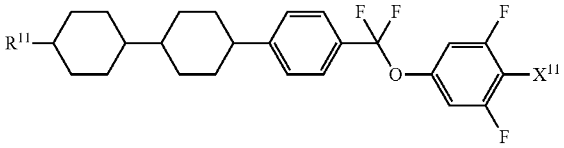
(4-24)
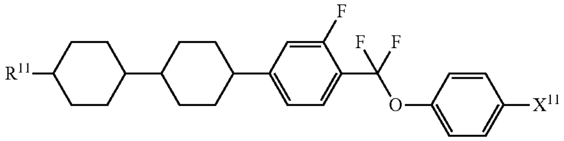
(4-25)
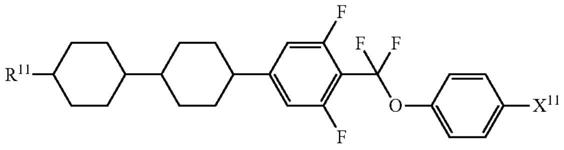
(4-26)
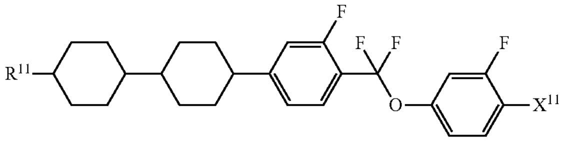
(4-27)
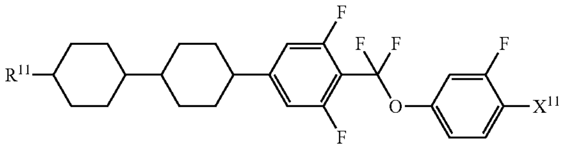
(4-28)
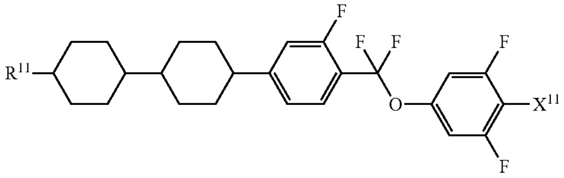
(4-29)
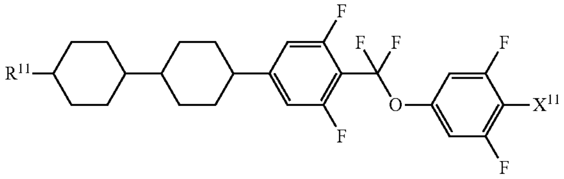
(4-30)
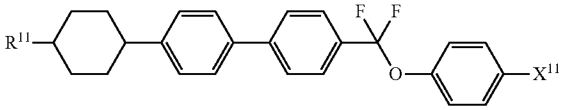
(4-31)
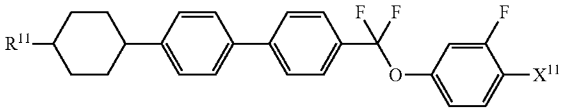

-continued
(4-32)
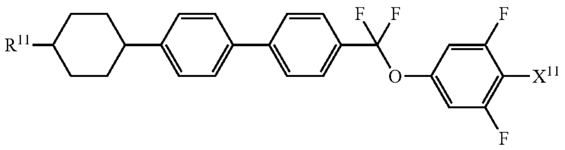
(4-33)
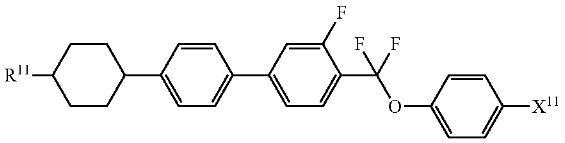
(4-34)
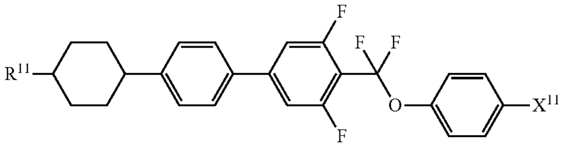
(4-35)
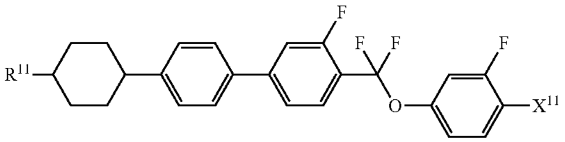
(4-36)
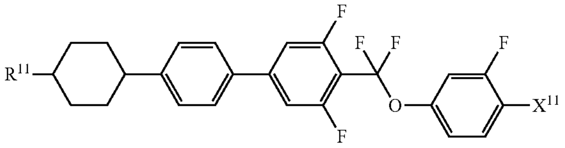
(4-37)
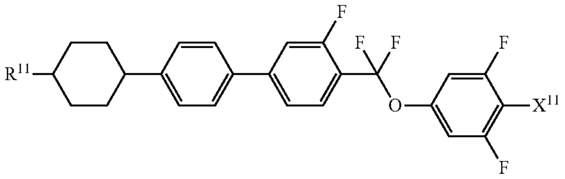
(4-38)
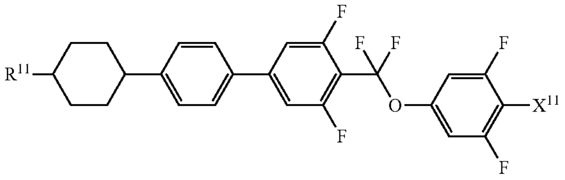
(4-39)
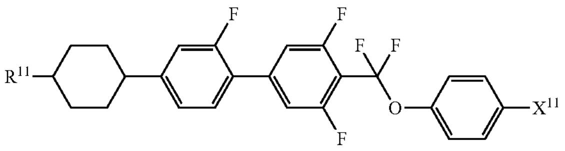
-continued
(4-40)
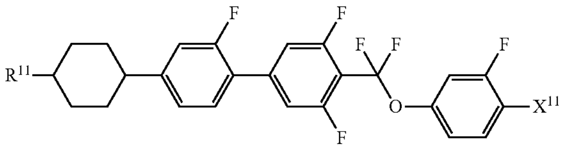
(4-41)
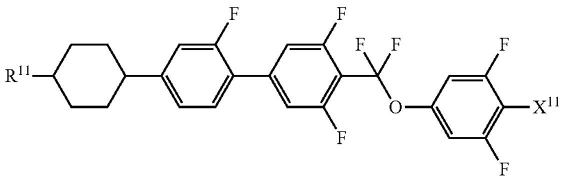
(4-42)
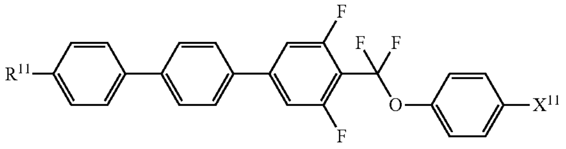
(4-43)
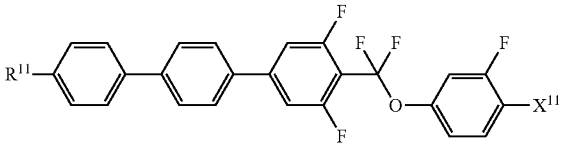
(4-44)
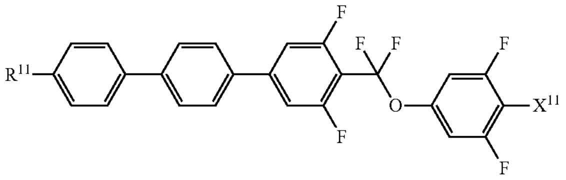
(4-45)
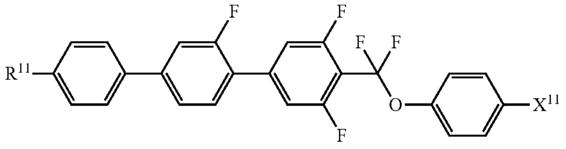
(4-46)
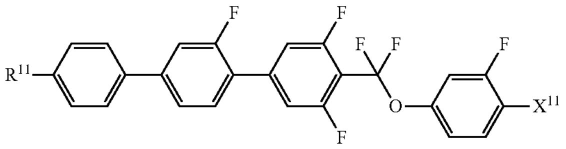
(4-47)
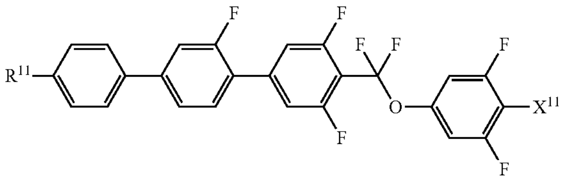

-continued (4-48)

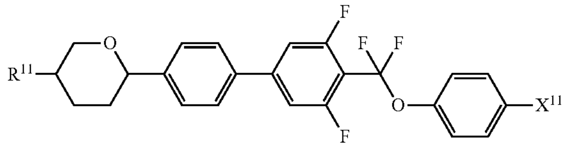

(4-49)

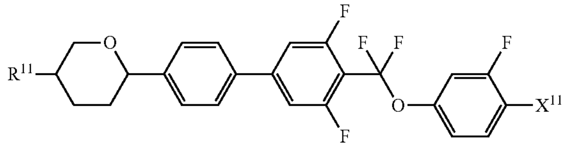

(4-50)

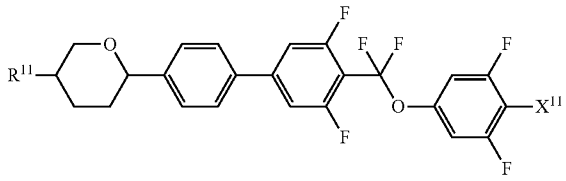

(4-51)

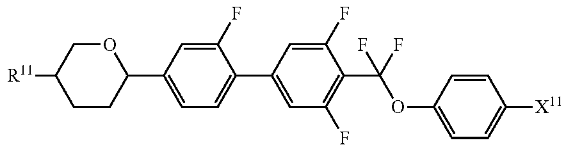

(4-52)

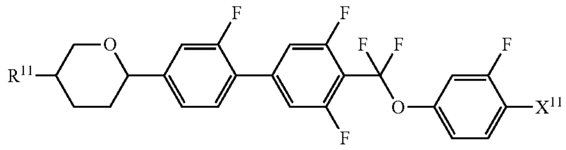

(4-53)

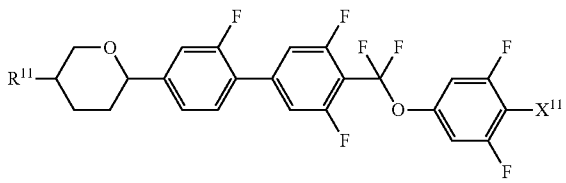

(4-54)

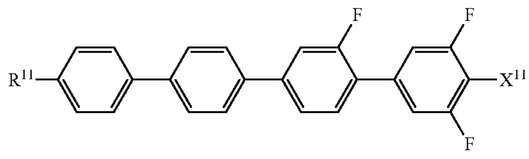

(4-55)

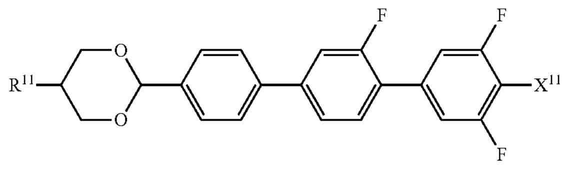

-continued (4-56)

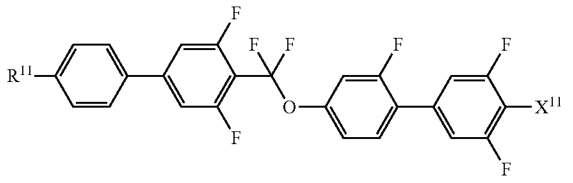

(4-57)

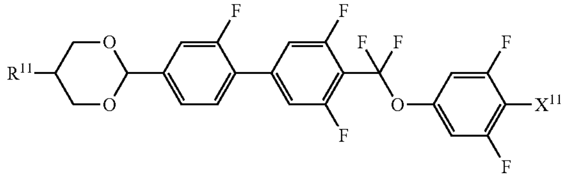

In the compounds (component B), $R^{11}$ and $X^{11}$ are defined in a manner identical with the definitions in formulas (2) to (4).

Component B has a positive dielectric anisotropy, and superb stability to heat, light and so forth, and therefore is used for preparing a composition for the TFT mode or the PSA mode. The content of component B is suitably in the range of approximately 1% by weight to approximately 99% by weight, preferably, approximately 10% by weight to approximately 97% by weight, and further preferably, approximately 40% by weight to approximately 95% by weight, based on the total weight of the liquid crystal composition. Viscosity of the composition can be adjusted by further adding compounds (12) to (14) (Component E).

Component C includes compound (5) in which aright terminal group is —C≡N or —C≡C—C≡N. Preferred examples of component C include compounds (5-1) to (5-64).

(5-1)

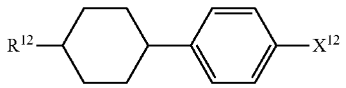

(5-2)

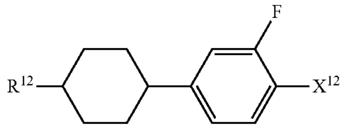

(5-3)

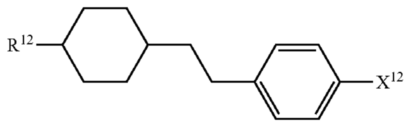

(5-4)

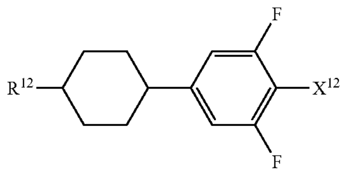

(5-5)

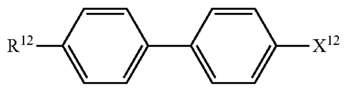

-continued
(5-6)
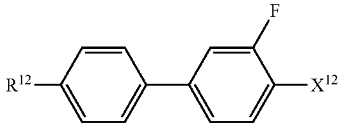
(5-7)
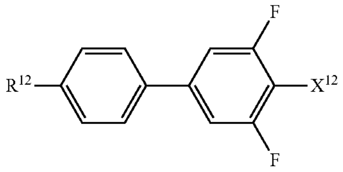
(5-8)
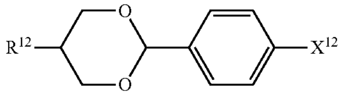
(5-9)
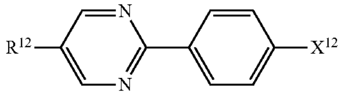
(5-10)
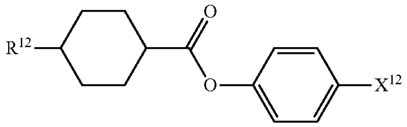
(5-11)
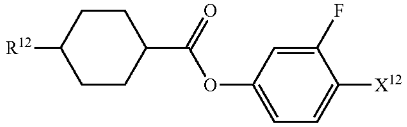
(5-12)
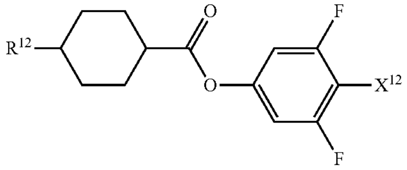
(5-13)
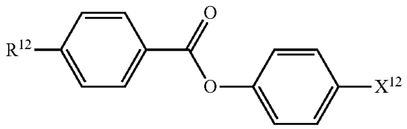
(5-14)
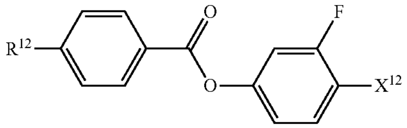
(5-15)
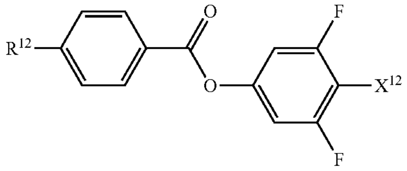
(5-16)
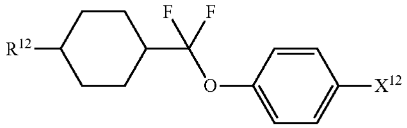
-continued
(5-17)
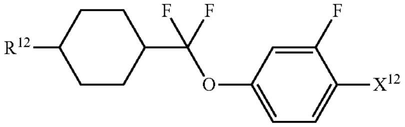
(5-18)
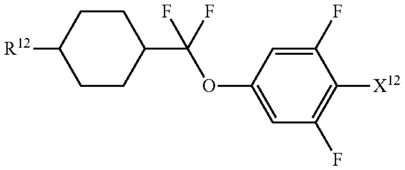
(5-19)
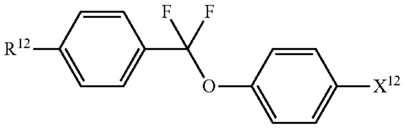
(5-20)
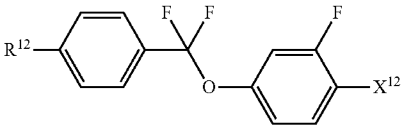
(5-21)
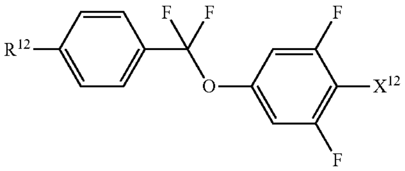
(5-22)
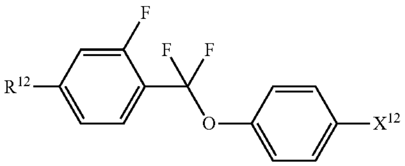
(5-23)
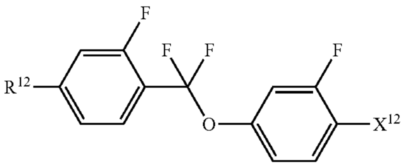
(5-24)
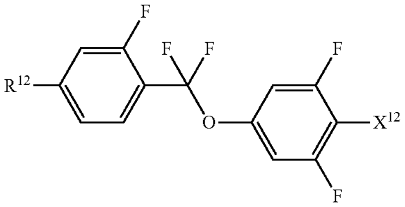
(5-25)
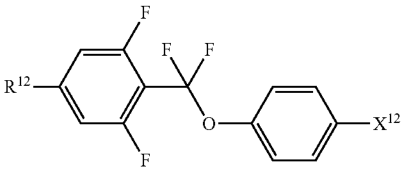

-continued (5-26)

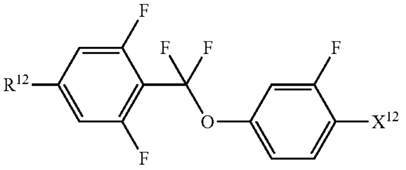

(5-27)

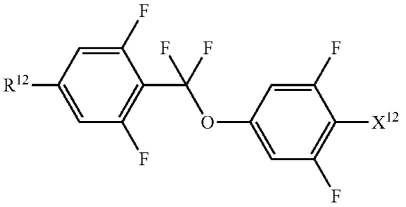

(5-28)

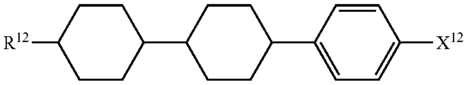

(5-29)

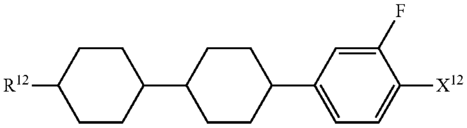

(5-30)

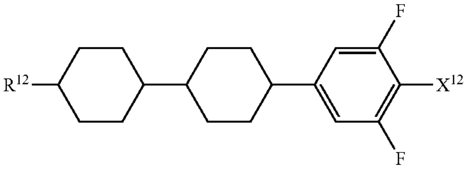

(5-31)

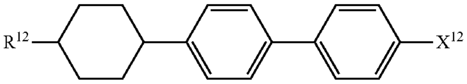

(5-32)

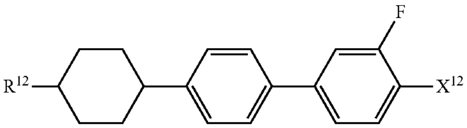

(5-33)

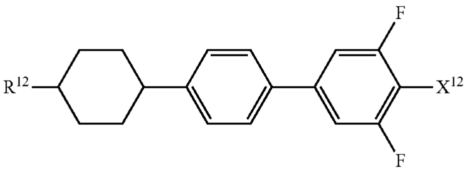

(5-34)

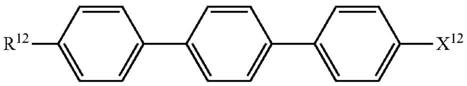

(5-35)

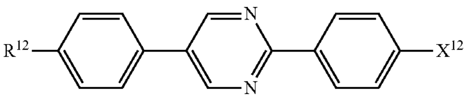

(5-36)

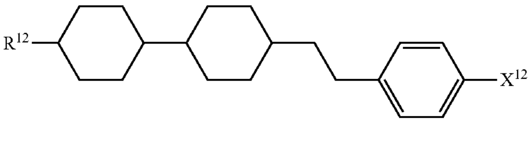

-continued (5-37)

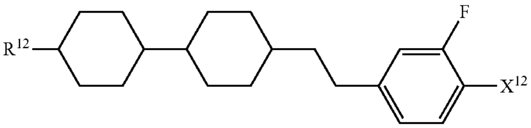

(5-38)

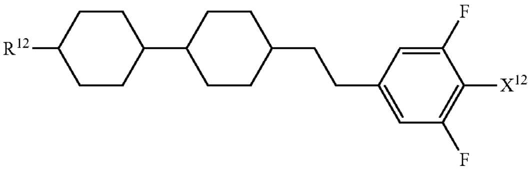

(5-39)

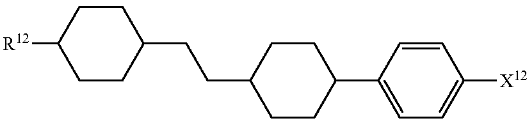

(5-40)

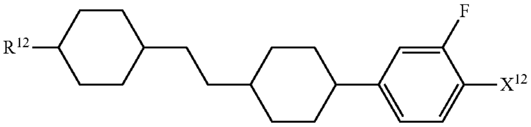

(5-41)

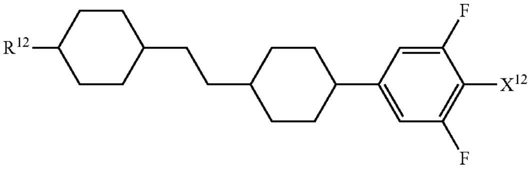

In the compounds (component C), $R^{12}$ and $X^{12}$ are defined in a manner identical with the definitions in formula (5).

Component C has a positive dielectric anisotropy and a value thereof is large, and therefore is mainly used for preparing a composition for the STN mode, the TN mode or the PSA mode. Dielectric anisotropy of the composition can be increased by adding the component C. Component C is effective in extending a temperature range of the liquid crystal phase, adjusting the viscosity or adjusting the optical anisotropy. Component C is also useful for adjusting a voltage-transmittance curve of the device.

When a composition for the STN mode or the TN mode is prepared, the content of component C is suitably in the range approximately of 1 to approximately 99% by weight based on the total weight of the composition, preferably, in the range of approximately 10 to approximately 97% by weight, and further preferably, in the range of approximately 40 to approximately 95% by weight. In the composition, a temperature range of the liquid crystal phase, the viscosity, the optical anisotropy, the dielectric anisotropy and so forth can be adjusted by adding component E.

Component D includes compounds (6) to (12). The compounds have a benzene ring in which atoms on lateral positions are replaced by two halogen atoms, such as 2,3-difluoro-1,4-phenylene. Preferred examples of component D include compounds (6-1) to (6-8), compounds (7-1) to (7-17), compound (8-1), compounds (9-1) to (9-3), compounds (10-1) to (10-11), compounds (11-1) to (11-3) and compound (12-1) to (12-3).

(6-1)
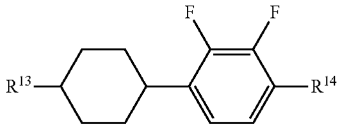
(6-2)
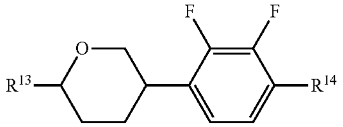
(6-3)
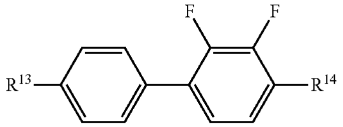
(6-4)
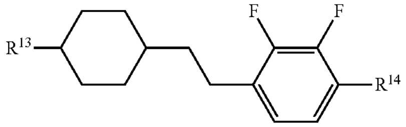
(6-5)
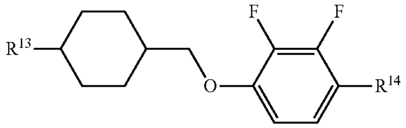
(6-6)
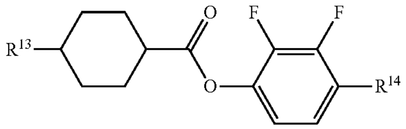
(6-7)
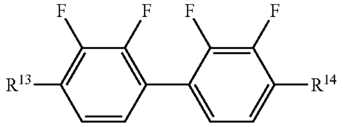
(6-8)
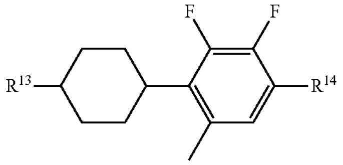
(7-1)
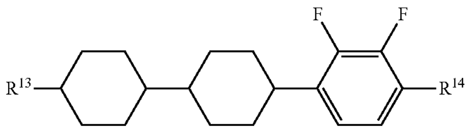
(7-2)
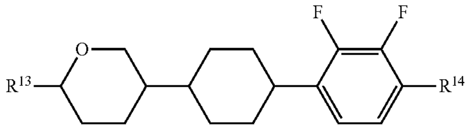
(7-3)
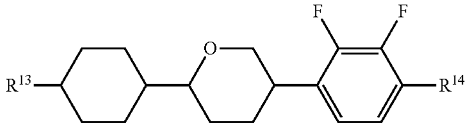
-continued
(7-4)
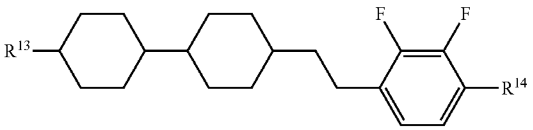
(7-5)
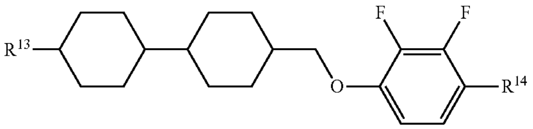
(7-6)
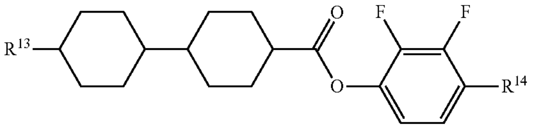
(7-7)
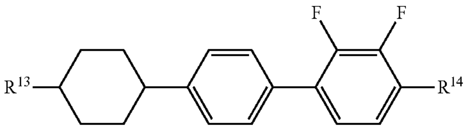
(7-8)
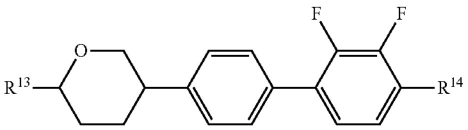
(7-9)
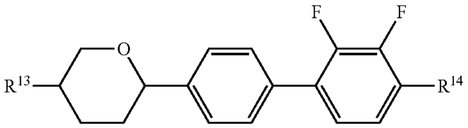
(7-10)
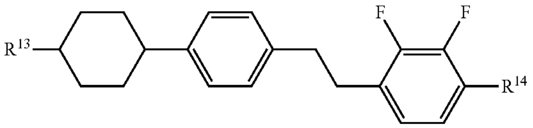
(7-11)
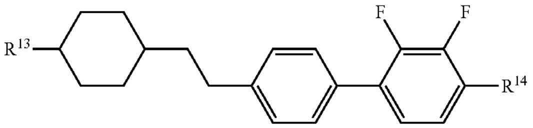
(7-12)
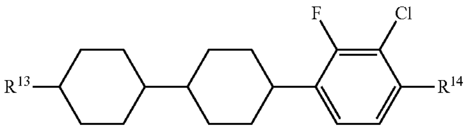
(7-13)
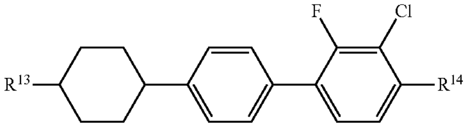
(7-14)
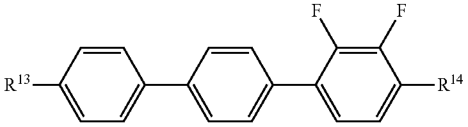

-continued
(7-15)
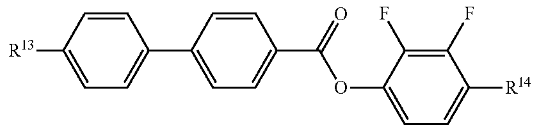
(7-16)
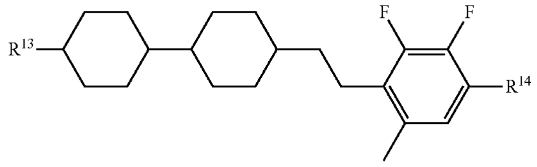
(7-17)
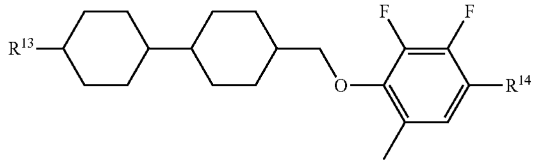
(8-1)
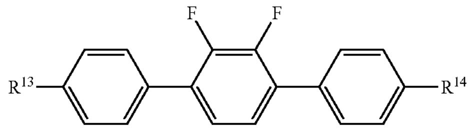
(9-1)
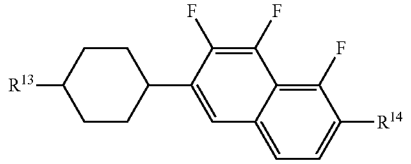
(9-2)
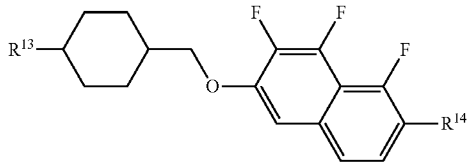
(9-3)
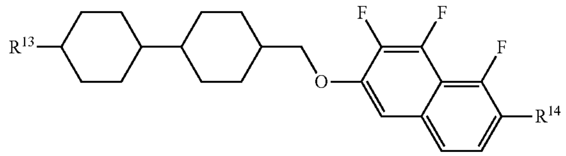
(10-1)
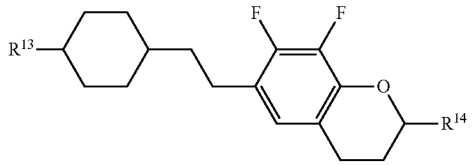
(10-2)
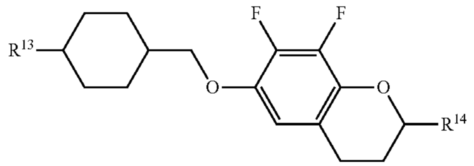
-continued
(10-3)
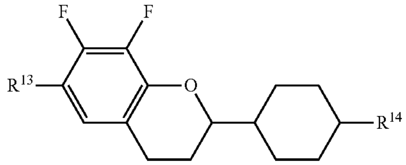
(10-4)
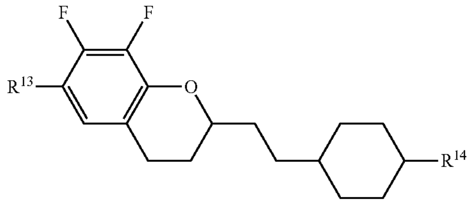
(10-5)
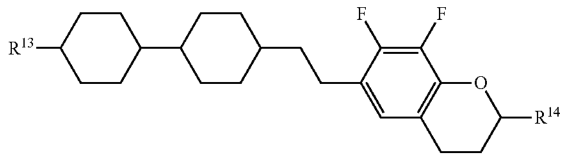
(10-6)
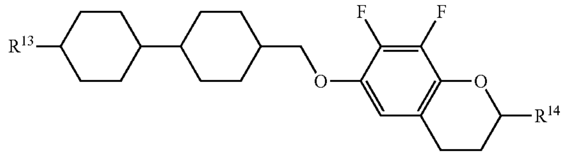
(10-7)
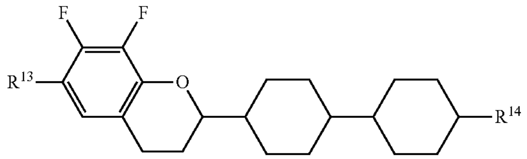
(10-8)
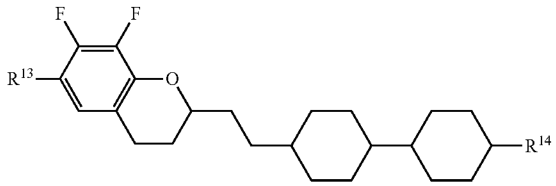
(10-9)
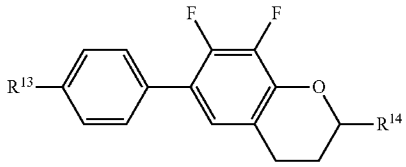
(10-10)
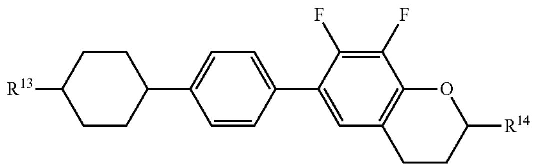

-continued (10-11)

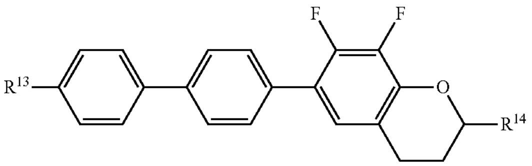

(11-1)

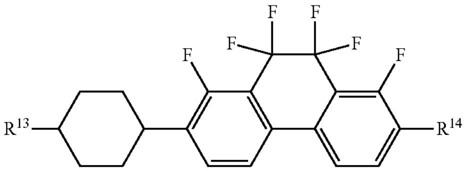

(11-2)

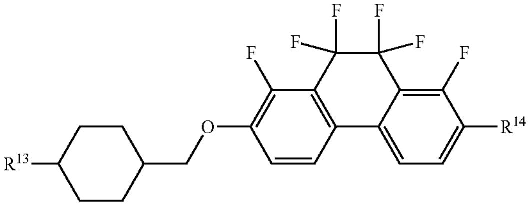

(11-3)

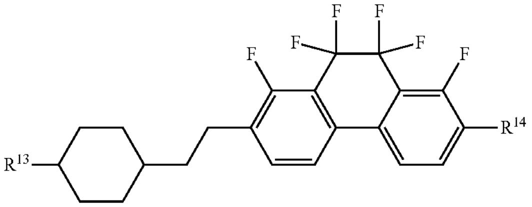

(12-1)

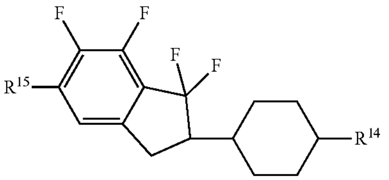

(12-2)

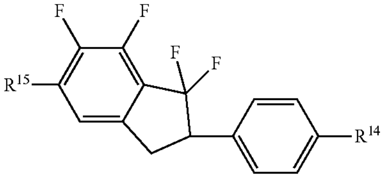

(12-3)

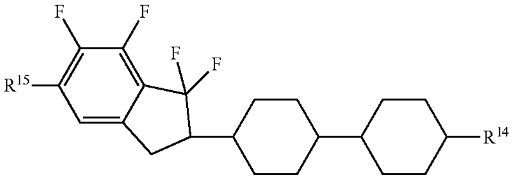

In the compounds (component D), $R^{13}$, $R^{14}$ and $R^{15}$ are defined in a manner identical with the definitions in formulas (6) to (12).

Component D includes a compound having a dielectric anisotropy. Component D is mainly used for preparing a composition for the VA mode or the PSA mode. Compound (6) is a bicyclic compound among types of component D, and therefore is effective mainly in adjusting the viscosity, adjusting the optical anisotropy and adjusting the dielectric anisotropy. Compounds (7) and (8) are a tricyclic compound, and therefore are effective mainly in increasing the maximum temperature, increasing the optical anisotropy or increasing the dielectric anisotropy. Compounds (9) to (12) are effective in increasing the dielectric anisotropy.

When a liquid crystal composition for the VA mode or the PSA mode is prepared, the content of component D is preferably approximately 40% by weight or more, and further preferably, in the range of approximately 50 to 95% by weight, based on the total weight of the composition. Addition of component D allows adjustment of an elastic constant of the composition and adjustment of a voltage-transmittance curve of the device. When component D is added to a composition having a positive dielectric anisotropy, the content of Component D is preferably approximately 30% by weight or less based on the total weight of the composition.

Component E includes a compound in which two terminal groups are alkyl or the like. Preferred examples of component E include compounds (13-1) to (13-11), compounds (14-1) to (14-19) and compounds (15-1) to (15-7).

(13-1)

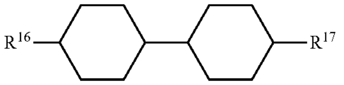

(13-2)

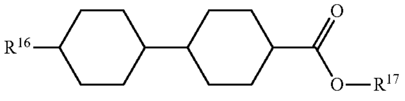

(13-3)

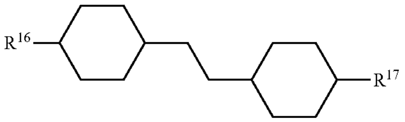

(13-4)

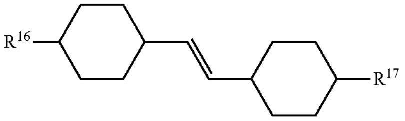

(13-5)

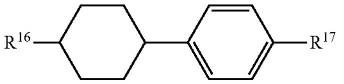

(13-6)

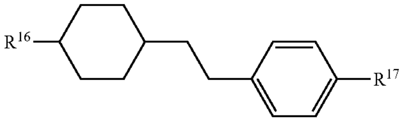

(13-7)

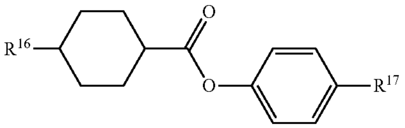

(13-8)

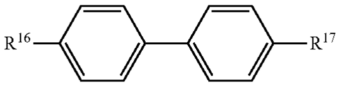

-continued
(13-9)
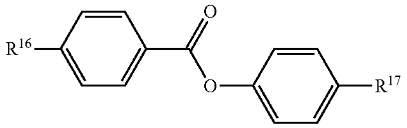
(13-10)
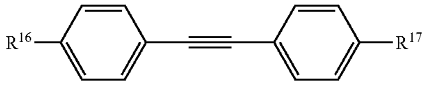
(13-11)
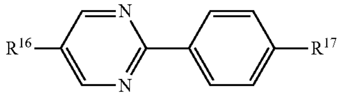
(14-1)
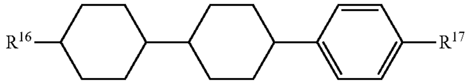
(14-2)
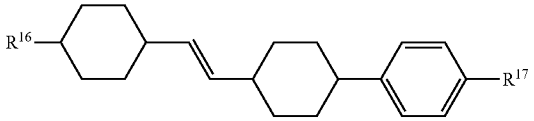
(14-3)
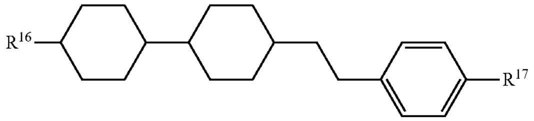
(14-4)
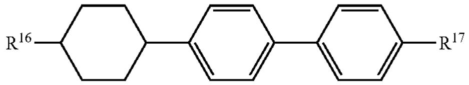
(14-5)
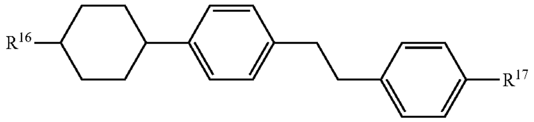
(14-6)
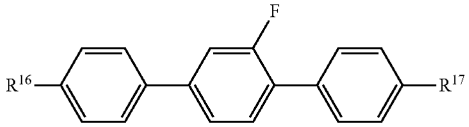
(14-7)
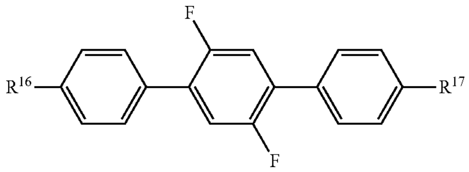
(14-8)
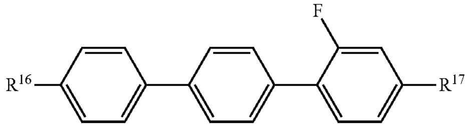
(14-9)
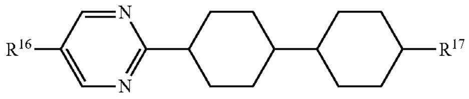
-continued
(14-10)
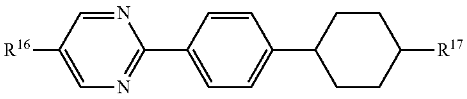
(14-11)
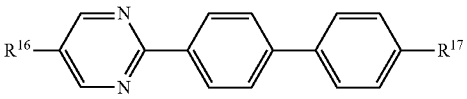
(14-12)
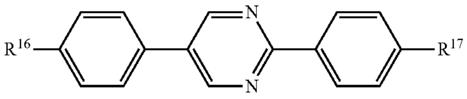
(14-13)
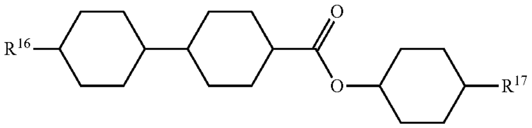
(14-14)
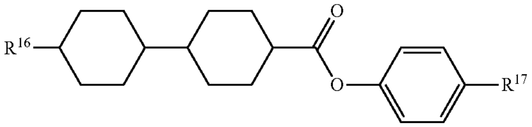
(14-15)
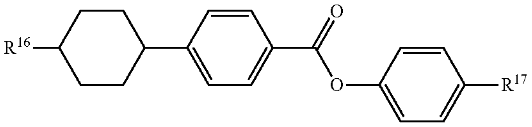
(14-16)
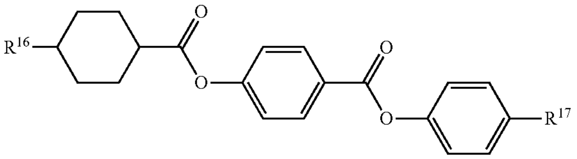
(14-17)
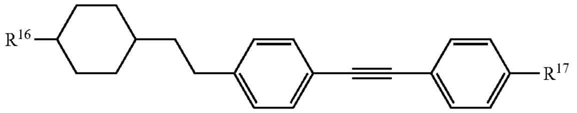
(14-18)
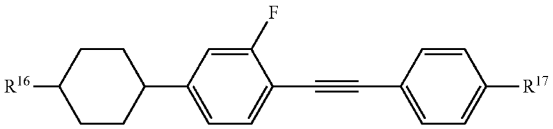
(14-19)
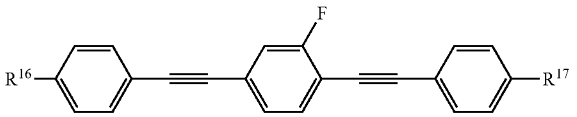
(15-1)
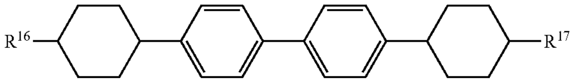

-continued (15-2)

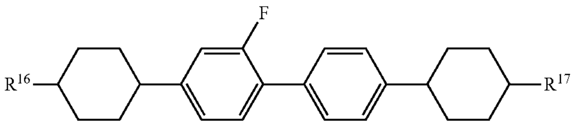

(15-3)

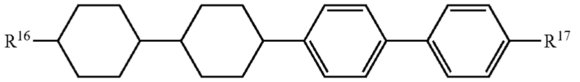

(15-4)

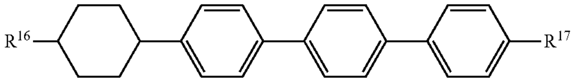

(15-5)

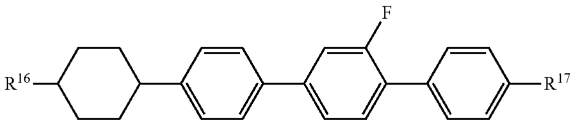

(15-6)

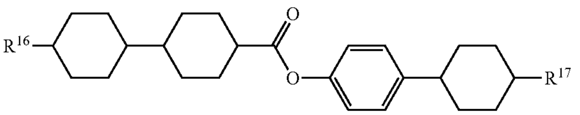

(15-7)

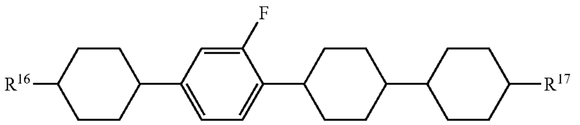

In the compounds (component E), $R^{16}$ and $R^{17}$ are defined in a manner identical with the definitions in formulas (13) to (15).

Component E has a small absolute value of dielectric anisotropy, and therefore is a compound close to neutrality. Compound (13) is effective mainly in adjusting the viscosity or adjusting the optical anisotropy. Compounds (14) and (15) are effective in extending a temperature range of the nematic phase by increasing the maximum temperature, or effective in adjusting the optical anisotropy.

When the content of component E is increased, a viscosity of the composition decreases, but the dielectric anisotropy also decreases. Then, the content is desirably as large as possible, as long as the composition meets a desired value of threshold voltage of the device. Therefore, when a composition for the VA mode or the PSA mode is prepared, the content of component E is preferably approximately 30% by weight or more, and further preferably, approximately 40% by weight or more, based on the total weight of the composition.

Preparation of composition (1) is performed by a method for dissolving required components at a high temperature, or the like. According to an application, an additive may be added to the composition. Examples of the additives include an optically active compound, a polymerizable compound, a polymerization initiator, an antioxidant and an ultraviolet light absorber. Such additives are well known to those skilled in the art, and described in literatures.

Composition (1) may further contain at least one optically active compound. The optically active compound is effective in inducing a helical structure in liquid crystal molecules to give a required twist angle, thereby preventing a reverse twist. A helical pitch can be adjusted by adding the optically active compound. For the purpose of adjusting temperature dependence of the helical pitch, two or more optically active compounds may be added. Preferred examples of the optically active compound include compounds (Op-1) to (Op-18) described below.

(Op-1)

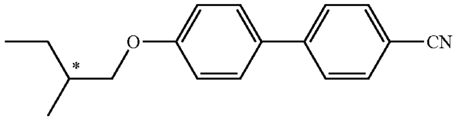

(Op-2)

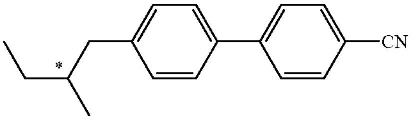

(Op-3)

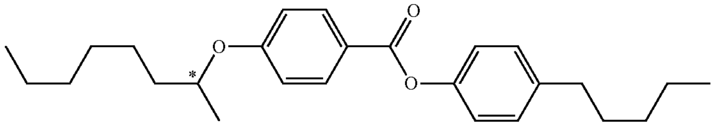

(Op-4)

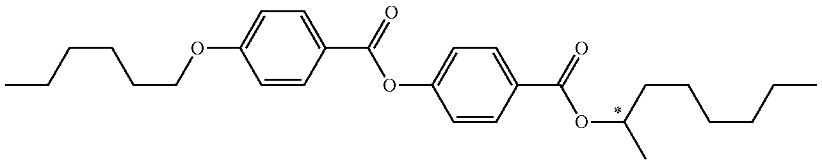

(Op-5)

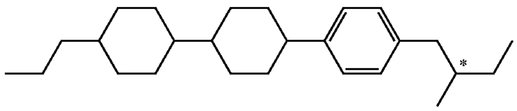

(Op-6)

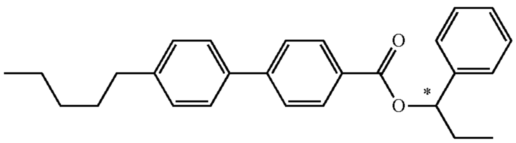

-continued
(Op-7)
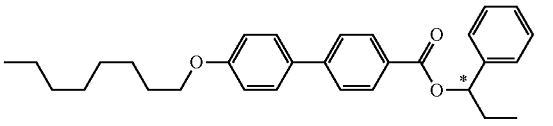
(Op-8)
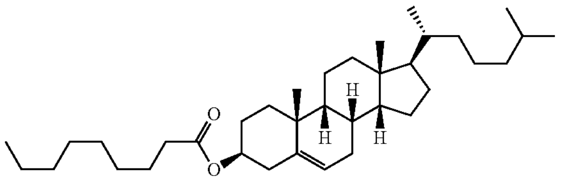
(Op-9)
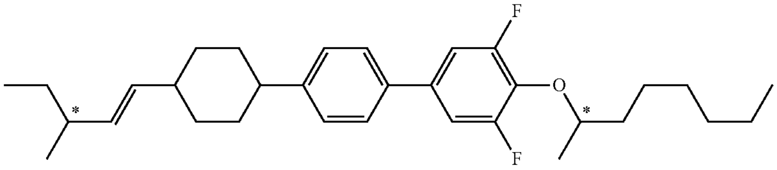
(Op-10)
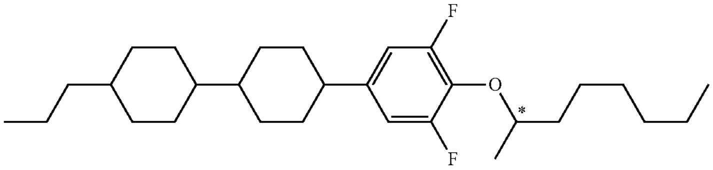
(Op-11)
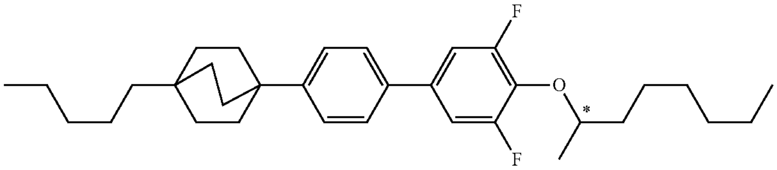
(Op-12)
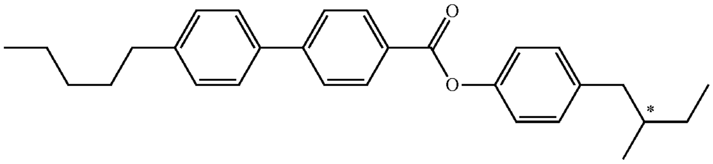
(Op-13)
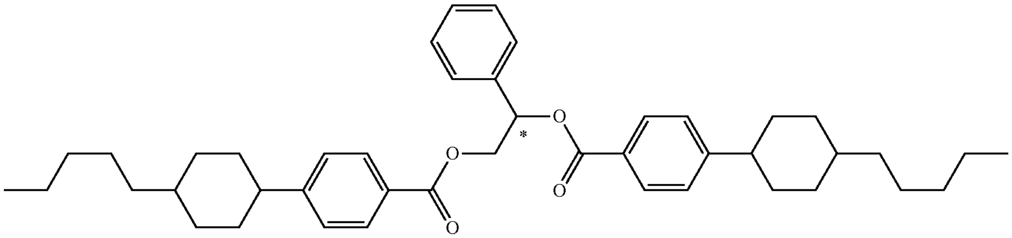
(Op-14)
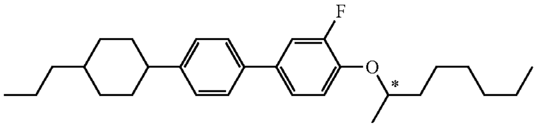
(Op-15)
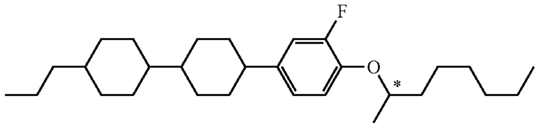
(Op-16)
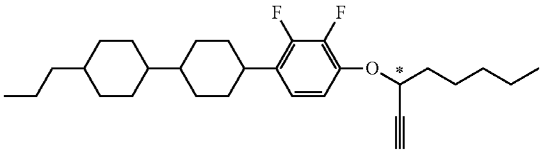
(Op-17)
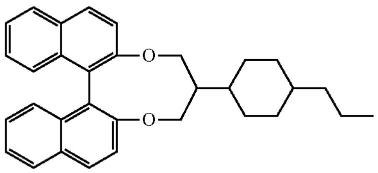

-continued (Op-18)

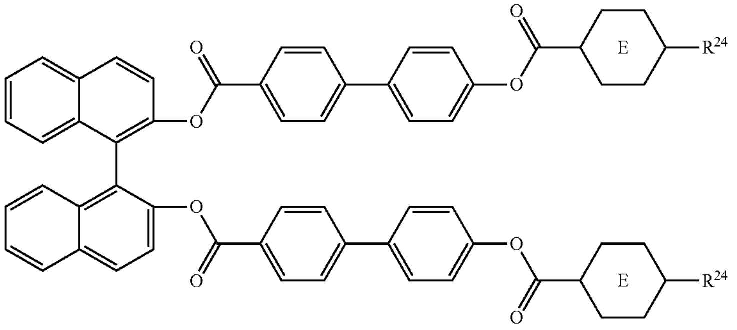

In compound (Op-18), ring E is 1,4-cyclohexylene or 1,4-phenylene, and $R^{24}$ is alkyl having 1 to 10 carbons.

In composition (1), a helical pitch is adjusted by adding such an optically active compound. The helical pitch is preferably adjusted in the range of approximately 40 to approximately 200 micrometers in a liquid crystal composition for the TFT mode and the TN mode. In a composition for the STN modes, the helical pitch is preferably adjusted in the range of approximately 6 to approximately 20 micrometers. In the case of a composition for the BTN mode, the helical pitch is preferably adjusted in the range of approximately 1.5 to approximately 4 micrometers. For the purpose of adjusting a temperature dependence of the helical pitch, two or more optically active compounds may be added.

Composition (1) can also be used for the PSA mode by adding a polymerizable compound. Examples of the polymerizable compound include an acrylate, a methacrylate, a vinyl compound, a vinyloxy compound, a propenyl ether, an epoxy compound (oxirane, oxetane) and a vinyl ketone. Further preferred examples include a compound having at least one acryloyloxy and a compound having at least one methacryloyloxy. Further preferred examples include a compound having acryloyloxy and methacryloyloxy.

Additional examples of other polymerizable compounds include compounds (M-1) to (M-12).

(M-1)

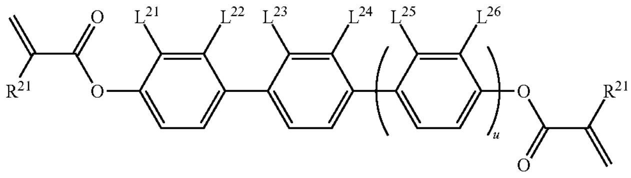

(M-2)

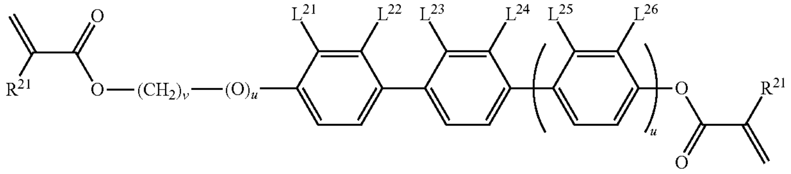

(M-3)

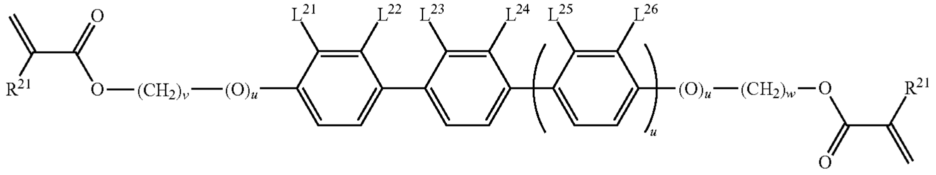

(M-4)

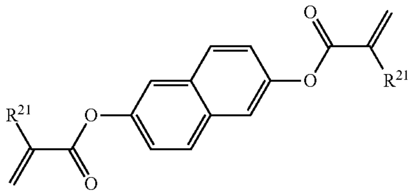

(M-5)

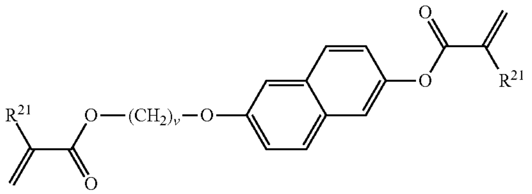

-continued (M-6)

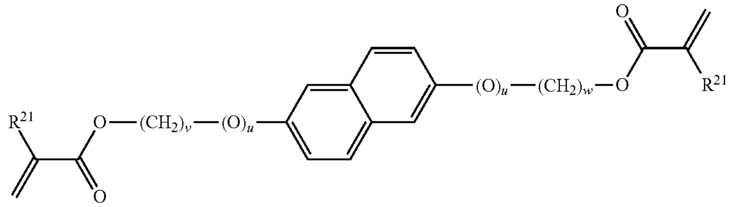

(M-7)

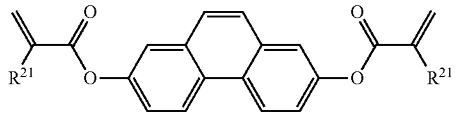

(M-8)

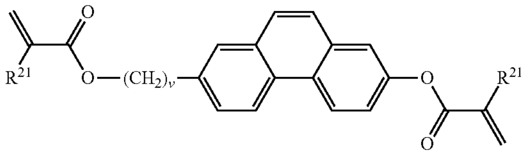

(M-9)

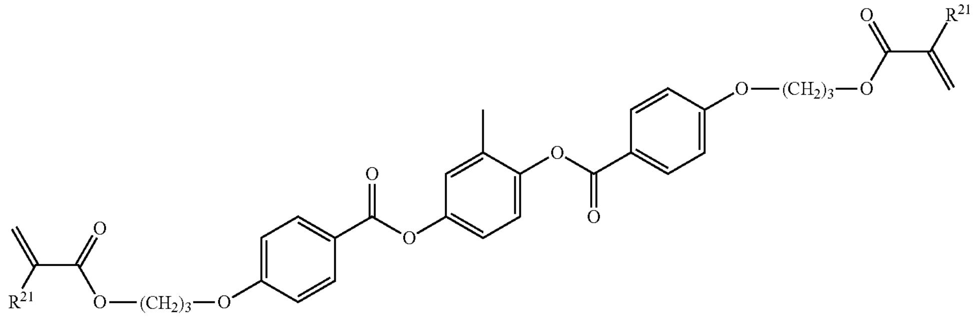

(M-10)

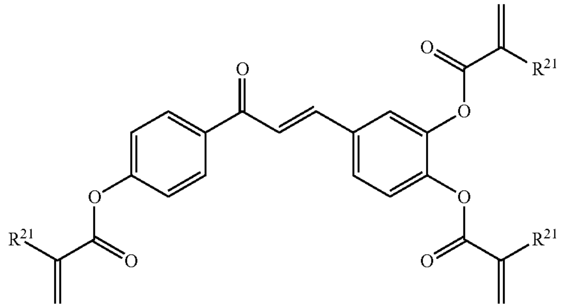

(M-11)

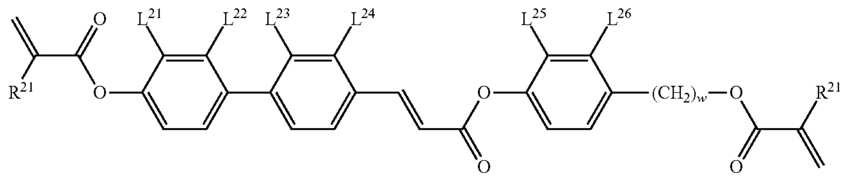

(M-12)

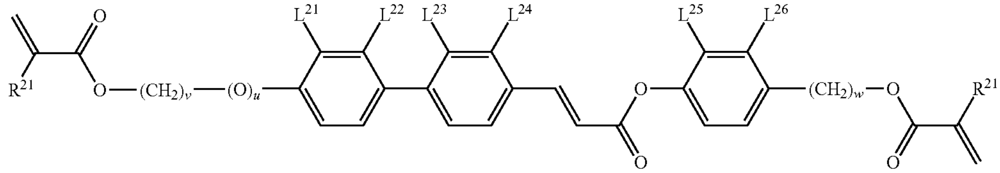

In compounds (M-1) to (M-12), $R^{21}$ is hydrogen or methyl; u is 0 or 1; v and w are independently an integer from 1 to 10; and $L^{21}$, $L^{22}$, $L^{23}$, $L^{24}$, $L^{25}$ and $L^{26}$ are independently hydrogen or fluorine.

When a second component of the polymerizable composition includes a polymerizable compound having a liquid crystal phase, an optically anisotropic object is generated by allowing the compound to polymerize while controlling alignment of the liquid crystal molecule. The optically anisotropic object can be used for phase difference film, a polarizing element, a circular polarizing element, an elliptical polarizing element, an antireflection film, a selective reflection film, a color compensation film, a viewing angle compensation film, or the like.

The antioxidant is effective for maintaining a large voltage holding ratio. Preferred examples of the antioxidant include compounds (AO-1) and (AO-2) as described below, IRGANOX 415, IRGANOX 565, IRGANOX 1010, IRGANOX 1035, IRGANOX 3114 and IRGANOX 1098 (trade names: BASF). The ultraviolet light absorber is effective for preventing a decrease in the maximum temperature. Preferred examples of the ultraviolet light absorber include a benzophenone derivative, a benzoate derivative and a triazole derivative. Specific examples include compounds (AO-3) and (AO-4) described below, TINUVIN 329, TINUVIN P, TINUVIN 326, TINUVIN 234, TINUVIN 213, TINUVIN 400, TINUVIN 328 and TINUVIN 99-2 (trade names: BASF), and 1,4-diazabicyclo[2.2.2]octane (DABCO). A light stabilizer such as an amine having steric hindrance is preferred for maintaining a large voltage holding ratio. Preferred examples of the light stabilizer include compounds (AO-5) and (AO-6) described below, TINUVIN 144, TINUVIN 765 and TINUVIN 770DF (trade names: BASF). Moreover, a heat stabilizer is also effective in maintaining a large voltage holding ratio. Preferred examples include IRGAFOS 168 (trade name: BASF). A defoaming agent is effective in preventing foam formation. Preferred examples of the defoaming agent include dimethyl silicone oil and methylphenyl silicone oil.

(AO-1)

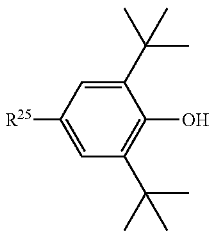

(AO-2)

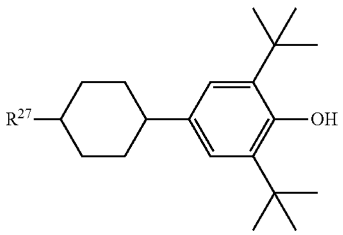

(AO-3)

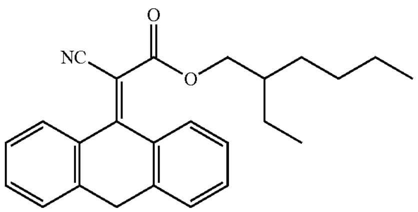

(AO-4)

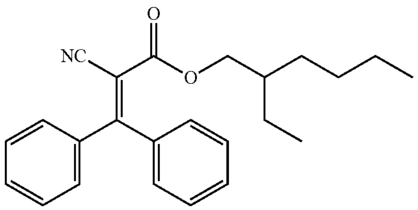

-continued (AO-5)

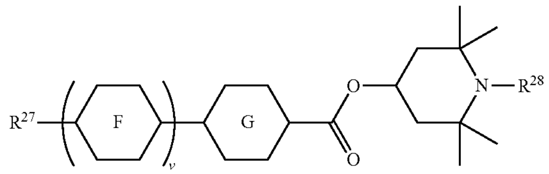

(AO-6)

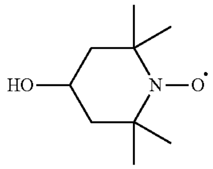

In compound (AO-1), $R^{25}$ is alkyl having 1 to 20 carbons, alkoxy having 1 to 20 carbons, —$COOR^{26}$ or H—$CH_2CH_2COOR^{26}$, and $R^{26}$ is alkyl having 1 to 20 carbons, in compounds (AO-2) and (AO-5), $R^{27}$ is alkyl having 1 to 20 carbons, and in (AO-5), ring F and ring G are 1,4-cyclohexylene or 1,4-phenylene, v is 0, 1 or 2, and $R^{28}$ is hydrogen, methyl or O'.

Composition (1) can be used for a GH mode by addition of a dichroic dye such as a merocyanine type, a stylyl type, an azo type, an azomethine type, an azoxy type, a quinophthalone type, an anthraquinone type and a tetrazine type.

3. Liquid Crystal Display Device

Composition (1) can be used for a liquid crystal display device having an operating mode such as the PC mode, the TN mode, the STN mode, the OCB mode and the PSA mode, and driven by an active matrix (AM mode). Composition (1) can also be used for a liquid crystal display device having an operating mode such as the PC mode, the TN mode, the STN mode, the OCB mode, the VA mode and the IPS mode, and driven by a passive matrix (PM) mode. The AM mode device and the PM mode device can be applied to any of a reflective type, a transmissive type and transflective type.

Composition (1) can also be used for a nematic curvilinear aligned phase (NCAP) device prepared by microencapsulating a nematic liquid crystal, a polymer dispersed liquid crystal display device (PDLCD) device in which a three-dimensional network polymer is formed in the liquid crystal, and a polymer network liquid crystal display device (PNLCD).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in greater detail by way of Examples. However, the invention is not limited by the Examples.

1-1. Example of Compound (1)

Compound (1) was prepared according to procedures described below. The prepared compound was identified by a method such as an NMR analysis. Physical properties of the compound were measured by methods described below.

NMR Analysis

As a measuring apparatus, DRX-500 (made by Bruker BioSpin Corporation) was used. In $^{1}$H-NMR measurement, a sample was dissolved in a deuterated solvent such as $CDCl_3$, and measurement was carried out under the conditions of room temperature, 500 MHz and 16 times of accumulation. Tetramethylsilane was used as an internal standard. $^{19}$F-NMR measurement was carried out using $CFCl_3$ as an internal standard and under conditions of 24 times of accumulation. In the explanation of nuclear magnetic resonance spectra, symbols s, d, t, q, quin, sex, m and br stand for a singlet, a doublet, a triplet, a quartet, a quintet, a sextet, a multiplet and being broad, respectively.

Samples for Measurement

When phase structure and transition temperature were measured, a liquid crystal compound per se was used as a sample. When physical properties such as a maximum temperature of a nematic phase, viscosity, optical anisotropy, and dielectric anisotropy were measured, a composition prepared by mixing and the compound with a base liquid crystal was used as a sample.

When a sample in which the compound was mixed with the base liquid crystal was used, measurement was carried out according to a method described below. A sample was prepared by mixing 15% by weight of the compound and 85% by weight of the base liquid crystal. Then, extrapolated values were calculated from measured values of the sample according to an extrapolation method represented by an equation below, and the extrapolated values were described. {Extrapolated value}={100×(measured value of a sample)−(% by weight of base liquid crystal)×(measured value of the base liquid crystal)}/(% by weight of the compound).

When crystals (or a smectic phase) precipitated at 25° C. even at the ratio of the compound to the base liquid crystal, a ratio of the compound to the base liquid crystal is changed in the order of (10% by weight:90% by weight), (5% by weight: 95% by weight) and (1% by weight:99% by weight), and physical properties of the sample were measured at a ratio at which crystals (or a smectic phase) did not precipitate at 25° C. In addition, unless otherwise noted, the ratio of the compound to the base liquid crystal was 15% by weight:85% by weight.

As the base liquid crystal, base liquid crystal (i) described below was used. Ratios of components of base liquid crystal (i) are expressed in terms of % by weight.

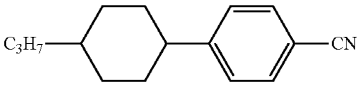

24%

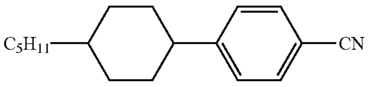

36%

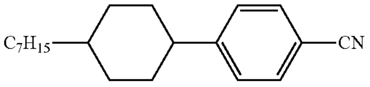

25%

-continued

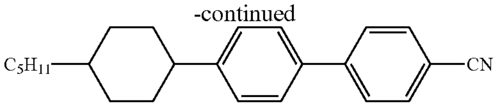

15%

Measurement Methods

Physical properties were measured according to methods described below. Most of the methods are applied as described in Standard of Japan Electronics and Information Technology Industries Association, hereinafter, abbreviated as JEITA) discussed and established as the Standard of JEITA (JEITA ED-2521B), or as modified thereon. No TFT was attached to a TN device used for measurement.

(1) Phase Structure

A sample was placed on a hot plate of a melting point apparatus (FP-52 Hot Stage made by Mettler-Toledo International Inc.) equipped with a polarizing microscope, and a state of phase and a change thereof were observed with the polarizing microscope while the sample was heated at a rate of 3° C. per minute, and a kind of the phase was specified.

(2) Transition Temperature (° C.)

A sample was heated and then cooled at a rate of 3° C. per minute using a differential scanning calorimeter, DSC-7 System or Diamond DSC System, made by PerkinElmer, Inc. A starting point of an endothermic peak or an exothermic peak caused by a change of phase of the sample was determined by means of extrapolation, and thus a transition temperature was determined. Temperature at which a compound undergoes transition from a solid to a liquid crystal phase such as a smectic phase and a nematic phase may be occasionally abbreviated as "minimum temperature of the liquid crystal phase." Temperature at which a compound undergoes transition from a liquid crystal phase to a liquid may be occasionally abbreviated as a "clearing point."

Crystals were expressed as C. When kinds of the crystals were distinguishable, each of the crystals was expressed as $C_1$ or $C_2$. A smectic phase or a nematic phase was expressed as S or N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. A transition temperature was expressed as "C, 50.0; N, 100.0 I," for example. The expression indicates that a transition temperature from a crystal to a nematic phase is 50.0° C., and a transition temperature from the nematic phase to a liquid is 100.0° C.

(3) Compatibility at a Low Temperature:

Samples in which the compound and the base liquid crystal were mixed for the compound to be 20% by weight, 15% by weight, 10% by weight, 5% by weight, 3% by weight and 1% by weight were prepared, and placed in glass vials. After the glass vials were kept in freezers at −10° C. or −20° C. for a predetermined period of time, whether or not crystals or a smectic phase precipitated was observed.

(4) Maximum Temperature of a Nematic Phase ($T_{NI}$ or NI; ° C.)

A sample was placed on a hot plate in a melting point apparatus equipped with a polarizing microscope and was heated at the rate of 1° C. per minute. Temperature was measured when part of the sample began to change from a nematic phase to an isotropic liquid. A higher limit of a temperature range of the nematic phase may be occasionally abbreviated as "maximum temperature." When the sample was a mixture of a compound and the mother liquid crystal, the maximum temperature was expressed using a symbol $T_{NI}$. When the sample was a mixture of a compound and component B, the maximum temperature was expressed using a symbol NI.

(5) Minimum Temperature of a Nematic Phase ($T_c$; ° C.)

Samples each having a nematic phase were kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., $T_c$ was expressed as $T_c \leq -20$° C. A lower limit of the temperature range of the nematic phase may be occasionally abbreviated as "minimum temperature."

(6) Viscosity (Bulk Viscosity; η; Measured at 20° C.; mPa·s)

A cone-plate (E-type) rotational viscometer was used for measurement.

(7) Viscosity (Rotational Viscosity; γ1; Measured at 25° C.; mPa·s)

Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. A voltage was applied stepwise to the device in the range of 16 V to 19.5 V at an increment of 0.5 V. After a period of 0.2 second with no voltage, a voltage was applied repeatedly under the conditions of only one rectangular wave (rectangular pulse; 0.2 second) and no voltage (2 seconds). A peak current and a peak time of a transient current generated by the applied voltage were measured. A value of rotational viscosity was obtained from the measured values and calculation equation (8) on page 40 of the paper presented by M. Imai et al. A value of dielectric anisotropy required for the calculation was determined using the device by which the rotational viscosity was measured and by a method described below.

(8) Optical Anisotropy (Refractive Index Anisotropy; Δn; Measured at 25° C.)

Measurement was carried out by means of an Abbe refractometer with a polarizing plate mounted on an ocular by using light at a wavelength of 589 nanometers. A surface of a main prism was rubbed in one direction, and then a sample was added dropwise onto the main prism. A refractive index (n||) was measured when the direction of polarized light was parallel to the direction of rubbing. A refractive index (n⊥) was measured when the direction of polarized light was perpendicular to the direction of rubbing. A value of the refractive index anisotropy was calculated from an equation: Δn=n||−n⊥.

(9) Dielectric Anisotropy (Δ∈; Measured at 25° C.)

A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈||) in the major axis direction of liquid crystal molecules was measured. Sine waves (0.5 V, 1 kHz) were applied to the device, and after 2 seconds a dielectric constant (∈⊥) in the minor axis direction of the liquid crystal molecules was measured. A value of dielectric anisotropy was calculated from an equation: Δ∈=∈||−∈⊥.

(10) Elastic Constant (K; Measured at 25° C.; pN)

HP4284A LCR Meter made by Yokogawa-Hewlett-Packard Co. was used for measurement. A sample was put in a horizontal alignment cell in which a distance (cell gap) between two glass substrates was 20 micrometers. An electric charge of 0 V to 20 V was applied to the cell, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; The Nikkan Kogyo Shimbun, Ltd.) and the values of $K_{11}$ and K33 were obtained from equation (2.99). Next, $K_{22}$ was calculated using the previously determined values of $K_{11}$ and $K_{33}$ in formula (3.18) on page 171. An elastic constant is a mean value of the thus determined $K_{11}$, $K_{22}$ and $K_{33}$.

(11) Threshold Voltage (Vth; Measured at 25° C.; V):

An LCD-5100 luminance meter made by Otsuka Electronics Co., Ltd. was used for measurement. A light source was a halogen lamp. A sample was put in a normally white mode TN device in which a distance (cell gap) between two glass substrates was approximately 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a perpendicular direction, and the amount of light transmitted through the device was measured. A voltage-transmittance curve was prepared, in which the maximum value of the amount of light corresponded to 100% transmittance and the minimum value of the amount of light corresponded to 0% transmittance. A threshold voltage is a voltage at 90% transmittance.

(12) Voltage Holding Ratio (VHR-1; Measured at 25° C.; %)

A TN device used for measurement had a polyimide alignment film and a distance (cell gap) between two glass substrates was 5 micrometers. A sample was put in the device, and then the device was sealed with an ultraviolet-curable adhesive. The device was charged by applying a pulse voltage (60 microseconds at 5 V). A decaying voltage was measured for 16.7 milliseconds with a high-speed voltmeter, and area A between a voltage curve and a horizontal axis in a unit cycle was obtained. Area B was an area without decay. A voltage holding ratio is a percentage of area A to area B.

(13) Voltage Holding Ratio (VHR-2; Measured at 80° C.; %)

A TN device used for measurement had a polyimide alignment film and a distance (cell gap) between two glass substrates was 5 micrometers. A sample was put in the device, and then the device was sealed with an ultraviolet-curable adhesive. The T N device was charged by applying a pulse voltage (60 microseconds at 5 V). A decaying voltage was measured for 16.7 milliseconds with a high-speed voltmeter, and area A between a voltage curve and a horizontal axis in a unit cycle was obtained. Area B was an area without decay. A voltage holding ratio is a percentage of area A to area B.

Raw Material

Solmix A-11 (registered trade name) is a mixture of ethanol (85.5% by weight), methanol (13.4% by weight) and isopropanol (1.1% by weight), and was purchased from Japan Alcohol Trading Company, Ltd. Tetrahydrofuran may be abbreviated as THF.

Example 1

Synthesis of Compound (No. 32)

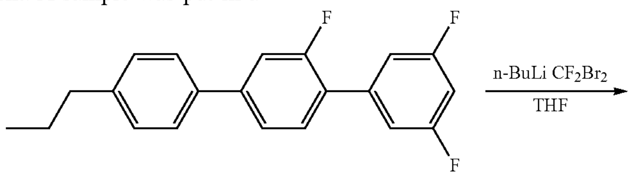

(e-1)

-continued

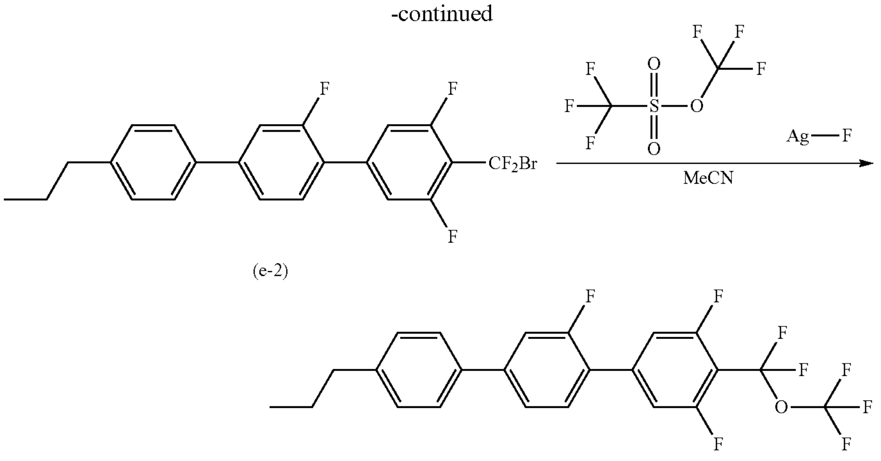

(e-2)

(No. 32)

First Step:

Under a nitrogen atmosphere, compound (e-1) (30.0 g) and THF (180 mL) were put in a reaction vessel, and the resultant mixture was cooled to −74° C. Thereto, n-butyllithium (1.6 M; n-hexane solution; 68.9 mL) was added dropwise in the temperature range of −74° C. to −70° C., and the resultant mixture was further stirred for 60 minutes. Subsequently, a THF (20.0 mL) solution of dibromodifluoromethane (28.9 g) was added dropwise thereto in the temperature range of −75° C. to −70° C., and the resultant mixture was stirred for 60 minutes, while returning the temperature to 25° C. The reaction mixture was poured into ice water and an aqueous layer was extracted with toluene. A combined organic layer was washed with brine and dried over anhydrous magnesium sulfate. The solution was concentrated under reduced pressure, and the residue was purified by silica gel chromatography (heptane), and thus compound (e-2) (27.9 g; 66.7%) was obtained. In addition, compound (e-1) can be prepared by the method described in JP 2007-308483 A or the like.

Second Step:

Under a nitrogen atmosphere, compound (e-2) (8.00 g), silver fluoride (8.92 g) and acetonitrile (400 mL) were put in a reaction vessel, and the resultant mixture was cooled to −30° C. Thereto, TFMT (17.91 mL) was added, the vessel was sealed, and the resultant mixture was stirred for two days. The reaction mixture was poured into water and an aqueous layer was extracted three times with toluene. A combined organic layer was washed with brine and dried over anhydrous magnesium sulfate. The solution was concentrated under reduced pressure, and the residue was purified by silica gel chromatography (heptane), and thus compound (No. 32) (2.2 g; 27.2%) was obtained.

$^{1}$H-NMR (δ ppm; $CDCl_3$): 7.53 (d, 2H), 7.48 (d, 2H), 7.42 (d, 1H), 7.30 (d, 2H), 7.26 (d, 2H), 2.65 (t, 2H), 1.69 (sex, 2H), 0.98 (t, 3H).

Physical properties of compound (No. 32) were as described below.

Transition temperature: C, 34.2; S, 36.5; N, 60.1 I. $T_{NI}$=35.0° C.; η=69.2 mPa·s; Δn=0.170; Δε=23.9; compatibility at a low temperature: 15 wt %, holding the liquid crystal phase at −20° C. for 30 days.

Example 2

Synthesis of Compound (No. 219)

(e-3)

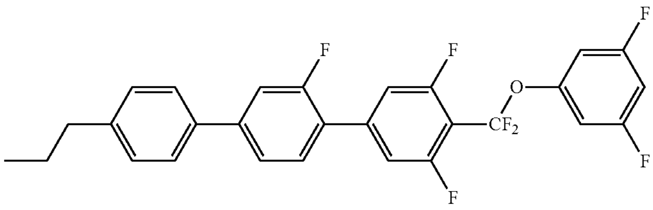

(e-4)

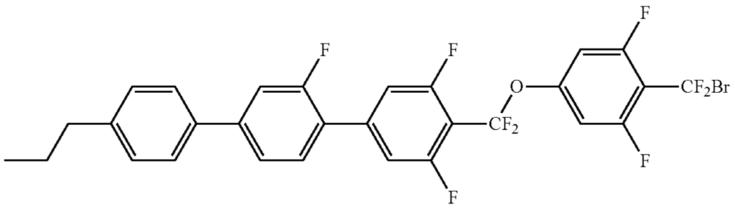

-continued (No.219)

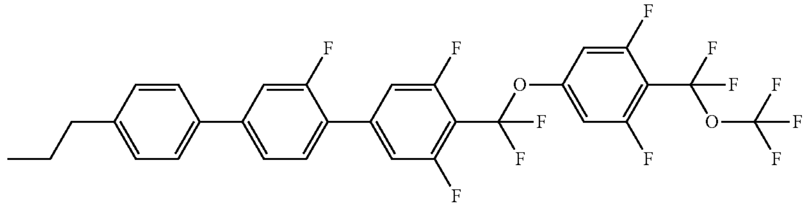

Compound (No. 219) was obtained by preparing compound (e-4) using compound (e-3) in place of compound (e-1), and using compound (e-4) in place of compound (e-2) in Example 1. In addition, compound (e-3) can be easily prepared with referring to Examples of JP 2009-292730 A or the like.

$^1$H-NMR (δ ppm; $CDCl_3$): 7.55 (d, 2H), 7.49 (d, 2H), 7.45 (d, 2H), 7.41-7.35 (m, 4H), 7.00 (d, 2H), 2.64 (t, 2H), 1.69 (sex, 2H), 0.99 (t, 3H).

Physical properties of compound (No. 219) were as described below.

Transition temperature: C, 93.8 $S_A$ 115.8; N, 116.7 I. $T_{NI}$=87.0° C.; η=127.0 mPa·s; Δn=0.184; $\Delta\epsilon$=42.57.

Synthesis of Compound (No. 36)

(e-5)

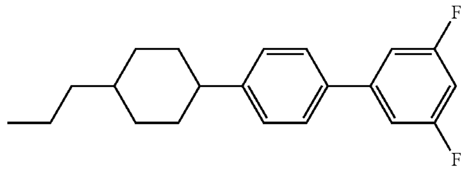

(e-6)

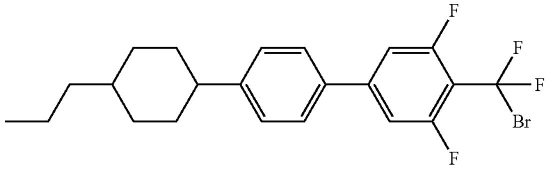

(No.36)

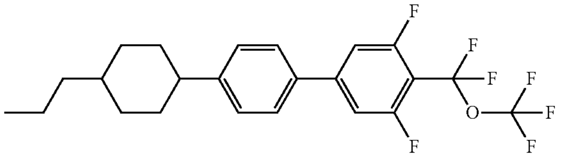

Compound (No. 36) was obtained by preparing compound using compound (e-5) in place of compound (e-1), and using compound (e-6) in place of compound (e-2) in Example 1. In addition, compound (e-5) can be prepared by the method described in JP 06-298685 A or the like.

$^1$H-NMR (δ ppm; $CDCl_3$): 7.49 (d, 2H), 7.35 (d, 2H), 7.20 (d, 2H), 2.54 (t, 1H), 1.91 (t, 4H), 1.49 (q, 2H), 1.41-1.20 (m, 5H), 1.09 (q, 2H), 0.92 (t, 3H).

Physical properties of compound (No. 36) were as described below.

Transition temperature: C, 10.0; N, 27.9 I. $T_{NI}$=42.4° C.; η=52.1 mPa·s; Δn=0.117; $\Delta\epsilon$=15.8; compatibility at a low temperature: 15 wt %, holding the liquid crystal phase at −20° C. for 30 days.

Example 4

Synthesis of Compound (No. 67)

(e-7)

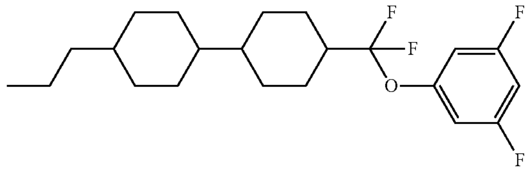

(e-8)

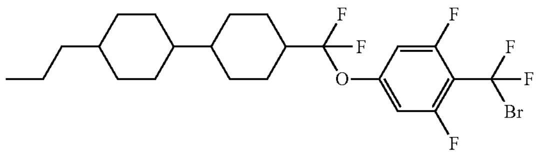

(No.67)

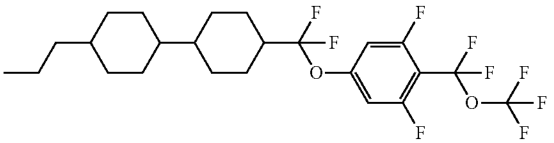

Compound (No. 67) was obtained by preparing compound (e-8) using compound (e-7) in place of compound (e-1), and using compound (e-8) in place of compound (e-2) in Example 1. In addition, compound (e-7) can be prepared by the method described in JP 2003-176265 A or the like.

$^1$H-NMR (δ ppm; $CDCl_3$): 6.82 (d, 2H), 2.02 (d, 3H), 1.86 (d, 2H) and 1.75 (dd, 4H), 1.31-0.80 (m, 15H), 0.88 (t, 3H).

Physical properties of compound (No. 67) were as described below.

Transition temperature: C, 38.0; N, 88.4 I. $T_{NI}$=72.4° C.; η=45.5 mPa·s; Δn=0.077; $\Delta\epsilon$=17.9; compatibility at a low temperature: 15 wt %, holding the liquid crystal phase at −20° C. for 30 days.

Example 5

Synthesis of Compound (No. 39)

(e-9)

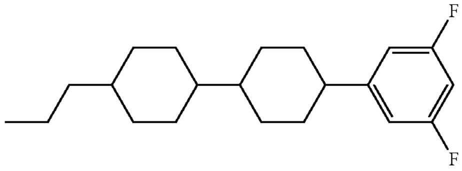

(e-10)

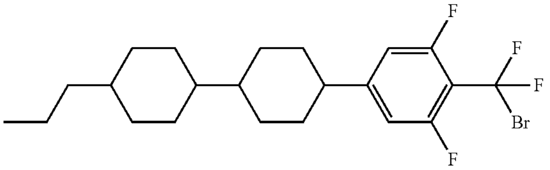

(No.39)

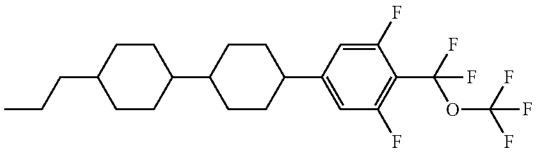

Compound (No. 39) was obtained by preparing (e-10) using compound (e-9) in place of compound (e-1), and using compound (e-10) in place of compound (e-2) in Example 1. In addition, compound (e-9) can be prepared by the method described in JP 2007-308483 A or the like.

$^1$H-NMR (δ ppm; $CDCl_3$): 6.83 (d, 2H), 2.46 (tt, 1H), 1.87 (m, 4H), 1.74 (m, 4H), 1.40-0.80 (m, 18H), 0.88 (t, 3H).

Physical properties of compound (No. 39) were as described below.

Transition temperature: C, 50.9; N, 65.9 I. $T_{NI}$=53.0° C.; η=42.9 mPa·s; Δn=0.070; Δ∈=17.13.

Example 6

Synthesis of Compound (No. 61)

(e-11)

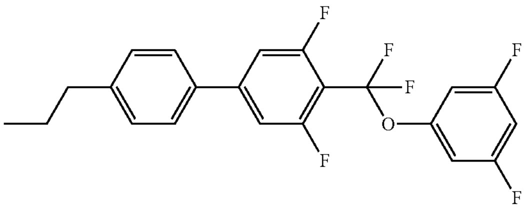

(e-12)

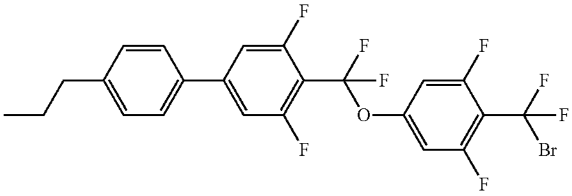

(No. 61)

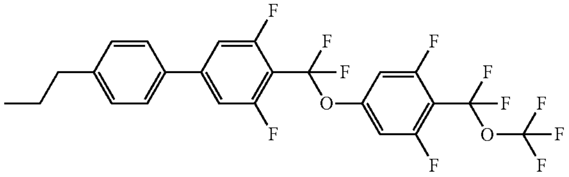

Compound (No. 61) was obtained by preparing compound (e-12) using compound (e-11) in place of compound (e-1), and using compound (e-12) in place of compound (e-2) in Example 1. In addition, compound (e-11) can be easily prepared with referring to Examples of JP 2003-261478 A or the like.

$^1$H-NMR (δ ppm; $CDCl_3$): 7.49 (d, 2H), 7.30 (d, 2H), 7.22 (d, 2H), 6.98 (d, 2H), 2.64 (t, 2H), 1.67 (sex, 2H), 0.97 (t, 3H).

Physical properties of compound (No. 61) were as described below.

Transition temperature: C, 18.1 I. $T_{NI}$=−3° C.; η=76.3 mPa·s; Δn=0.11; Δ∈=33.13; compatibility at a low temperature: 15 wt %, holding the liquid crystal phase at −20° C. for 30 days.

Example 7

Synthesis of Compound (No. 233)

(e-13)

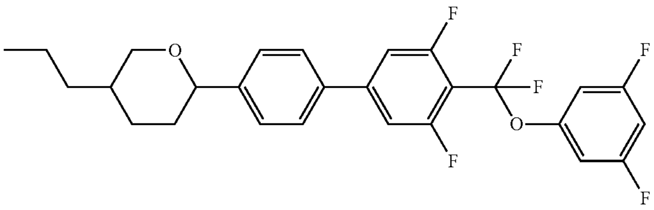

-continued (e-14)

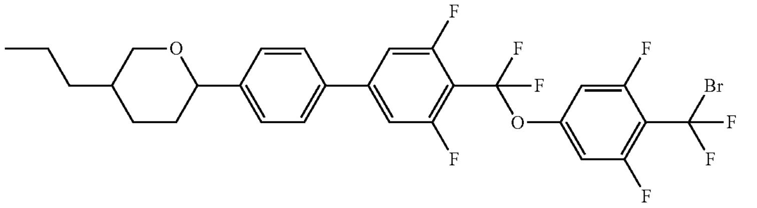

(No. 233)

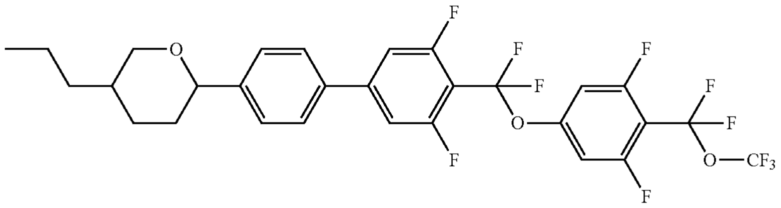

Compound (No. 233) was obtained by preparing compound (e-14) using compound (e-13) in place of compound (e-1), and using compound (e-14) in place of compound (e-2) in Example 1. In addition, compound (e-13) can be easily prepared with referring to Examples of JP 2011-136998 A or the like.

$^1$H-NMR (δ ppm; $CDCl_3$): 7.54 (d, 2H), 7.47 (d, 2H), 7.22 (d, 2H), 6.98 (d, 2H), 4.33 (d, 1H), 4.11 (d, 1H), 3.23 (t, 1H), 2.01 (d, 1H), 1.91 (d, 2H), 1.77-1.55 (m, 2H), 1.45-1.10 (m, 5H), 0.93 (t, 3H).

Physical properties of compound (No. 233) were as described below.

Transition temperature: C, 74.9; N, 118 I. $T_{NI}$=95.7° C.; η=157 mPa·s; Δn=0.137; $\Delta\epsilon$=32.47.

Example 8

Synthesis of Compound (No. 42)

(e-15)

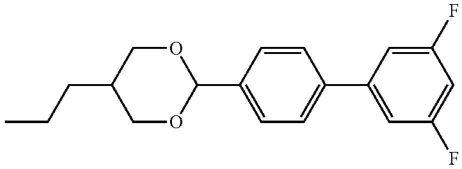

(e-16)

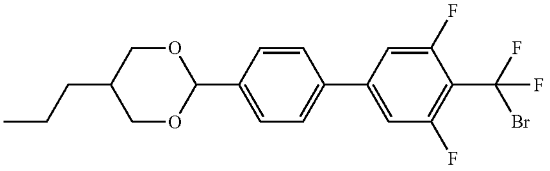

(No. 42)

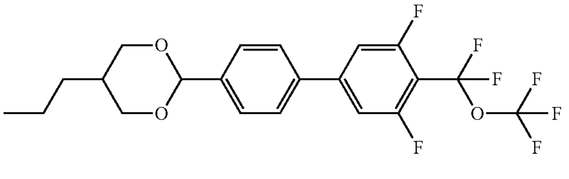

Compound (No. 42) was obtained by preparing compound (e-16) using compound (e-15) in place of compound (e-1), and using compound (e-16) in place of compound (e-2) in Example 1. In addition, compound (e-15) can be easily prepared with referring to Examples of JP 2009-292729 A or the like.

$^1$H-NMR (δ ppm; $CDCl_3$): 7.61 (d, 2H), 7.55 (d, 2H), 7.21 (d, 2H), 5.47 (s, 1H), 4.25 (dd, 2H), 3.57 (t, 2H), 2.21-2.16 (m, 1H), 1.36 (sex, 2H), 1.10 (q, 2H), 0.94 (t, 3H).

Physical properties of compound (No. 42) were as described below.

Transition temperature: C, 97.5; N, 105 I. $T_{NI}$=56.7° C.; η=75.5 mPa·s; Δn=0.127; $\Delta\epsilon$=21.8.

Example 9

Synthesis of Compound (No. 598)

(e-17)

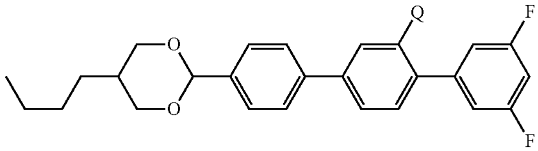

(e-18)

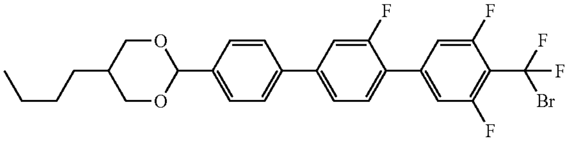

(No. 598)

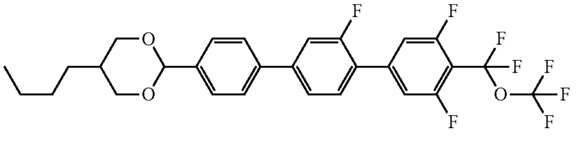

Compound (No. 598) was obtained by preparing compound (e-18) using compound (e-17) in place of compound (e-1), and using compound (e-18) in place of compound (e-2) in Example 1. In addition, compound (e-17) can be easily prepared with referring to Examples in JP 2009-292729 A or the like.

$^1$H-NMR (δ ppm; $CDCl_3$): 7.65 (d, 2H), 7.63 (d, 1H), 7.62 (d, 1H), 7.51 (d, 2H), 7.45 (d, 1H), 7.28 (d, 2H), 5.50 (s, 1H), 4.29 (dd, 2H), 3.59 (t, 2H), 2.20-2.15 (m, 1H), 1.38-1.31 (m, 4H), 1.16 (q, 2H), 0.95 (t, 3H).

Physical properties of compound (No. 598) were as described below.

Transition temperature: C, 72.0; N, 220 I. $T_{NI}$=152.4° C.; η=292.3 mPa·s; Δn=0.184; $\Delta\epsilon$=20.1.

Example 10

Synthesis of Compound (No. 598)

(e-19)

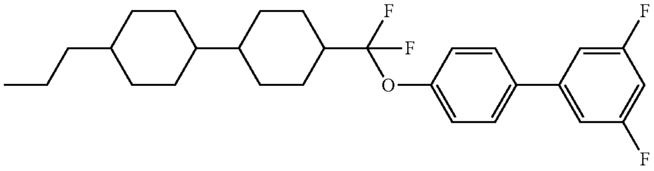

(e-20)

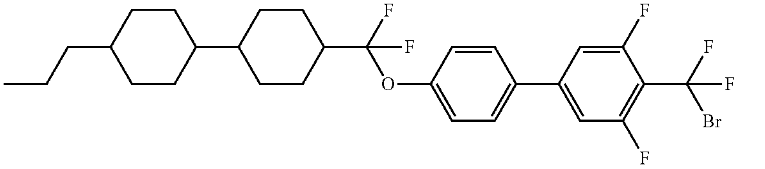

(No. 599)

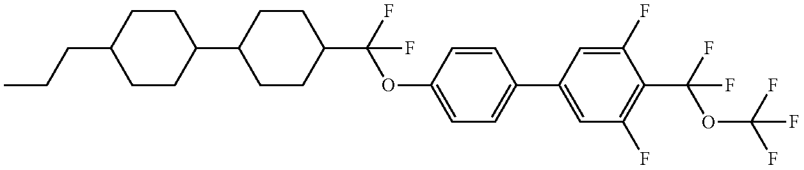

Compound (No. 598) was obtained by preparing compound (e-20) using compound (e-19) in place of compound (e-1), and using compound (e-20) in place of compound (e-2) in Example 1. In addition, compound (e-19) can be easily prepared with referring to Examples in WO 2008090780 A or the like.

$^1$H-NMR (δ ppm; $CDCl_3$): 7.52 (d, 2H), 7.27 (d, 2H), 7.18 (d, 2H), 2.07-2.00 (m, 3H), 1.87 (d, 2H), 1.80-1.69 (m, 4H), 1.45-0.80 (m, 18H).

Physical properties of compound (No. 598) were as described below.

Transition temperature: C, 115 N, 229.4 I. $T_{NI}$=163.7° C.; η=90.1 mPa·s; Δn=0.144; Δε=19.4; compatibility at a low temperature: 15 wt %, holding the liquid crystal phase at −20° C. for 30 days.

Example 11

Synthesis of Compound (No. 600)

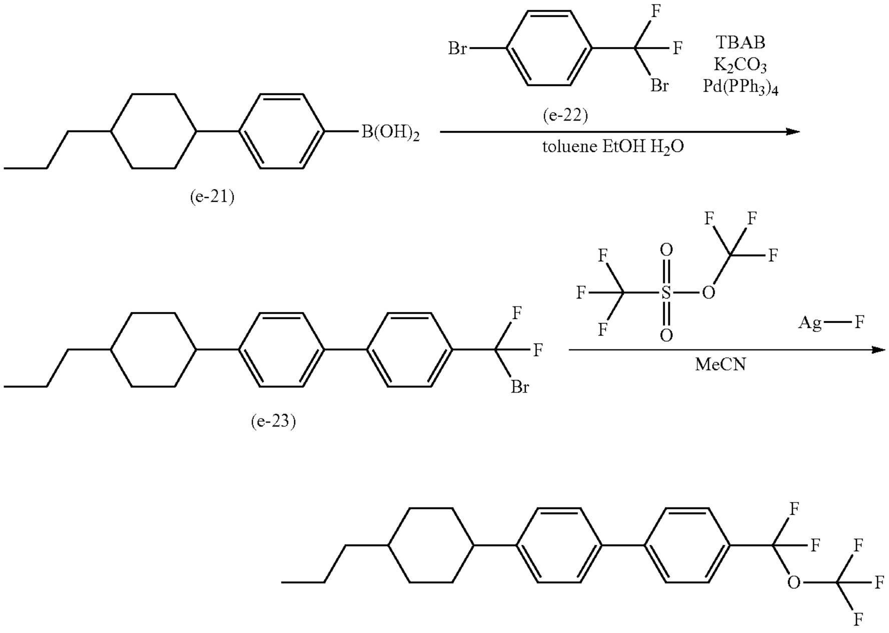

(e-22)

(e-21)

(e-23)

(No. 600)

First Step

Under a nitrogen atmosphere, compound (e-21) (7 g) and compound (e-22) (11 g) were dissolved in toluene, and water, ethanol, $Pd(PPh_3)_4$ (1 g), TBAB (0.4 g) and potassium carbonate (2.5 g) were added thereto, and the resultant mixture was subjected to heating reflux for 6 hours. After reaction completion, the resultant reaction mixture was extracted with toluene, washed with a 2 N—NaOH aqueous solution, a saturated aqueous solution of sodium hydrogencarbonate, water and a saturated aqueous solution of sodium chloride, and then dried over anhydrous magnesium sulfate and concentrated under reduced pressure. The resultant product was purified by silica gel column chromatography (heptane:toluene=9:1 in a volume ratio), and thus compound (e-23) (5.35 g) was obtained. In addition, compound (e-21) and compound (e-22) can be prepared by the methods described in JP H06-228037 A, JP 2011-98942 A or the like.

Second Step

Compound (No. 600) was obtained using compound (e-23) in place of compound (e-2) in the second step in Example 1.

$^1$H-NMR (δ ppm; $CDCl_3$): 7.67 (s, 4H), 7.52 (d, 2H), 7.31 (d, 2H), 2.55 (t, 1H), 1.91 (t, 4H), 1.50 (q, 2H), 1.40-1.20 (m, 5H), 1.05 (q, 2H), 0.91 (t, 3H).

Physical properties of compound (No. 600) were as described below.

Transition temperature: SE 91.3 SB 122.1 I. $T_{NI}$=69.0° C.; η=30.9 mPa·s; Δn=0.130; Δε=10.6; compatibility at a low temperature: 15 wt %, holding the liquid crystal phase at −20° C. for 30 days.

Example 12

Synthesis of Compound (No. 601)

(e-24)

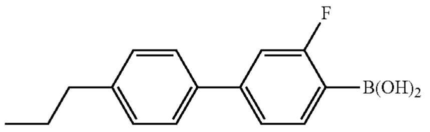

(e-22)

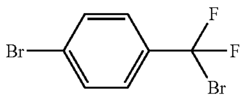

(e-25)

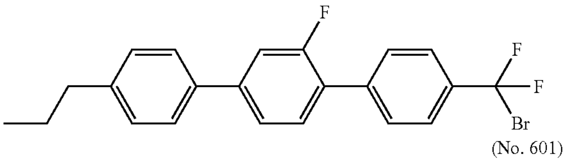

(No. 601)

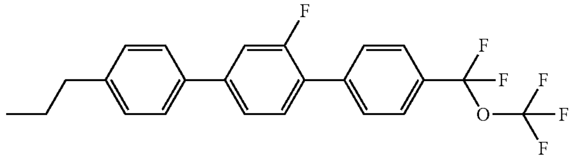

Compound (No. 601) was obtained by preparing compound (e-25) using compound (e-24) in place of compound (e-21), and using compound (e-25) in place of compound (e-23) in Example 11. In addition, compound (e-24) can be prepared by the method described in WO 2008090780 A or the like.

$^1$H-NMR (δ ppm; $CDCl_3$): 7.72 (s, 4H), 7.54 (d, 2H), 7.48 (q, 2H), 7.41 (d, 1H), 7.29 (d, 2H), 2.64 (t, 2H), 1.71 (sex, 2H), 0.98 (t, 3H).

Physical properties of compound (No. 601) were as described below.

Transition temperature: C, 100.6; S, 125.2 SA 170.5 I. $T_{NI}$=57.7° C.; η=32.9 mPa·s; Δn=0.217; Δε=17.9.

Example 13

Synthesis of Compound (No. 602)

(e-26)

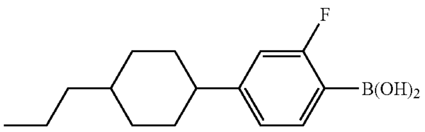

(e-22)

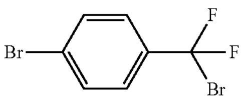

(e-27)

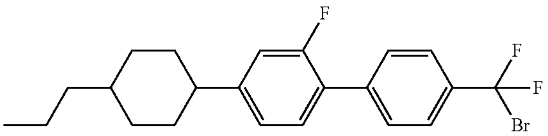

(No. 602)

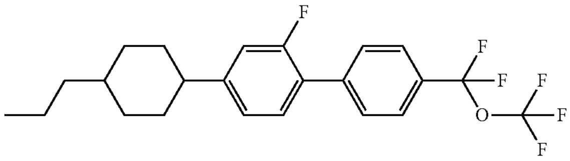

Compound (No. 602) was obtained by preparing compound (e-27) using compound (e-26) in place of compound (e-21), and using compound (e-27) in place of compound (e-23) in Example 11. In addition, compound (e-26) can be easily prepared with referring to Examples in JP 2011-136998 A or the like.

$^1$H-NMR (δ ppm; $CDCl_3$): 7.69 (d, 2H), 7.65 (d, 2H), 7.35 (t, 1H), 7.09 (d, 1H), 7.01 (d, 1H), 2.52 (t, 1H), 1.94 (t, 4H), 1.51-1.20 (m, 7H), 1.08 (q, 2H), 0.93 (t, 3H).

Physical properties of compound (No. 602) were as described below.

Transition temperature: C, 24.0; S, 26.1; S, 51.2; N, 53.9 I. $T_{NI}$=44.4° C.; η=30.4 mPa·s; Δn=0.117; Δε=12.1; compatibility at a low temperature: 15 wt %, holding the liquid crystal phase at −20° C. for 30 days.

Example 14

Synthesis of Compound (No. 602)

(e-21)

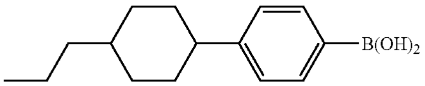

-continued (e-28)

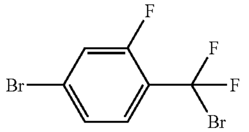

(e-29)

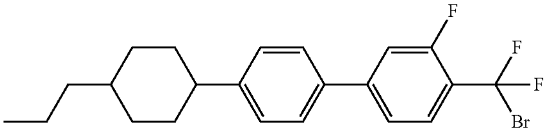

(No. 603)

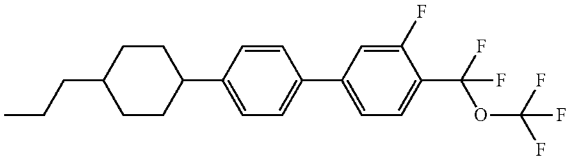

Compound (No. 603) was obtained by preparing compound (e-29) using compound (e-28) in place of compound (e-22), and using compound (e-29) in place of compound (e-23) in Example 11. In addition, compound (e-28) can be easily prepared with referring to Examples in JP 2011-98942 A or the like.

$^1$H-NMR (δ ppm; $CDCl_3$): 7.64 (t, 1H), 7.51 (d, 2H), 7.43 (d, 1H), 7.39 (d, 1H), 7.32 (d, 2H), 2.52 (t, 1H), 1.94 (t, 4H), 1.51-1.20 (m, 7H), 1.08 (q, 2H), 0.93 (t, 3H).

Physical properties of compound (No. 603) were as described below.

Transition temperature: C, 52.8; N, 58.6 I. $T_{NI}$=55.7° C.; η=47.9 mPa·s; Δn=0.110; Δ∈=12.2.

Compounds (No. 1) to (No. 597) shown below can be prepared in a manner similar to the synthesis method described in Examples 1 to 7. On measuring a transition temperature, a compound per se was used as a sample. On measuring a maximum temperature ($T_{NI}$), viscosity (η), optical anisotropy (Δn) and dielectric anisotropy (Δ∈), a mixture of a compound (15% by weight) and base liquid crystal (i) (85% by weight) was used as a sample. From the measured values, extrapolated values were calculated according to the extrapolation method and described. In addition, each of a prepared compound (15% by weight) was well dissolved in base liquid crystal (i) (85% by weight).

| No. | |
|---|---|
| 1 | 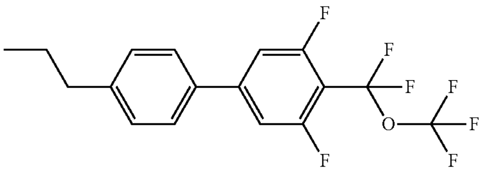 [SMILES: CCCc1ccc(-c2cc(F)c(C(F)(F)OC(F)(F)F)c(F)c2)cc1] |
| 2 | 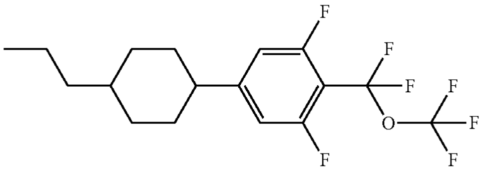 |
| 3 | 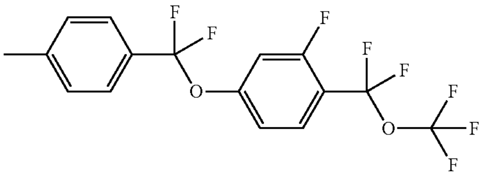 [SMILES: Cc1ccc(C(F)(F)Oc2ccc(C(F)(F)OC(F)(F)F)c(F)c2)cc1] |
| 4 | 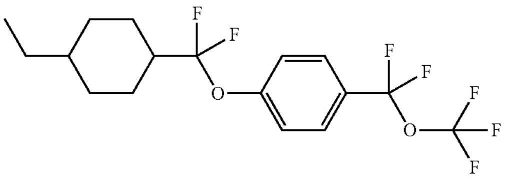 [SMILES: CCC1CCC(C(F)(F)Oc2ccc(C(F)(F)OC(F)(F)F)cc2)CC1] |
| 5 | 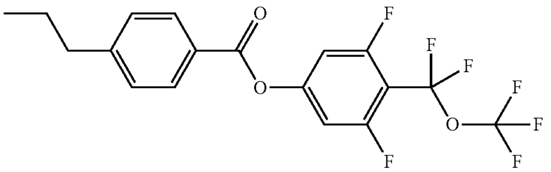 [SMILES: CCCc1ccc(C(=O)Oc2cc(F)c(C(F)(F)OC(F)(F)F)c(F)c2)cc1] |

-continued
| No. | |
|---|---|
| 6 | 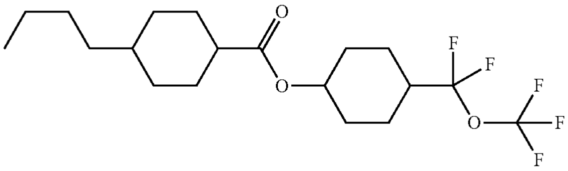 [SMILES: CCCCC1CCC(C(=O)OC2CCC(C(F)(F)OC(F)(F)F)CC2)CC1] |
| 7 | 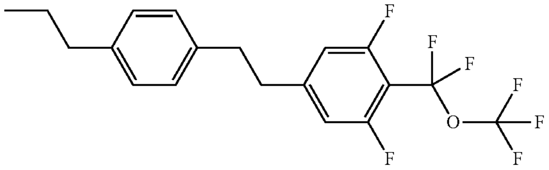 |
| 8 | 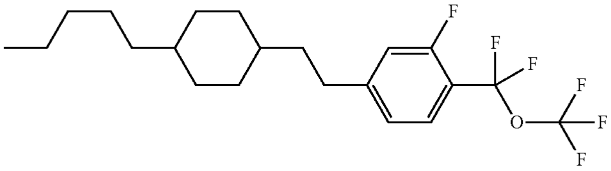 [SMILES: CCCCCC1CCC(CCc2ccc(C(F)(F)OC(F)(F)F)c(F)c2)CC1] |
| 9 | 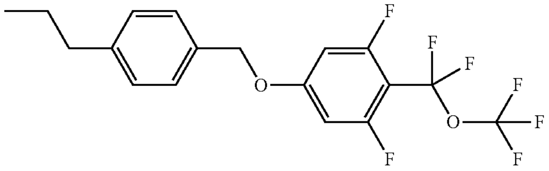 |
| 10 | 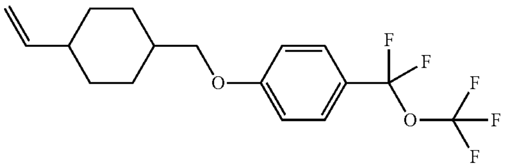 [SMILES: C=CC1CCC(COc2ccc(C(F)(F)OC(F)(F)F)cc2)CC1] |
| 11 | 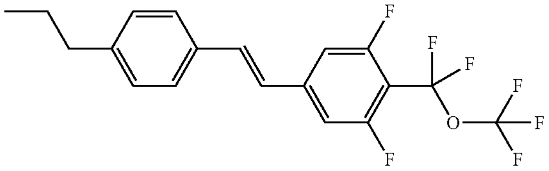 [SMILES: CCCc1ccc(/C=C/c2cc(F)c(C(F)(F)OC(F)(F)F)c(F)c2)cc1] |
| 12 | 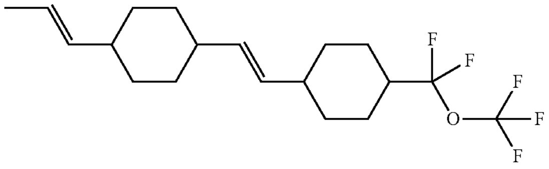 [SMILES: C/C=C/C1CCC(/C=C/C2CCC(C(F)(F)OC(F)(F)F)CC2)CC1] |
| 13 | 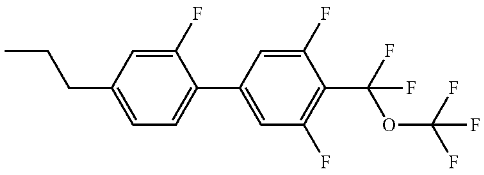 [SMILES: CCCc1ccc(-c2cc(F)c(C(F)(F)OC(F)(F)F)c(F)c2)c(F)c1] |

-continued
| No. | |
|---|---|
| 14 | 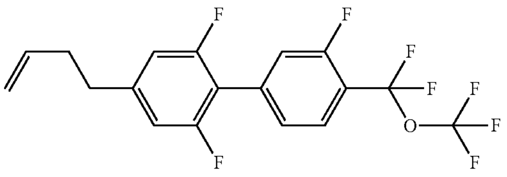 [SMILES: C=CCCc1cc(F)c(-c2ccc(C(F)(F)OC(F)(F)F)c(F)c2)c(F)c1] |
| 15 | 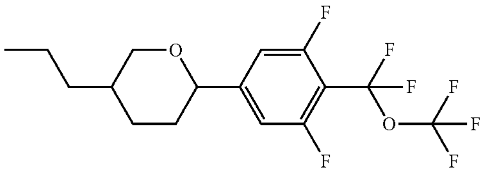 |
| 16 | 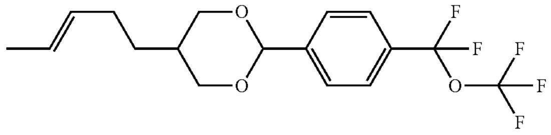 [SMILES: C/C=C/CCC1COC(c2ccc(C(F)(F)OC(F)(F)F)cc2)OC1] |
| 17 | 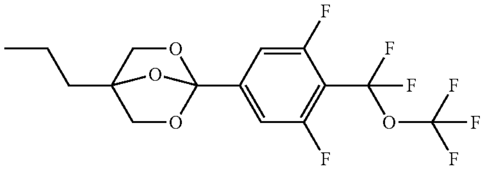 [SMILES: CCCC12COC(c3cc(F)c(C(F)(F)OC(F)(F)F)c(F)c3)(OC1)O2] |
| 18 | 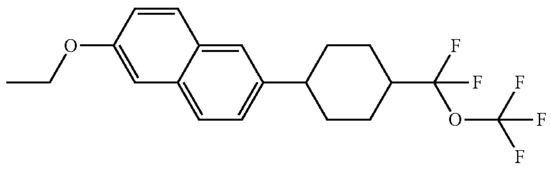 [SMILES: CCOc1ccc2cc(C3CCC(C(F)(F)OC(F)(F)F)CC3)ccc2c1] |
| 19 | 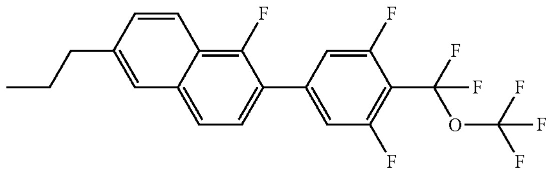 [SMILES: CCCc1ccc2c(F)c(-c3cc(F)c(C(F)(F)OC(F)(F)F)c(F)c3)ccc2c1] |
| 20 | 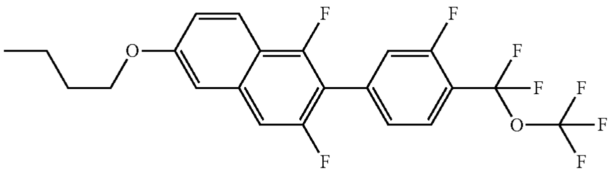 [SMILES: CCCCOc1ccc2c(F)c(-c3ccc(C(F)(F)OC(F)(F)F)c(F)c3)c(F)cc2c1] |
| 21 | 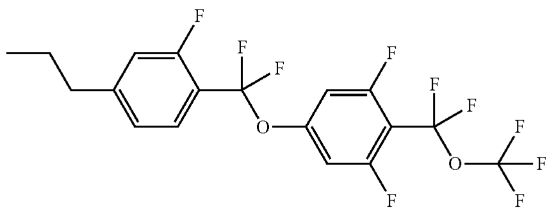 [SMILES: CCCc1ccc(C(F)(F)Oc2cc(F)c(C(F)(F)OC(F)(F)F)c(F)c2)c(F)c1] |

-continued
| No. | |
|---|---|
| 22 | 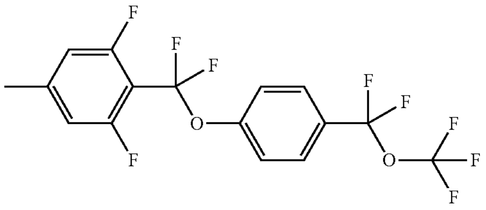 [SMILES: Cc1cc(F)c(C(F)(F)Oc2ccc(C(F)(F)OC(F)(F)F)cc2)c(F)c1] |
| 23 | 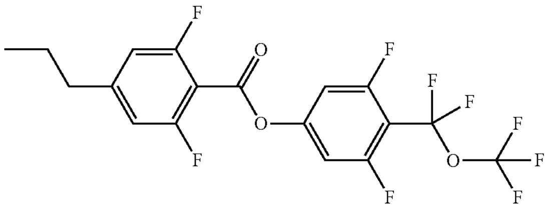 [SMILES: CCCc1cc(F)c(C(=O)Oc2cc(F)c(C(F)(F)OC(F)(F)F)c(F)c2)c(F)c1] |
| 24 | 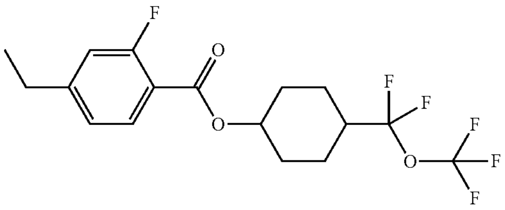 [SMILES: CCc1ccc(C(=O)OC2CCC(C(F)(F)OC(F)(F)F)CC2)c(F)c1] |
| 25 | 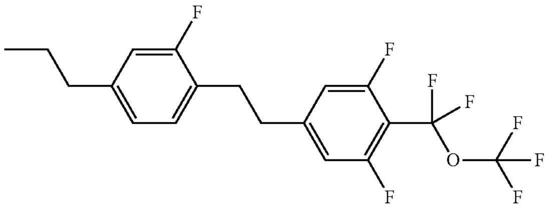 [SMILES: CCCc1ccc(CCc2cc(F)c(C(F)(F)OC(F)(F)F)c(F)c2)c(F)c1] |
| 26 | 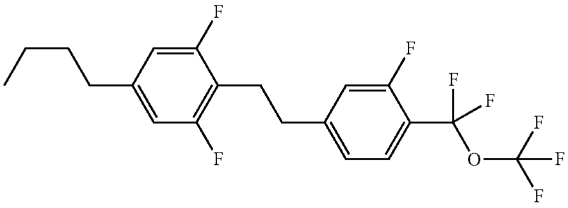 [SMILES: CCCCc1cc(F)c(CCc2ccc(C(F)(F)OC(F)(F)F)c(F)c2)c(F)c1] |
| 27 | 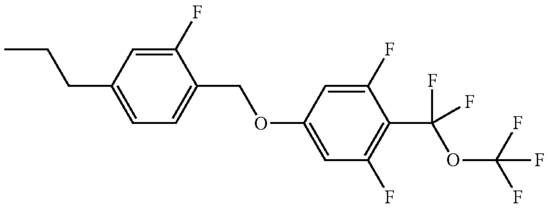 [SMILES: CCCc1ccc(COc2cc(F)c(C(F)(F)OC(F)(F)F)c(F)c2)c(F)c1] |
| 28 | 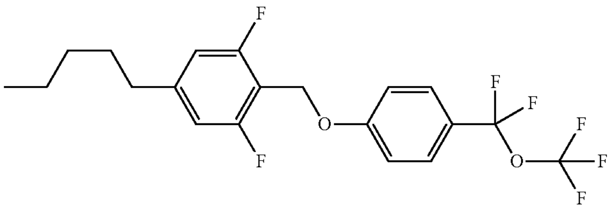 [SMILES: CCCCCc1cc(F)c(COc2ccc(C(F)(F)OC(F)(F)F)cc2)c(F)c1] |

-continued
| No. | |
|---|---|
| 29 | 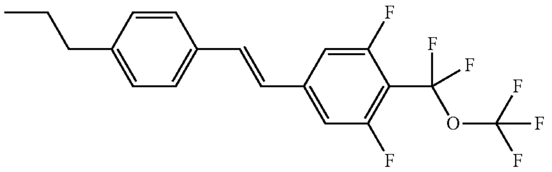 [SMILES: CCCc1ccc(/C=C/c2cc(F)c(C(F)(F)OC(F)(F)F)c(F)c2)cc1] |
| 30 | 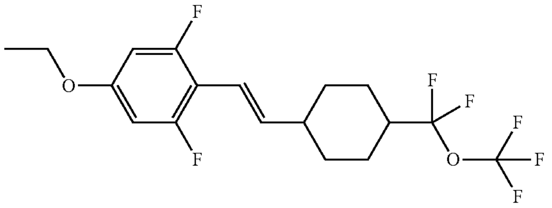 [SMILES: CCOc1cc(F)c(/C=C/C2CCC(C(F)(F)OC(F)(F)F)CC2)c(F)c1] |
| 31 | 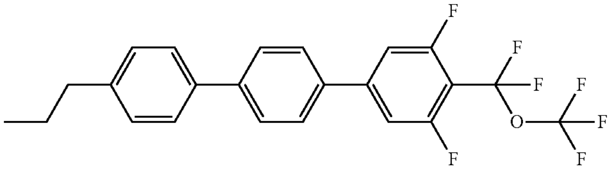 |
| 32 | 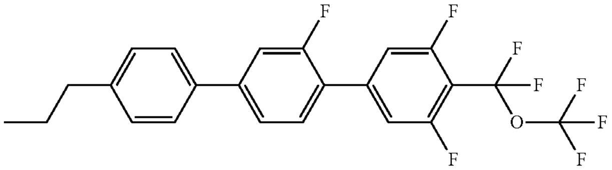 [SMILES: CCCc1ccc(-c2ccc(-c3cc(F)c(C(F)(F)OC(F)(F)F)c(F)c3)cc2)cc1] |
| 33 | 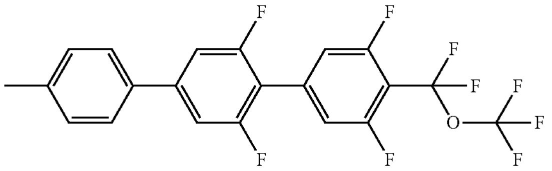 [SMILES: Cc1ccc(-c2cc(F)c(-c3cc(F)c(C(F)(F)OC(F)(F)F)c(F)c3)c(F)c2)cc1] |
| 34 | 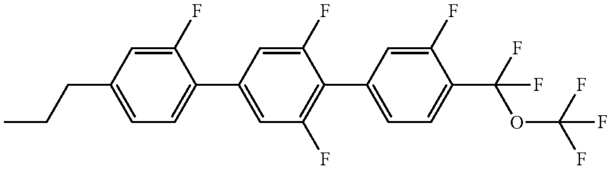 [SMILES: CCCc1ccc(-c2cc(F)c(-c3ccc(C(F)(F)OC(F)(F)F)c(F)c3)c(F)c2)c(F)c1] |
| 35 | 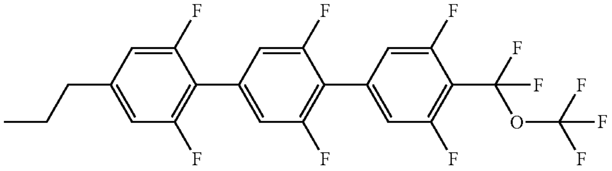 [SMILES: CCCc1cc(F)c(-c2cc(F)c(-c3cc(F)c(C(F)(F)OC(F)(F)F)c(F)c3)c(F)c2)c(F)c1] |
| 36 | 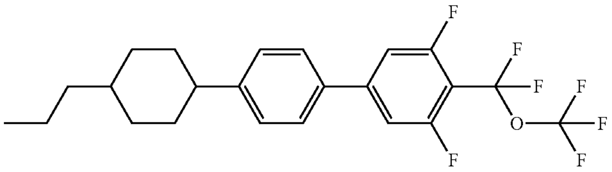 |

-continued
| No. | |
|---|---|
| 37 | 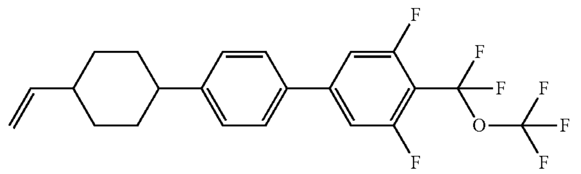 [SMILES: C=CC1CCC(c2ccc(-c3cc(F)c(C(F)(F)OC(F)(F)F)c(F)c3)cc2)CC1] |
| 38 | 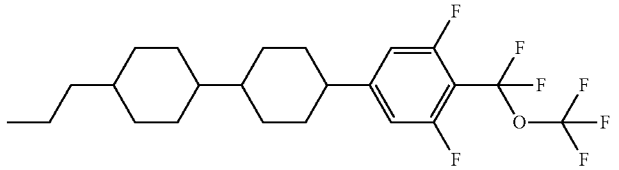 [SMILES: CCCC1CCC(C2CCC(c3cc(F)c(C(F)(F)OC(F)(F)F)c(F)c3)CC2)CC1] |
| 39 | 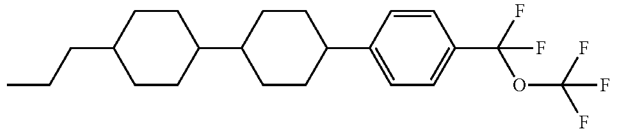 [SMILES: CCCC1CCC(C2CCC(c3ccc(C(F)(F)OC(F)(F)F)cc3)CC2)CC1] |
| 40 | 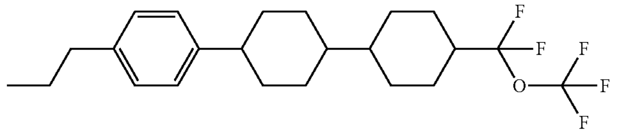 |
| 41 | 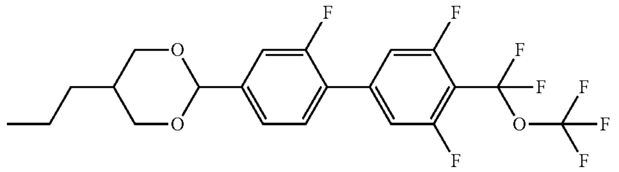 |
| 42 | 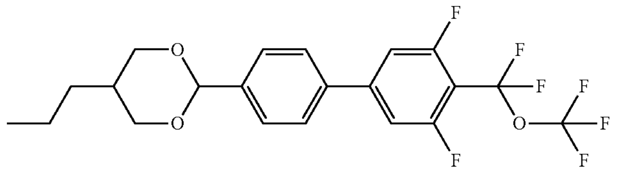 |
| 43 | 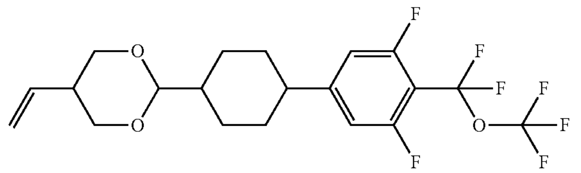 [SMILES: C=CC1COC(C2CCC(c3cc(F)c(C(F)(F)OC(F)(F)F)c(F)c3)CC2)OC1] |
| 44 | 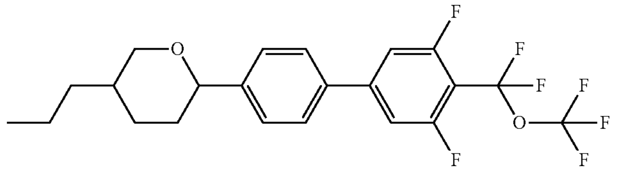 [SMILES: CCCC1CCC(c2ccc(-c3cc(F)c(C(F)(F)OC(F)(F)F)c(F)c3)c(F)c2)OC1] |
| 45 | 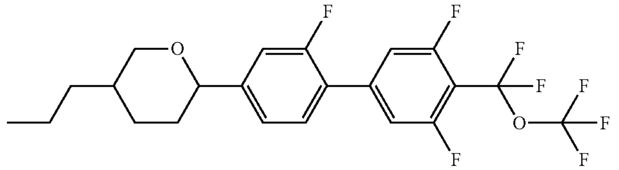 |

-continued
| No. | |
|---|---|
| 46 | 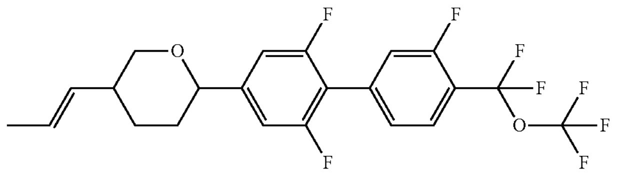 [SMILES: C/C=C/C1CCC(c2cc(F)c(-c3ccc(C(F)(F)OC(F)(F)F)c(F)c3)c(F)c2)OC1] |
| 47 | 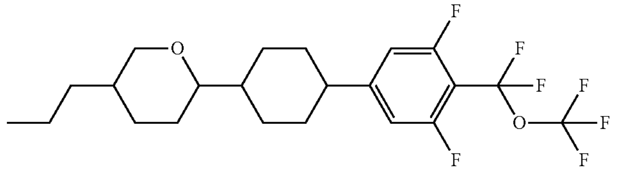 [SMILES: CCCC1CCC(C2CCC(c3cc(F)c(C(F)(F)OC(F)(F)F)c(F)c3)CC2)OC1] |
| 48 | 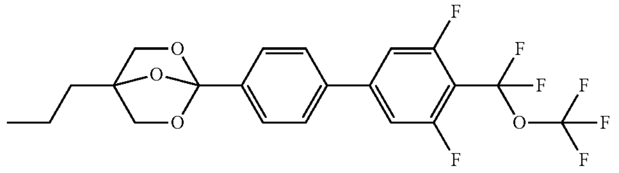 [SMILES: CCCC12COC(c3ccc(-c4cc(F)c(C(F)(F)OC(F)(F)F)c(F)c4)cc3)(OC1)O2] |
| 49 | 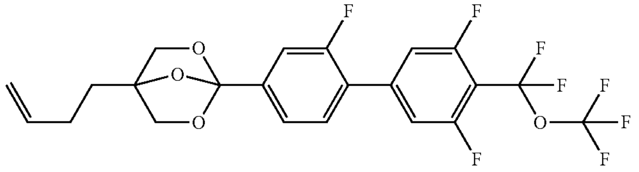 [SMILES: C=CCCC12COC(c3ccc(-c4cc(F)c(C(F)(F)OC(F)(F)F)c(F)c4)c(F)c3)(OC1)O2] |
| 50 | 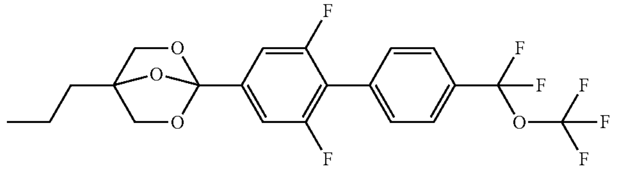 [SMILES: CCCC12COC(c3cc(F)c(-c4ccc(C(F)(F)OC(F)(F)F)cc4)c(F)c3)(OC1)O2] |
| 51 | 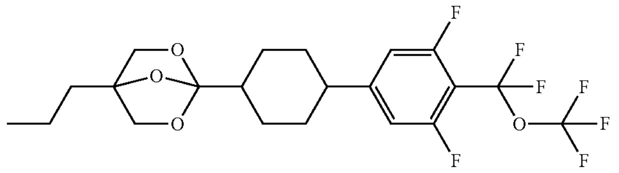 [SMILES: CCCC12COC(C3CCC(c4cc(F)c(C(F)(F)OC(F)(F)F)c(F)c4)CC3)(OC1)O2] |
| 52 | 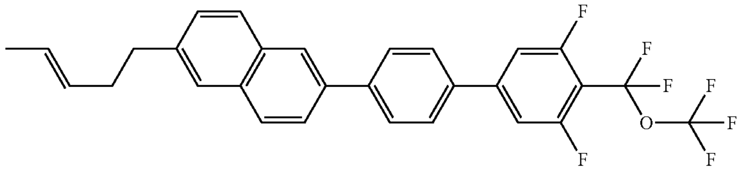 [SMILES: C/C=C/CCc1ccc2cc(-c3ccc(-c4cc(F)c(C(F)(F)OC(F)(F)F)c(F)c4)cc3)ccc2c1] |
| 53 | 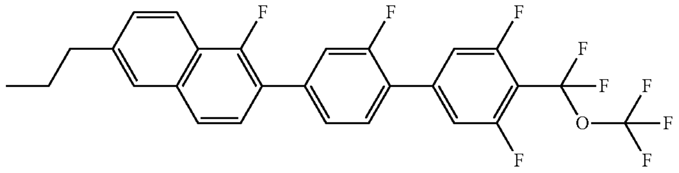 [SMILES: CCCc1ccc2c(F)c(-c3ccc(-c4cc(F)c(C(F)(F)OC(F)(F)F)c(F)c4)c(F)c3)ccc2c1] |

-continued
| No. | |
|---|---|
| 54 | 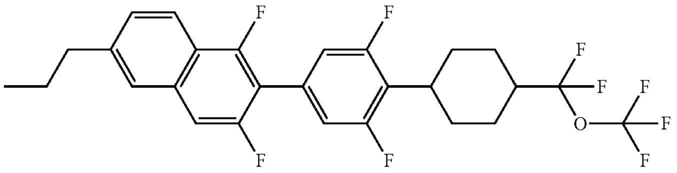 |
| 55 | 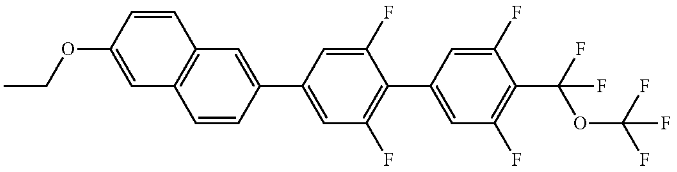 [SMILES: CCOc1ccc2cc(-c3cc(F)c(-c4cc(F)c(C(F)(F)OC(F)(F)F)c(F)c4)c(F)c3)ccc2c1] |
| 56 | 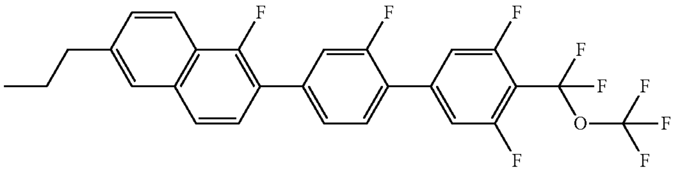 [SMILES: CCCc1ccc2c(F)c(-c3ccc(-c4cc(F)c(C(F)(F)OC(F)(F)F)c(F)c4)c(F)c3)ccc2c1] |
| 57 | 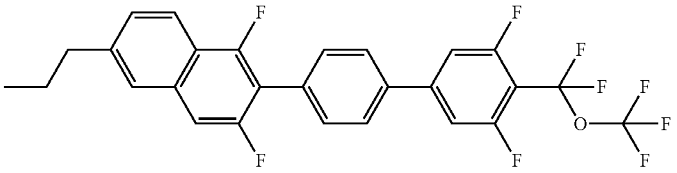 |
| 58 | 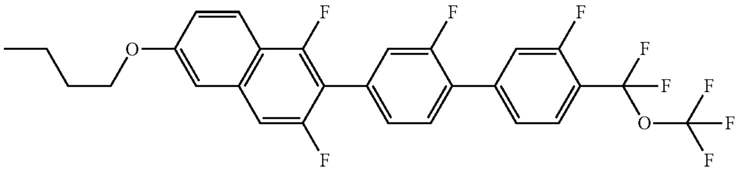 [SMILES: CCCCOc1ccc2c(F)c(-c3ccc(-c4ccc(C(F)(F)OC(F)(F)F)c(F)c4)c(F)c3)c(F)cc2c1] |
| 59 | 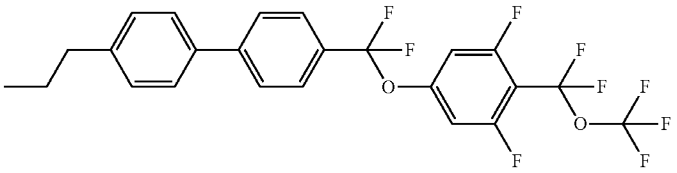 |
| 60 | 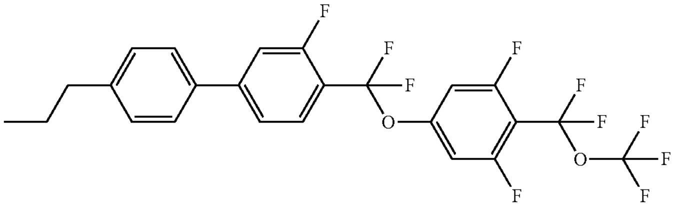 [SMILES: CCCc1ccc(-c2ccc(C(F)(F)Oc3cc(F)c(C(F)(F)OC(F)(F)F)c(F)c3)c(F)c2)cc1] |
| 61 | 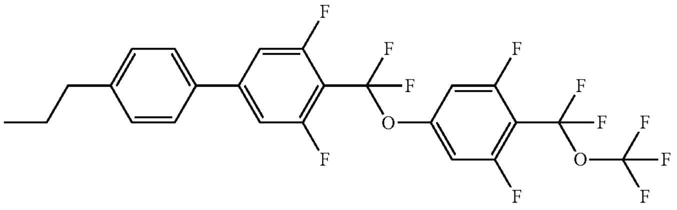 |

-continued
| No. | |
|---|---|
| 62 | 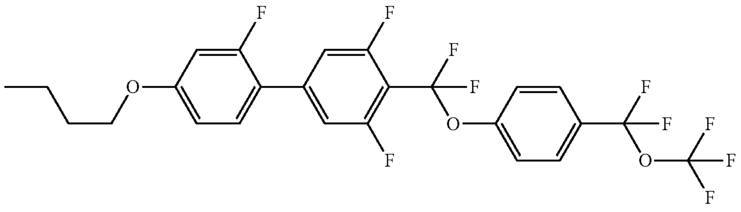 [SMILES: CCCCOc1ccc(-c2cc(F)c(C(F)(F)Oc3ccc(C(F)(F)OC(F)(F)F)cc3)c(F)c2)c(F)c1] |
| 63 | 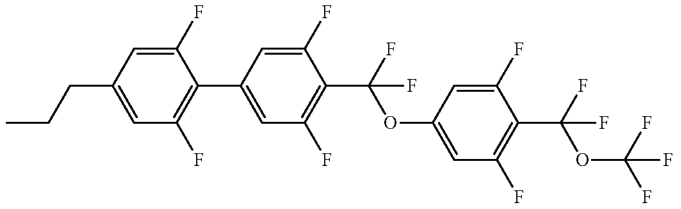 [SMILES: CCCc1cc(F)c(-c2cc(F)c(C(F)(F)Oc3cc(F)c(C(F)(F)OC(F)(F)F)c(F)c3)c(F)c2)c(F)c1] |
| 64 | 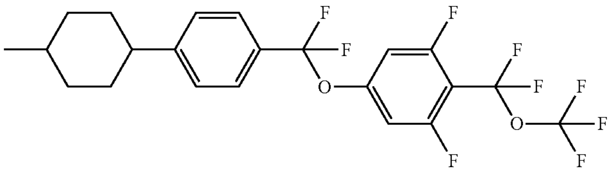 [SMILES: CC1CCC(c2ccc(C(F)(F)Oc3cc(F)c(C(F)(F)OC(F)(F)F)c(F)c3)cc2)CC1] |
| 65 | 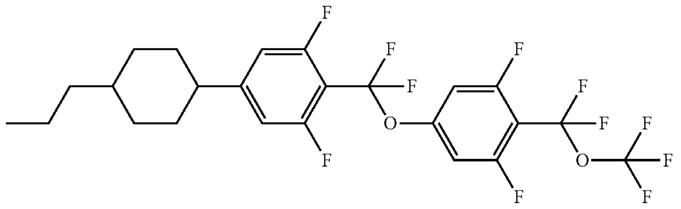 [SMILES: CCCC1CCC(c2cc(F)c(C(F)(F)Oc3cc(F)c(C(F)(F)OC(F)(F)F)c(F)c3)c(F)c2)CC1] |
| 66 | 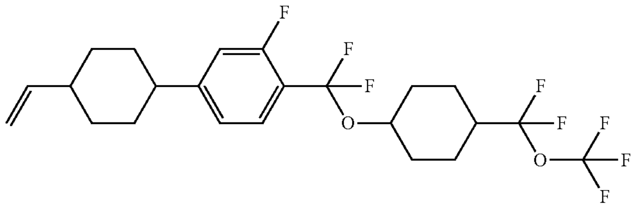 [SMILES: C=CC1CCC(c2ccc(C(F)(F)OC3CCC(C(F)(F)OC(F)(F)F)CC3)c(F)c2)CC1] |
| 67 | 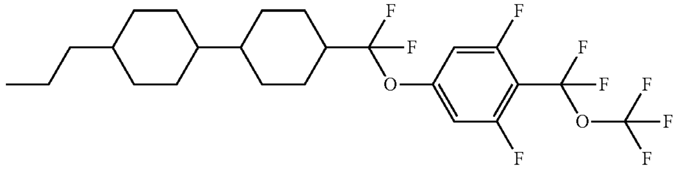 |
| 68 | 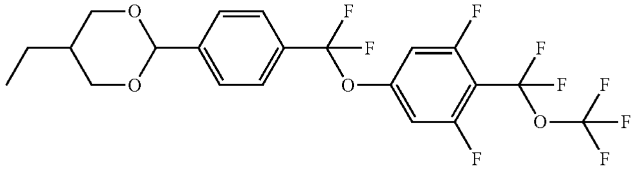 [SMILES: CCC1COC(c2ccc(C(F)(F)Oc3cc(F)c(C(F)(F)OC(F)(F)F)c(F)c3)cc2)OC1] |

-continued
| No. | |
|---|---|
| 69 | 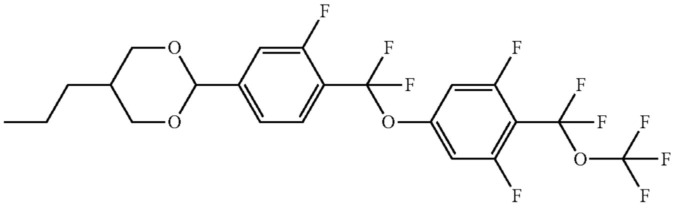 [SMILES: CCCC1COC(c2ccc(C(F)(F)Oc3cc(F)c(C(F)(F)OC(F)(F)F)c(F)c3)c(F)c2)OC1] |
| 70 | 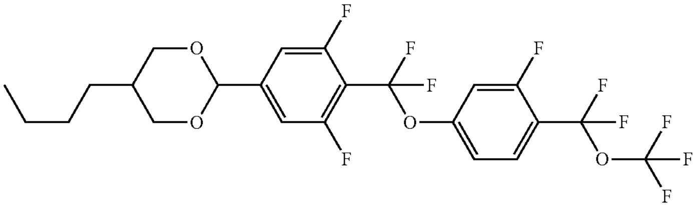 [SMILES: CCCCC1COC(c2cc(F)c(C(F)(F)Oc3ccc(C(F)(F)OC(F)(F)F)c(F)c3)c(F)c2)OC1] |
| 71 | 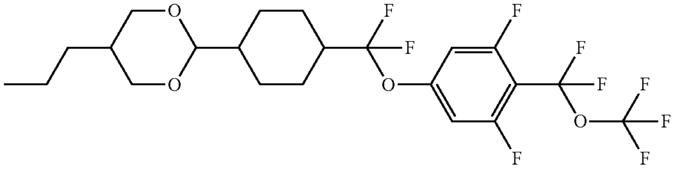 |
| 72 | 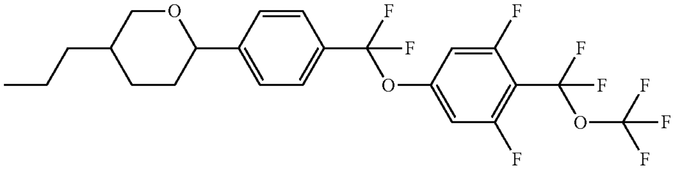 [SMILES: CCCC1CCC(c2ccc(C(F)(F)Oc3cc(F)c(C(F)(F)OC(F)(F)F)c(F)c3)cc2)OC1] |
| 73 | 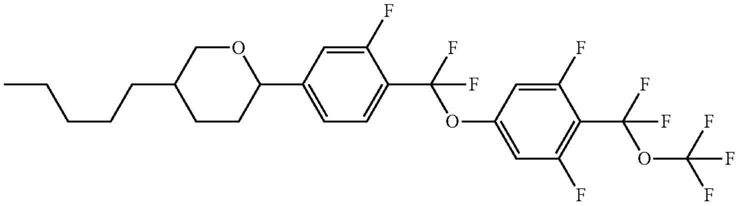 [SMILES: CCCCCC1CCC(c2ccc(C(F)(F)Oc3cc(F)c(C(F)(F)OC(F)(F)F)c(F)c3)c(F)c2)OC1] |
| 74 | 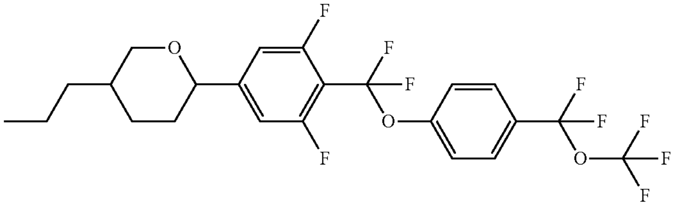 [SMILES: CCCC1CCC(c2cc(F)c(C(F)(F)Oc3ccc(C(F)(F)OC(F)(F)F)cc3)c(F)c2)OC1] |
| 75 | 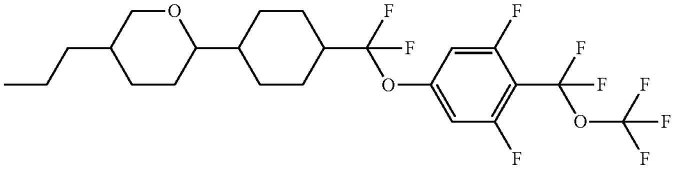 |
| 76 | 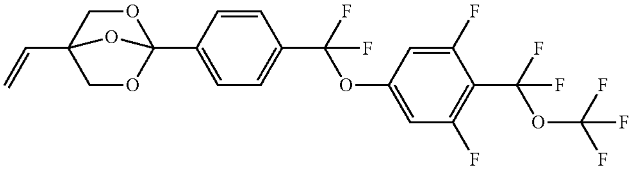 [SMILES: C=CC12COC(c3ccc(C(F)(F)Oc4cc(F)c(C(F)(F)OC(F)(F)F)c(F)c4)cc3)(OC1)O2] |

-continued
| No. | |
|---|---|
| 77 | 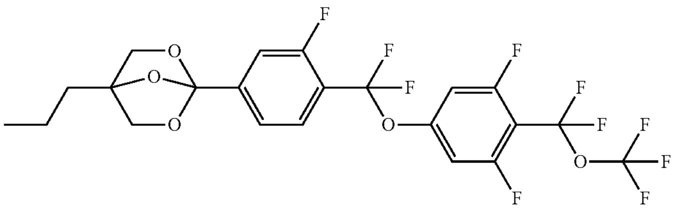 [SMILES: CCCC12COC(c3ccc(C(F)(F)Oc4cc(F)c(C(F)(F)OC(F)(F)F)c(F)c4)c(F)c3)(OC1)O2] |
| 78 | 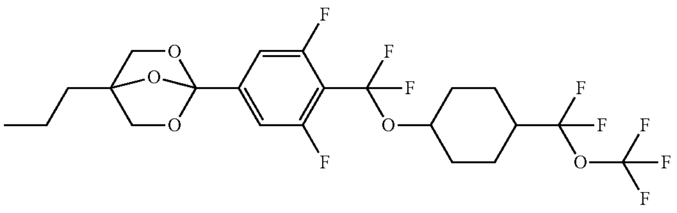 [SMILES: CCCC12COC(c3cc(F)c(C(F)(F)OC4CCC(C(F)(F)OC(F)(F)F)CC4)c(F)c3)(OC1)O2] |
| 79 | 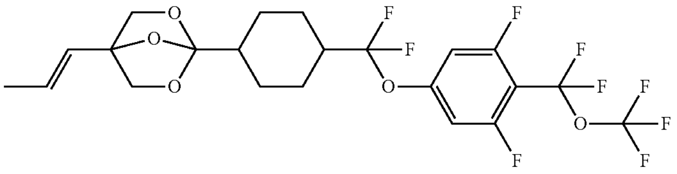 [SMILES: C/C=C/C12COC(C3CCC(C(F)(F)Oc4cc(F)c(C(F)(F)OC(F)(F)F)c(F)c4)CC3)(OC1)O2] |
| 80 | 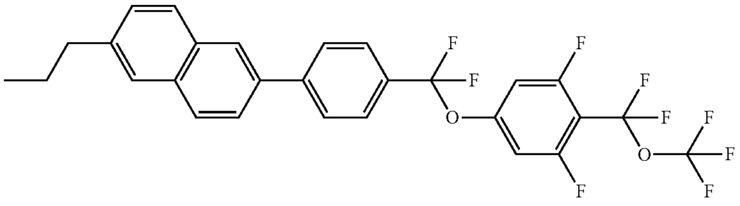 [SMILES: CCCc1ccc2cc(-c3ccc(C(F)(F)Oc4cc(F)c(C(F)(F)OC(F)(F)F)c(F)c4)cc3)ccc2c1] |
| 81 | 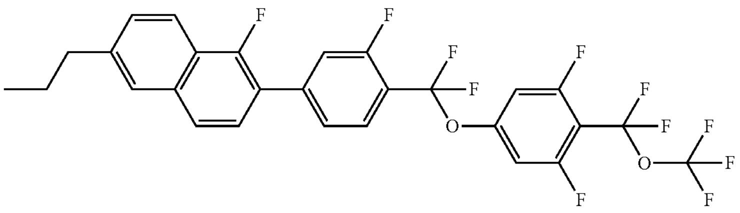 |
| 82 | 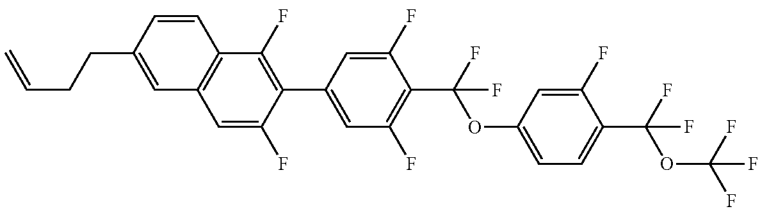 |
| 83 | 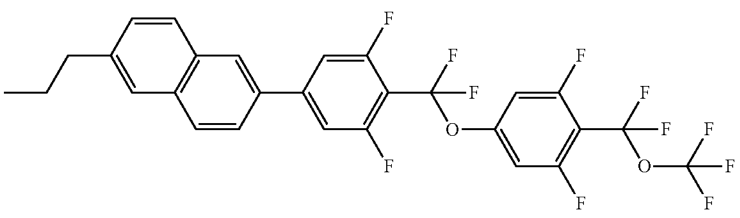 |

-continued
| No. | |
|---|---|
| 84 | 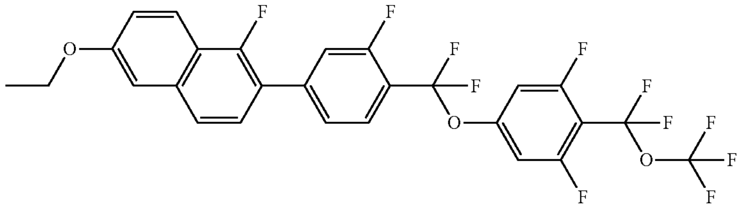 [SMILES: CCCc1ccc2c(F)c(-c3ccc(C(F)(F)Oc4cc(F)c(C(F)(F)OC(F)(F)F)c(F)c4)c(F)c3)ccc2c1] |
| 85 | 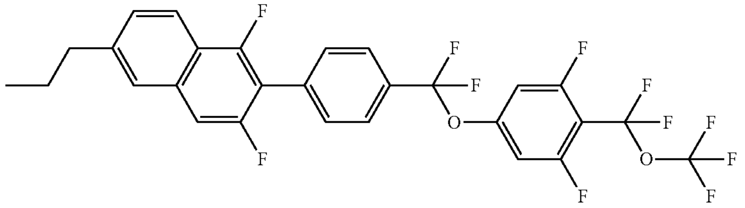 [SMILES: CCCc1ccc2c(F)c(-c3ccc(C(F)(F)Oc4cc(F)c(C(F)(F)OC(F)(F)F)c(F)c4)cc3)c(F)cc2c1] |
| 86 | 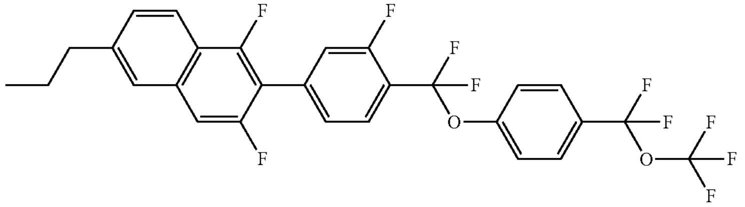 [SMILES: CCCc1ccc2c(F)c(-c3ccc(C(F)(F)Oc4ccc(C(F)(F)OC(F)(F)F)cc4)c(F)c3)c(F)cc2c1] |
| 87 | 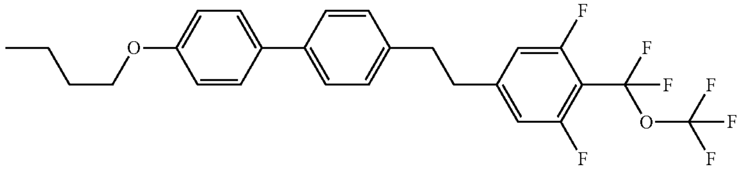 [SMILES: CCCCOc1ccc(-c2ccc(CCc3cc(F)c(C(F)(F)OC(F)(F)F)c(F)c3)cc2)cc1] |
| 88 | 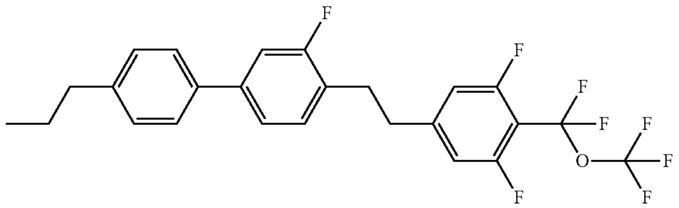 |
| 89 | 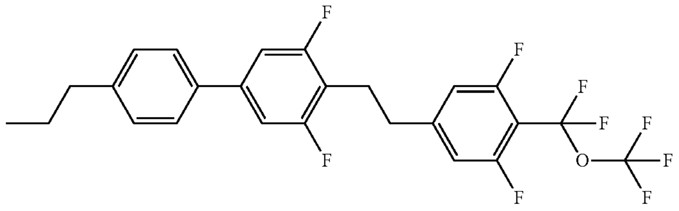 [SMILES: CCCc1ccc(-c2ccc(CCc3cc(F)c(C(F)(F)OC(F)(F)F)c(F)c3)c(F)c2)cc1] |
| 90 | 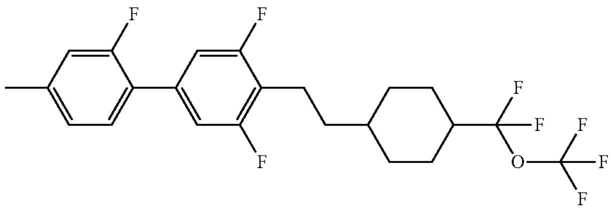 [SMILES: Cc1ccc(-c2cc(F)c(CCC3CCC(C(F)(F)OC(F)(F)F)CC3)c(F)c2)c(F)c1] |

-continued
| No. | |
|---|---|
| 91 | 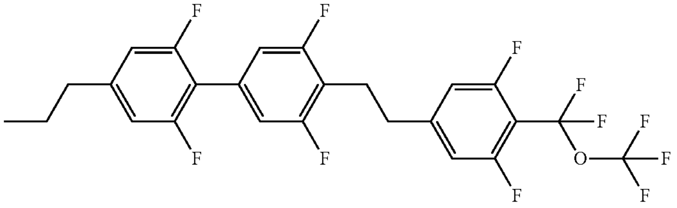 [SMILES: CCCc1cc(F)c(-c2cc(F)c(CCc3cc(F)c(C(F)(F)OC(F)(F)F)c(F)c3)c(F)c2)c(F)c1] |
| 92 | 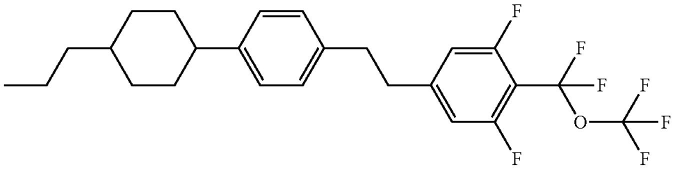 [SMILES: CCCC1CCC(c2ccc(CCc3cc(F)c(C(F)(F)OC(F)(F)F)c(F)c3)cc2)CC1] |
| 93 | 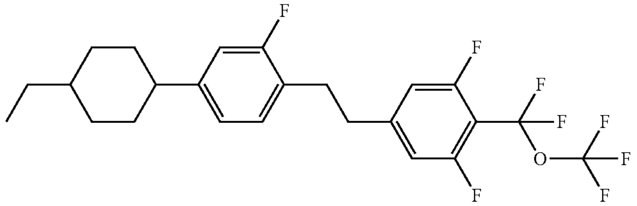 [SMILES: CCC1CCC(c2ccc(CCc3cc(F)c(C(F)(F)OC(F)(F)F)c(F)c3)c(F)c2)CC1] |
| 94 | 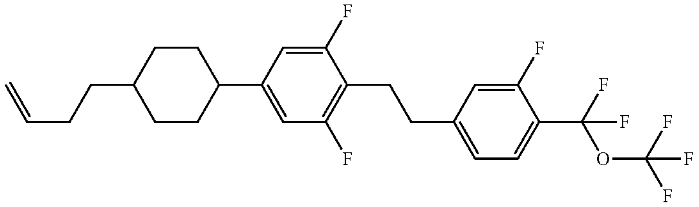 [SMILES: C=CCCC1CCC(c2cc(F)c(CCc3ccc(C(F)(F)OC(F)(F)F)c(F)c3)c(F)c2)CC1] |
| 95 | 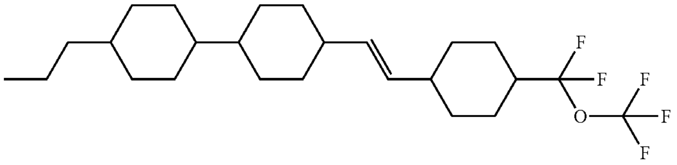 [SMILES: CCCC1CCC(C2CCC(/C=C/C3CCC(C(F)(F)OC(F)(F)F)CC3)CC2)CC1] |
| 96 | 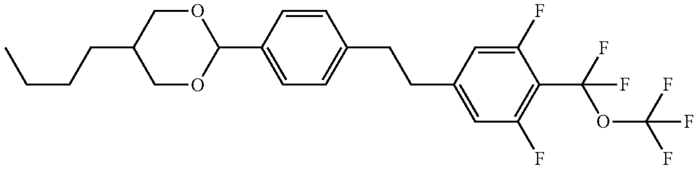 [SMILES: CCCCC1COC(c2ccc(CCc3cc(F)c(C(F)(F)OC(F)(F)F)c(F)c3)cc2)OC1] |
| 97 | 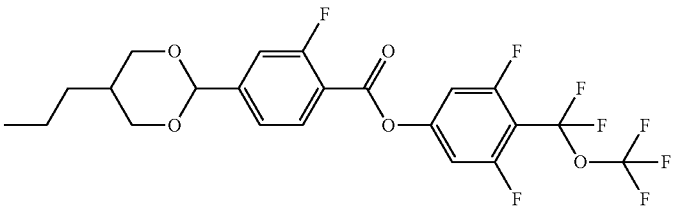 [SMILES: CCCC1COC(c2ccc(C(=O)Oc3cc(F)c(C(F)(F)OC(F)(F)F)c(F)c3)c(F)c2)OC1] |

-continued
| No. | |
|---|---|
| 98 | 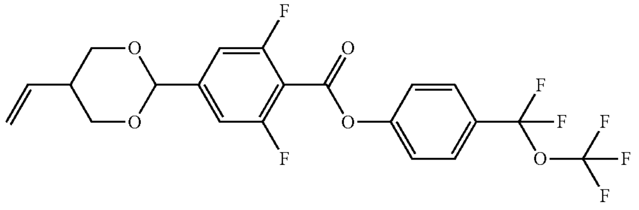 [SMILES: C=CC1COC(c2cc(F)c(C(=O)Oc3ccc(C(F)(F)OC(F)(F)F)cc3)c(F)c2)OC1] |
| 99 | 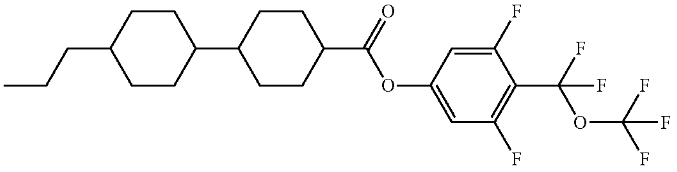 |
| 100 | 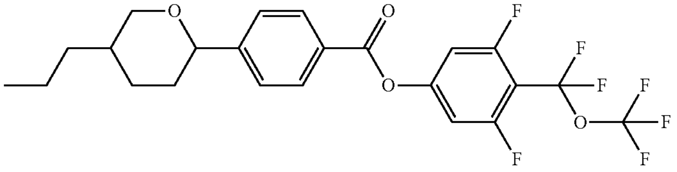 |
| 101 | 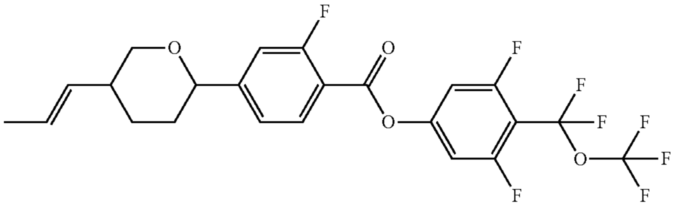 [SMILES: C/C=C/C1CCC(c2ccc(C(=O)Oc3cc(F)c(C(F)(F)OC(F)(F)F)c(F)c3)c(F)c2)OC1] |
| 102 | 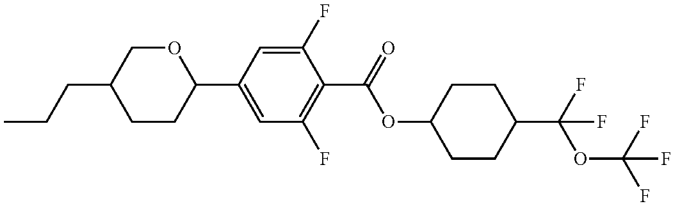 [SMILES: CCCC1CCC(c2cc(F)c(C(=O)OC3CCC(C(F)(F)OC(F)(F)F)CC3)c(F)c2)OC1] |
| 103 | 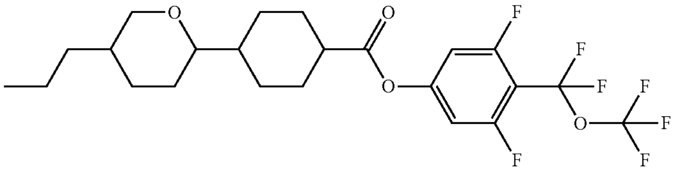 |
| 104 | 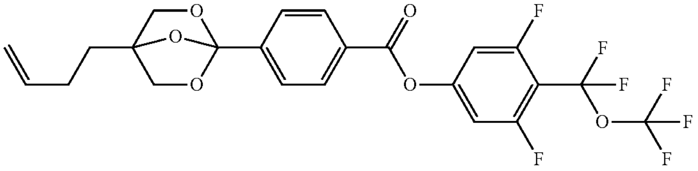 [SMILES: C=CCCC12COC(c3ccc(C(=O)Oc4cc(F)c(C(F)(F)OC(F)(F)F)c(F)c4)cc3)(OC1)O2] |
| 105 | 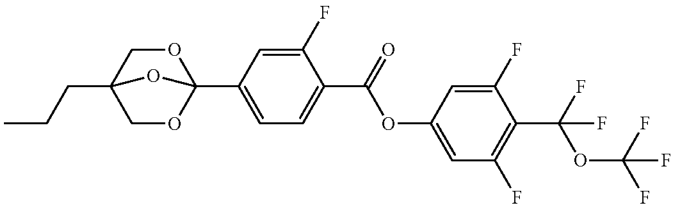 [SMILES: CCCC12COC(c3ccc(C(=O)Oc4cc(F)c(C(F)(F)OC(F)(F)F)c(F)c4)c(F)c3)(OC1)O2] |

-continued
| No. | |
|---|---|
| 106 | 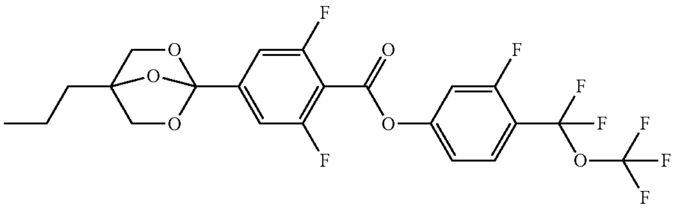 [SMILES: CCCC12COC(c3cc(F)c(C(=O)Oc4ccc(C(F)(F)OC(F)(F)F)c(F)c4)c(F)c3)(OC1)O2] |
| 107 | 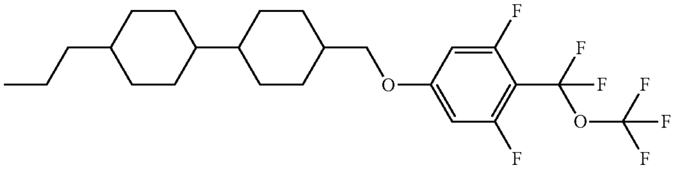 |
| 108 | 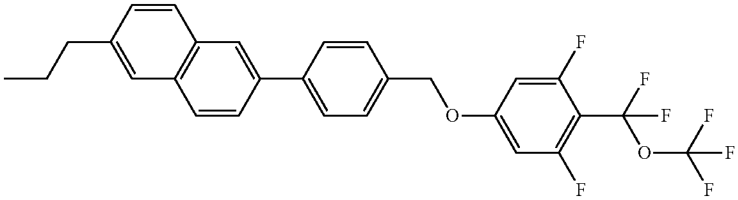 [SMILES: CCCc1ccc2cc(-c3ccc(COc4cc(F)c(C(F)(F)OC(F)(F)F)c(F)c4)cc3)ccc2c1] |
| 109 | 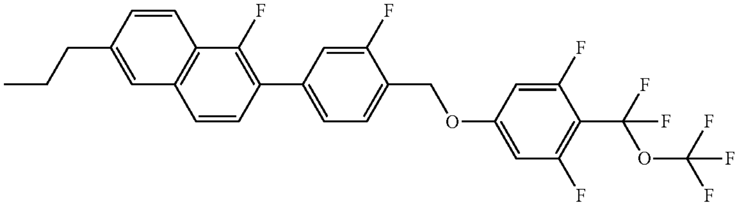 |
| 110 | 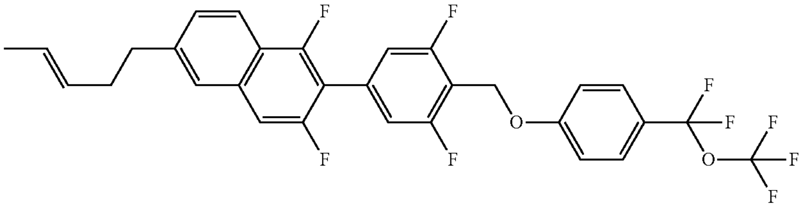 [SMILES: C/C=C/CCc1ccc2c(F)c(-c3cc(F)c(COc4ccc(C(F)(F)OC(F)(F)F)cc4)c(F)c3)c(F)cc2c1] |
| 111 | 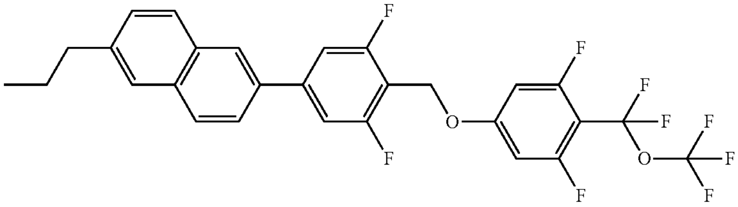 [SMILES: CCCc1ccc2c(F)c(-c3ccc(COc4cc(F)c(C(F)(F)OC(F)(F)F)c(F)c4)c(F)c3)ccc2c1] |
| 112 | 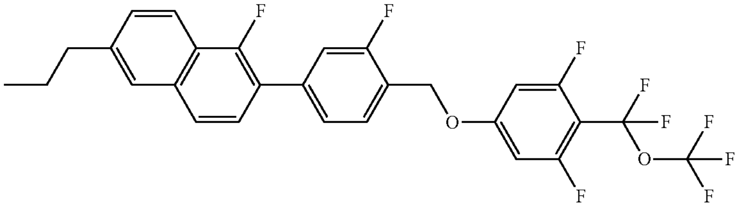 |

-continued
| No. | |
|---|---|
| 113 | 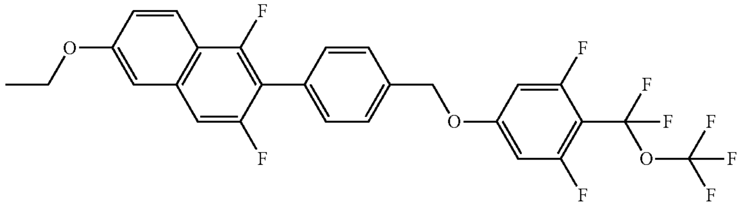 [SMILES: CCOc1ccc2c(F)c(-c3ccc(COc4cc(F)c(C(F)(F)OC(F)(F)F)c(F)c4)cc3)c(F)cc2c1] |
| 114 | 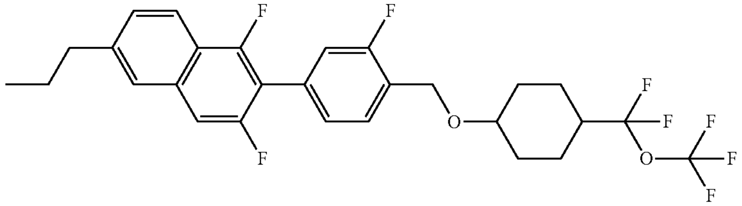 [SMILES: CCCc1ccc2c(F)c(-c3ccc(COC4CCC(C(F)(F)OC(F)(F)F)CC4)c(F)c3)c(F)cc2c1] |
| 115 | 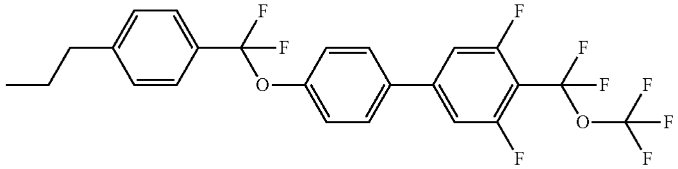 [SMILES: CCCc1ccc(C(F)(F)Oc2ccc(-c3cc(F)c(C(F)(F)OC(F)(F)F)c(F)c3)cc2)cc1] |
| 116 | 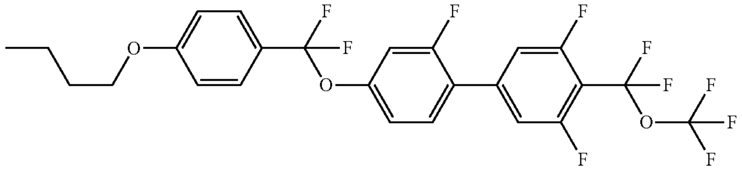 [SMILES: CCCCOc1ccc(C(F)(F)Oc2ccc(-c3cc(F)c(C(F)(F)OC(F)(F)F)c(F)c3)c(F)c2)cc1] |
| 117 | 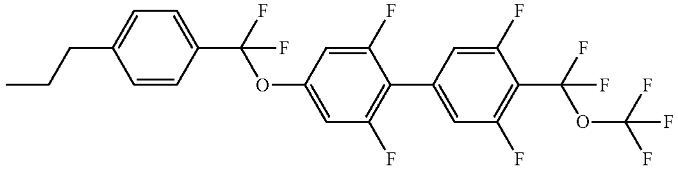 |
| 118 | 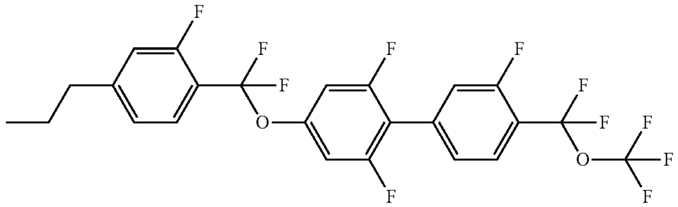 |
| 119 | 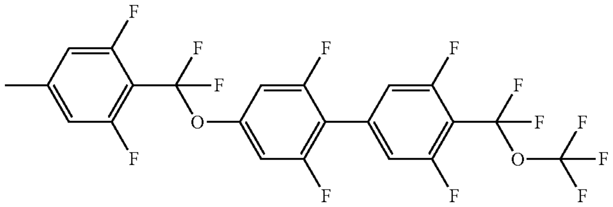 [SMILES: Cc1cc(F)c(C(F)(F)Oc2cc(F)c(-c3cc(F)c(C(F)(F)OC(F)(F)F)c(F)c3)c(F)c2)c(F)c1] |
| 120 | 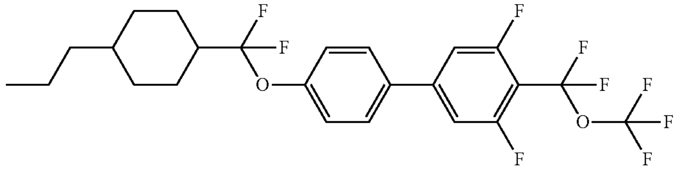 [SMILES: CCCC1CCC(C(F)(F)Oc2ccc(-c3cc(F)c(C(F)(F)OC(F)(F)F)c(F)c3)cc2)CC1] |

-continued
| No. | |
|---|---|
| 121 | 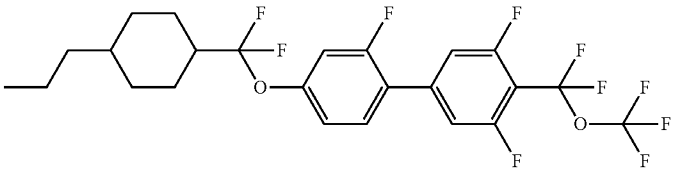 [SMILES: CCCC1CCC(C(F)(F)Oc2ccc(-c3cc(F)c(C(F)(F)OC(F)(F)F)c(F)c3)c(F)c2)CC1] |
| 122 | 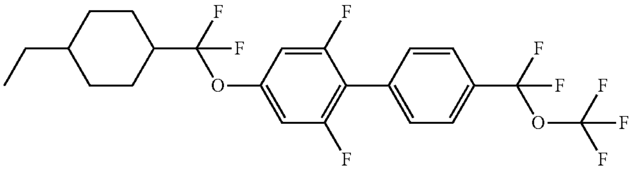 [SMILES: CCC1CCC(C(F)(F)Oc2cc(F)c(-c3ccc(C(F)(F)OC(F)(F)F)cc3)c(F)c2)CC1] |
| 123 | 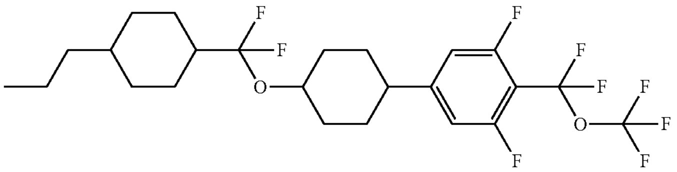 |
| 124 | 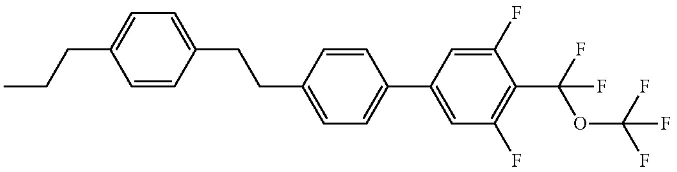 |
| 125 | 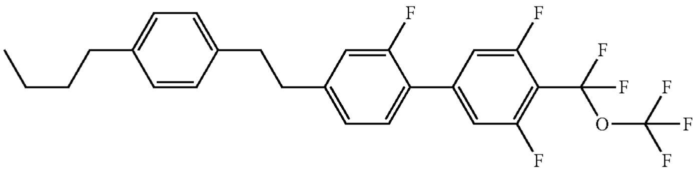 [SMILES: CCCCc1ccc(CCc2ccc(-c3cc(F)c(C(F)(F)OC(F)(F)F)c(F)c3)c(F)c2)cc1] |
| 126 | 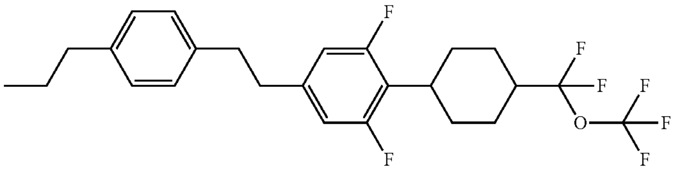 [SMILES: CCCc1ccc(CCc2cc(F)c(C3CCC(C(F)(F)OC(F)(F)F)CC3)c(F)c2)cc1] |
| 127 | 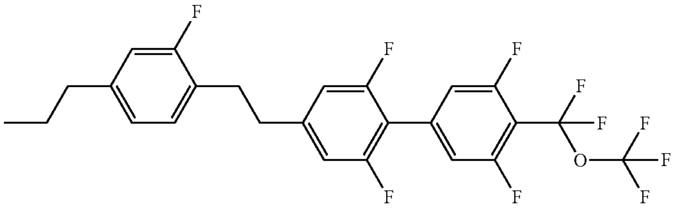 [SMILES: CCCc1ccc(CCc2cc(F)c(-c3cc(F)c(C(F)(F)OC(F)(F)F)c(F)c3)c(F)c2)c(F)c1] |
| 128 | 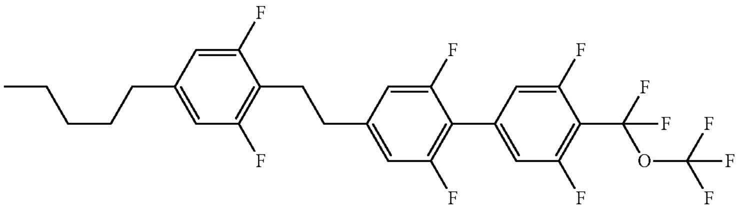 [SMILES: CCCCCc1cc(F)c(CCc2cc(F)c(-c3cc(F)c(C(F)(F)OC(F)(F)F)c(F)c3)c(F)c2)c(F)c1] |

-continued
| No. | |
|---|---|
| 129 | 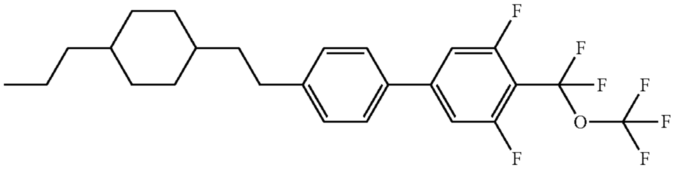 |
| 130 | 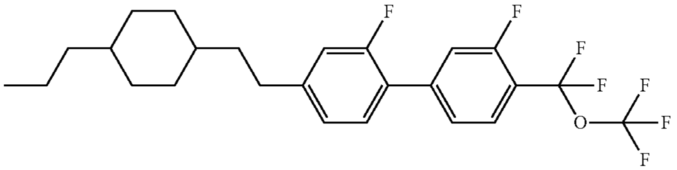 [SMILES: CCCC1CCC(CCc2ccc(-c3ccc(C(F)(F)OC(F)(F)F)c(F)c3)c(F)c2)CC1] |
| 131 | 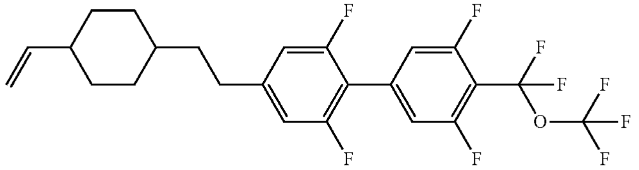 [SMILES: C=CC1CCC(CCc2cc(F)c(-c3cc(F)c(C(F)(F)OC(F)(F)F)c(F)c3)c(F)c2)CC1] |
| 132 | 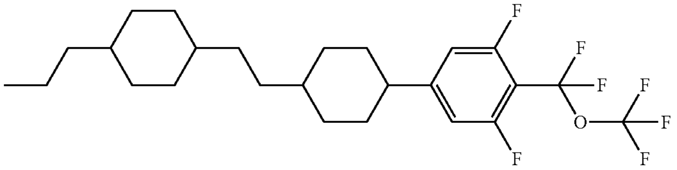 |
| 133 | 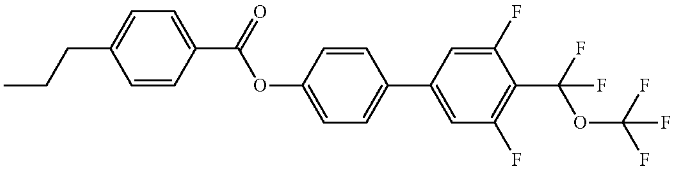 [SMILES: CCCc1ccc(C(=O)Oc2ccc(-c3cc(F)c(C(F)(F)OC(F)(F)F)c(F)c3)cc2)cc1] |
| 134 | 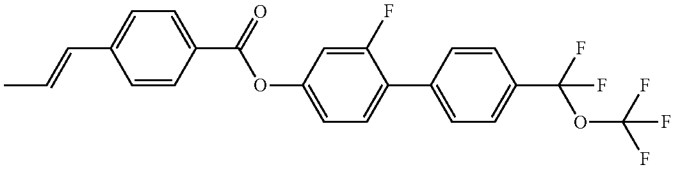 [SMILES: C/C=C/c1ccc(C(=O)Oc2ccc(-c3ccc(C(F)(F)OC(F)(F)F)cc3)c(F)c2)cc1] |
| 135 | 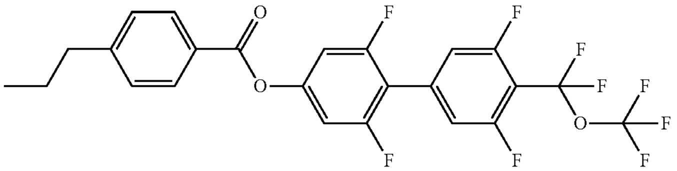 [SMILES: CCCc1ccc(C(=O)Oc2cc(F)c(-c3cc(F)c(C(F)(F)OC(F)(F)F)c(F)c3)c(F)c2)cc1] |
| 136 | 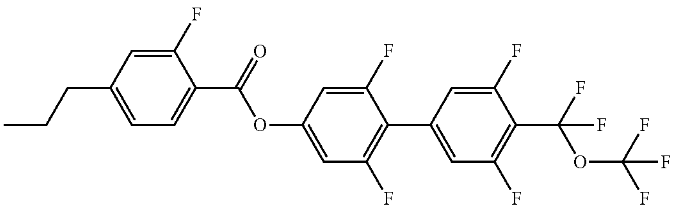 [SMILES: CCCc1ccc(C(=O)Oc2cc(F)c(-c3cc(F)c(C(F)(F)OC(F)(F)F)c(F)c3)c(F)c2)c(F)c1] |

-continued
| No. | |
|---|---|
| 137 | 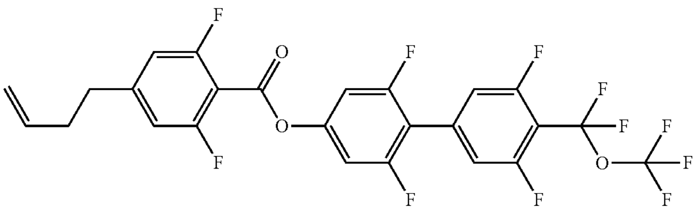 [SMILES: C=CCCc1cc(F)c(C(=O)Oc2cc(F)c(-c3cc(F)c(C(F)(F)OC(F)(F)F)c(F)c3)c(F)c2)c(F)c1] |
| 138 | 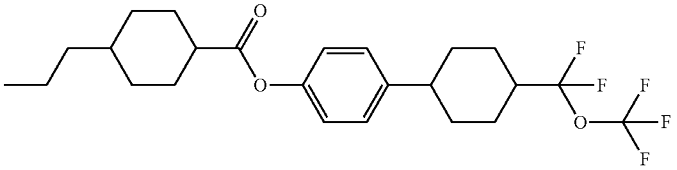 [SMILES: CCCC1CCC(C(=O)Oc2ccc(C3CCC(C(F)(F)OC(F)(F)F)CC3)cc2)CC1] |
| 139 | 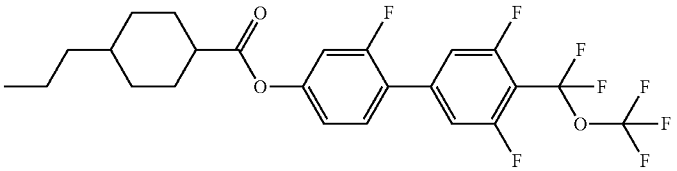 [SMILES: CCCC1CCC(C(=O)Oc2ccc(-c3cc(F)c(C(F)(F)OC(F)(F)F)c(F)c3)c(F)c2)CC1] |
| 140 | 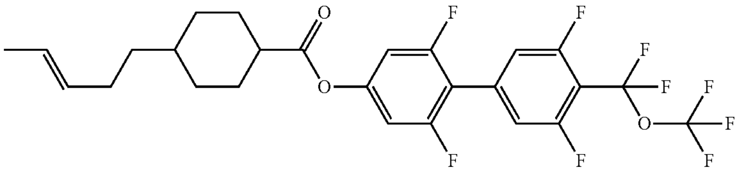 [SMILES: C/C=C/CCC1CCC(C(=O)Oc2cc(F)c(-c3cc(F)c(C(F)(F)OC(F)(F)F)c(F)c3)c(F)c2)CC1] |
| 141 | 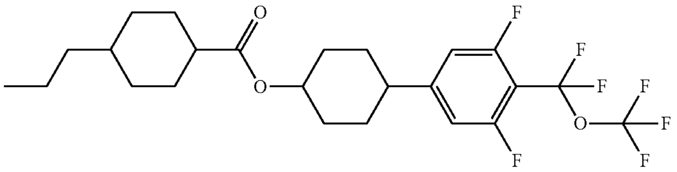 [SMILES: CCCC1CCC(C(=O)OC2CCC(c3cc(F)c(C(F)(F)OC(F)(F)F)c(F)c3)CC2)CC1] |
| 142 | 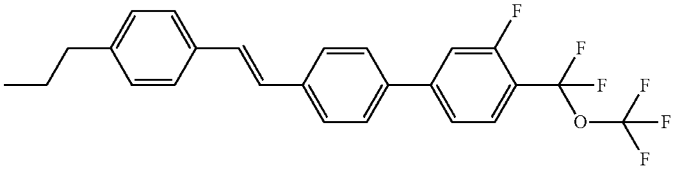 |
| 143 | 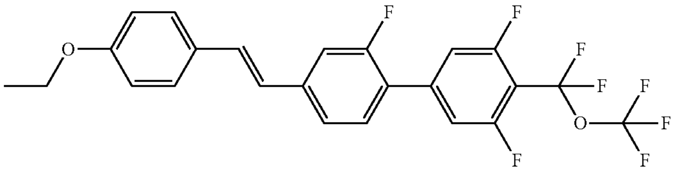 [SMILES: CCOc1ccc(/C=C/c2ccc(-c3cc(F)c(C(F)(F)OC(F)(F)F)c(F)c3)c(F)c2)cc1] |
| 144 | 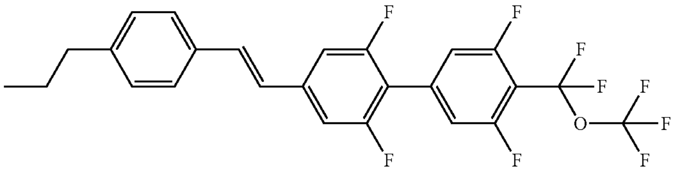 [SMILES: CCCc1ccc(/C=C/c2cc(F)c(-c3cc(F)c(C(F)(F)OC(F)(F)F)c(F)c3)c(F)c2)cc1] |

-continued
| No. | |
|---|---|
| 145 | 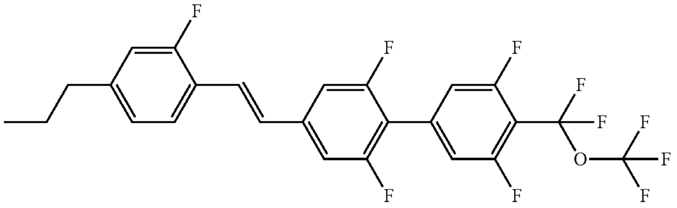 [SMILES: CCCc1ccc(/C=C/c2cc(F)c(-c3cc(F)c(C(F)(F)OC(F)(F)F)c(F)c3)c(F)c2)c(F)c1] |
| 146 | 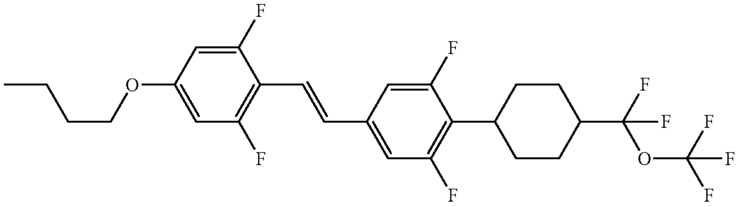 [SMILES: CCCCOc1cc(F)c(/C=C/c2cc(F)c(C3CCC(C(F)(F)OC(F)(F)F)CC3)c(F)c2)c(F)c1] |
| 147 | 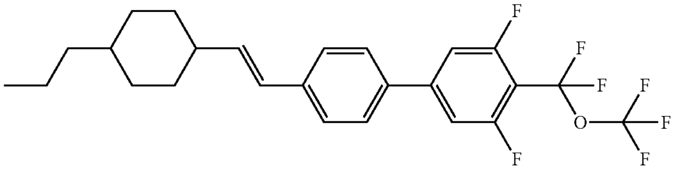 |
| 148 | 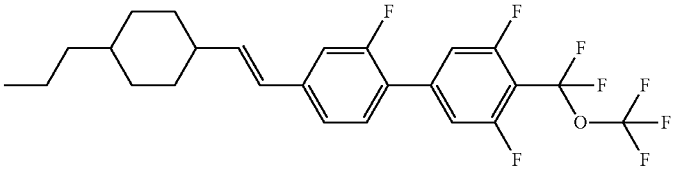 [SMILES: CCCC1CCC(/C=C/c2ccc(-c3cc(F)c(C(F)(F)OC(F)(F)F)c(F)c3)cc2)CC1] |
| 149 | 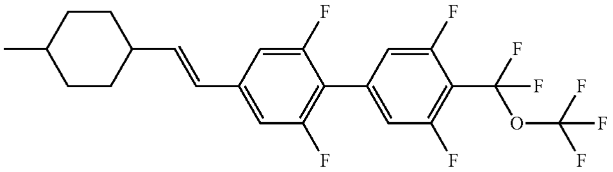 [SMILES: CC1CCC(/C=C/c2cc(F)c(-c3cc(F)c(C(F)(F)OC(F)(F)F)c(F)c3)c(F)c2)CC1] |
| 150 | 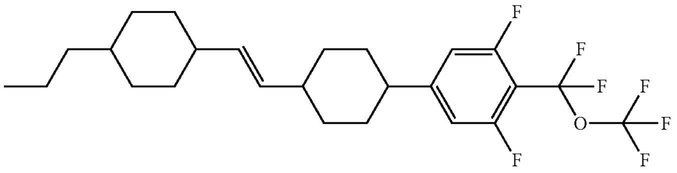 |

-continued
| No. | |
|---|---|
| 151 | 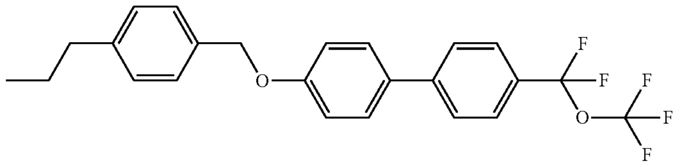 [SMILES: CCCc1ccc(COc2ccc(-c3ccc(C(F)(F)OC(F)(F)F)cc3)cc2)cc1] |
| 152 | 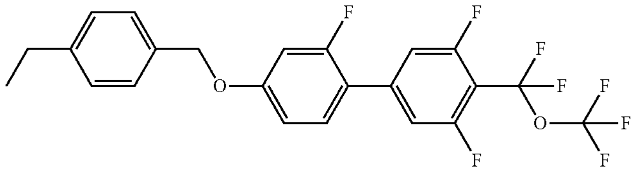 [SMILES: CCc1ccc(COc2ccc(-c3cc(F)c(C(F)(F)OC(F)(F)F)c(F)c3)c(F)c2)cc1] |
| 153 | 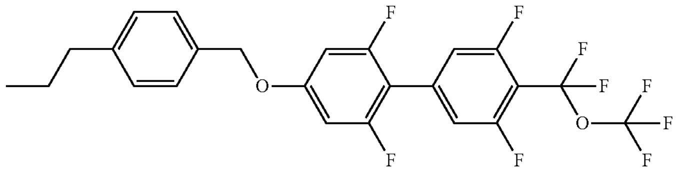 |
| 154 | 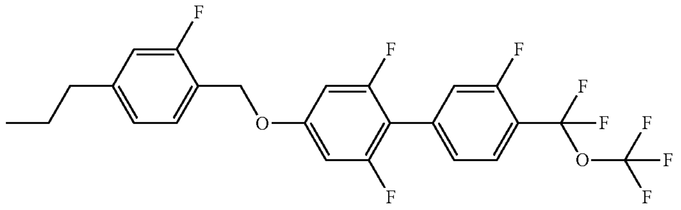 |
| 155 | 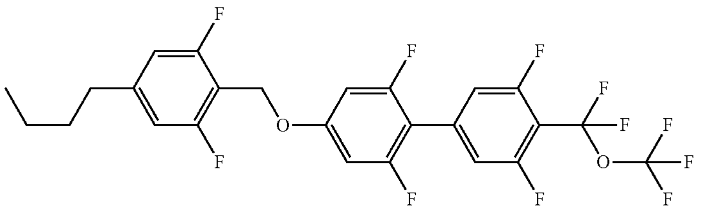 [SMILES: CCCCc1cc(F)c(COc2cc(F)c(-c3cc(F)c(C(F)(F)OC(F)(F)F)c(F)c3)c(F)c2)c(F)c1] |
| 156 | 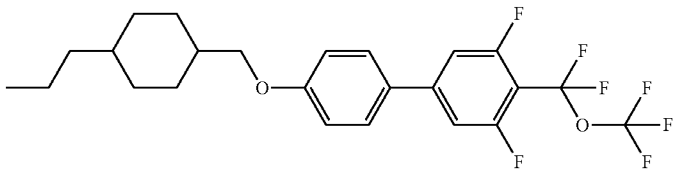 |
| 157 | 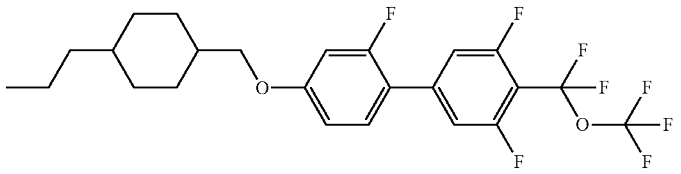 [SMILES: CCCC1CCC(COc2ccc(-c3cc(F)c(C(F)(F)OC(F)(F)F)c(F)c3)c(F)c2)CC1] |
| 158 | 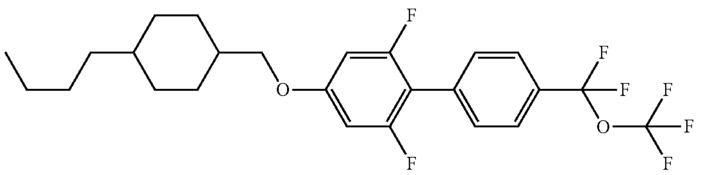 [SMILES: CCCCC1CCC(COc2cc(F)c(-c3ccc(C(F)(F)OC(F)(F)F)cc3)c(F)c2)CC1] |

-continued
| No. | |
|---|---|
| 159 | 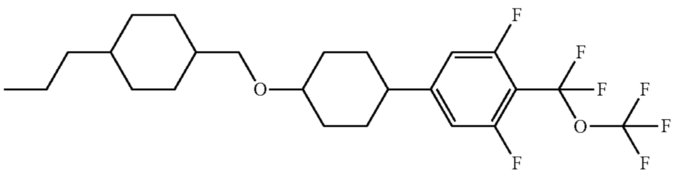 [SMILES: CCCC1CCC(COC2CCC(c3cc(F)c(C(F)(F)OC(F)(F)F)c(F)c3)CC2)CC1] |
| 160 | 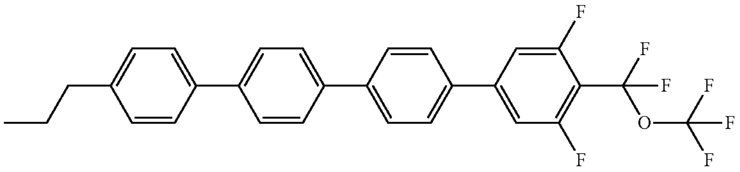 [SMILES: CCCc1ccc(-c2ccc(-c3ccc(-c4cc(F)c(C(F)(F)OC(F)(F)F)c(F)c4)c(F)c3)cc2)cc1] |
| 161 | 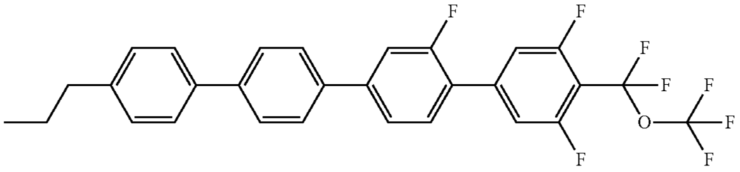 |
| 162 | 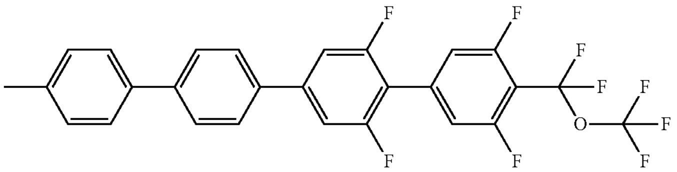 [SMILES: Cc1ccc(-c2ccc(-c3cc(F)c(-c4cc(F)c(C(F)(F)OC(F)(F)F)c(F)c4)c(F)c3)cc2)cc1] |
| 163 | 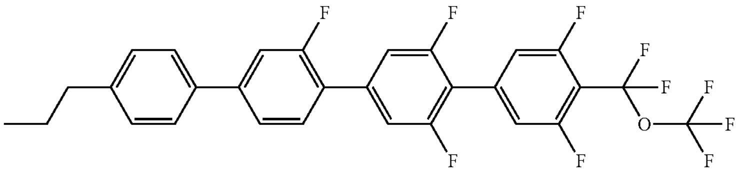 |
| 164 | 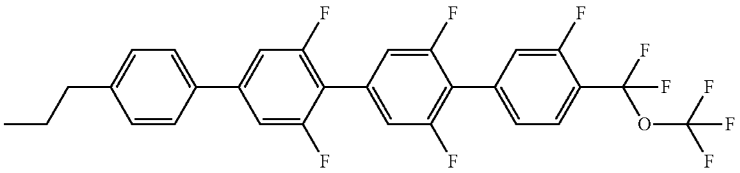 [SMILES: CCCc1ccc(-c2cc(F)c(-c3cc(F)c(-c4ccc(C(F)(F)OC(F)(F)F)c(F)c4)c(F)c3)c(F)c2)cc1] |
| 165 | 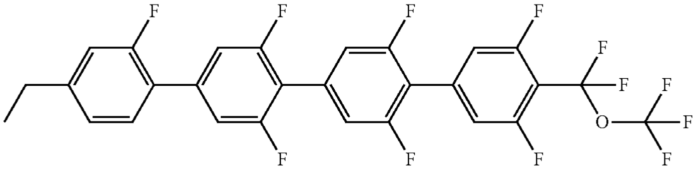 [SMILES: CCc1ccc(-c2cc(F)c(-c3cc(F)c(-c4cc(F)c(C(F)(F)OC(F)(F)F)c(F)c4)c(F)c3)c(F)c2)c(F)c1] |
| 166 | 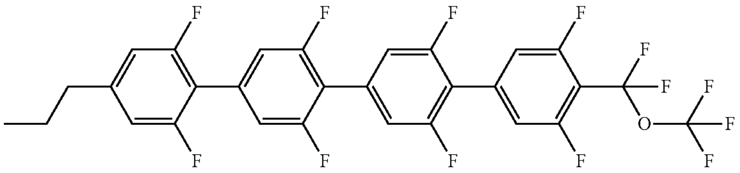 [SMILES: CCCc1cc(F)c(-c2cc(F)c(-c3cc(F)c(-c4cc(F)c(C(F)(F)OC(F)(F)F)c(F)c4)c(F)c3)c(F)c2)c(F)c1] |

-continued
| No. | |
|---|---|
| 167 | 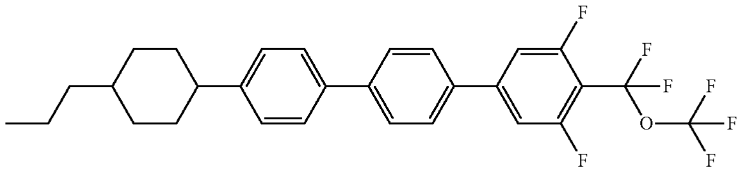 [SMILES: CCCC1CCC(c2ccc(-c3ccc(-c4cc(F)c(C(F)(F)OC(F)(F)F)c(F)c4)cc3)cc2)CC1] |
| 168 | 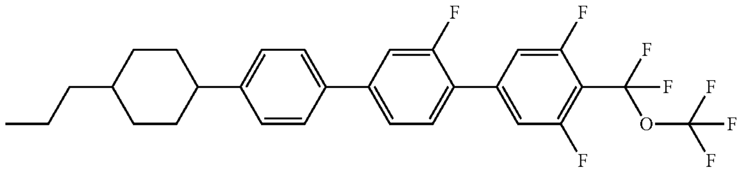 [SMILES: CCCC1CCC(c2ccc(-c3ccc(-c4cc(F)c(C(F)(F)OC(F)(F)F)c(F)c4)c(F)c3)cc2)CC1] |
| 169 | 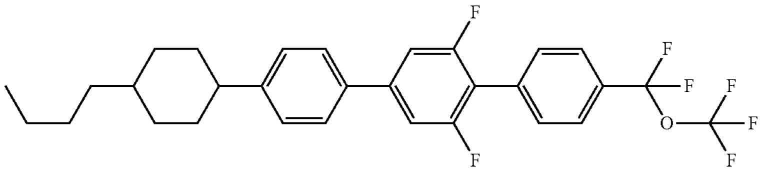 [SMILES: CCCCC1CCC(c2ccc(-c3cc(F)c(-c4ccc(C(F)(F)OC(F)(F)F)cc4)c(F)c3)cc2)CC1] |
| 170 | 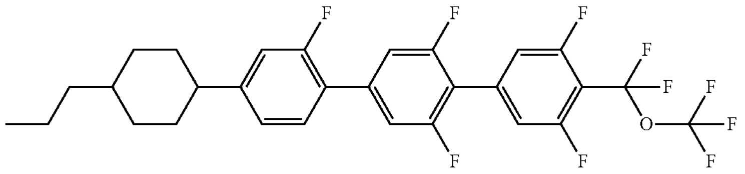 |
| 171 | 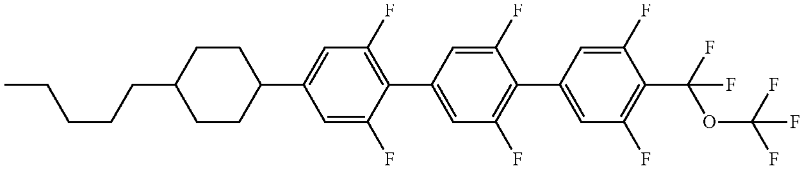 [SMILES: CCCCCC1CCC(c2cc(F)c(-c3cc(F)c(-c4cc(F)c(C(F)(F)OC(F)(F)F)c(F)c4)c(F)c3)c(F)c2)CC1] |
| 172 | 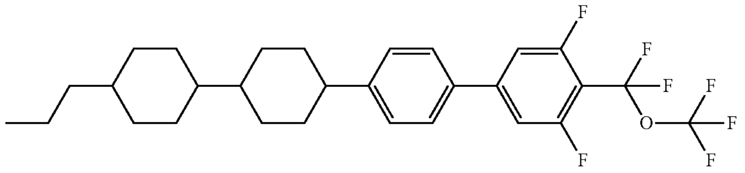 [SMILES: CCCC1CCC(C2CCC(c3ccc(-c4cc(F)c(C(F)(F)OC(F)(F)F)c(F)c4)cc3)CC2)CC1] |
| 173 | 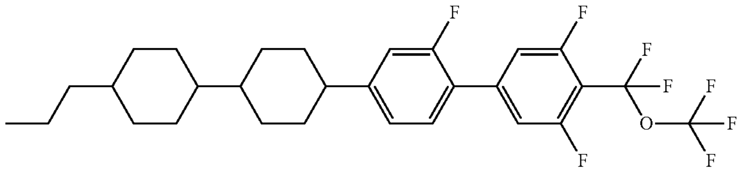 |
| 174 | 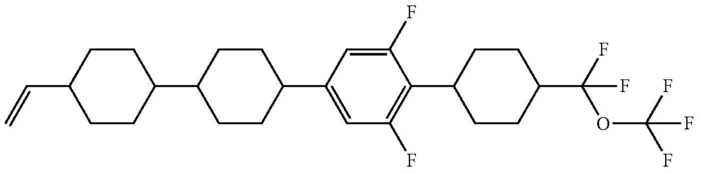 [SMILES: C=CC1CCC(C2CCC(c3cc(F)c(C4CCC(C(F)(F)OC(F)(F)F)CC4)c(F)c3)CC2)CC1] |

-continued
| No. | |
|---|---|
| 175 | 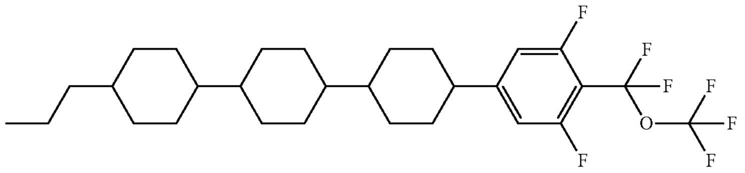 [SMILES: CCCC1CCC(C2CCC(C3CCC(c4cc(F)c(C(F)(F)OC(F)(F)F)c(F)c4)CC3)CC2)CC1] |
| 176 | 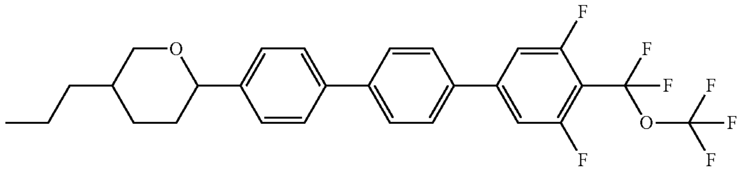 [SMILES: CCCC1CCC(c2ccc(-c3ccc(-c4cc(F)c(C(F)(F)OC(F)(F)F)c(F)c4)cc3)cc2)OC1] |
| 177 | 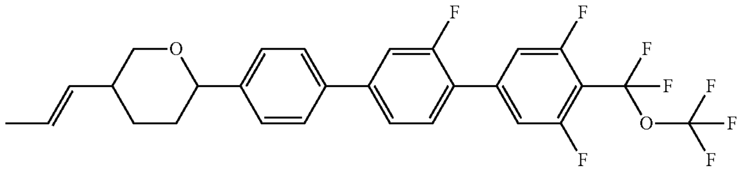 [SMILES: C/C=C/C1CCC(c2ccc(-c3ccc(-c4cc(F)c(C(F)(F)OC(F)(F)F)c(F)c4)c(F)c3)cc2)OC1] |
| 178 | 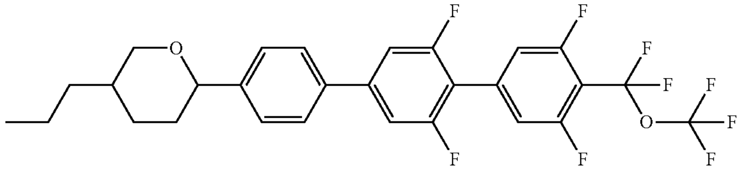 [SMILES: CCCC1CCC(c2ccc(-c3cc(F)c(-c4cc(F)c(C(F)(F)OC(F)(F)F)c(F)c4)c(F)c3)cc2)OC1] |
| 179 | 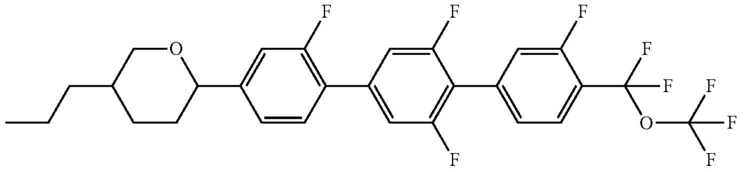 |
| 180 | 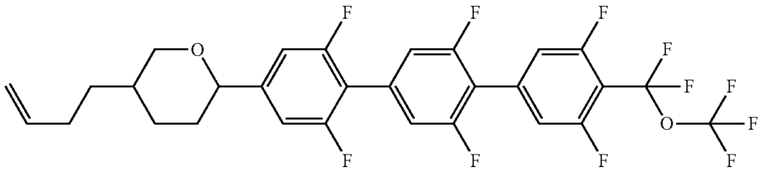 [SMILES: C=CCCC1CCC(c2cc(F)c(-c3cc(F)c(-c4cc(F)c(C(F)(F)OC(F)(F)F)c(F)c4)c(F)c3)c(F)c2)OC1] |
| 181 | 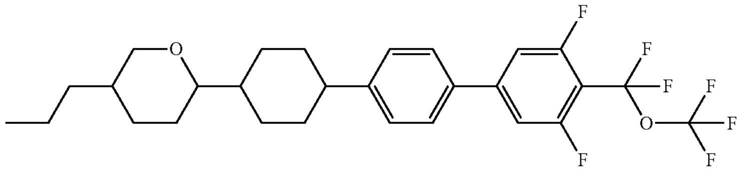 |
| 182 | 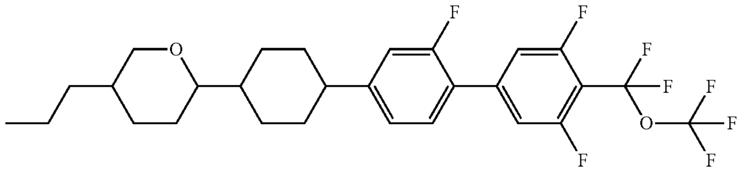 |

-continued
| No. | |
|---|---|
| 183 | 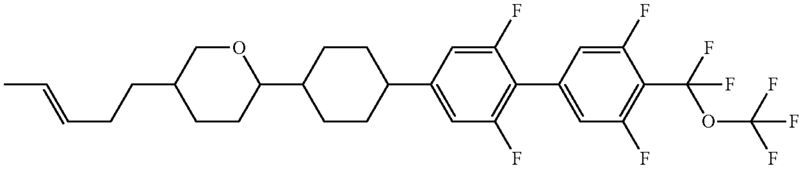 [SMILES: C/C=C/CCC1CCC(C2CCC(c3cc(F)c(-c4cc(F)c(C(F)(F)OC(F)(F)F)c(F)c4)c(F)c3)CC2)OC1] |
| 184 | 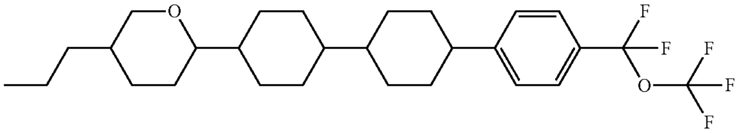 [SMILES: CCCC1CCC(C2CCC(C3CCC(c4ccc(C(F)(F)OC(F)(F)F)cc4)CC3)CC2)OC1] |
| 185 | 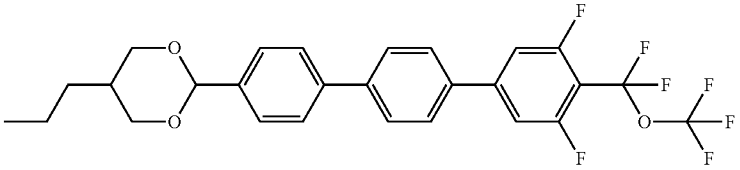 |
| 186 | 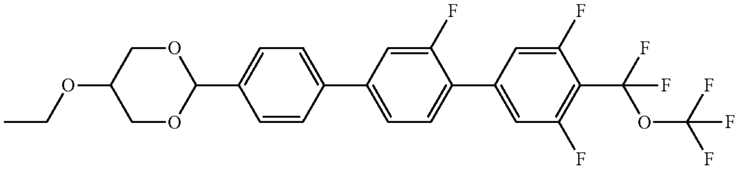 |
| 187 | 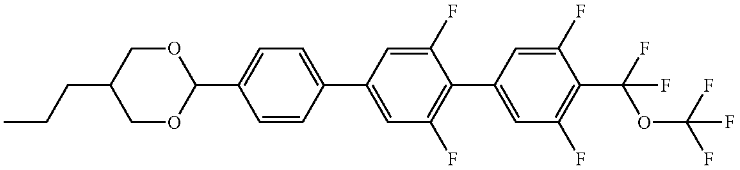 [SMILES: CCCC1COC(c2ccc(-c3cc(F)c(-c4cc(F)c(C(F)(F)OC(F)(F)F)c(F)c4)c(F)c3)cc2)OC1] |
| 188 | 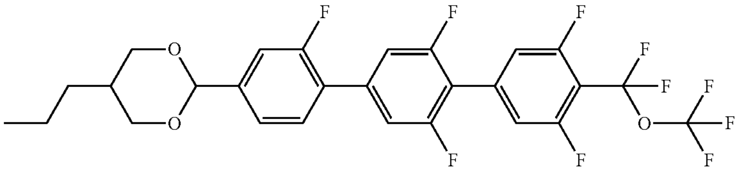 |
| 189 | 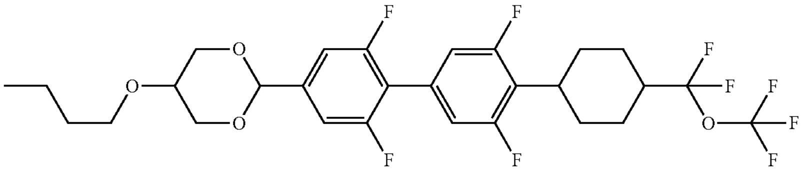 [SMILES: CCCCOC1COC(c2cc(F)c(-c3cc(F)c(C4CCC(C(F)(F)OC(F)(F)F)CC4)c(F)c3)c(F)c2)OC1] |
| 190 | 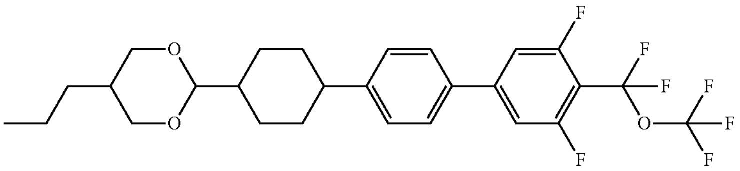 [SMILES: CCCC1COC(C2CCC(c3ccc(-c4cc(F)c(C(F)(F)OC(F)(F)F)c(F)c4)cc3)CC2)OC1] |
| 191 | 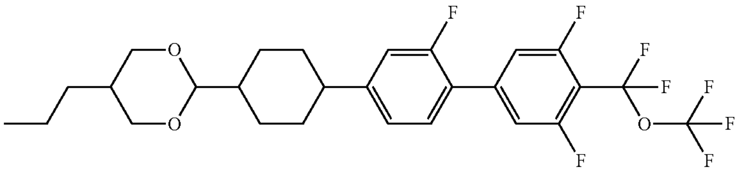 |

-continued
| No. | |
|---|---|
| 192 | 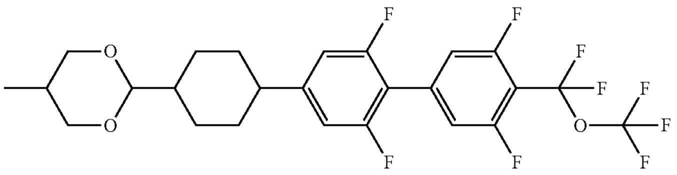 [SMILES: CC1COC(C2CCC(c3cc(F)c(-c4cc(F)c(C(F)(F)OC(F)(F)F)c(F)c4)c(F)c3)CC2)OC1] |
| 193 | 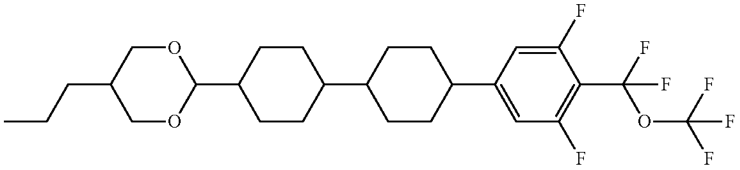 [SMILES: CCCC1COC(C2CCC(C3CCC(c4cc(F)c(C(F)(F)OC(F)(F)F)c(F)c4)CC3)CC2)OC1] |
| 194 | 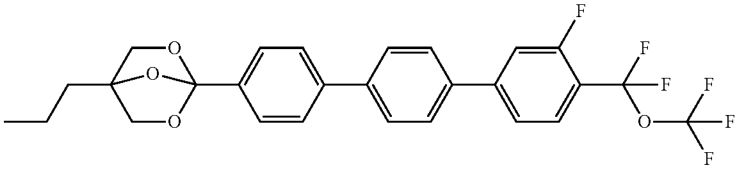 [SMILES: CCCC12COC(c3ccc(-c4ccc(-c5ccc(C(F)(F)OC(F)(F)F)c(F)c5)cc4)cc3)(OC1)O2] |
| 195 | 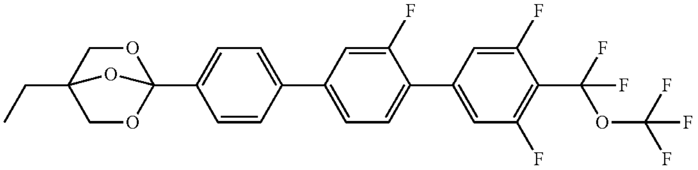 [SMILES: CCC12COC(c3ccc(-c4ccc(-c5cc(F)c(C(F)(F)OC(F)(F)F)c(F)c5)c(F)c4)cc3)(OC1)O2] |
| 196 | 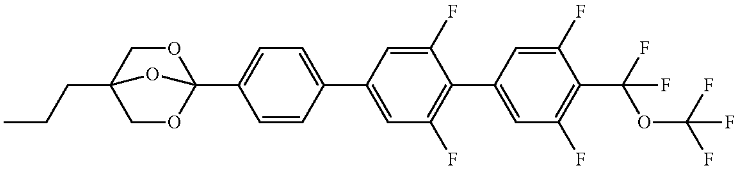 |
| 197 | 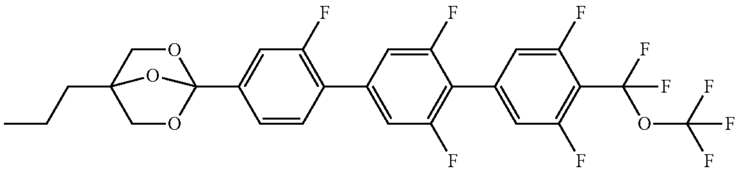 [SMILES: CCCC12COC(c3ccc(-c4cc(F)c(-c5cc(F)c(C(F)(F)OC(F)(F)F)c(F)c5)c(F)c4)c(F)c3)(OC1)O2] |
| 198 | 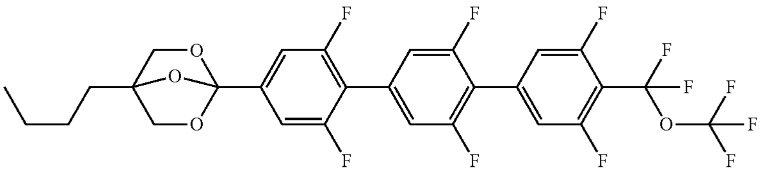 [SMILES: CCCCC12COC(c3cc(F)c(-c4cc(F)c(-c5cc(F)c(C(F)(F)OC(F)(F)F)c(F)c5)c(F)c4)c(F)c3)(OC1)O2] |
| 199 | 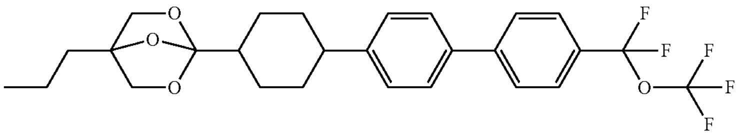 [SMILES: CCCC12COC(C3CCC(c4ccc(-c5ccc(C(F)(F)OC(F)(F)F)cc5)cc4)CC3)(OC1)O2] |

-continued
| No. | |
|---|---|
| 200 | 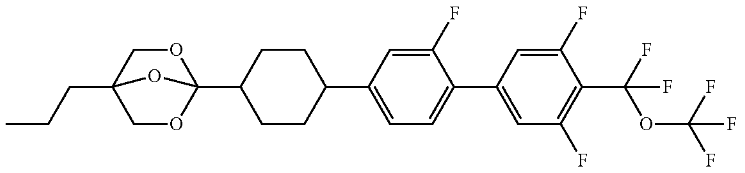 [SMILES: CCCC12COC(C3CCC(c4ccc(-c5cc(F)c(C(F)(F)OC(F)(F)F)c(F)c5)c(F)c4)CC3)(OC1)O2] |
| 201 | 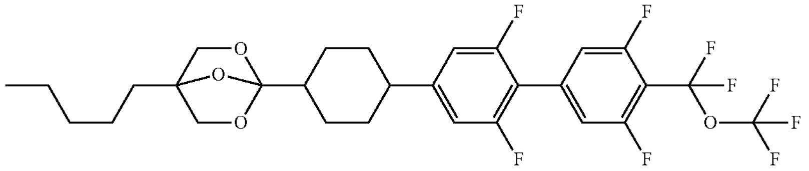 [SMILES: CCCCCC12COC(C3CCC(c4cc(F)c(-c5cc(F)c(C(F)(F)OC(F)(F)F)c(F)c5)c(F)c4)CC3)(OC1)O2] |
| 202 | 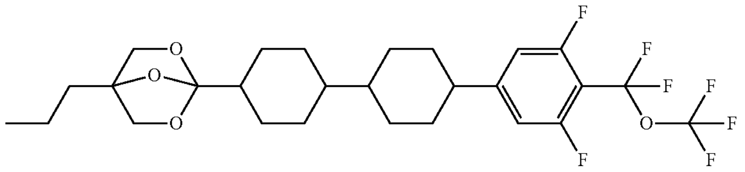 [SMILES: CCCC12COC(C3CCC(C4CCC(c5cc(F)c(C(F)(F)OC(F)(F)F)c(F)c5)CC4)CC3)(OC1)O2] |
| 203 | 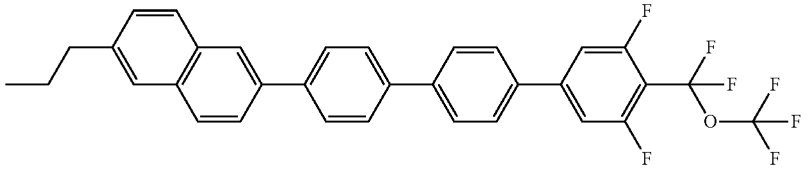 [SMILES: CCCc1ccc2cc(-c3ccc(-c4ccc(-c5cc(F)c(C(F)(F)OC(F)(F)F)c(F)c5)cc4)cc3)ccc2c1] |
| 204 | 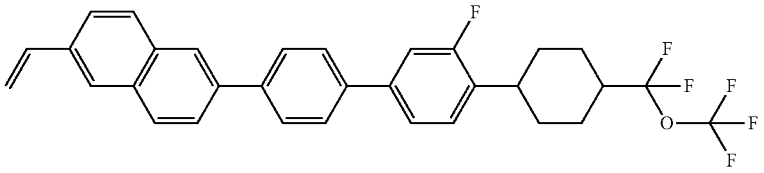 [SMILES: C=Cc1ccc2cc(-c3ccc(-c4ccc(C5CCC(C(F)(F)OC(F)(F)F)CC5)c(F)c4)cc3)ccc2c1] |
| 205 | 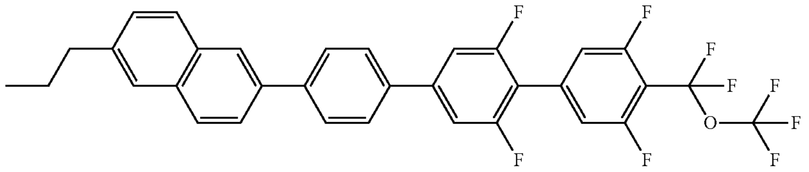 [SMILES: CCCc1ccc2cc(-c3ccc(-c4cc(F)c(-c5cc(F)c(C(F)(F)OC(F)(F)F)c(F)c5)c(F)c4)cc3)ccc2c1] |
| 206 | 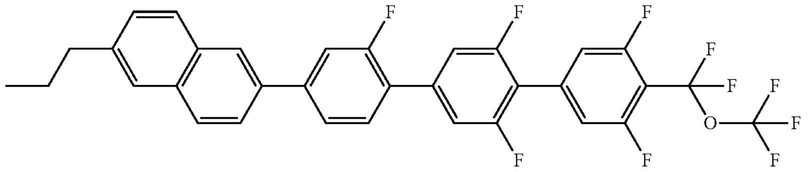 [SMILES: CCCc1ccc2cc(-c3ccc(-c4cc(F)c(-c5cc(F)c(C(F)(F)OC(F)(F)F)c(F)c5)c(F)c4)c(F)c3)ccc2c1] |
| 207 | 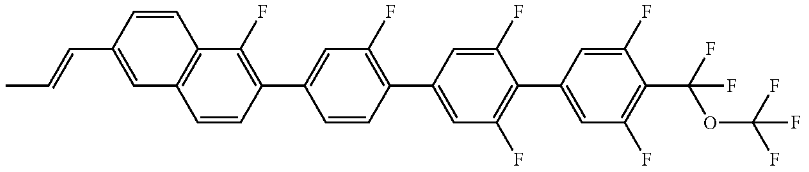 |

-continued
| No. | |
|---|---|
| 208 | 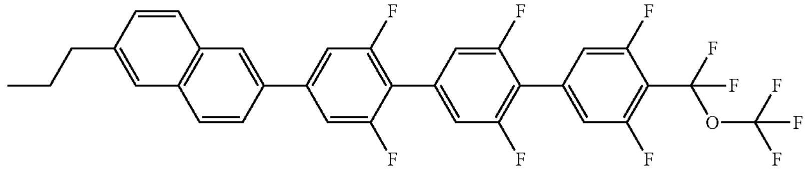 [SMILES: CCCc1ccc2cc(-c3cc(F)c(-c4cc(F)c(-c5cc(F)c(C(F)(F)OC(F)(F)F)c(F)c5)c(F)c4)c(F)c3)ccc2c1] |
| 209 | 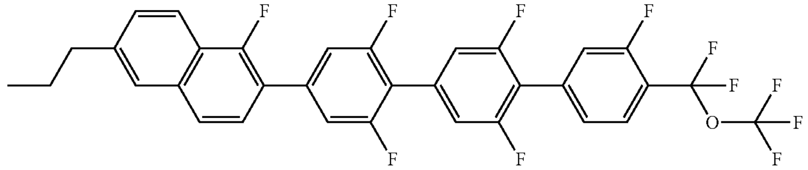 |
| 210 | 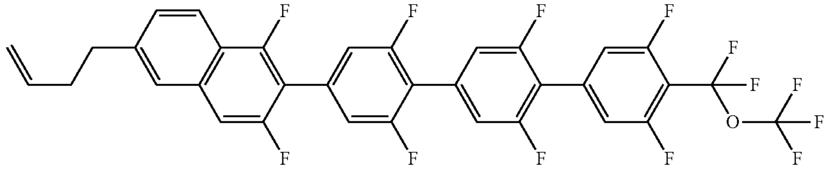 [SMILES: C=CCCc1ccc2c(F)c(-c3cc(F)c(-c4cc(F)c(-c5cc(F)c(C(F)(F)OC(F)(F)F)c(F)c5)c(F)c4)c(F)c3)c(F)cc2c1] |
| 211 | 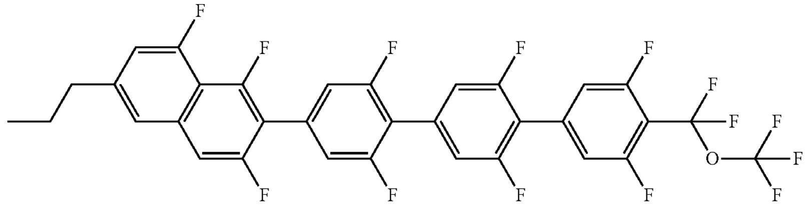 [SMILES: CCCc1cc(F)c2c(F)c(-c3cc(F)c(-c4cc(F)c(-c5cc(F)c(C(F)(F)OC(F)(F)F)c(F)c5)c(F)c4)c(F)c3)c(F)cc2c1] |
| 212 | 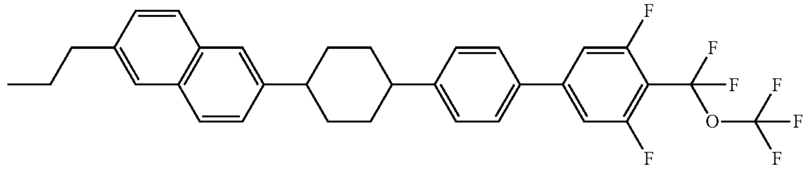 |
| 213 | 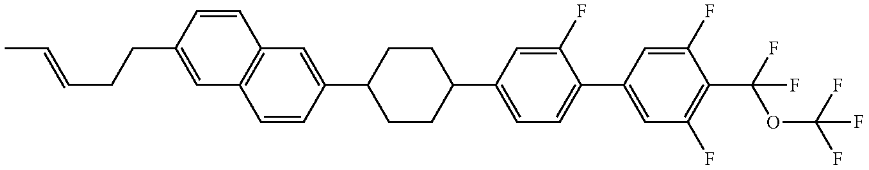 [SMILES: C/C=C/CCc1ccc2cc(C3CCC(c4ccc(-c5cc(F)c(C(F)(F)OC(F)(F)F)c(F)c5)c(F)c4)CC3)ccc2c1] |
| 214 | 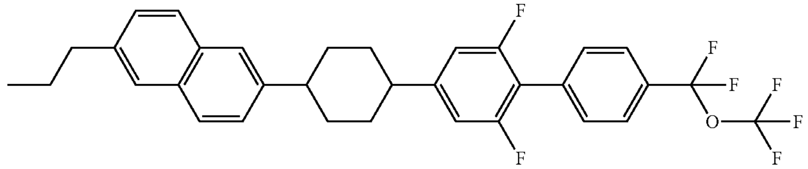 [SMILES: CCCc1ccc2cc(C3CCC(c4cc(F)c(-c5ccc(C(F)(F)OC(F)(F)F)cc5)c(F)c4)CC3)ccc2c1] |
| 215 | 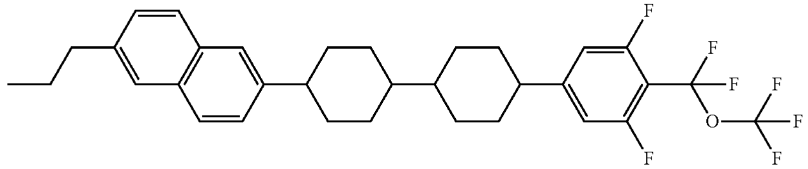 [SMILES: CCCc1ccc2cc(C3CCC(C4CCC(c5cc(F)c(C(F)(F)OC(F)(F)F)c(F)c5)CC4)CC3)ccc2c1] |

-continued
| No. | |
|---|---|
| 216 | 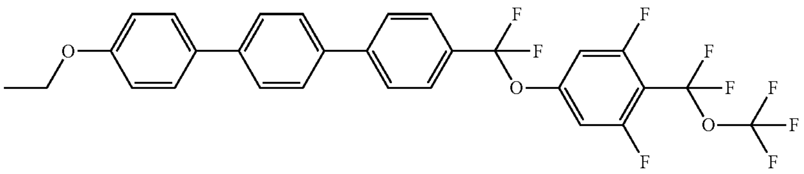 [SMILES: CCOc1ccc(-c2ccc(-c3ccc(C(F)(F)Oc4cc(F)c(C(F)(F)OC(F)(F)F)c(F)c4)cc3)cc2)cc1] |
| 217 | 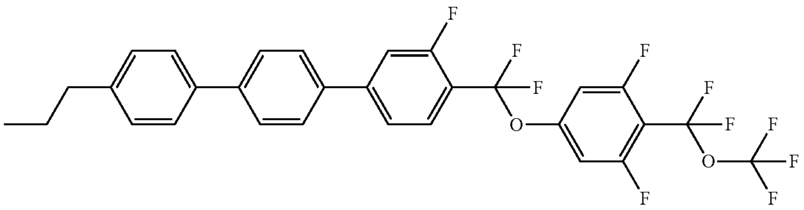 [SMILES: CCCc1ccc(-c2ccc(-c3ccc(C(F)(F)Oc4cc(F)c(C(F)(F)OC(F)(F)F)c(F)c4)c(F)c3)cc2)cc1] |
| 218 | 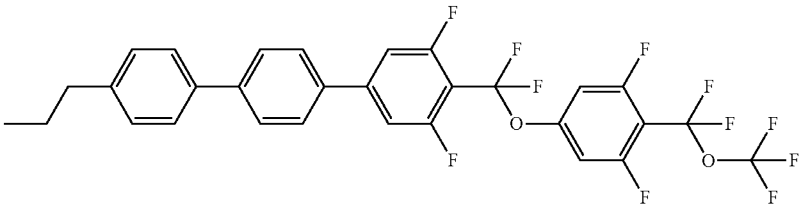 |
| 219 | 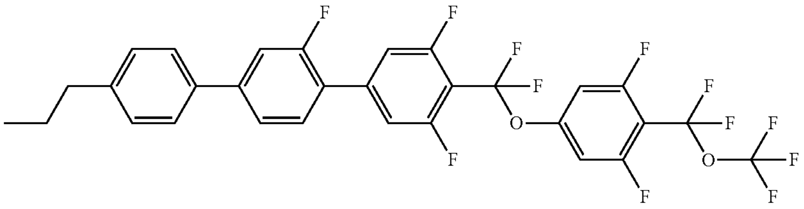 [SMILES: CCCc1ccc(-c2ccc(-c3cc(F)c(C(F)(F)Oc4cc(F)c(C(F)(F)OC(F)(F)F)c(F)c4)c(F)c3)c(F)c2)cc1] |
| 220 | 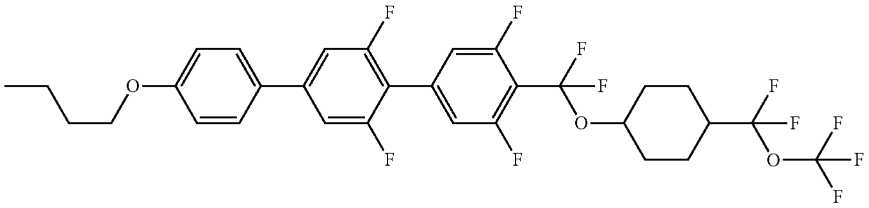 [SMILES: CCCCOc1ccc(-c2cc(F)c(-c3cc(F)c(C(F)(F)OC4CCC(C(F)(F)OC(F)(F)F)CC4)c(F)c3)c(F)c2)cc1] |
| 221 | 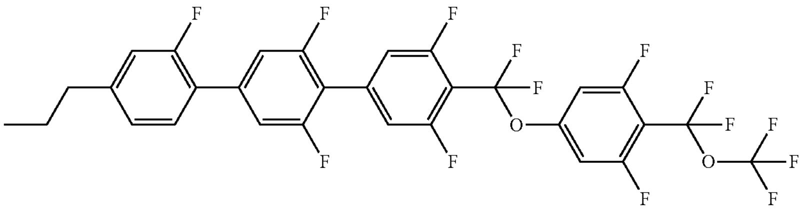 [SMILES: CCCc1ccc(-c2cc(F)c(-c3cc(F)c(C(F)(F)Oc4cc(F)c(C(F)(F)OC(F)(F)F)c(F)c4)c(F)c3)c(F)c2)c(F)c1] |
| 222 | 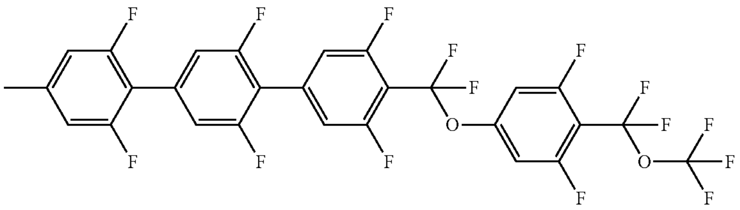 [SMILES: Cc1cc(F)c(-c2cc(F)c(-c3cc(F)c(C(F)(F)Oc4cc(F)c(C(F)(F)OC(F)(F)F)c(F)c4)c(F)c3)c(F)c2)c(F)c1] |

-continued
| No. | |
|---|---|
| 223 | 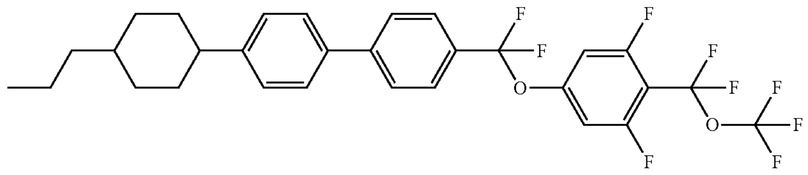 [SMILES: CCCC1CCC(c2ccc(-c3ccc(C(F)(F)Oc4cc(F)c(C(F)(F)OC(F)(F)F)c(F)c4)cc3)cc2)CC1] |
| 224 | 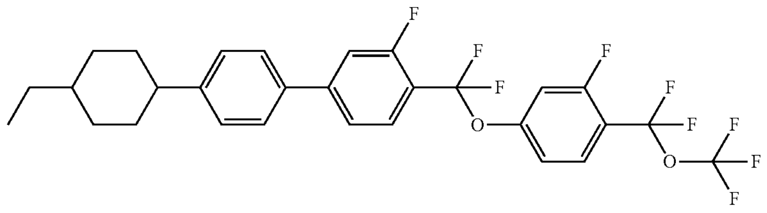 |
| 225 | 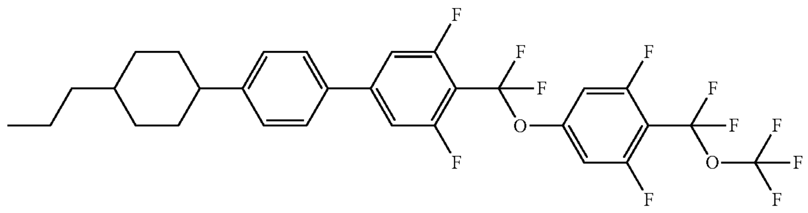 |
| 226 | 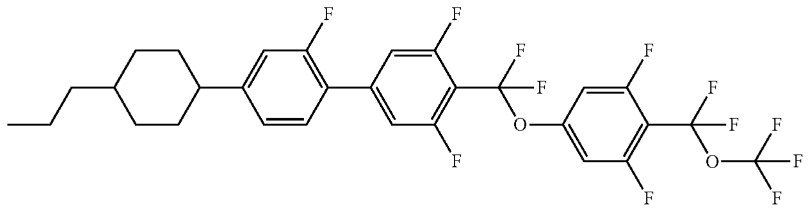 [SMILES: CCCC1CCC(c2ccc(-c3cc(F)c(C(F)(F)Oc4cc(F)c(C(F)(F)OC(F)(F)F)c(F)c4)c(F)c3)cc2)CC1] |
| 227 | 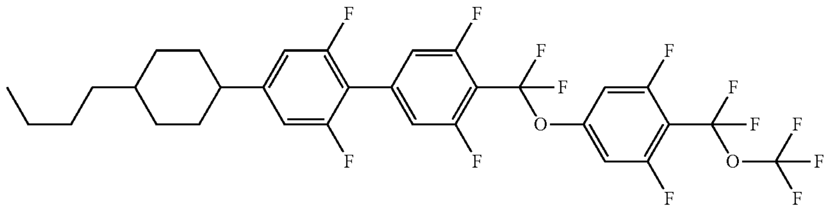 [SMILES: CCCCC1CCC(c2cc(F)c(-c3cc(F)c(C(F)(F)Oc4cc(F)c(C(F)(F)OC(F)(F)F)c(F)c4)c(F)c3)c(F)c2)CC1] |
| 228 | 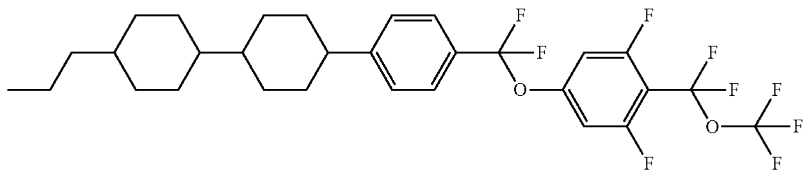 |
| 229 | 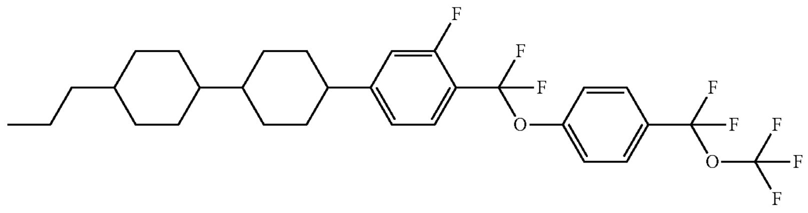 |

-continued
| No. | |
|---|---|
| 230 | 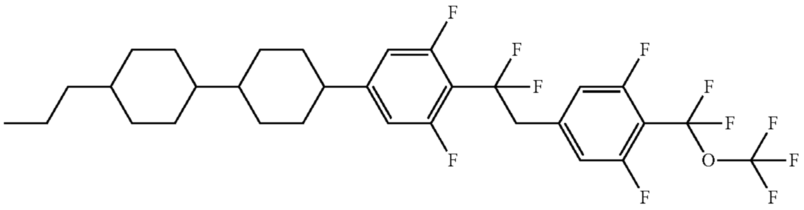 |
| 231 | 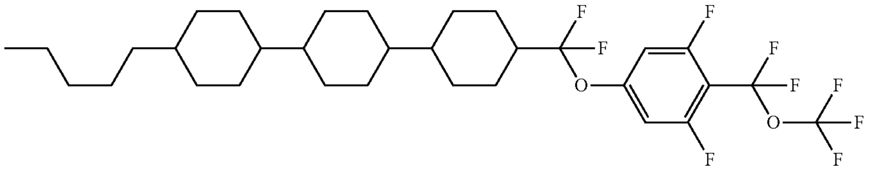 [SMILES: CCCCCC1CCC(C2CCC(C3CCC(C(F)(F)Oc4cc(F)c(C(F)(F)OC(F)(F)F)c(F)c4)CC3)CC2)CC1] |
| 232 | 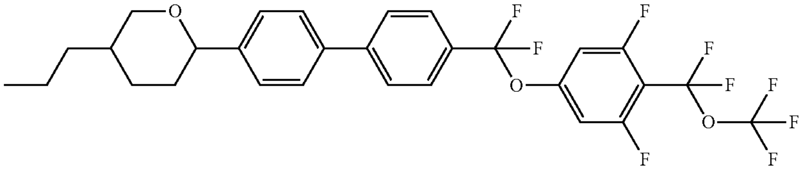 |
| 233 | 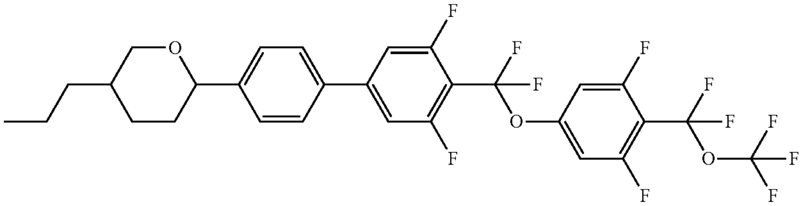 |
| 234 | 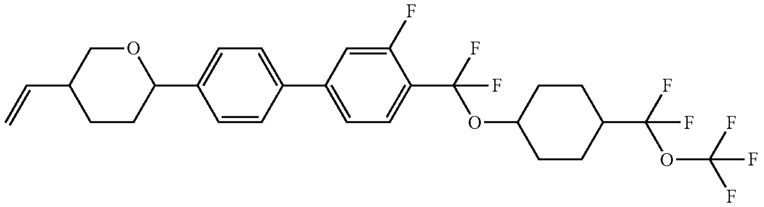 [SMILES: C=CC1CCC(c2ccc(-c3ccc(C(F)(F)OC4CCC(C(F)(F)OC(F)(F)F)CC4)c(F)c3)cc2)OC1] |
| 235 | 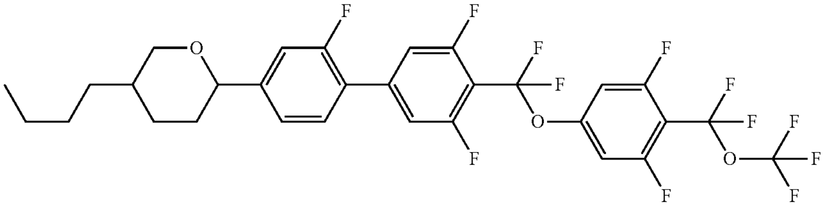 [SMILES: CCCCC1CCC(c2ccc(-c3cc(F)c(C(F)(F)Oc4cc(F)c(C(F)(F)OC(F)(F)F)c(F)c4)c(F)c3)c(F)c2)OC1] |
| 236 | 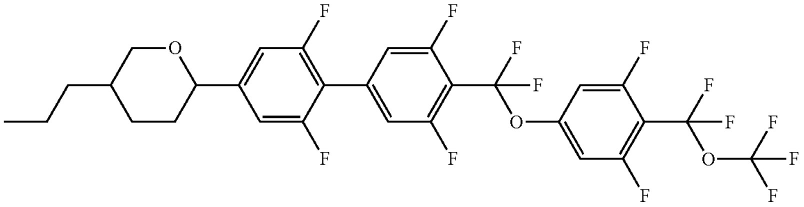 [SMILES: CCCC1CCC(c2cc(F)c(-c3cc(F)c(C(F)(F)Oc4cc(F)c(C(F)(F)OC(F)(F)F)c(F)c4)c(F)c3)c(F)c2)OC1] |

-continued
| No. | |
|---|---|
| 237 | 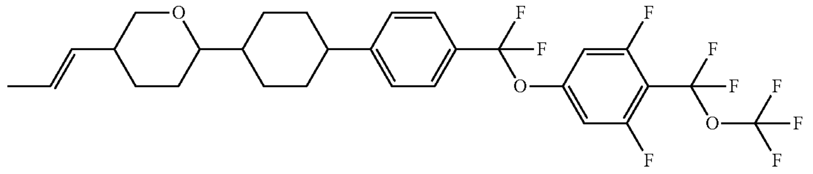 |
| 238 | 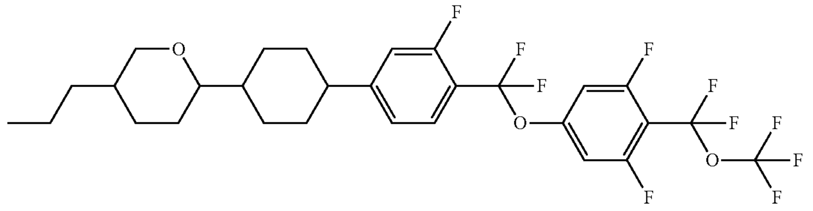 |
| 239 | 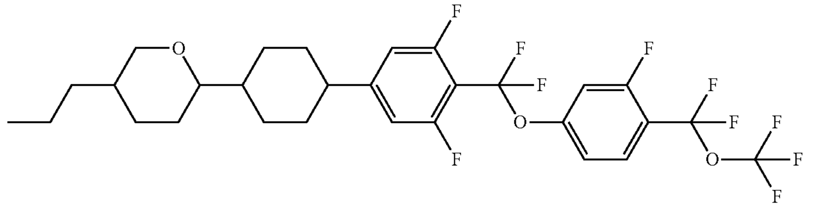 |
| 240 | 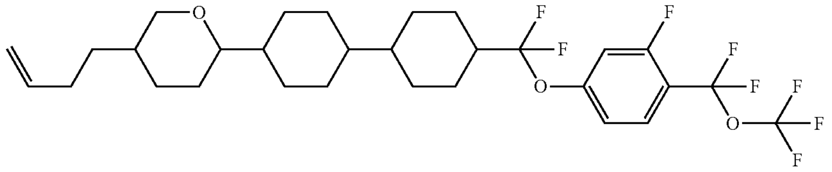 |
| 241 | 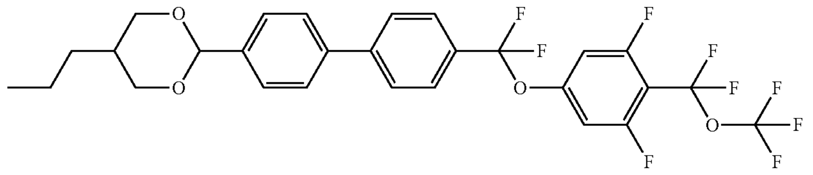 [SMILES: CCCC1COC(c2ccc(-c3ccc(C(F)(F)Oc4cc(F)c(C(F)(F)OC(F)(F)F)c(F)c4)cc3)cc2)OC1] |
| 242 | 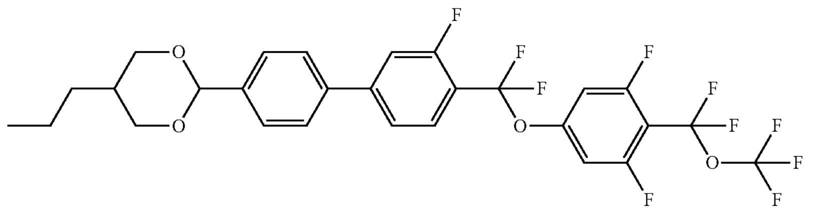 [SMILES: CCCC1COC(c2ccc(-c3ccc(C(F)(F)Oc4cc(F)c(C(F)(F)OC(F)(F)F)c(F)c4)c(F)c3)cc2)OC1] |
| 243 | 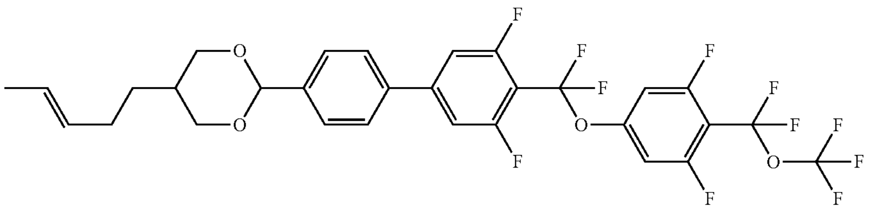 [SMILES: C/C=C/CCC1COC(c2ccc(-c3cc(F)c(C(F)(F)Oc4cc(F)c(C(F)(F)OC(F)(F)F)c(F)c4)c(F)c3)cc2)OC1] |

-continued
| No. | |
|---|---|
| 244 | 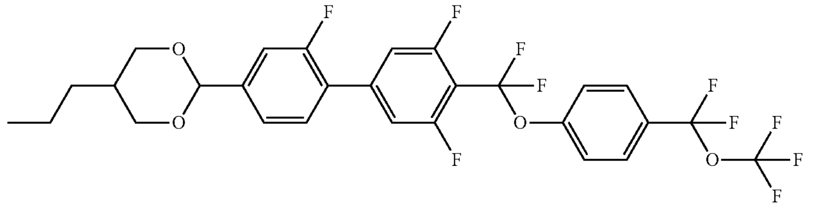 [SMILES: CCCC1COC(c2ccc(-c3cc(F)c(C(F)(F)Oc4ccc(C(F)(F)OC(F)(F)F)cc4)c(F)c3)c(F)c2)OC1] |
| 245 | 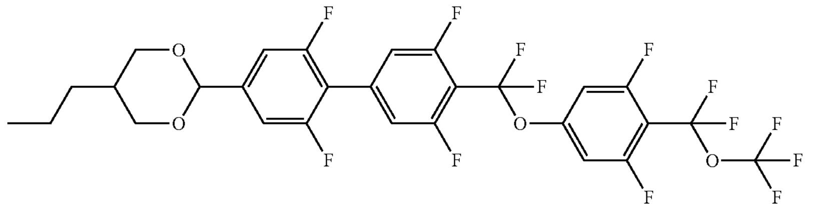 |
| 246 | 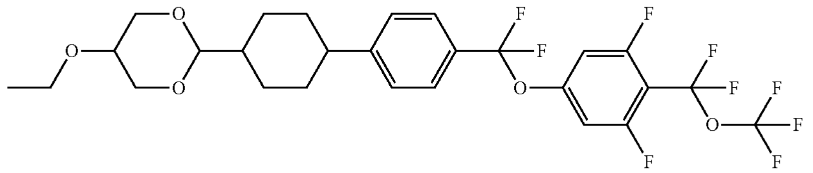 |
| 247 | 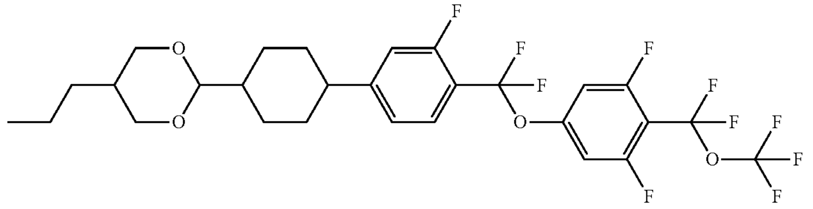 |
| 248 | 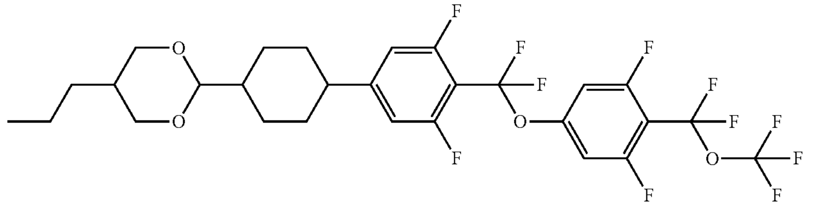 [SMILES: CCCC1COC(C2CCC(c3cc(F)c(C(F)(F)Oc4cc(F)c(C(F)(F)OC(F)(F)F)c(F)c4)c(F)c3)CC2)OC1] |
| 249 | 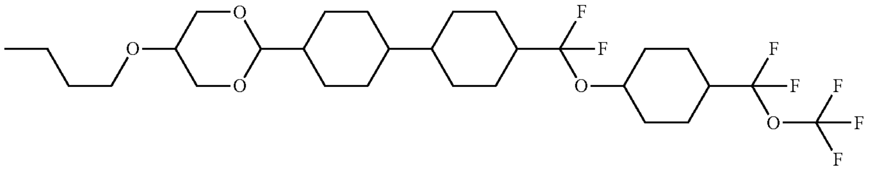 [SMILES: CCCCOC1COC(C2CCC(C3CCC(C(F)(F)OC4CCC(C(F)(F)OC(F)(F)F)CC4)CC3)CC2)OC1] |
| 250 | 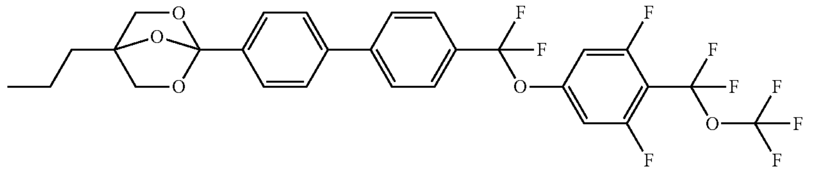 [SMILES: CCCC12COC(c3ccc(-c4ccc(C(F)(F)Oc5cc(F)c(C(F)(F)OC(F)(F)F)c(F)c5)cc4)cc3)(OC1)O2] |

-continued
| No. | |
|---|---|
| 251 | 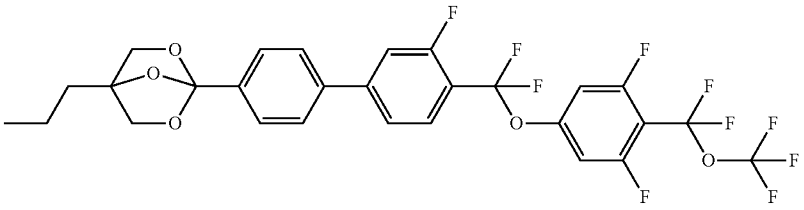 [SMILES: CCCC12COC(c3ccc(-c4ccc(C(F)(F)Oc5cc(F)c(C(F)(F)OC(F)(F)F)c(F)c5)c(F)c4)cc3)(OC1)O2] |
| 252 | 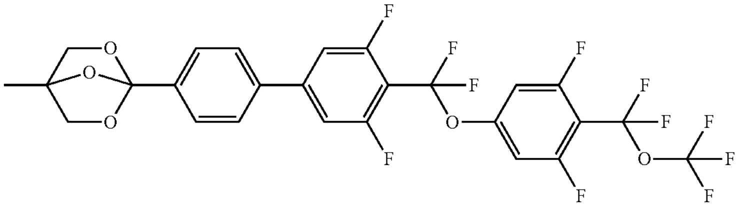 [SMILES: CC12COC(c3ccc(-c4cc(F)c(C(F)(F)Oc5cc(F)c(C(F)(F)OC(F)(F)F)c(F)c5)c(F)c4)cc3)(OC1)O2] |
| 253 | 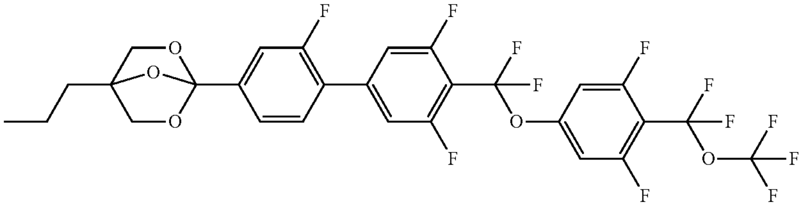 |
| 254 | 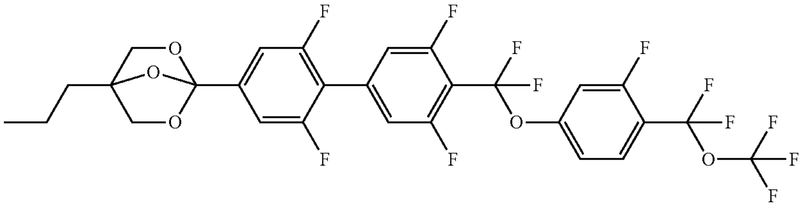 [SMILES: CCCC12COC(c3cc(F)c(-c4cc(F)c(C(F)(F)Oc5ccc(C(F)(F)OC(F)(F)F)c(F)c5)c(F)c4)c(F)c3)(OC1)O2] |
| 255 | 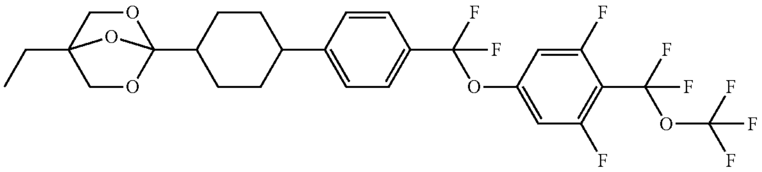 [SMILES: CCC12COC(C3CCC(c4ccc(C(F)(F)Oc5cc(F)c(C(F)(F)OC(F)(F)F)c(F)c5)cc4)CC3)(OC1)O2] |
| 256 | 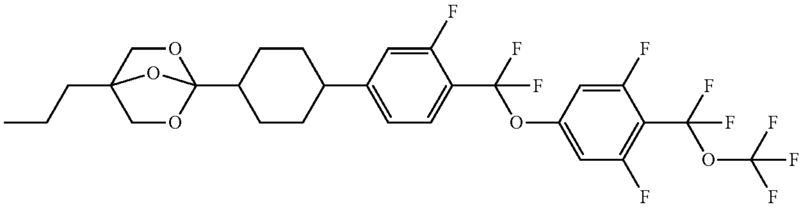 |
| 257 | 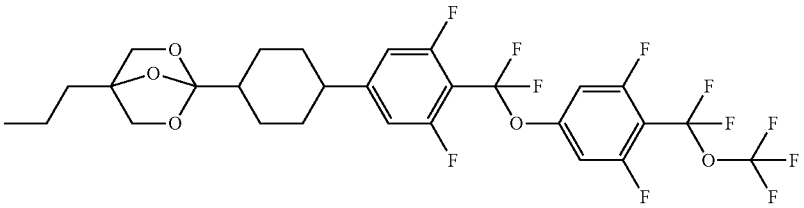 [SMILES: CCCC12COC(C3CCC(c4cc(F)c(C(F)(F)Oc5cc(F)c(C(F)(F)OC(F)(F)F)c(F)c5)c(F)c4)CC3)(OC1)O2] |

-continued
| No. | |
|---|---|
| 258 | 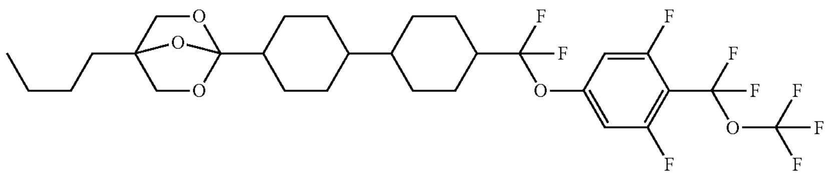 [SMILES: CCCCC12COC(C3CCC(C4CCC(C(F)(F)Oc5cc(F)c(C(F)(F)OC(F)(F)F)c(F)c5)CC4)CC3)(OC1)O2] |
| 259 | 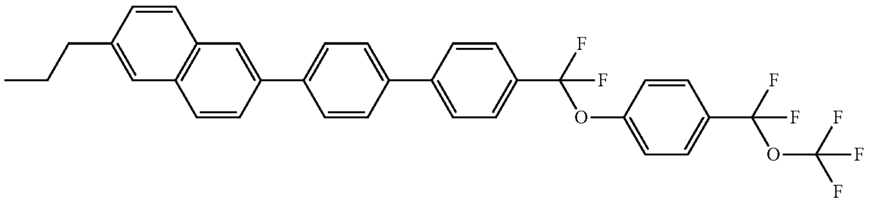 [SMILES: CCCc1ccc2cc(-c3ccc(-c4ccc(C(F)(F)Oc5ccc(C(F)(F)OC(F)(F)F)cc5)cc4)cc3)ccc2c1] |
| 260 | 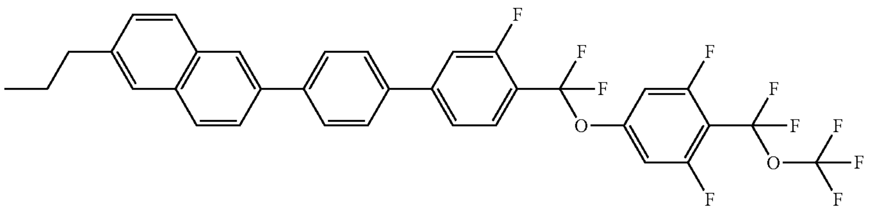 |
| 261 | 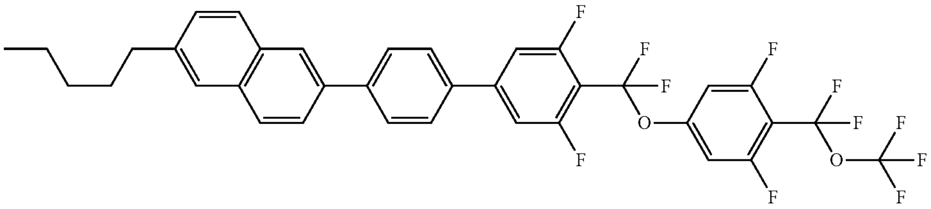 [SMILES: CCCCCc1ccc2cc(-c3ccc(-c4cc(F)c(C(F)(F)Oc5cc(F)c(C(F)(F)OC(F)(F)F)c(F)c5)c(F)c4)cc3)ccc2c1] |
| 262 | 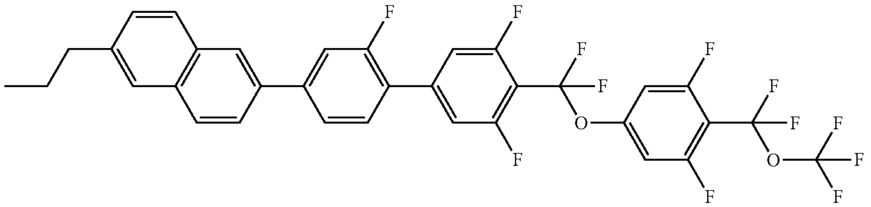 [SMILES: CCCc1ccc2cc(-c3ccc(-c4cc(F)c(C(F)(F)Oc5cc(F)c(C(F)(F)OC(F)(F)F)c(F)c5)c(F)c4)c(F)c3)ccc2c1] |
| 263 | 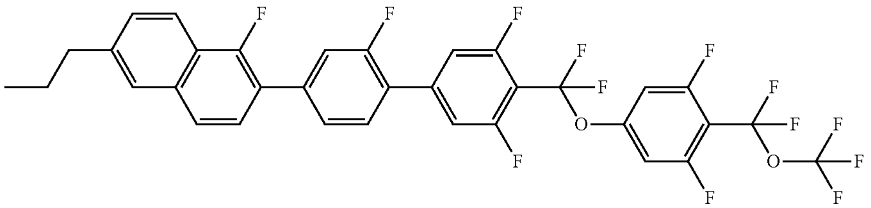 [SMILES: CCCc1ccc2c(F)c(-c3ccc(-c4cc(F)c(C(F)(F)Oc5cc(F)c(C(F)(F)OC(F)(F)F)c(F)c5)c(F)c4)c(F)c3)ccc2c1] |
| 264 | 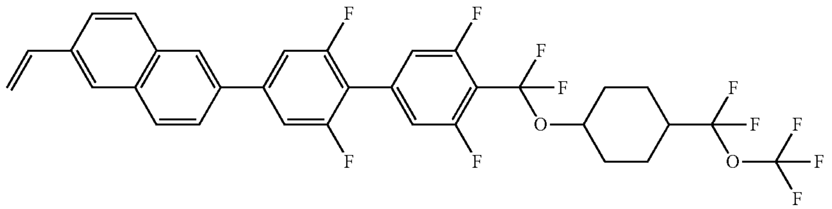 [SMILES: C=Cc1ccc2cc(-c3cc(F)c(-c4cc(F)c(C(F)(F)OC5CCC(C(F)(F)OC(F)(F)F)CC5)c(F)c4)c(F)c3)ccc2c1] |

-continued
| No. | |
|---|---|
| 265 | 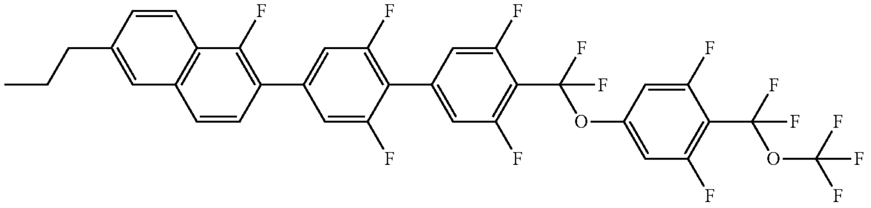 [SMILES: CCCc1ccc2c(F)c(-c3cc(F)c(-c4cc(F)c(C(F)(F)Oc5cc(F)c(C(F)(F)OC(F)(F)F)c(F)c5)c(F)c4)c(F)c3)ccc2c1] |
| 266 | 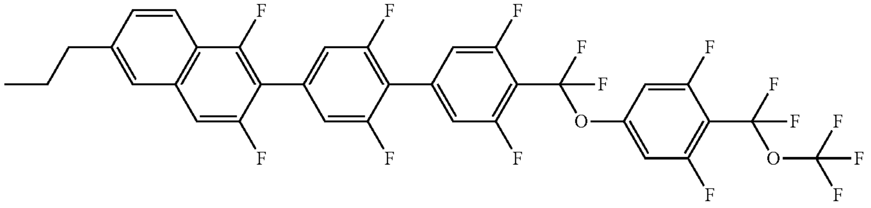 [SMILES: CCCc1ccc2c(F)c(-c3cc(F)c(-c4cc(F)c(C(F)(F)Oc5cc(F)c(C(F)(F)OC(F)(F)F)c(F)c5)c(F)c4)c(F)c3)c(F)cc2c1] |
| 267 | 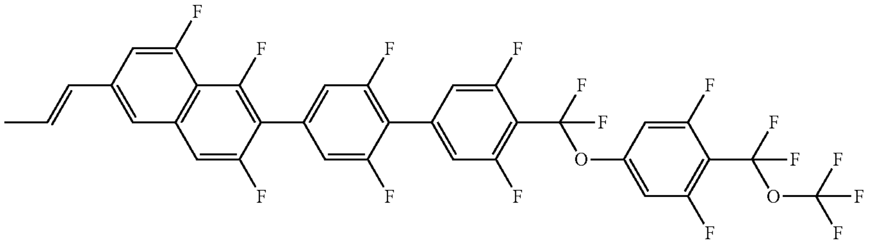 [SMILES: C/C=C/c1cc(F)c2c(F)c(-c3cc(F)c(-c4cc(F)c(C(F)(F)Oc5cc(F)c(C(F)(F)OC(F)(F)F)c(F)c5)c(F)c4)c(F)c3)c(F)cc2c1] |
| 268 | 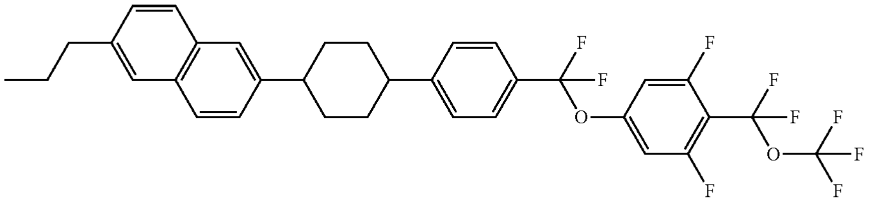 [SMILES: CCCc1ccc2cc(C3CCC(c4ccc(C(F)(F)Oc5cc(F)c(C(F)(F)OC(F)(F)F)c(F)c5)cc4)CC3)ccc2c1] |
| 269 | 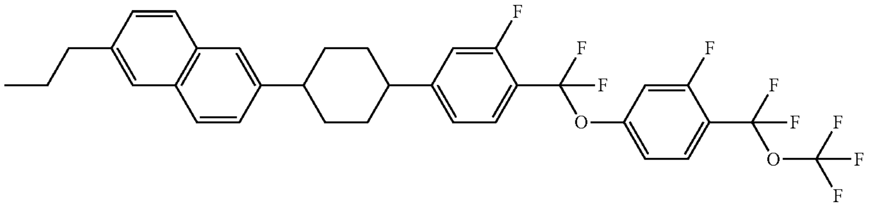 [SMILES: CCCc1ccc2cc(C3CCC(c4ccc(C(F)(F)Oc5ccc(C(F)(F)OC(F)(F)F)c(F)c5)c(F)c4)CC3)ccc2c1] |
| 270 | 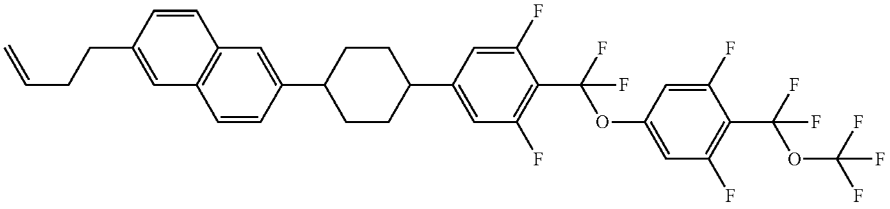 [SMILES: C=CCCc1ccc2cc(C3CCC(c4cc(F)c(C(F)(F)Oc5cc(F)c(C(F)(F)OC(F)(F)F)c(F)c5)c(F)c4)CC3)ccc2c1] |
| 271 | 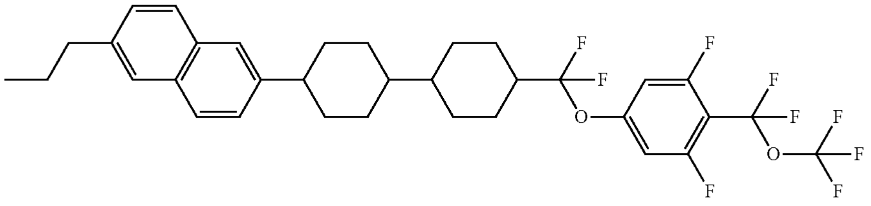 [SMILES: CCCc1ccc2cc(C3CCC(C4CCC(C(F)(F)Oc5cc(F)c(C(F)(F)OC(F)(F)F)c(F)c5)CC4)CC3)ccc2c1] |

-continued
| No. | |
|---|---|
| 272 | 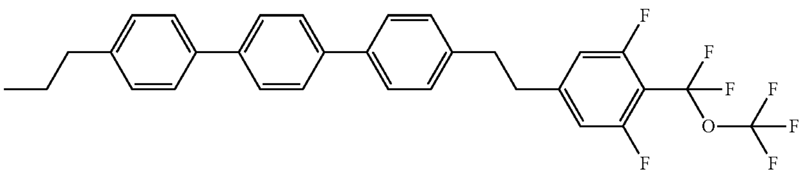 [SMILES: CCCc1ccc(-c2ccc(-c3ccc(CCc4cc(F)c(C(F)(F)OC(F)(F)F)c(F)c4)cc3)cc2)cc1] |
| 273 | 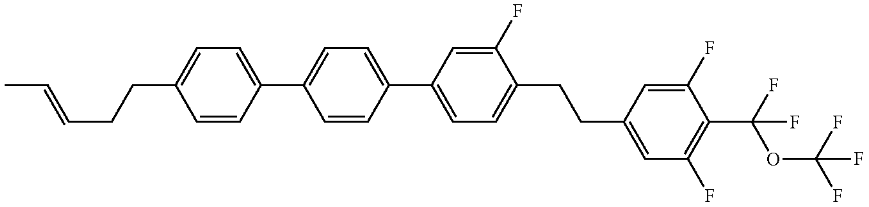 [SMILES: C/C=C/CCc1ccc(-c2ccc(-c3ccc(CCc4cc(F)c(C(F)(F)OC(F)(F)F)c(F)c4)c(F)c3)cc2)cc1] |
| 274 | 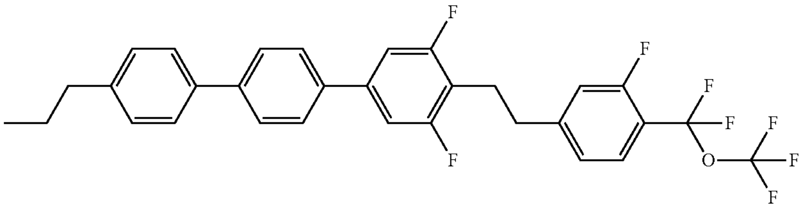 [SMILES: CCCc1ccc(-c2ccc(-c3cc(F)c(CCc4ccc(C(F)(F)OC(F)(F)F)c(F)c4)c(F)c3)cc2)cc1] |
| 275 | 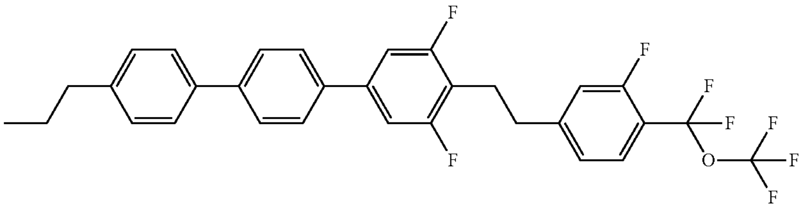 [SMILES: CCCc1ccc(-c2ccc(-c3cc(F)c(CCc4ccc(C(F)(F)OC(F)(F)F)c(F)c4)c(F)c3)cc2)cc1] |
| 276 | 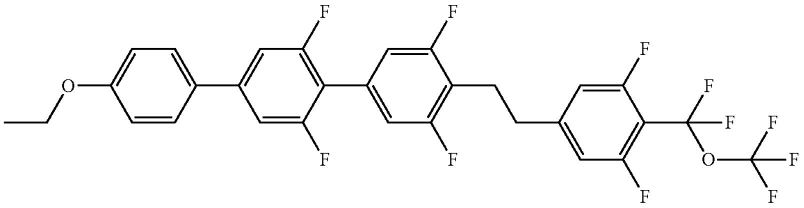 |
| 277 | 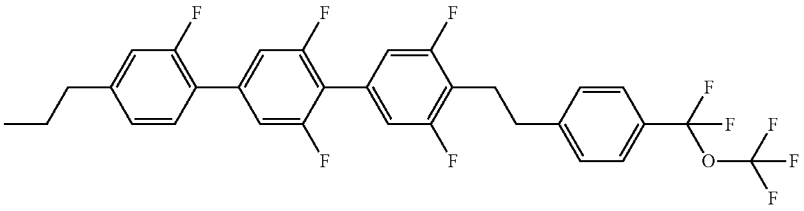 |
| 278 | 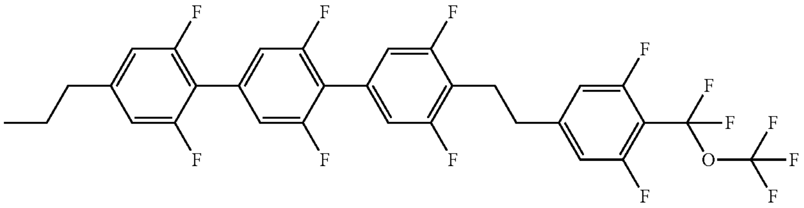 [SMILES: CCOc1ccc(-c2cc(F)c(-c3cc(F)c(CCc4cc(F)c(C(F)(F)OC(F)(F)F)c(F)c4)c(F)c3)c(F)c2)cc1] |

-continued
| No. | |
|---|---|
| 279 | 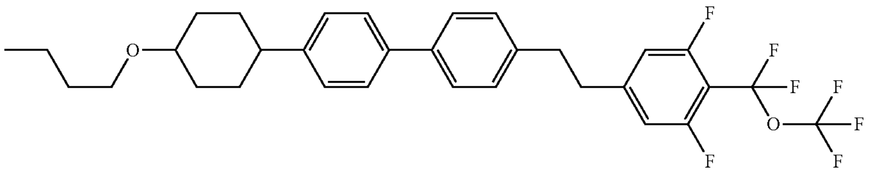 [SMILES: CCCCOC1CCC(c2ccc(-c3ccc(CCc4cc(F)c(C(F)(F)OC(F)(F)F)c(F)c4)cc3)cc2)CC1] |
| 280 | 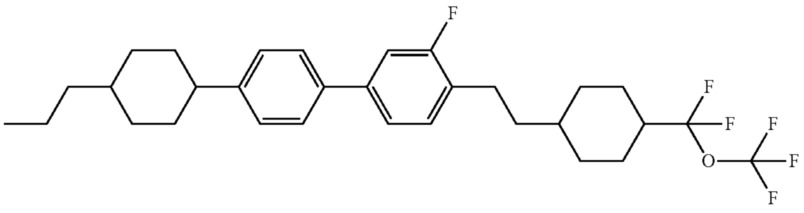 [SMILES: CCCC1CCC(c2ccc(-c3ccc(CCC4CCC(C(F)(F)OC(F)(F)F)CC4)c(F)c3)cc2)CC1] |
| 281 | 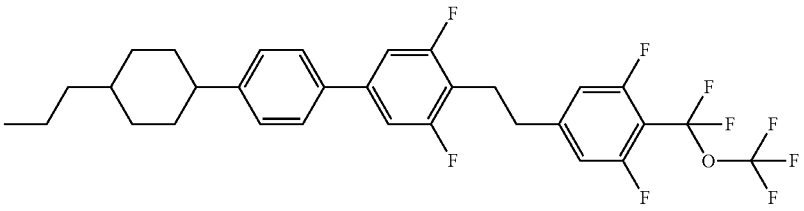 [SMILES: CCCC1CCC(c2ccc(-c3cc(F)c(CCc4cc(F)c(C(F)(F)OC(F)(F)F)c(F)c4)c(F)c3)cc2)CC1] |
| 282 | 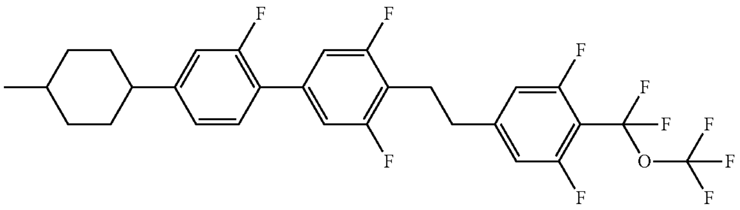 [SMILES: CC1CCC(c2ccc(-c3cc(F)c(CCc4cc(F)c(C(F)(F)OC(F)(F)F)c(F)c4)c(F)c3)c(F)c2)CC1] |
| 283 | 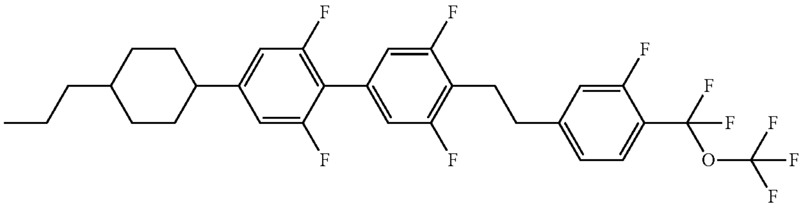 [SMILES: CCCC1CCC(c2cc(F)c(-c3cc(F)c(CCc4ccc(C(F)(F)OC(F)(F)F)c(F)c4)c(F)c3)c(F)c2)CC1] |
| 284 | 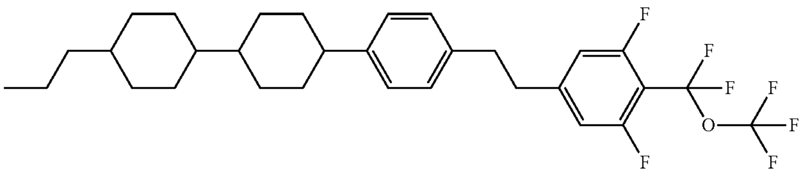 [SMILES: CCCC1CCC(C2CCC(c3ccc(CCc4cc(F)c(C(F)(F)OC(F)(F)F)c(F)c4)cc3)CC2)CC1] |
| 285 | 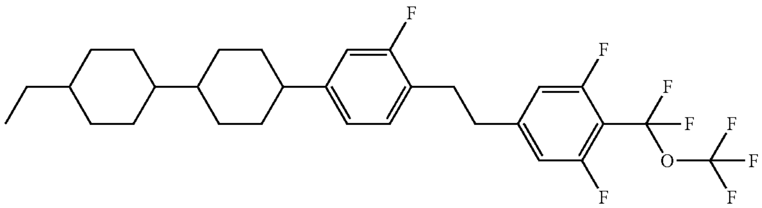 [SMILES: CCC1CCC(C2CCC(c3ccc(CCc4cc(F)c(C(F)(F)OC(F)(F)F)c(F)c4)c(F)c3)CC2)CC1] |

-continued
| No. | |
|---|---|
| 286 | 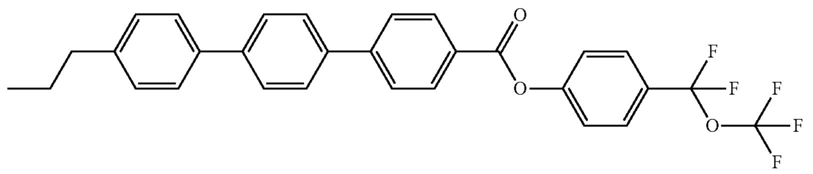 [SMILES: CCCc1ccc(-c2ccc(-c3ccc(C(=O)Oc4ccc(C(F)(F)OC(F)(F)F)cc4)cc3)cc2)cc1] |
| 287 | 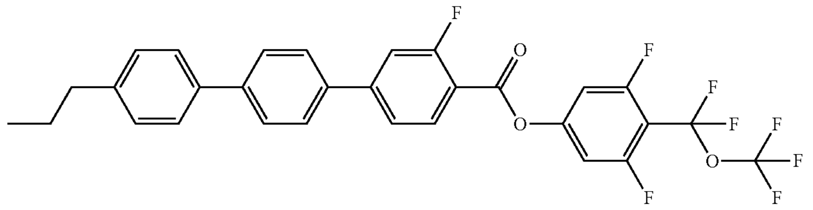 [SMILES: CCCc1ccc(-c2ccc(-c3ccc(C(=O)Oc4cc(F)c(C(F)(F)OC(F)(F)F)c(F)c4)c(F)c3)cc2)cc1] |
| 288 | 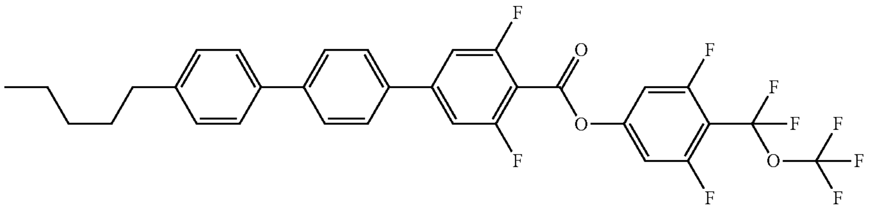 [SMILES: CCCCCc1ccc(-c2ccc(-c3cc(F)c(C(=O)Oc4cc(F)c(C(F)(F)OC(F)(F)F)c(F)c4)c(F)c3)cc2)cc1] |
| 289 | 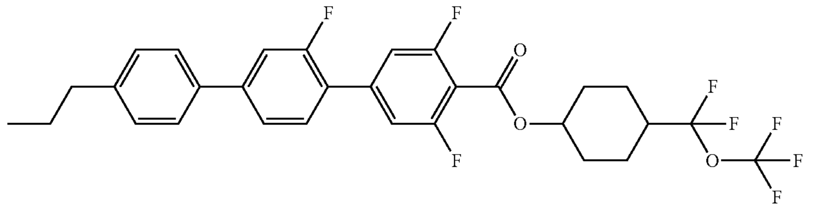 [SMILES: CCCc1ccc(-c2ccc(-c3cc(F)c(C(=O)OC4CCC(C(F)(F)OC(F)(F)F)CC4)c(F)c3)c(F)c2)cc1] |
| 290 | 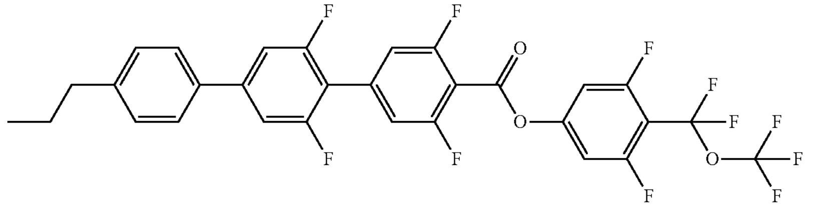 |
| 291 | 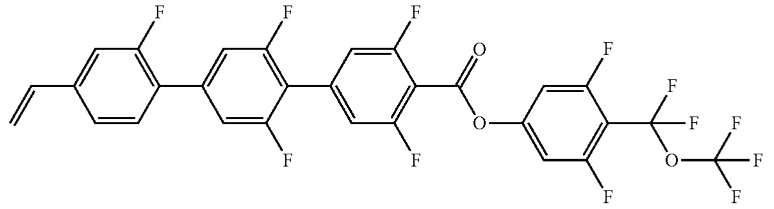 [SMILES: C=Cc1ccc(-c2cc(F)c(-c3cc(F)c(C(=O)Oc4cc(F)c(C(F)(F)OC(F)(F)F)c(F)c4)c(F)c3)c(F)c2)c(F)c1] |
| 292 | 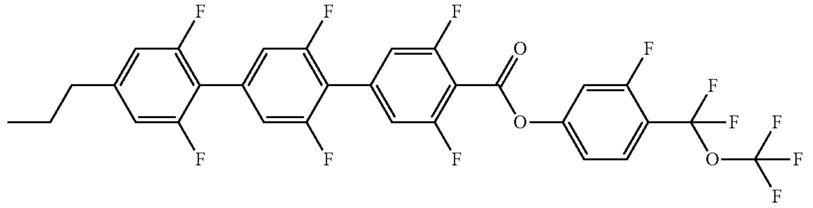 |

-continued
| No. | |
|---|---|
| 293 | 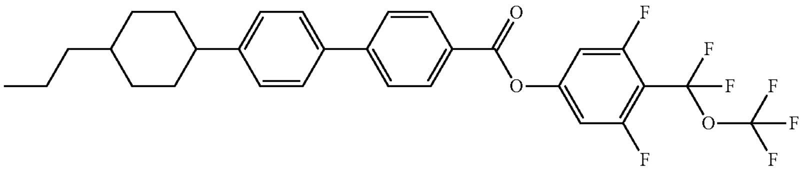 [SMILES: CCCC1CCC(c2ccc(-c3ccc(C(=O)Oc4cc(F)c(C(F)(F)OC(F)(F)F)c(F)c4)cc3)cc2)CC1] |
| 294 | 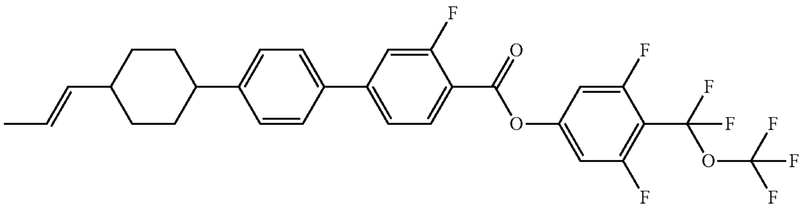 [SMILES: C/C=C/C1CCC(c2ccc(-c3ccc(C(=O)Oc4cc(F)c(C(F)(F)OC(F)(F)F)c(F)c4)c(F)c3)cc2)CC1] |
| 295 | 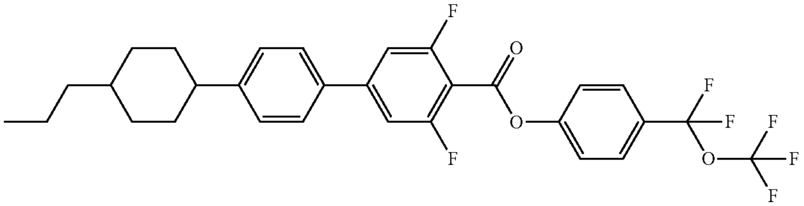 [SMILES: CCCC1CCC(c2ccc(-c3cc(F)c(C(=O)Oc4ccc(C(F)(F)OC(F)(F)F)cc4)c(F)c3)cc2)CC1] |
| 296 | 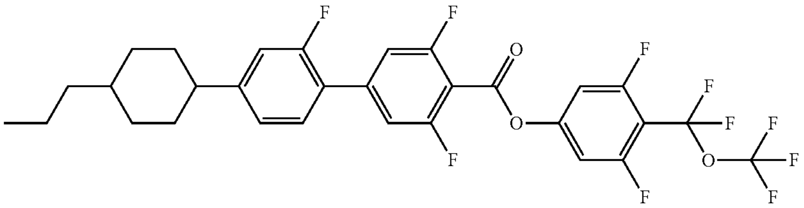 |
| 297 | 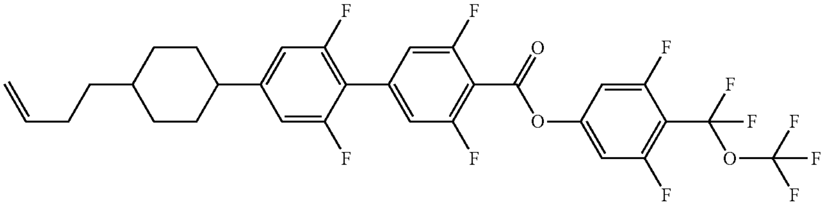 [SMILES: C=CCCC1CCC(c2cc(F)c(-c3cc(F)c(C(=O)Oc4cc(F)c(C(F)(F)OC(F)(F)F)c(F)c4)c(F)c3)c(F)c2)CC1] |
| 298 | 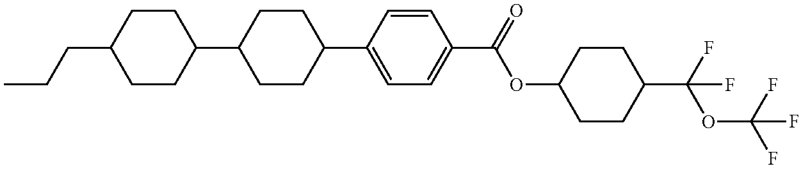 [SMILES: CCCC1CCC(C2CCC(c3ccc(C(=O)OC4CCC(C(F)(F)OC(F)(F)F)CC4)cc3)CC2)CC1] |
| 299 | 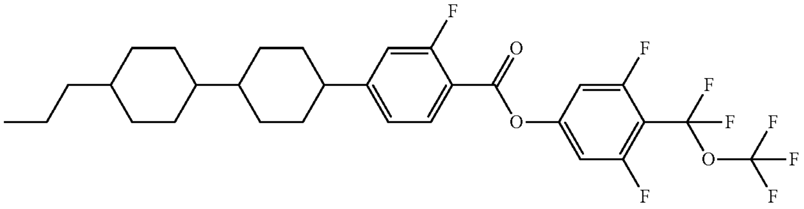 [SMILES: CCCC1CCC(C2CCC(c3ccc(C(=O)Oc4cc(F)c(C(F)(F)OC(F)(F)F)c(F)c4)c(F)c3)CC2)CC1] |

-continued
| No. | |
|---|---|
| 300 | 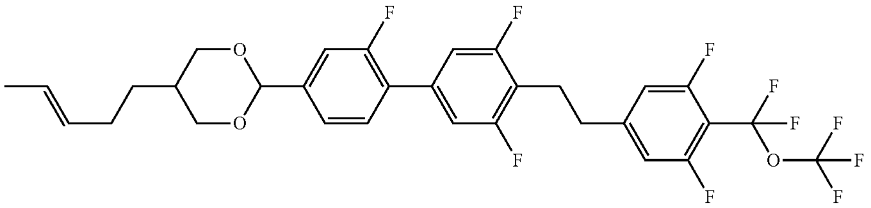 [SMILES: C/C=C/CCC1COC(c2ccc(-c3cc(F)c(CCc4cc(F)c(C(F)(F)OC(F)(F)F)c(F)c4)c(F)c3)c(F)c2)OC1] |
| 301 | 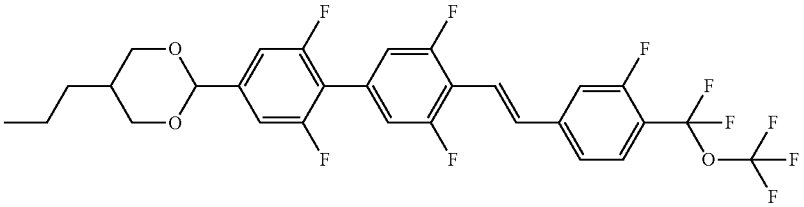 [SMILES: CCCC1COC(c2cc(F)c(-c3cc(F)c(/C=C/c4ccc(C(F)(F)OC(F)(F)F)c(F)c4)c(F)c3)c(F)c2)OC1] |
| 302 | 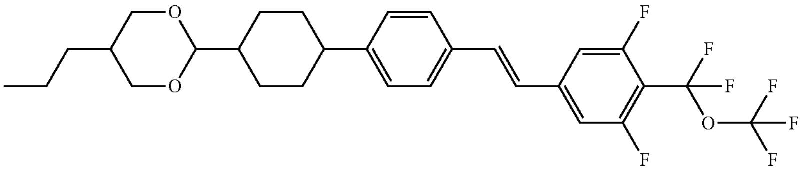 |
| 303 | 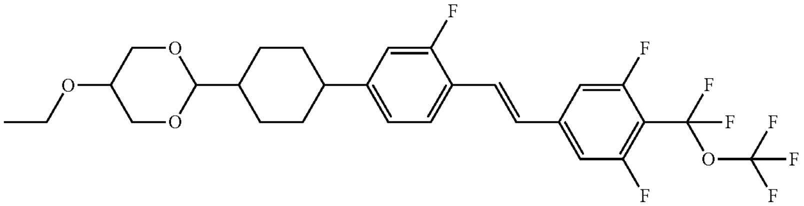 [SMILES: CCOC1COC(C2CCC(c3ccc(/C=C/c4cc(F)c(C(F)(F)OC(F)(F)F)c(F)c4)c(F)c3)CC2)OC1] |
| 304 | 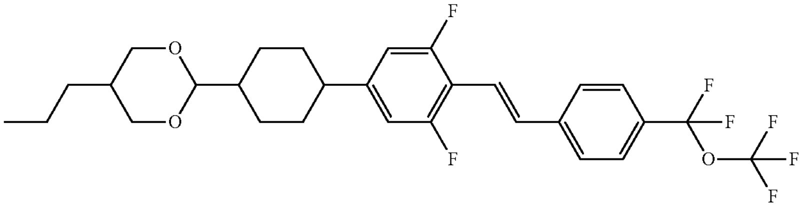 [SMILES: CCCC1COC(C2CCC(c3cc(F)c(/C=C/c4ccc(C(F)(F)OC(F)(F)F)cc4)c(F)c3)CC2)OC1] |
| 305 | 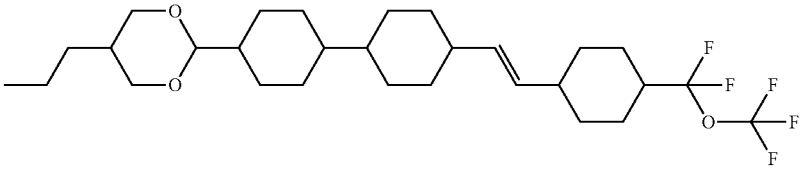 [SMILES: CCCC1COC(C2CCC(C3CCC(/C=C/C4CCC(C(F)(F)OC(F)(F)F)CC4)CC3)CC2)OC1] |
| 306 | 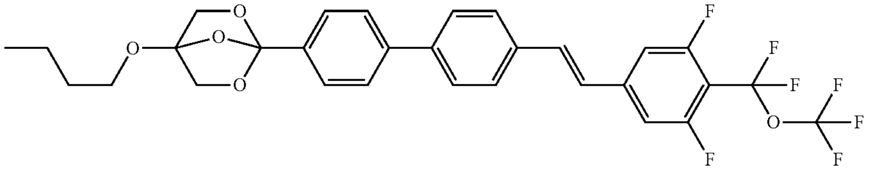 [SMILES: CCCCOC12COC(c3ccc(-c4ccc(/C=C/c5cc(F)c(C(F)(F)OC(F)(F)F)c(F)c5)cc4)cc3)(OC1)O2] |

-continued
| No. | |
|---|---|
| 307 | 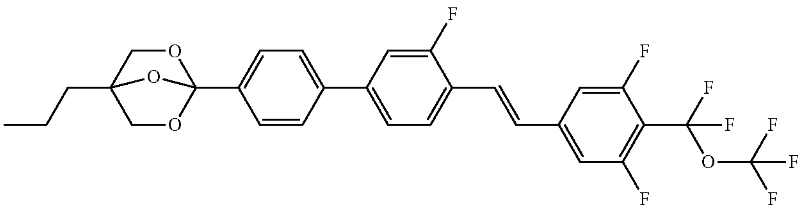 [SMILES: CCCC12COC(c3ccc(-c4ccc(/C=C/c5cc(F)c(C(F)(F)OC(F)(F)F)c(F)c5)c(F)c4)cc3)(OC1)O2] |
| 308 | 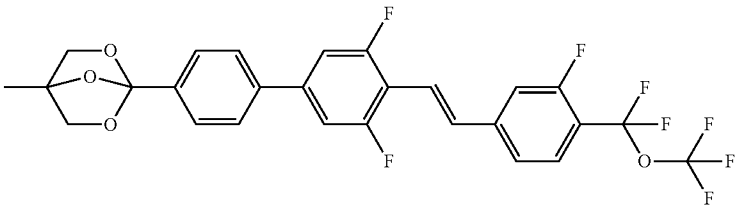 [SMILES: CC12COC(c3ccc(-c4cc(F)c(/C=C/c5ccc(C(F)(F)OC(F)(F)F)c(F)c5)c(F)c4)cc3)(OC1)O2] |
| 309 | 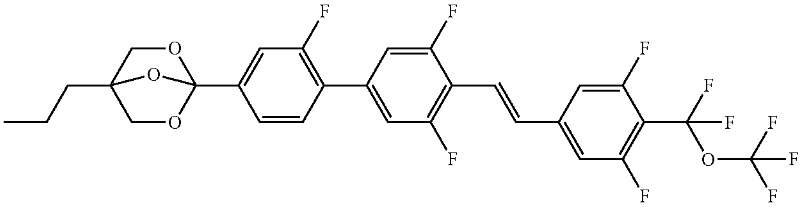 |
| 310 | 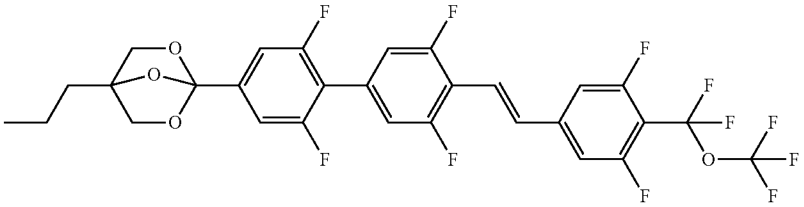 |
| 311 | 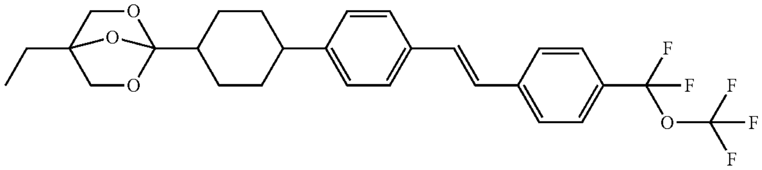 |
| 312 | 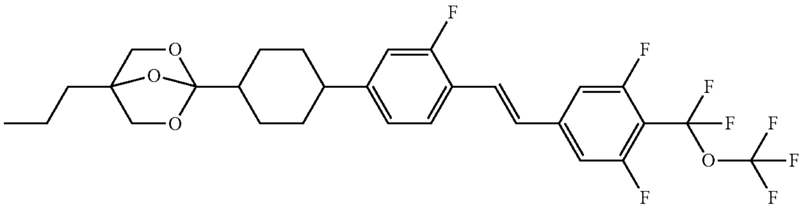 [SMILES: CCCC12COC(C3CCC(c4cc(F)c(/C=C/c5cc(F)c(C(F)(F)OC(F)(F)F)c(F)c5)c(F)c4)CC3)(OC1)O2] |
| 313 | 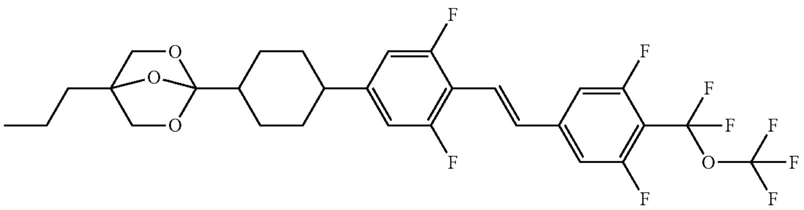 |

-continued
| No. | |
|---|---|
| 314 | 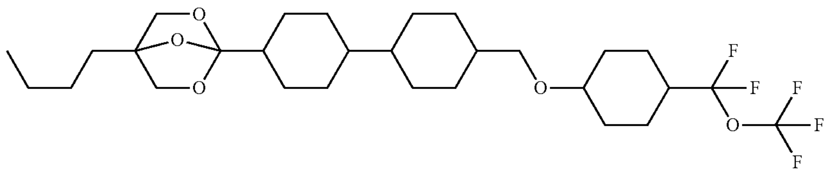 [SMILES: CCCCC12COC(C3CCC(C4CCC(COC5CCC(C(F)(F)OC(F)(F)F)CC5)CC4)CC3)(OC1)O2] |
| 315 | 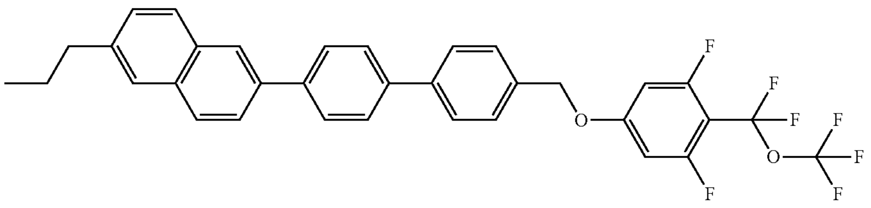 [SMILES: CCCc1ccc2cc(-c3ccc(-c4ccc(COc5cc(F)c(C(F)(F)OC(F)(F)F)c(F)c5)cc4)cc3)ccc2c1] |
| 316 | 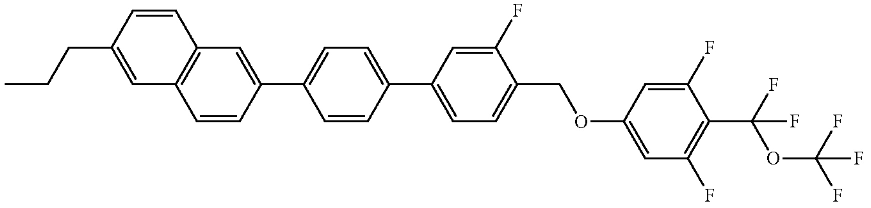 [SMILES: CCCc1ccc2cc(-c3ccc(-c4ccc(COc5cc(F)c(C(F)(F)OC(F)(F)F)c(F)c5)c(F)c4)cc3)ccc2c1] |
| 317 | 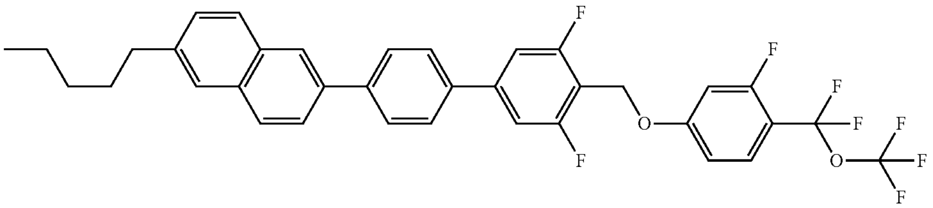 [SMILES: CCCCCc1ccc2cc(-c3ccc(-c4cc(F)c(COc5ccc(C(F)(F)OC(F)(F)F)c(F)c5)c(F)c4)cc3)ccc2c1] |
| 318 | 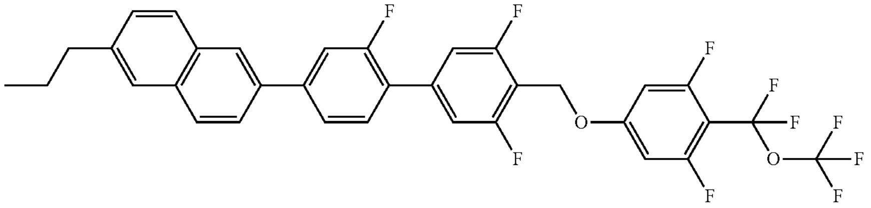 [SMILES: CCCc1ccc2cc(-c3ccc(-c4cc(F)c(COc5cc(F)c(C(F)(F)OC(F)(F)F)c(F)c5)c(F)c4)c(F)c3)ccc2c1] |
| 319 | 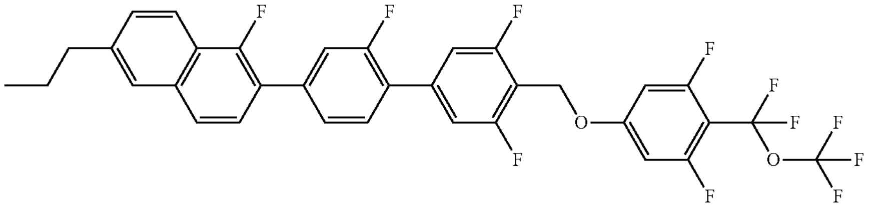 |
| 320 | 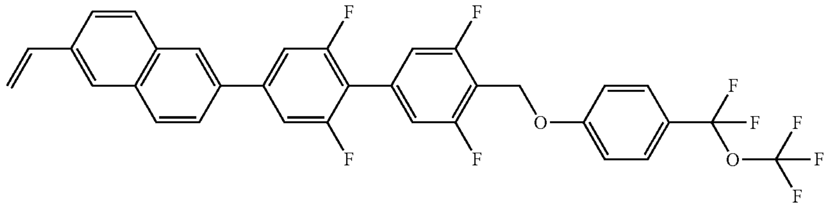 [SMILES: C=Cc1ccc2cc(-c3cc(F)c(-c4cc(F)c(COc5ccc(C(F)(F)OC(F)(F)F)cc5)c(F)c4)c(F)c3)ccc2c1] |

-continued
| No. | |
|---|---|
| 321 | 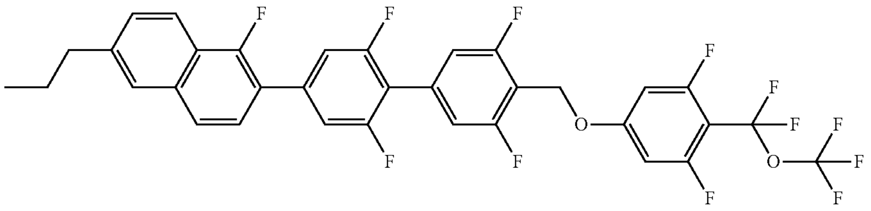 [SMILES: CCCc1ccc2c(F)c(-c3cc(F)c(-c4cc(F)c(COc5cc(F)c(C(F)(F)OC(F)(F)F)c(F)c5)c(F)c4)c(F)c3)ccc2c1] |
| 322 | 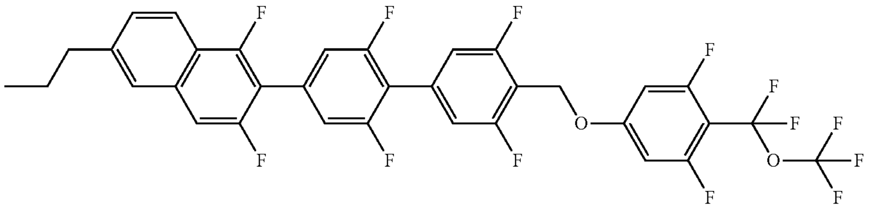 |
| 323 | 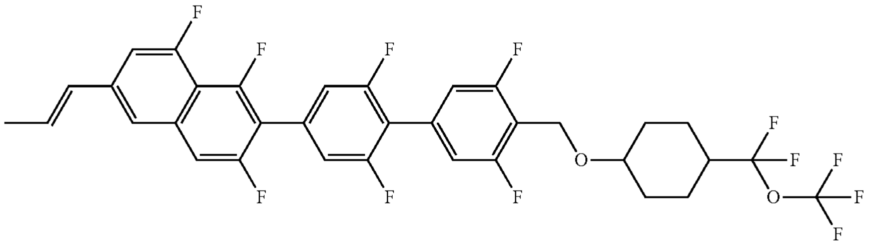 [SMILES: C/C=C/c1cc(F)c2c(F)c(-c3cc(F)c(-c4cc(F)c(COC5CCC(C(F)(F)OC(F)(F)F)CC5)c(F)c4)c(F)c3)c(F)cc2c1] |
| 324 | 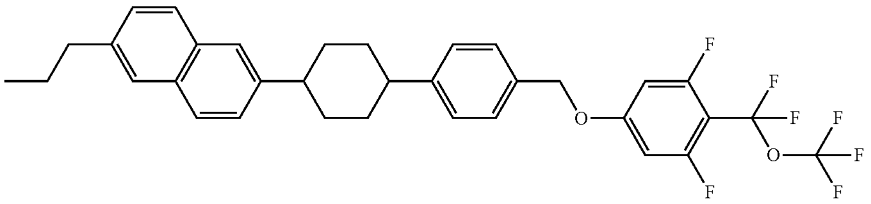 |
| 325 | 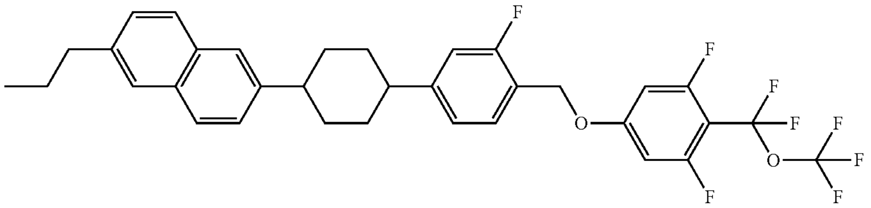 |
| 326 | 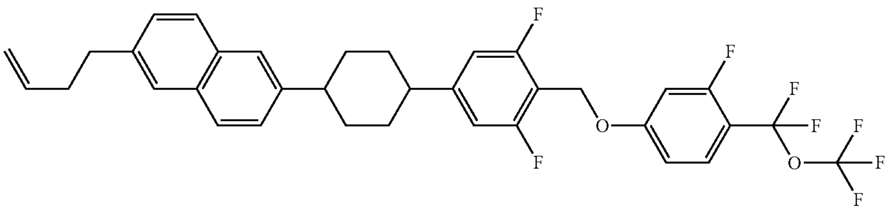 [SMILES: C=CCCc1ccc2cc(C3CCC(c4cc(F)c(COc5ccc(C(F)(F)OC(F)(F)F)c(F)c5)c(F)c4)CC3)ccc2c1] |
| 327 | 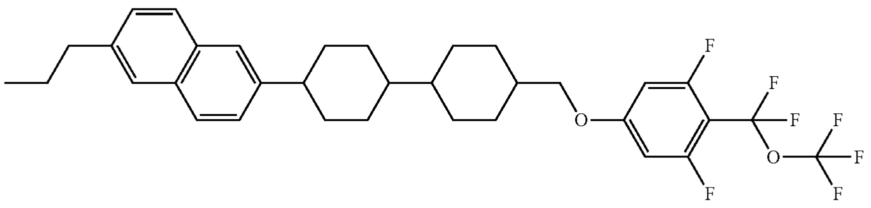 [SMILES: CCCc1ccc2cc(C3CCC(C4CCC(COc5cc(F)c(C(F)(F)OC(F)(F)F)c(F)c5)CC4)CC3)ccc2c1] |

-continued
| No. | |
|---|---|
| 328 | 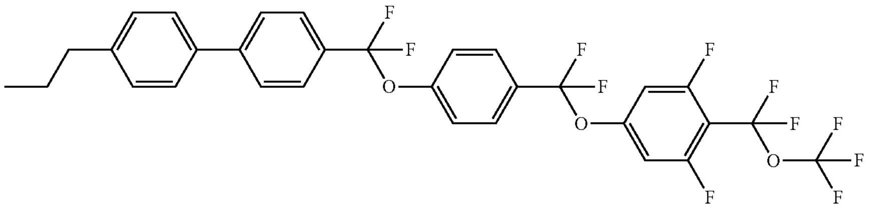 [SMILES: CCCc1ccc(-c2ccc(C(F)(F)Oc3ccc(C(F)(F)Oc4cc(F)c(C(F)(F)OC(F)(F)F)c(F)c4)cc3)cc2)cc1] |
| 329 | 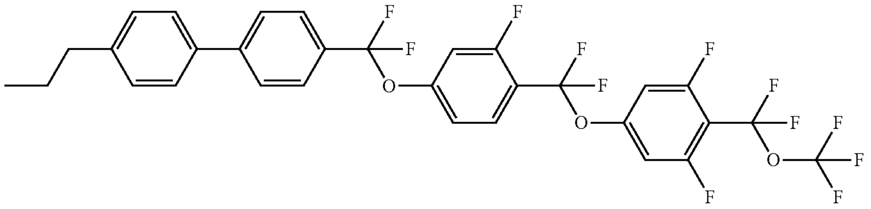 |
| 330 | 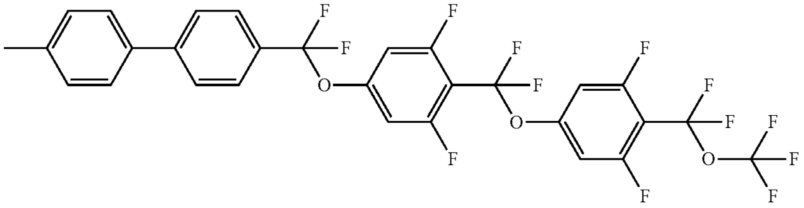 [SMILES: Cc1ccc(-c2ccc(C(F)(F)Oc3cc(F)c(C(F)(F)Oc4cc(F)c(C(F)(F)OC(F)(F)F)c(F)c4)c(F)c3)cc2)cc1] |
| 331 | 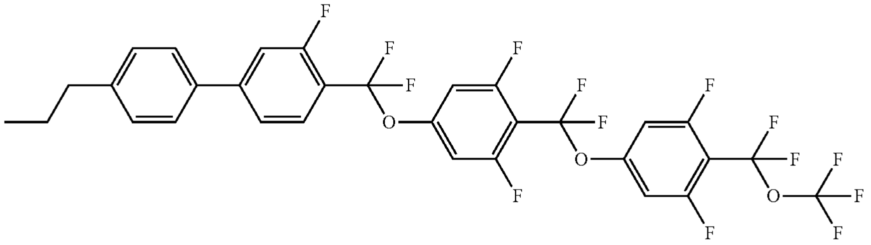 |
| 332 | 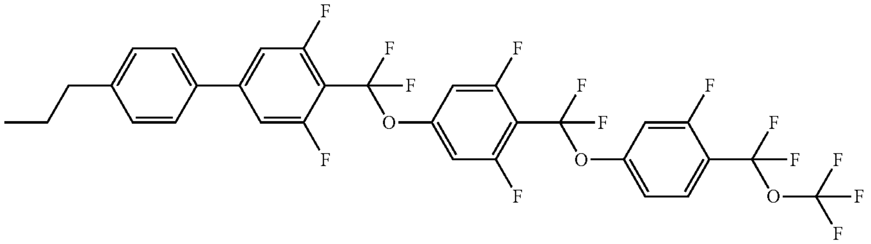 [SMILES: CCCc1ccc(-c2cc(F)c(C(F)(F)Oc3cc(F)c(C(F)(F)Oc4ccc(C(F)(F)OC(F)(F)F)c(F)c4)c(F)c3)c(F)c2)cc1] |
| 333 | 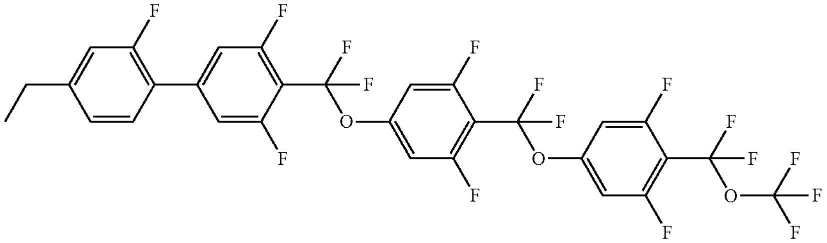 [SMILES: CCc1ccc(-c2cc(F)c(C(F)(F)Oc3cc(F)c(C(F)(F)Oc4cc(F)c(C(F)(F)OC(F)(F)F)c(F)c4)c(F)c3)c(F)c2)c(F)c1] |

-continued
No.
334 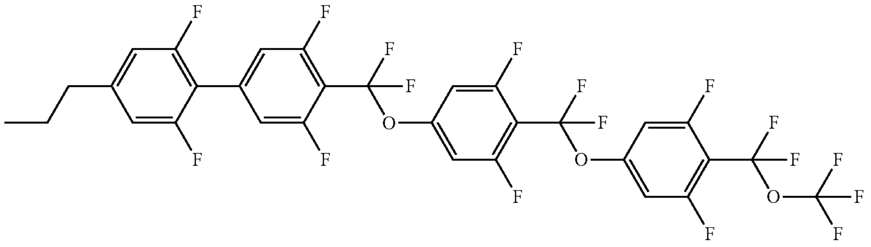 [SMILES: CCCc1cc(F)c(-c2cc(F)c(C(F)(F)Oc3cc(F)c(C(F)(F)Oc4cc(F)c(C(F)(F)OC(F)(F)F)c(F)c4)c(F)c3)c(F)c2)c(F)c1]
335 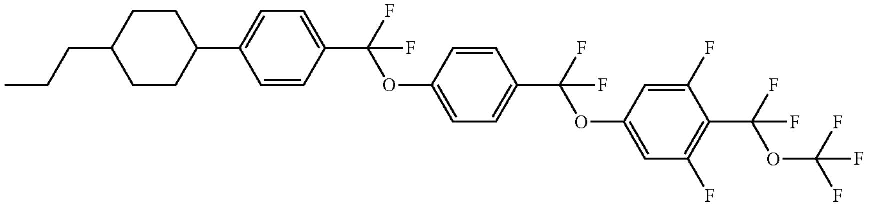
336 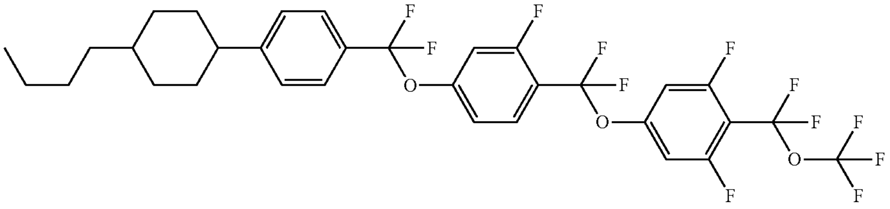 [SMILES: CCCCC1CCC(c2ccc(C(F)(F)Oc3ccc(C(F)(F)Oc4cc(F)c(C(F)(F)OC(F)(F)F)c(F)c4)c(F)c3)cc2)CC1]
337 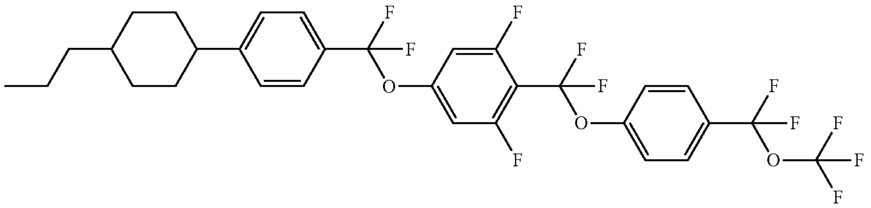
338 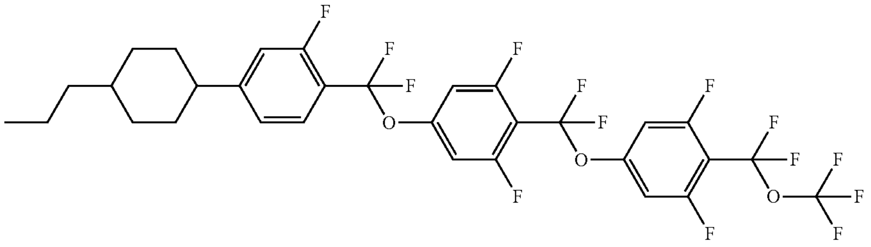 [SMILES: CCCC1CCC(c2ccc(C(F)(F)Oc3cc(F)c(C(F)(F)Oc4cc(F)c(C(F)(F)OC(F)(F)F)c(F)c4)c(F)c3)c(F)c2)CC1]
339 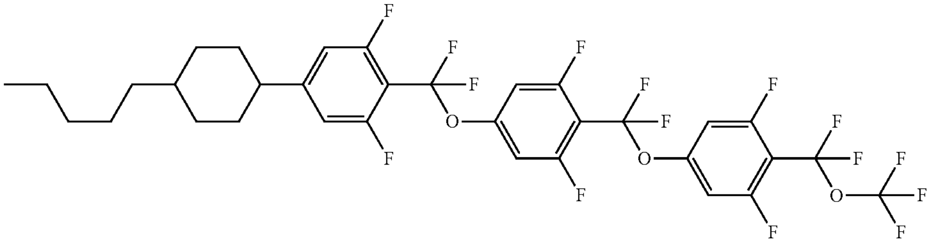 [SMILES: CCCCCC1CCC(c2cc(F)c(C(F)(F)Oc3cc(F)c(C(F)(F)Oc4cc(F)c(C(F)(F)OC(F)(F)F)c(F)c4)c(F)c3)c(F)c2)CC1]

-continued
| No. | |
|---|---|
| 340 | 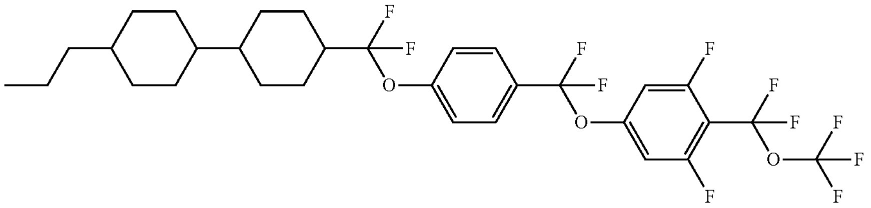 |
| 341 | 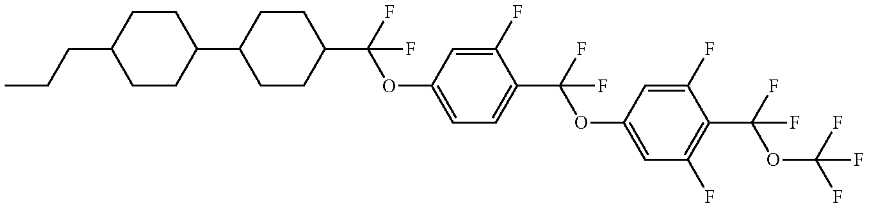 [SMILES: CCCC1CCC(C2CCC(C(F)(F)Oc3ccc(C(F)(F)Oc4cc(F)c(C(F)(F)OC(F)(F)F)c(F)c4)c(F)c3)CC2)CC1] |
| 342 | 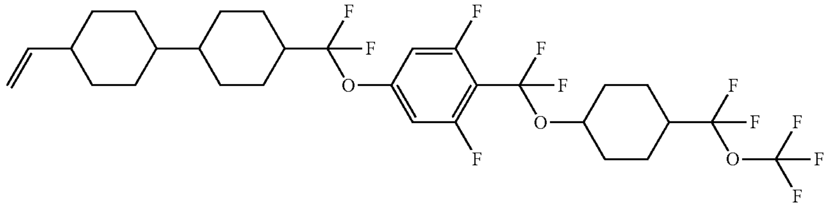 [SMILES: C=CC1CCC(C2CCC(C(F)(F)Oc3cc(F)c(C(F)(F)OC4CCC(C(F)(F)OC(F)(F)F)CC4)c(F)c3)CC2)CC1] |
| 343 | 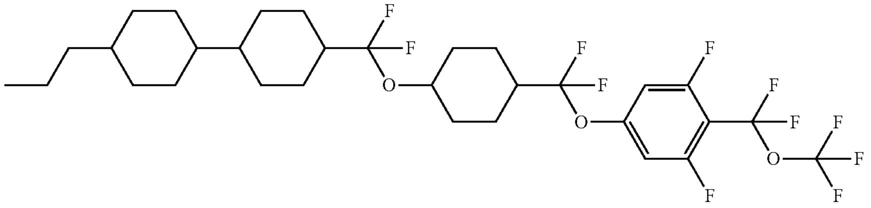 [SMILES: CCCC1CCC(C2CCC(C(F)(F)OC3CCC(C(F)(F)Oc4cc(F)c(C(F)(F)OC(F)(F)F)c(F)c4)CC3)CC2)CC1] |
| 344 | 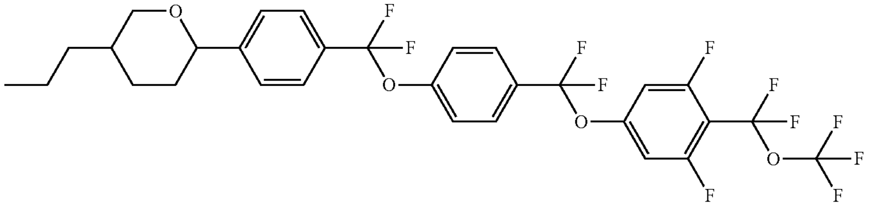 [SMILES: CCCC1CCC(c2ccc(C(F)(F)Oc3ccc(C(F)(F)Oc4cc(F)c(C(F)(F)OC(F)(F)F)c(F)c4)cc3)cc2)OC1] |
| 345 | 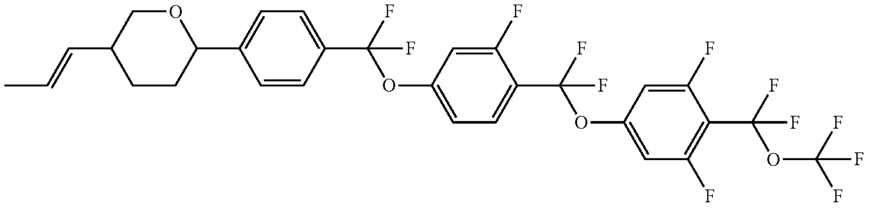 [SMILES: C/C=C/C1CCC(c2ccc(C(F)(F)Oc3ccc(C(F)(F)Oc4cc(F)c(C(F)(F)OC(F)(F)F)c(F)c4)c(F)c3)cc2)OC1] |
| 346 | 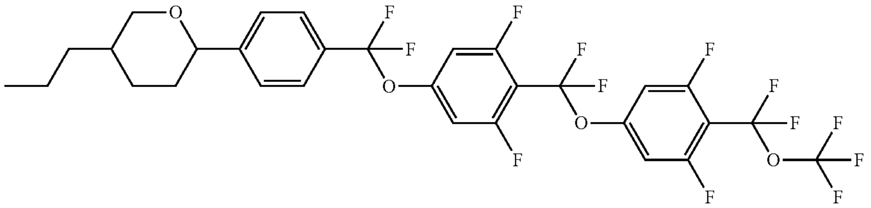 |

-continued
| No. | |
|---|---|
| 347 | 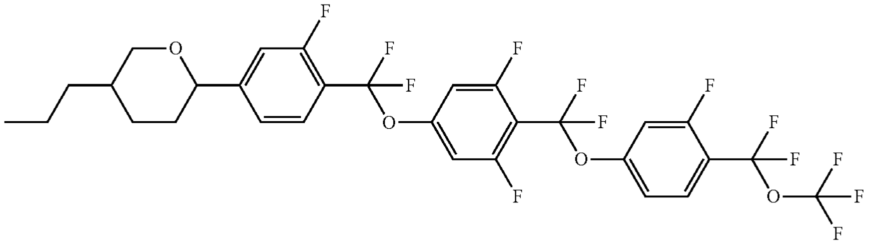 |
| 348 | 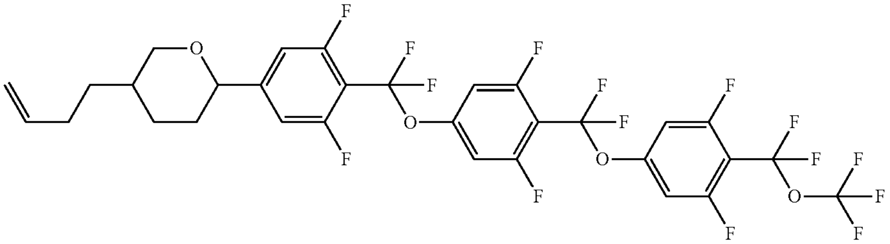 [SMILES: C=CCCC1CCC(c2cc(F)c(C(F)(F)Oc3cc(F)c(C(F)(F)Oc4cc(F)c(C(F)(F)OC(F)(F)F)c(F)c4)c(F)c3)c(F)c2)OC1] |
| 349 | 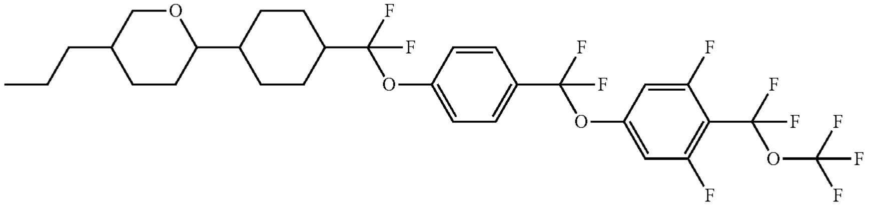 |
| 350 | 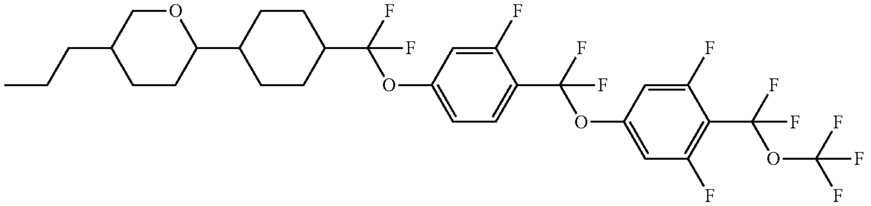 |
| 351 | 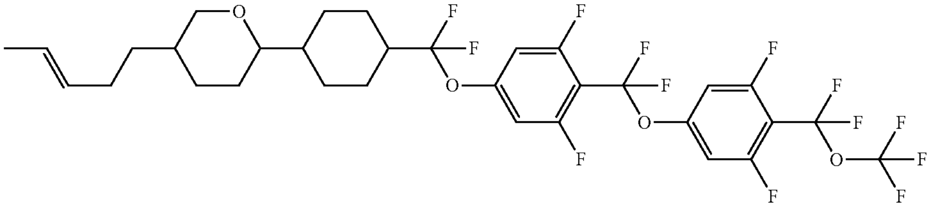 [SMILES: C/C=C/CCC1CCC(C2CCC(C(F)(F)Oc3cc(F)c(C(F)(F)Oc4cc(F)c(C(F)(F)OC(F)(F)F)c(F)c4)c(F)c3)CC2)OC1] |
| 352 | 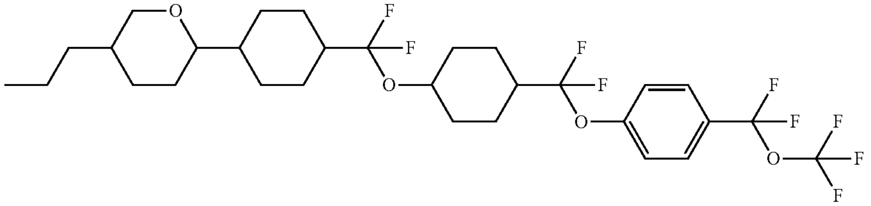 [SMILES: CCCC1CCC(C2CCC(C(F)(F)OC3CCC(C(F)(F)Oc4ccc(C(F)(F)OC(F)(F)F)cc4)CC3)CC2)OC1] |
| 353 | 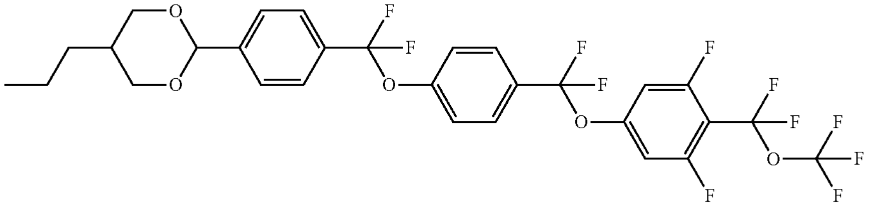 |

-continued
| No. | |
|---|---|
| 354 | 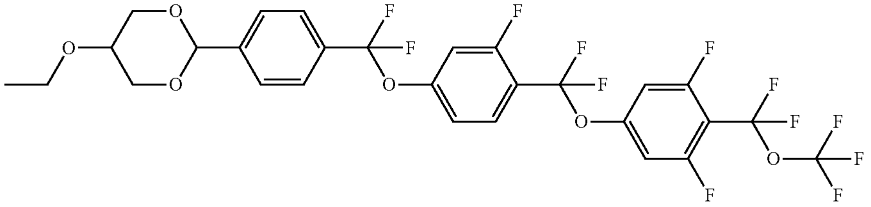 [SMILES: CCOC1COC(c2ccc(C(F)(F)Oc3ccc(C(F)(F)Oc4cc(F)c(C(F)(F)OC(F)(F)F)c(F)c4)c(F)c3)cc2)OC1] |
| 355 | 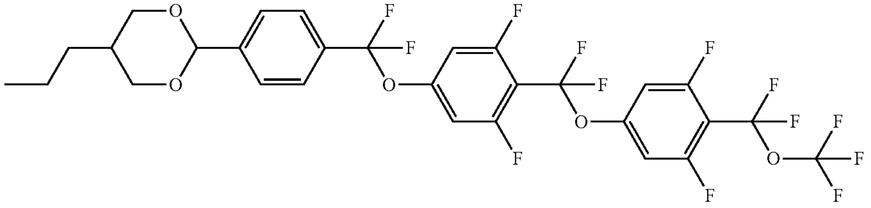 [SMILES: CCCC1COC(c2ccc(C(F)(F)Oc3cc(F)c(C(F)(F)Oc4cc(F)c(C(F)(F)OC(F)(F)F)c(F)c4)c(F)c3)cc2)OC1] |
| 356 | 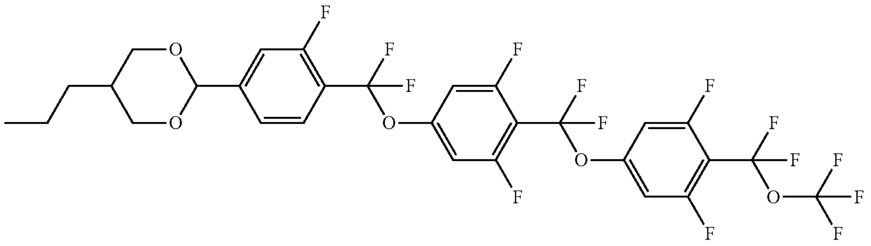 |
| 357 | 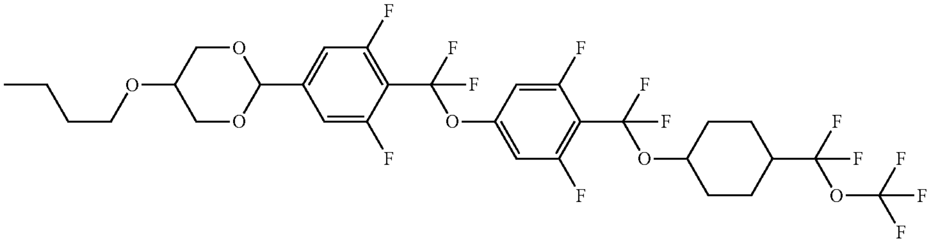 [SMILES: CCCCOC1COC(c2cc(F)c(C(F)(F)Oc3cc(F)c(C(F)(F)OC4CCC(C(F)(F)OC(F)(F)F)CC4)c(F)c3)c(F)c2)OC1] |
| 358 | 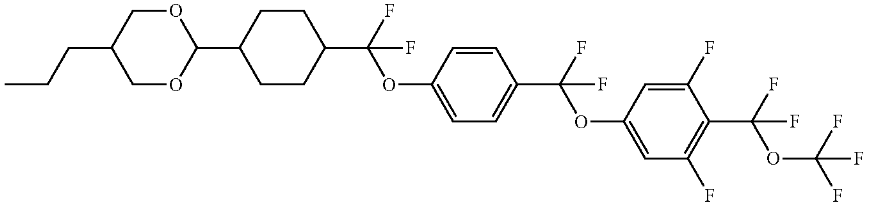 |
| 359 | 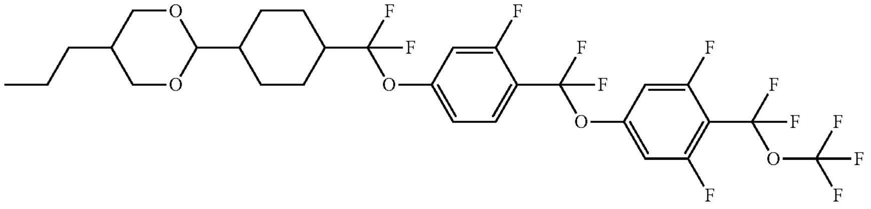 [SMILES: CCCC1COC(C2CCC(C(F)(F)Oc3ccc(C(F)(F)Oc4cc(F)c(C(F)(F)OC(F)(F)F)c(F)c4)c(F)c3)CC2)OC1] |
| 360 | 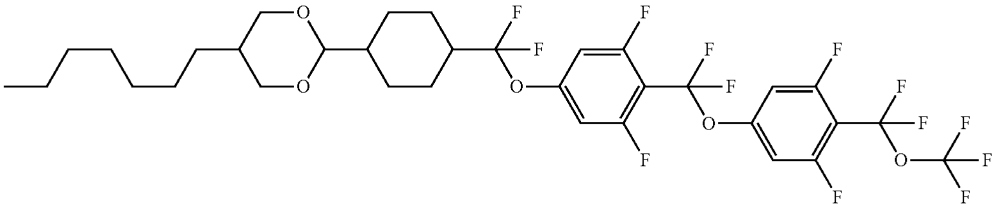 [SMILES: CCCCCCCC1COC(C2CCC(C(F)(F)Oc3cc(F)c(C(F)(F)Oc4cc(F)c(C(F)(F)OC(F)(F)F)c(F)c4)c(F)c3)CC2)OC1] |

-continued
| No. | |
|---|---|
| 361 | 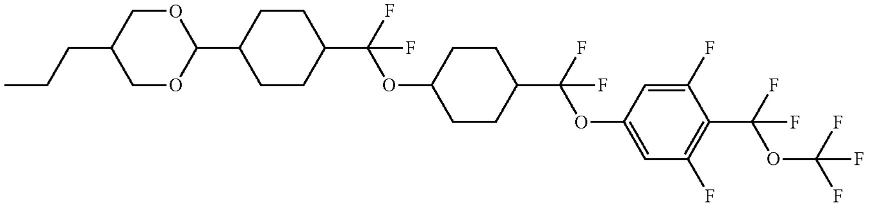 |
| 362 | 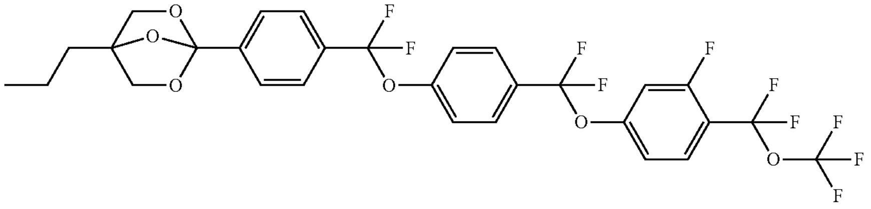 [SMILES: CCCC12COC(c3ccc(C(F)(F)Oc4ccc(C(F)(F)Oc5ccc(C(F)(F)OC(F)(F)F)c(F)c5)cc4)cc3)(OC1)O2] |
| 363 | 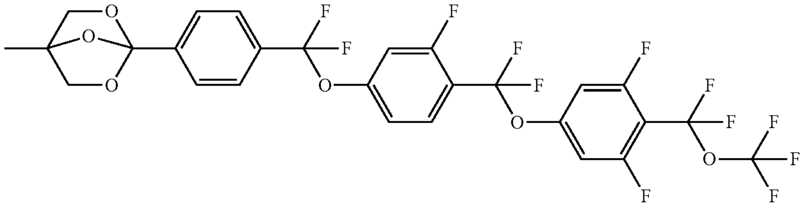 [SMILES: CC12COC(c3ccc(C(F)(F)Oc4ccc(C(F)(F)Oc5cc(F)c(C(F)(F)OC(F)(F)F)c(F)c5)c(F)c4)cc3)(OC1)O2] |
| 364 | 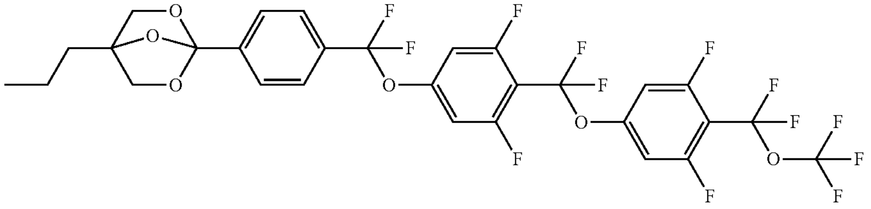 |
| 365 | 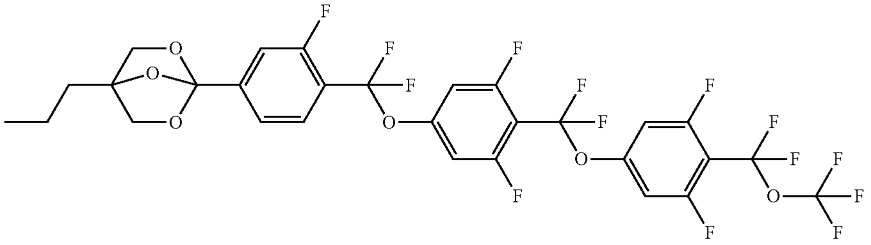 [SMILES: CCCC12COC(c3ccc(C(F)(F)Oc4cc(F)c(C(F)(F)Oc5cc(F)c(C(F)(F)OC(F)(F)F)c(F)c5)c(F)c4)c(F)c3)(OC1)O2] |
| 366 | 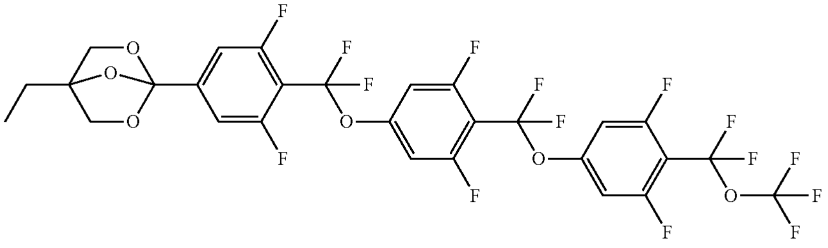 [SMILES: CCC12COC(c3cc(F)c(C(F)(F)Oc4cc(F)c(C(F)(F)Oc5cc(F)c(C(F)(F)OC(F)(F)F)c(F)c5)c(F)c4)c(F)c3)(OC1)O2] |
| 367 | 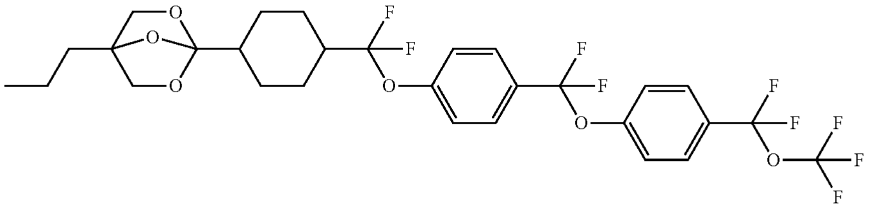 [SMILES: CCCC12COC(C3CCC(C(F)(F)Oc4ccc(C(F)(F)Oc5ccc(C(F)(F)OC(F)(F)F)cc5)cc4)CC3)(OC1)O2] |

-continued
| No. | |
|---|---|
| 368 | 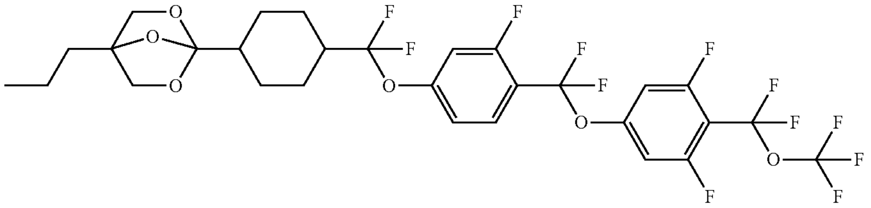 [SMILES: CCCC12COC(C3CCC(C(F)(F)Oc4ccc(C(F)(F)Oc5cc(F)c(C(F)(F)OC(F)(F)F)c(F)c5)c(F)c4)CC3)(OC1)O2] |
| 369 | 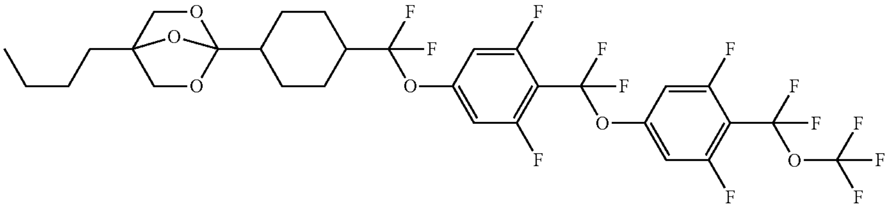 [SMILES: CCCCC12COC(C3CCC(C(F)(F)Oc4cc(F)c(C(F)(F)Oc5cc(F)c(C(F)(F)OC(F)(F)F)c(F)c5)c(F)c4)CC3)(OC1)O2] |
| 370 | 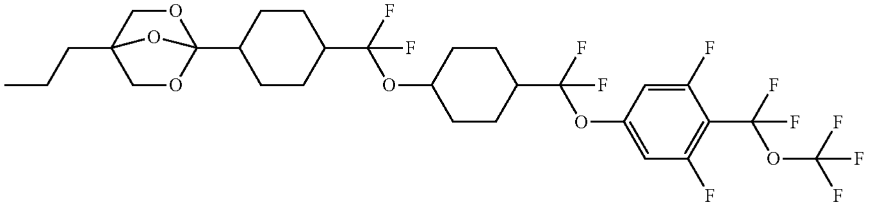 [SMILES: CCCC12COC(C3CCC(C(F)(F)OC4CCC(C(F)(F)Oc5cc(F)c(C(F)(F)OC(F)(F)F)c(F)c5)CC4)CC3)(OC1)O2] |
| 371 | 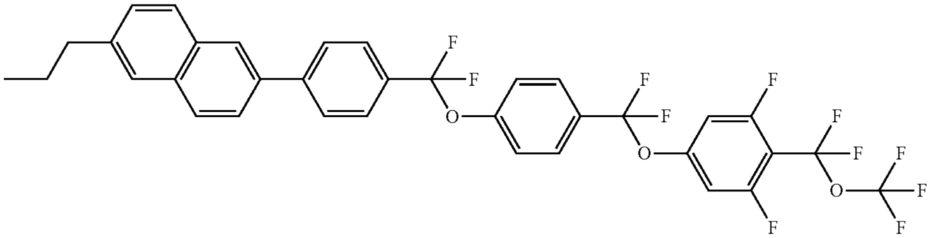 [SMILES: CCCc1ccc2cc(-c3ccc(C(F)(F)Oc4ccc(C(F)(F)Oc5cc(F)c(C(F)(F)OC(F)(F)F)c(F)c5)cc4)cc3)ccc2c1] |
| 372 | 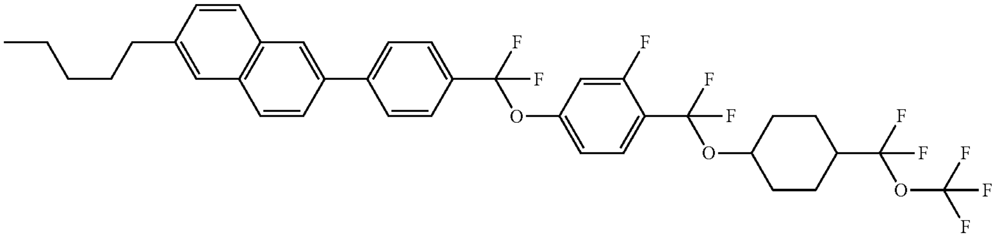 [SMILES: CCCCCc1ccc2cc(-c3ccc(C(F)(F)Oc4ccc(C(F)(F)OC5CCC(C(F)(F)OC(F)(F)F)CC5)c(F)c4)cc3)ccc2c1] |
| 373 | 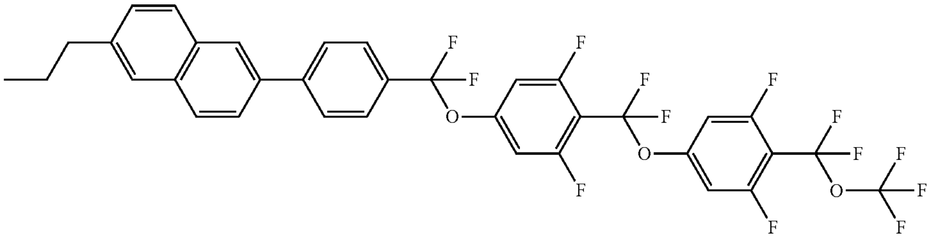 [SMILES: CCCc1ccc2cc(-c3ccc(C(F)(F)Oc4cc(F)c(C(F)(F)Oc5cc(F)c(C(F)(F)OC(F)(F)F)c(F)c5)c(F)c4)cc3)ccc2c1] |

-continued
| No. | |
|---|---|
| 374 | 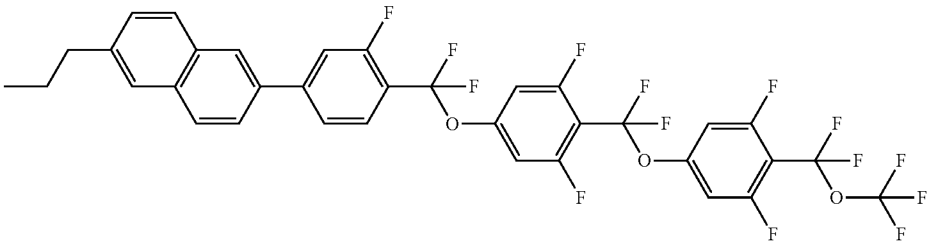 [SMILES: CCCc1ccc2cc(-c3ccc(C(F)(F)Oc4cc(F)c(C(F)(F)Oc5cc(F)c(C(F)(F)OC(F)(F)F)c(F)c5)c(F)c4)c(F)c3)ccc2c1] |
| 375 | 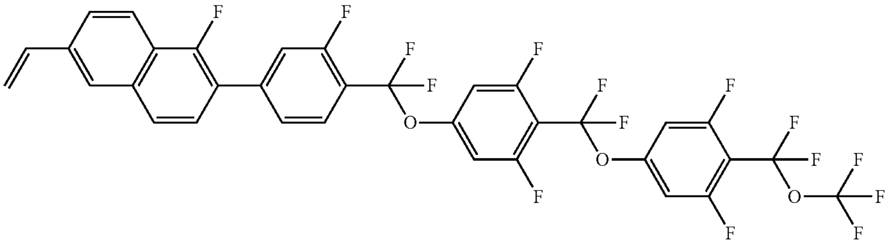 [SMILES: C=Cc1ccc2c(F)c(-c3ccc(C(F)(F)Oc4cc(F)c(C(F)(F)Oc5cc(F)c(C(F)(F)OC(F)(F)F)c(F)c5)c(F)c4)c(F)c3)ccc2c1] |
| 376 | 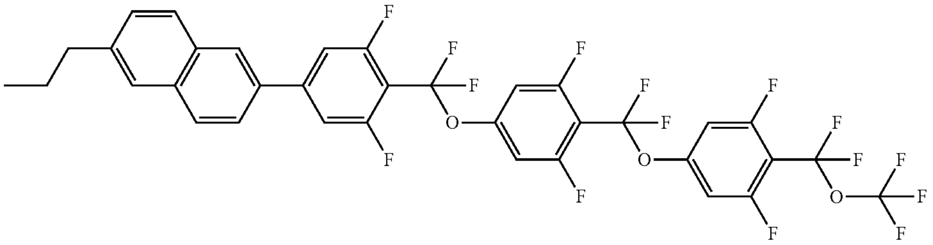 [SMILES: CCCc1ccc2cc(-c3cc(F)c(C(F)(F)Oc4cc(F)c(C(F)(F)Oc5cc(F)c(C(F)(F)OC(F)(F)F)c(F)c5)c(F)c4)c(F)c3)ccc2c1] |
| 377 | 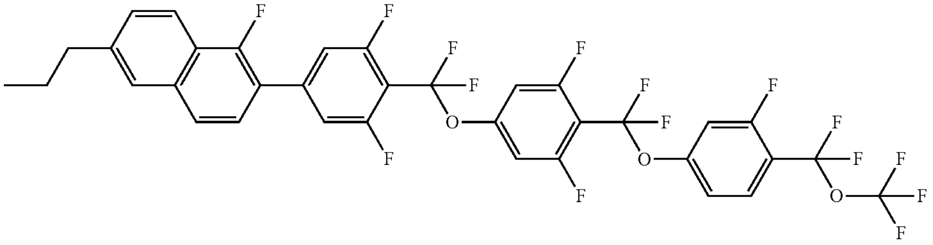 |
| 378 | 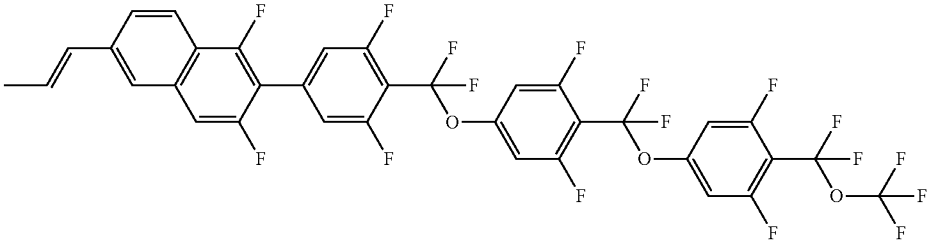 [SMILES: C/C=C/c1ccc2c(F)c(-c3cc(F)c(C(F)(F)Oc4cc(F)c(C(F)(F)Oc5cc(F)c(C(F)(F)OC(F)(F)F)c(F)c5)c(F)c4)c(F)c3)c(F)cc2c1] |
| 379 | 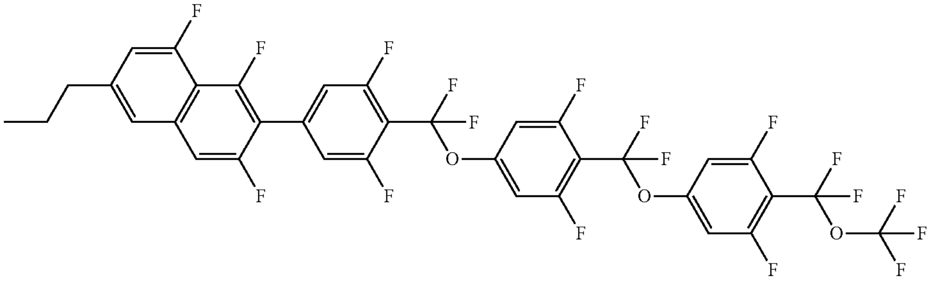 [SMILES: CCCc1cc(F)c2c(F)c(-c3cc(F)c(C(F)(F)Oc4cc(F)c(C(F)(F)Oc5cc(F)c(C(F)(F)OC(F)(F)F)c(F)c5)c(F)c4)c(F)c3)c(F)cc2c1] |

-continued
| No. | |
|---|---|
| 380 | 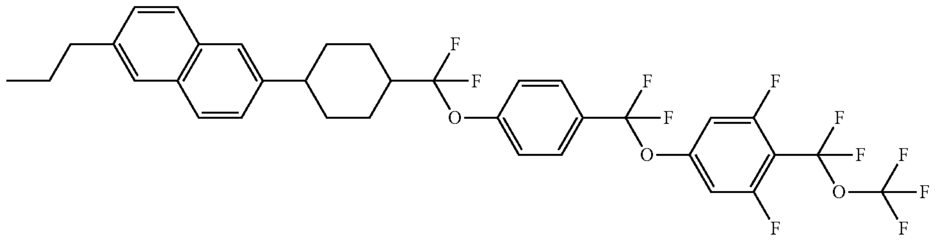 [SMILES: CCCc1ccc2cc(C3CCC(C(F)(F)Oc4ccc(C(F)(F)Oc5cc(F)c(C(F)(F)OC(F)(F)F)c(F)c5)cc4)CC3)ccc2c1] |
| 381 | 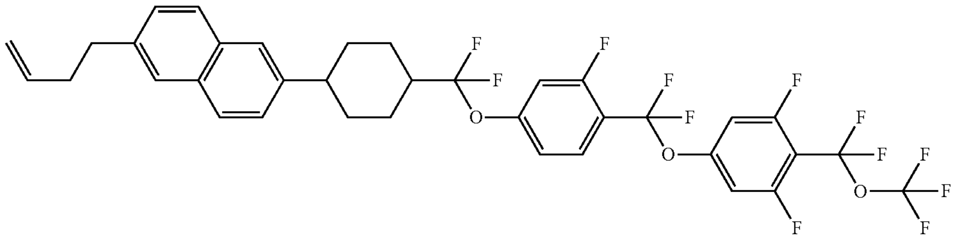 [SMILES: C=CCCc1ccc2cc(C3CCC(C(F)(F)Oc4ccc(C(F)(F)Oc5cc(F)c(C(F)(F)OC(F)(F)F)c(F)c5)c(F)c4)CC3)ccc2c1] |
| 382 | 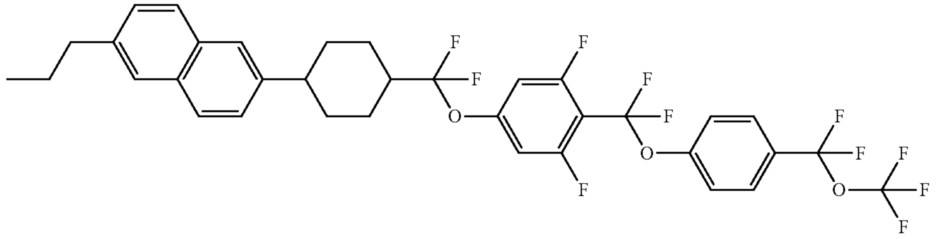 |
| 383 | 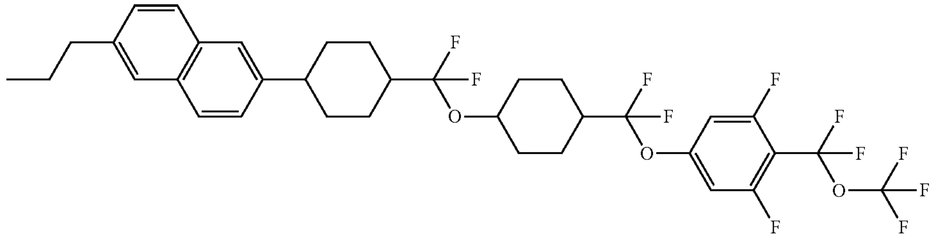 [SMILES: CCCc1ccc2cc(C3CCC(C(F)(F)OC4CCC(C(F)(F)Oc5cc(F)c(C(F)(F)OC(F)(F)F)c(F)c5)CC4)CC3)ccc2c1] |
| 384 | 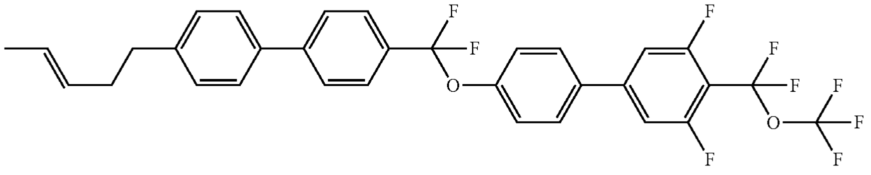 [SMILES: C/C=C/CCc1ccc(-c2ccc(C(F)(F)Oc3ccc(-c4cc(F)c(C(F)(F)OC(F)(F)F)c(F)c4)cc3)cc2)cc1] |
| 385 | 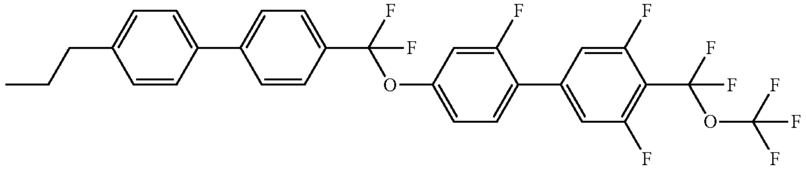 [SMILES: CCCc1ccc(-c2ccc(C(F)(F)Oc3ccc(-c4cc(F)c(C(F)(F)OC(F)(F)F)c(F)c4)c(F)c3)cc2)cc1] |
| 386 | 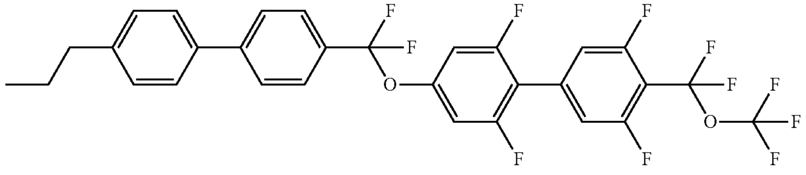 |

-continued
| No. | |
|---|---|
| 387 | 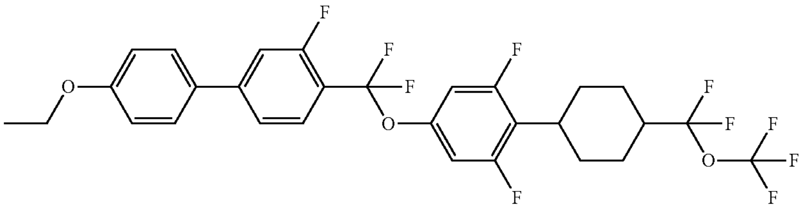 [SMILES: CCOc1ccc(-c2ccc(C(F)(F)Oc3cc(F)c(C4CCC(C(F)(F)OC(F)(F)F)CC4)c(F)c3)c(F)c2)cc1] |
| 388 | 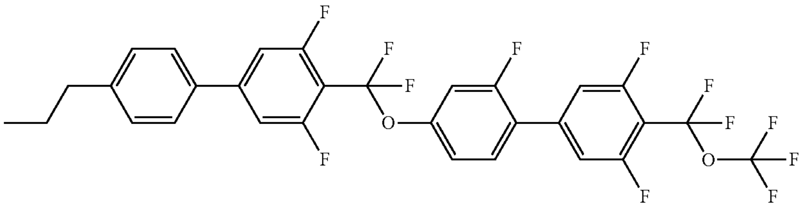 [SMILES: CCCc1ccc(-c2cc(F)c(C(F)(F)Oc3ccc(-c4cc(F)c(C(F)(F)OC(F)(F)F)c(F)c4)c(F)c3)c(F)c2)cc1] |
| 389 | 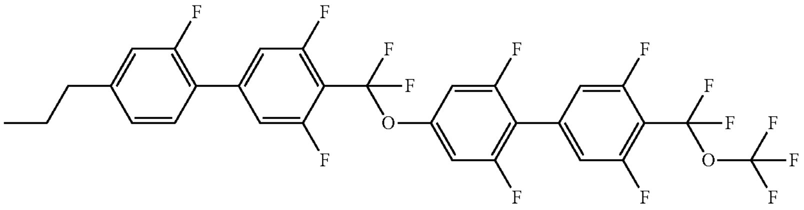 |
| 390 | 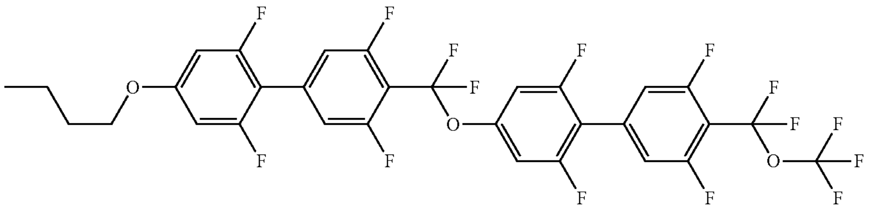 |
| 391 | 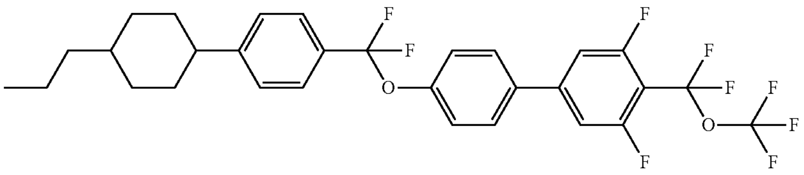 |
| 392 | 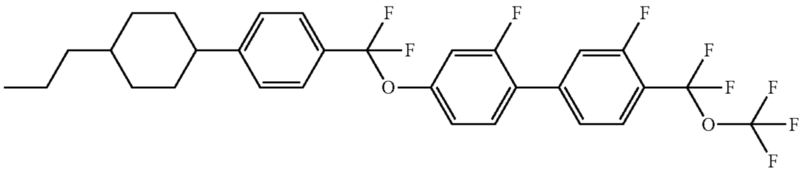 |
| 393 | 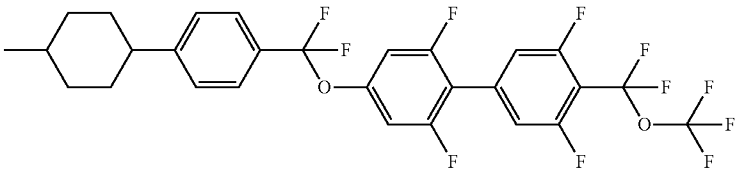 [SMILES: CC1CCC(c2ccc(C(F)(F)Oc3cc(F)c(-c4cc(F)c(C(F)(F)OC(F)(F)F)c(F)c4)c(F)c3)cc2)CC1] |

-continued
| No. | |
|---|---|
| 394 | 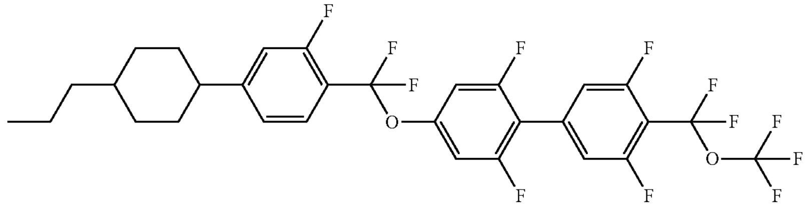 |
| 395 | 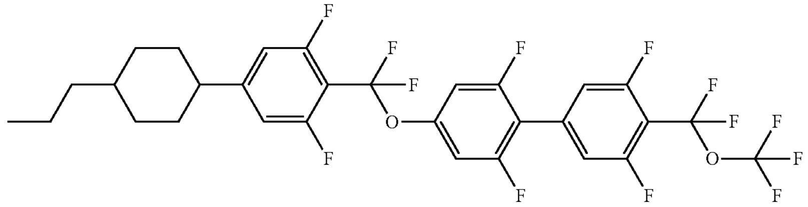 [SMILES: CCCC1CCC(c2cc(F)c(C(F)(F)Oc3cc(F)c(-c4cc(F)c(C(F)(F)OC(F)(F)F)c(F)c4)c(F)c3)c(F)c2)CC1] |
| 396 | 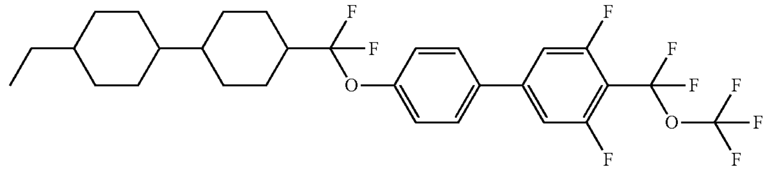 [SMILES: CCC1CCC(C2CCC(C(F)(F)Oc3ccc(-c4cc(F)c(C(F)(F)OC(F)(F)F)c(F)c4)cc3)CC2)CC1] |
| 397 | 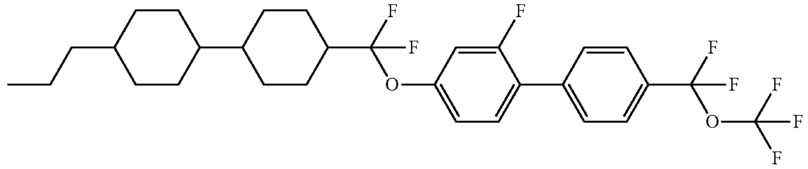 [SMILES: CCCC1CCC(C2CCC(C(F)(F)Oc3ccc(-c4ccc(C(F)(F)OC(F)(F)F)cc4)c(F)c3)CC2)CC1] |
| 398 | 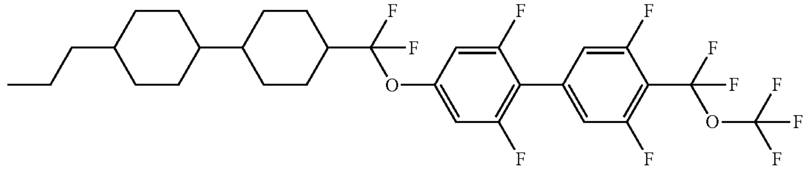 |
| 399 | 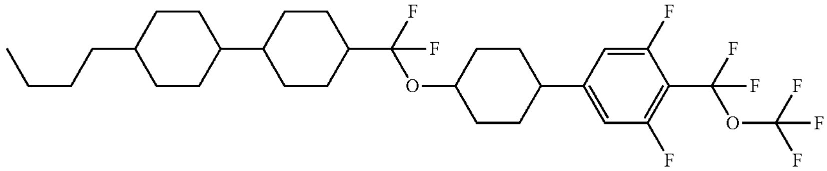 |
| 400 | 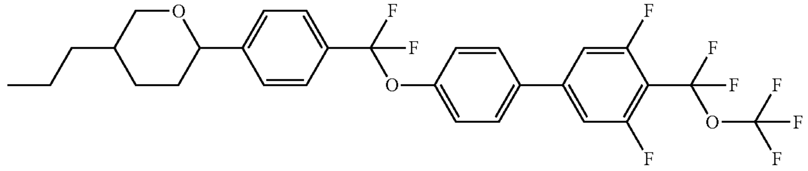 |
| 401 | 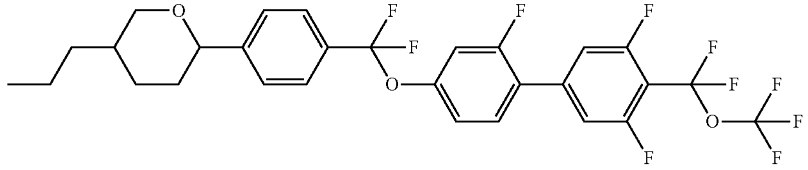 |

-continued
| No. | |
|---|---|
| 402 | 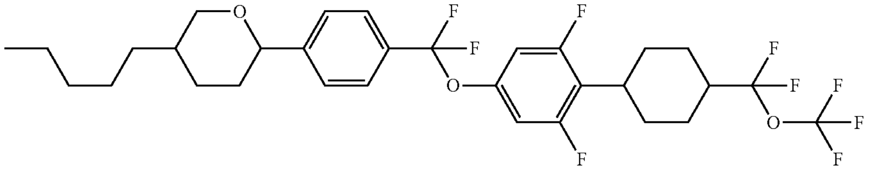 [SMILES: CCCCCC1CCC(c2ccc(C(F)(F)Oc3cc(F)c(C4CCC(C(F)(F)OC(F)(F)F)CC4)c(F)c3)cc2)OC1] |
| 403 | 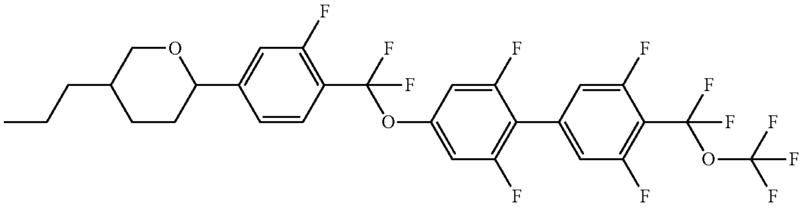 [SMILES: CCCC1CCC(c2ccc(C(F)(F)Oc3cc(F)c(-c4cc(F)c(C(F)(F)OC(F)(F)F)c(F)c4)c(F)c3)c(F)c2)OC1] |
| 404 | 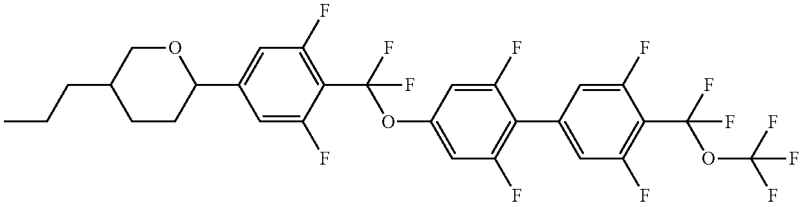 |
| 405 | 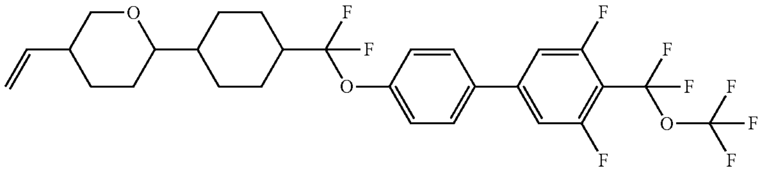 |
| 406 | 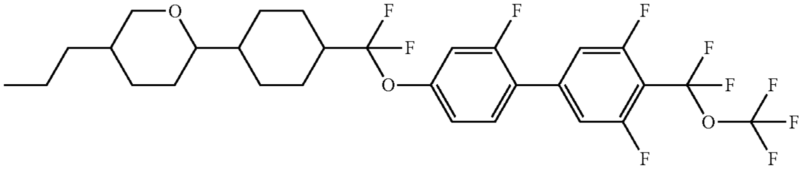 |
| 407 | 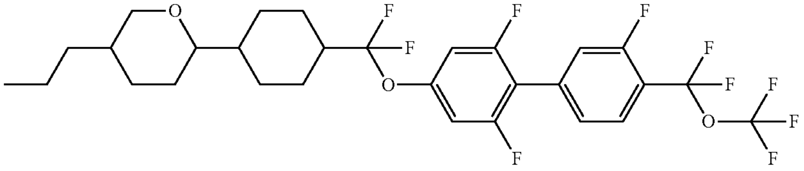 [SMILES: CCCC1CCC(C2CCC(C(F)(F)Oc3cc(F)c(-c4ccc(C(F)(F)OC(F)(F)F)c(F)c4)c(F)c3)CC2)OC1] |
| 408 | 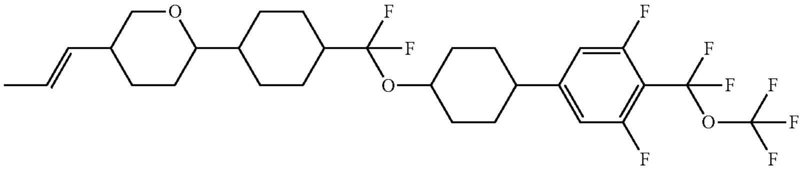 [SMILES: C/C=C/C1CCC(C2CCC(C(F)(F)OC3CCC(c4cc(F)c(C(F)(F)OC(F)(F)F)c(F)c4)CC3)CC2)OC1] |
| 409 | 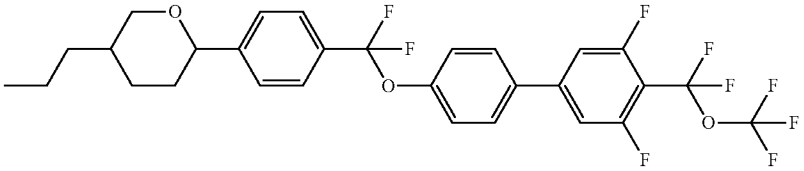 [SMILES: CCCC1CCC(c2ccc(C(F)(F)Oc3ccc(-c4cc(F)c(C(F)(F)OC(F)(F)F)c(F)c4)cc3)cc2)OC1] |

-continued
| No. | |
|---|---|
| 410 | 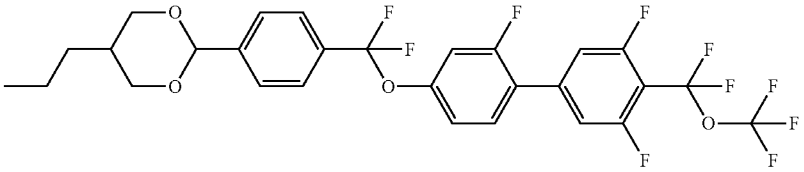 |
| 411 | 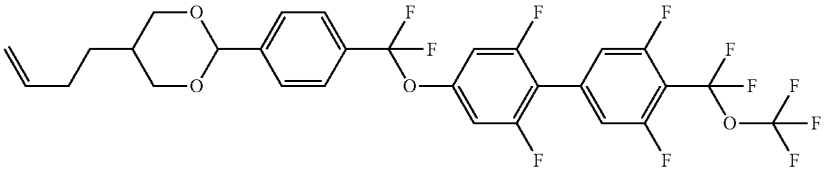 [SMILES: C=CCCC1COC(c2ccc(C(F)(F)Oc3cc(F)c(-c4cc(F)c(C(F)(F)OC(F)(F)F)c(F)c4)c(F)c3)cc2)OC1] |
| 412 | 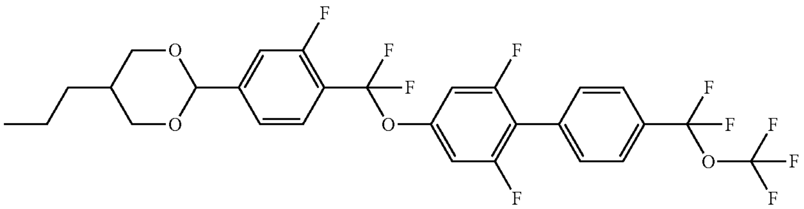 [SMILES: CCCC1COC(c2ccc(C(F)(F)Oc3cc(F)c(-c4ccc(C(F)(F)OC(F)(F)F)cc4)c(F)c3)c(F)c2)OC1] |
| 413 | 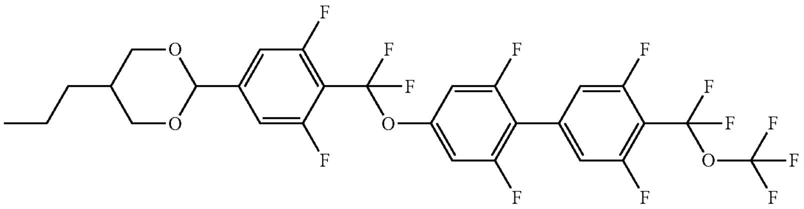 |
| 414 | 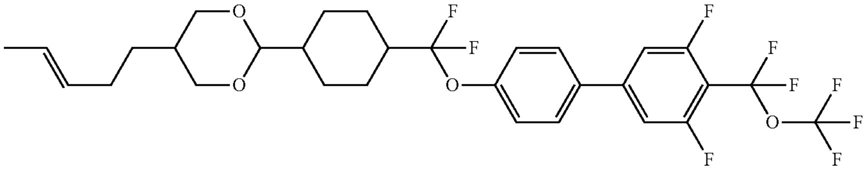 [SMILES: C/C=C/CCC1COC(C2CCC(C(F)(F)Oc3ccc(-c4cc(F)c(C(F)(F)OC(F)(F)F)c(F)c4)cc3)CC2)OC1] |
| 415 | 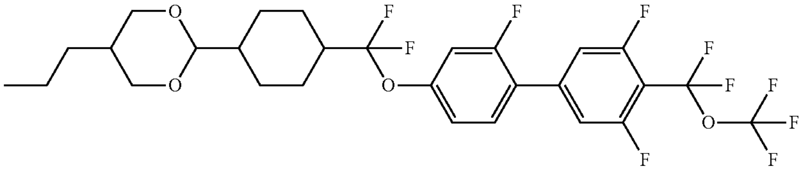 [SMILES: CCCC1COC(C2CCC(C(F)(F)Oc3ccc(-c4cc(F)c(C(F)(F)OC(F)(F)F)c(F)c4)c(F)c3)CC2)OC1] |
| 416 | 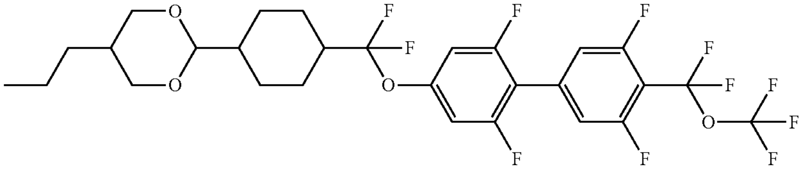 [SMILES: CCCC1COC(C2CCC(C(F)(F)Oc3cc(F)c(-c4cc(F)c(C(F)(F)OC(F)(F)F)c(F)c4)c(F)c3)CC2)OC1] |
| 417 | 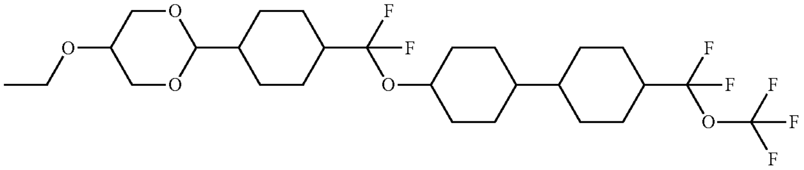 [SMILES: CCOC1COC(C2CCC(C(F)(F)OC3CCC(C4CCC(C(F)(F)OC(F)(F)F)CC4)CC3)CC2)OC1] |

-continued
| No. | |
|---|---|
| 418 | 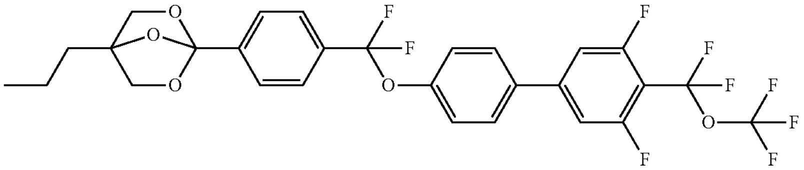 |
| 419 | 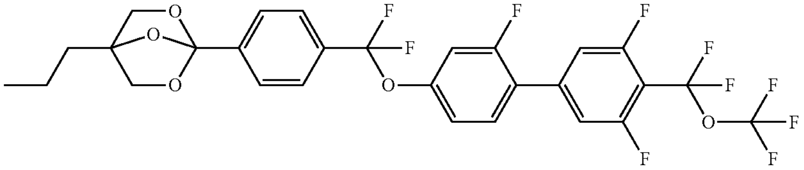 [SMILES: CCCC12COC(c3ccc(C(F)(F)Oc4ccc(-c5cc(F)c(C(F)(F)OC(F)(F)F)c(F)c5)c(F)c4)cc3)(OC1)O2] |
| 420 | 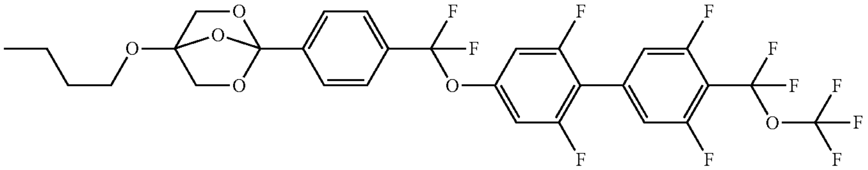 [SMILES: CCCCOC12COC(c3ccc(C(F)(F)Oc4cc(F)c(-c5cc(F)c(C(F)(F)OC(F)(F)F)c(F)c5)c(F)c4)cc3)(OC1)O2] |
| 421 | 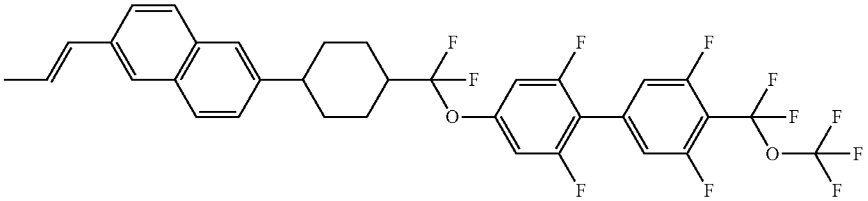 |
| 422 | 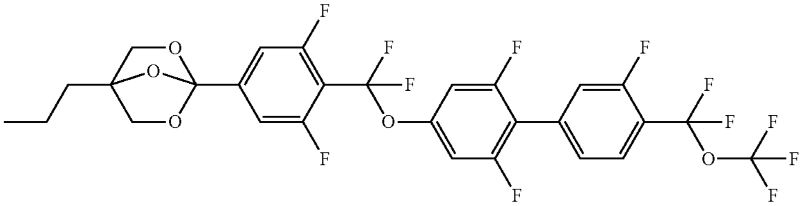 [SMILES: CCCC12COC(c3cc(F)c(C(F)(F)Oc4cc(F)c(-c5ccc(C(F)(F)OC(F)(F)F)c(F)c5)c(F)c4)c(F)c3)(OC1)O2] |
| 423 | 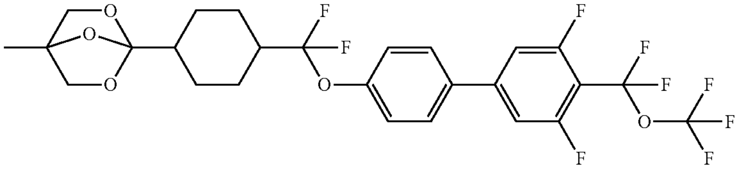 [SMILES: CC12COC(C3CCC(C(F)(F)Oc4ccc(-c5cc(F)c(C(F)(F)OC(F)(F)F)c(F)c5)cc4)CC3)(OC1)O2] |
| 424 | 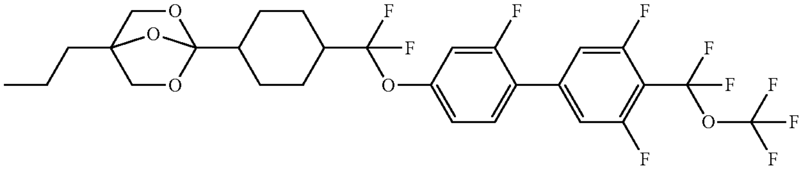 [SMILES: CCCC12COC(C3CCC(C(F)(F)Oc4ccc(-c5cc(F)c(C(F)(F)OC(F)(F)F)c(F)c5)c(F)c4)CC3)(OC1)O2] |
| 425 | 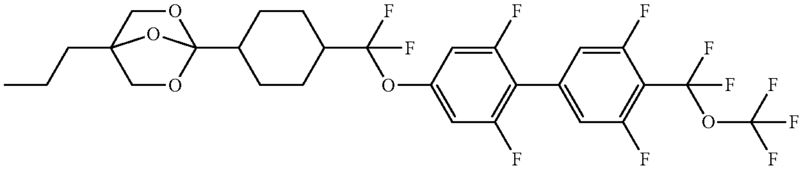 [SMILES: CCCC12COC(C3CCC(C(F)(F)Oc4cc(F)c(-c5cc(F)c(C(F)(F)OC(F)(F)F)c(F)c5)c(F)c4)CC3)(OC1)O2] |

-continued
| No. | |
|---|---|
| 426 | 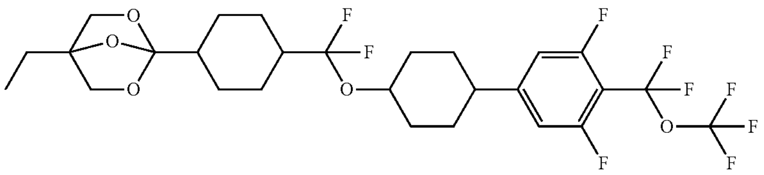 [SMILES: CCC12COC(C3CCC(C(F)(F)OC4CCC(c5cc(F)c(C(F)(F)OC(F)(F)F)c(F)c5)CC4)CC3)(OC1)O2] |
| 427 | 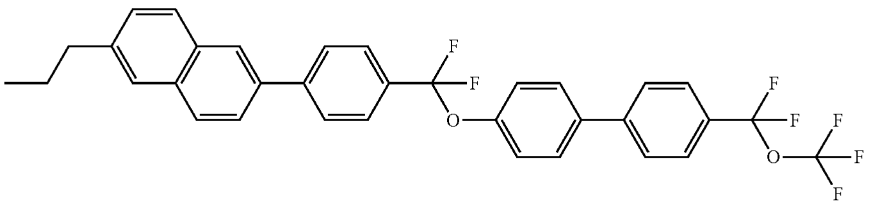 [SMILES: CCCc1ccc2cc(-c3ccc(C(F)(F)Oc4ccc(-c5ccc(C(F)(F)OC(F)(F)F)cc5)cc4)cc3)ccc2c1] |
| 428 | 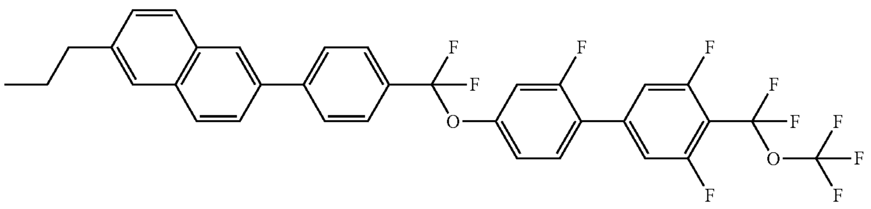 [SMILES: CCCc1ccc2cc(-c3ccc(C(F)(F)Oc4ccc(-c5cc(F)c(C(F)(F)OC(F)(F)F)c(F)c5)c(F)c4)cc3)ccc2c1] |
| 429 | 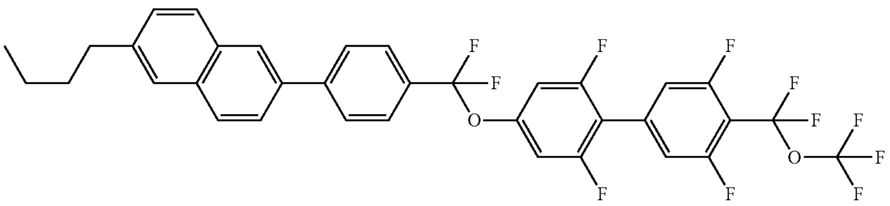 [SMILES: CCCCc1ccc2cc(-c3ccc(C(F)(F)Oc4cc(F)c(-c5cc(F)c(C(F)(F)OC(F)(F)F)c(F)c5)c(F)c4)cc3)ccc2c1] |
| 430 | 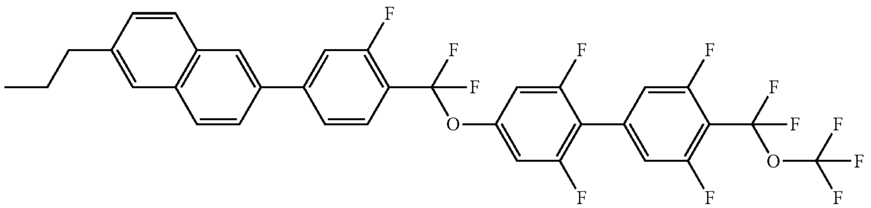 [SMILES: CCCc1ccc2cc(-c3ccc(C(F)(F)Oc4cc(F)c(-c5cc(F)c(C(F)(F)OC(F)(F)F)c(F)c5)c(F)c4)c(F)c3)ccc2c1] |
| 431 | 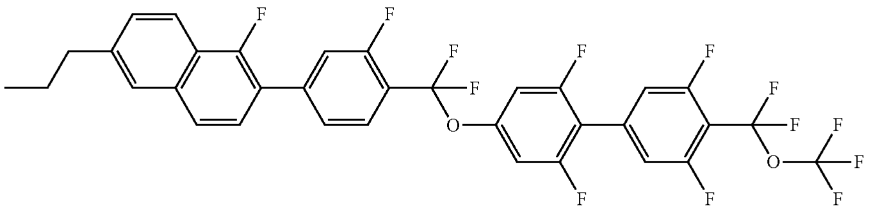 |
| 432 | 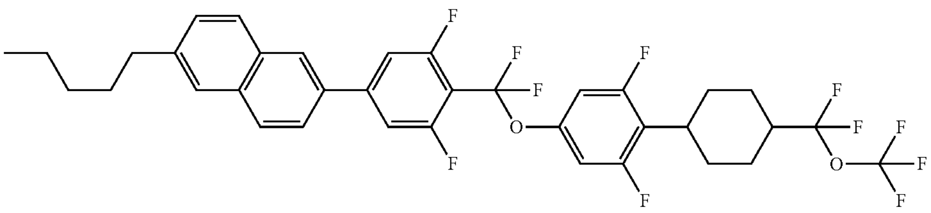 [SMILES: CCCCCc1ccc2cc(-c3cc(F)c(C(F)(F)Oc4cc(F)c(C5CCC(C(F)(F)OC(F)(F)F)CC5)c(F)c4)c(F)c3)ccc2c1] |

-continued
| No. | |
|---|---|
| 433 | 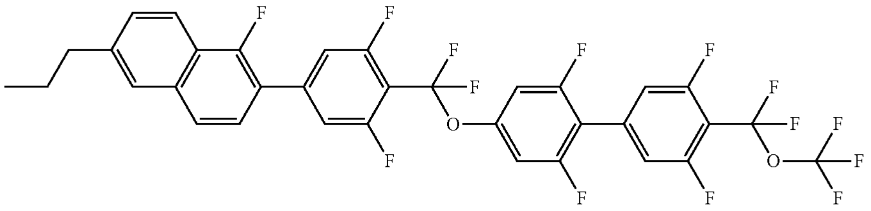 |
| 434 | 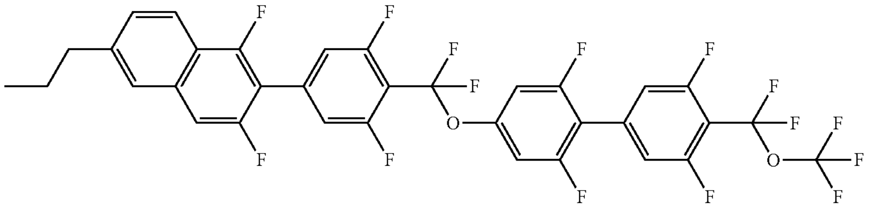 |
| 435 | 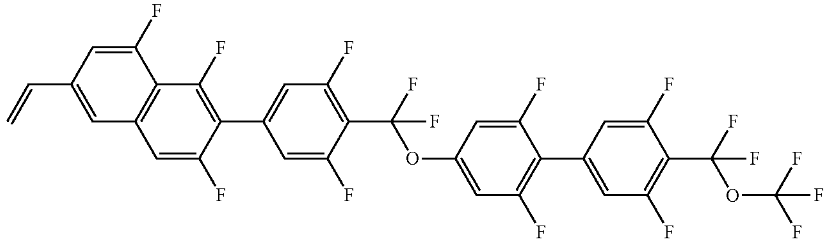 [SMILES: C=Cc1cc(F)c2c(F)c(-c3cc(F)c(C(F)(F)Oc4cc(F)c(-c5cc(F)c(C(F)(F)OC(F)(F)F)c(F)c5)c(F)c4)c(F)c3)c(F)cc2c1] |
| 436 | 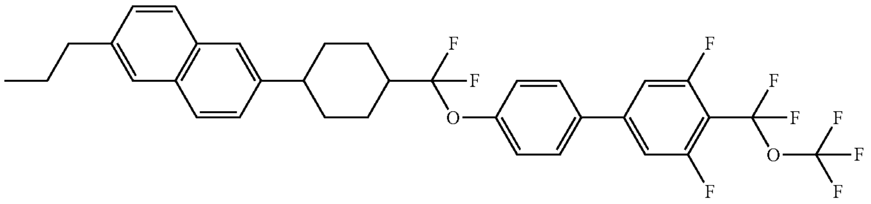 [SMILES: CCCc1ccc2cc(C3CCC(C(F)(F)Oc4ccc(-c5cc(F)c(C(F)(F)OC(F)(F)F)c(F)c5)cc4)CC3)ccc2c1] |
| 437 | 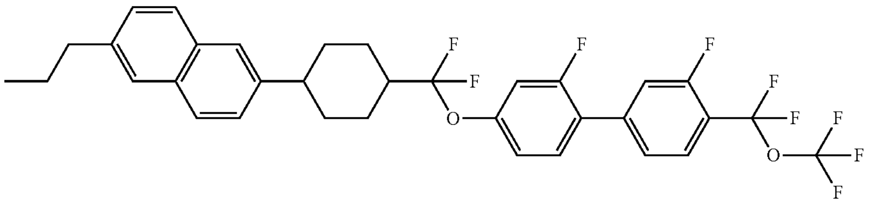 |
| 438 | 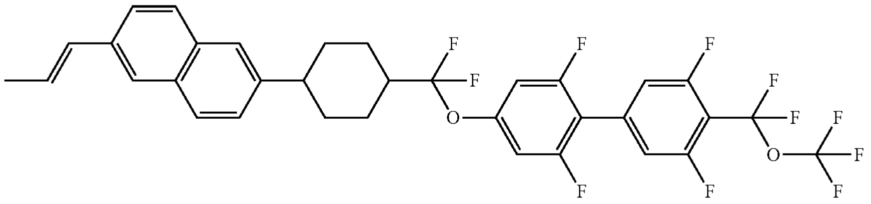 [SMILES: C/C=C/c1ccc2cc(C3CCC(C(F)(F)Oc4cc(F)c(-c5cc(F)c(C(F)(F)OC(F)(F)F)c(F)c5)c(F)c4)CC3)ccc2c1] |
| 439 | 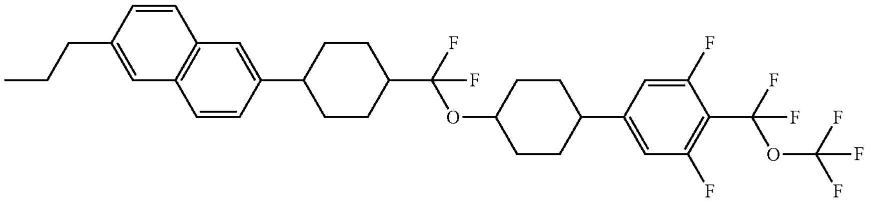 [SMILES: CCCc1ccc2cc(C3CCC(C(F)(F)OC4CCC(c5cc(F)c(C(F)(F)OC(F)(F)F)c(F)c5)CC4)CC3)ccc2c1] |

-continued
| No. | |
| --- | --- |
| 440 | 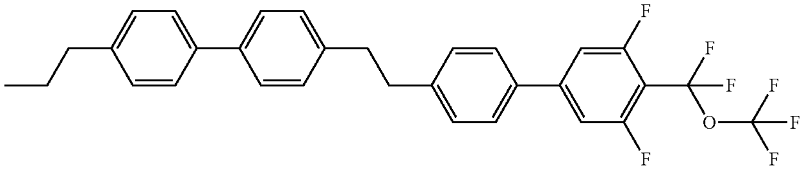 |
| 441 | 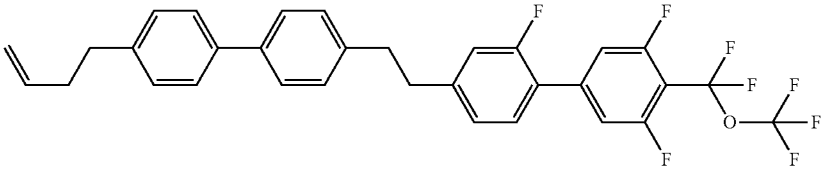 [SMILES: C=CCCc1ccc(-c2ccc(CCc3ccc(-c4cc(F)c(C(F)(F)OC(F)(F)F)c(F)c4)c(F)c3)cc2)cc1] |
| 442 | 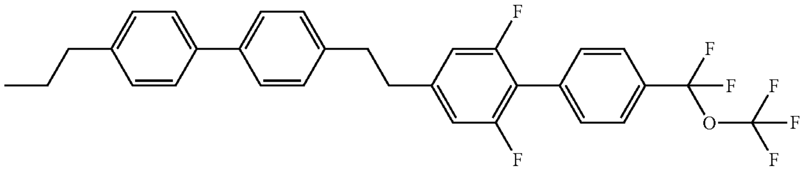 |
| 443 | 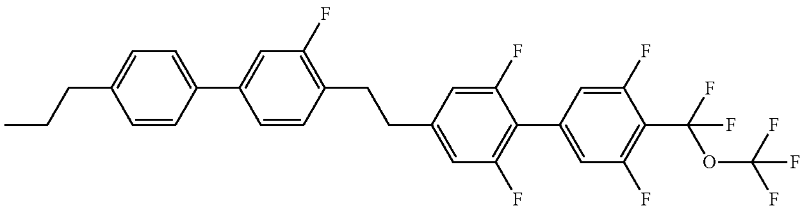 |
| 444 | 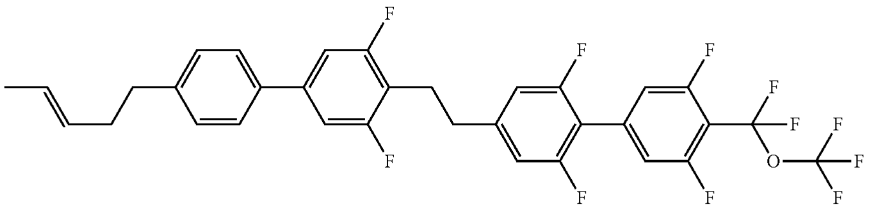 [SMILES: C/C=C/CCc1ccc(-c2cc(F)c(CCc3cc(F)c(-c4cc(F)c(C(F)(F)OC(F)(F)F)c(F)c4)c(F)c3)c(F)c2)cc1] |
| 445 | 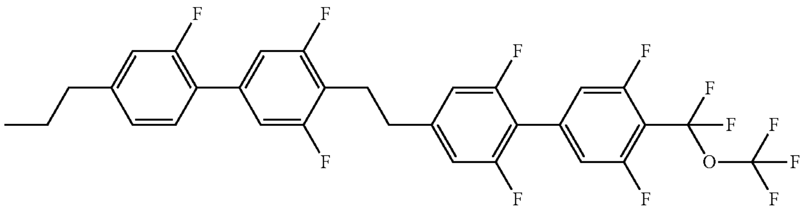 [SMILES: CCCc1ccc(-c2cc(F)c(CCc3cc(F)c(-c4cc(F)c(C(F)(F)OC(F)(F)F)c(F)c4)c(F)c3)c(F)c2)c(F)c1] |
| 446 | 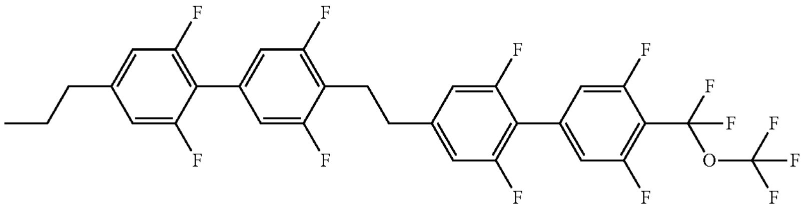 |
| 447 | 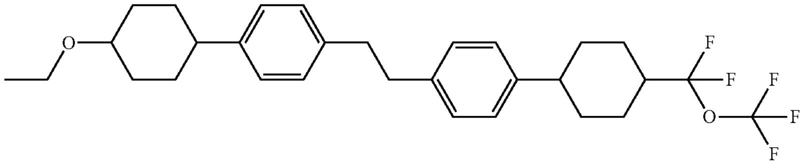 [SMILES: CCOC1CCC(c2ccc(CCc3ccc(C4CCC(C(F)(F)OC(F)(F)F)CC4)cc3)cc2)CC1] |

-continued
| No. | |
|---|---|
| 448 | 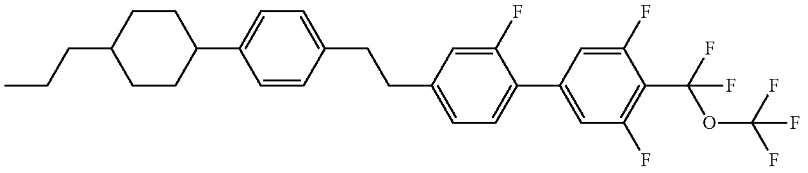 [SMILES: CCCC1CCC(c2ccc(CCc3cc(F)c(-c4cc(F)c(C(F)(F)OC(F)(F)F)c(F)c4)c(F)c3)cc2)CC1] |
| 449 | 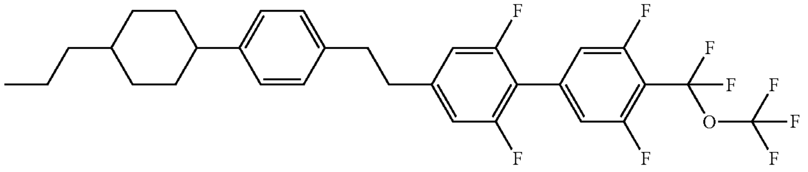 |
| 450 | 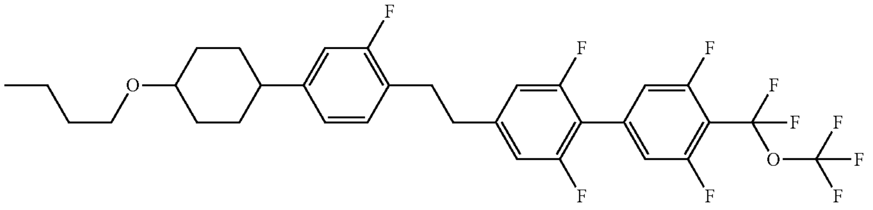 [SMILES: CCCCOC1CCC(c2ccc(CCc3cc(F)c(-c4cc(F)c(C(F)(F)OC(F)(F)F)c(F)c4)c(F)c3)c(F)c2)CC1] |
| 451 | 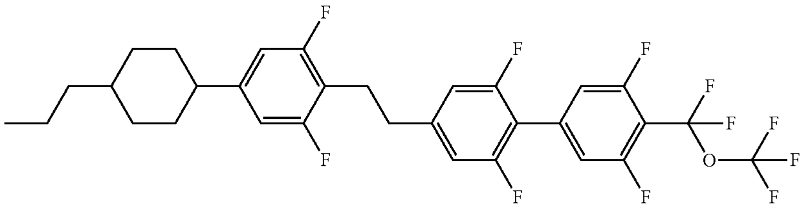 [SMILES: CCCC1CCC(c2cc(F)c(CCc3cc(F)c(-c4cc(F)c(C(F)(F)OC(F)(F)F)c(F)c4)c(F)c3)c(F)c2)CC1] |
| 452 | 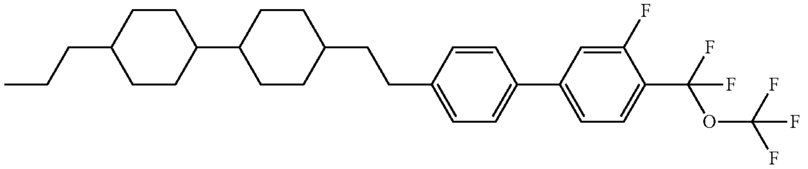 [SMILES: CCCC1CCC(C2CCC(CCc3ccc(-c4ccc(C(F)(F)OC(F)(F)F)c(F)c4)cc3)CC2)CC1] |
| 453 | 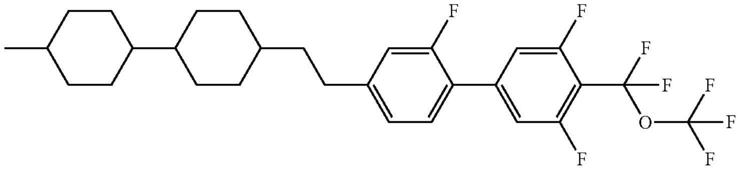 [SMILES: CC1CCC(C2CCC(CCc3ccc(-c4cc(F)c(C(F)(F)OC(F)(F)F)c(F)c4)c(F)c3)CC2)CC1] |
| 454 | 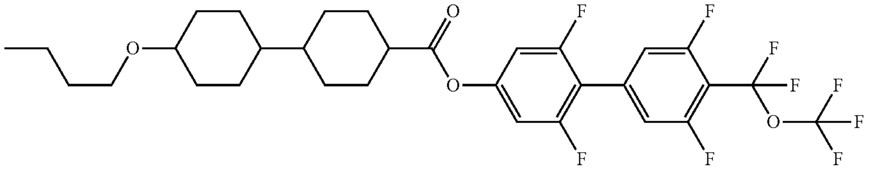 |
| 455 | 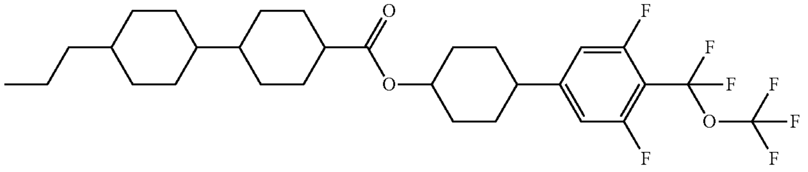 |

-continued
| No. | |
|---|---|
| 456 | 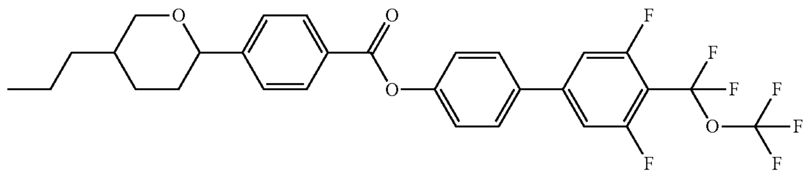 |
| 457 | 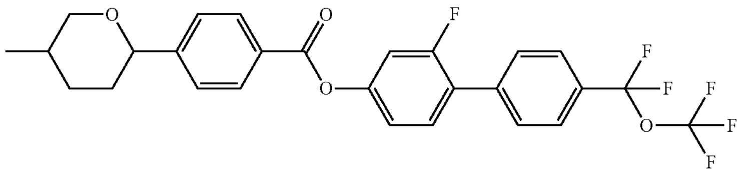 [SMILES: CC1CCC(c2ccc(C(=O)Oc3ccc(-c4ccc(C(F)(F)OC(F)(F)F)cc4)c(F)c3)cc2)OC1] |
| 458 | 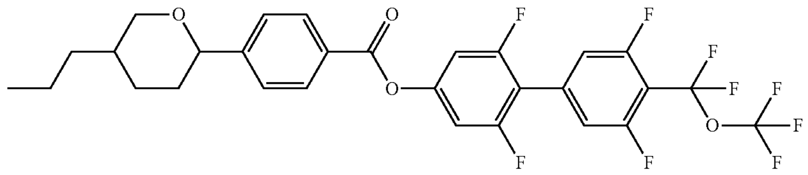 |
| 459 | 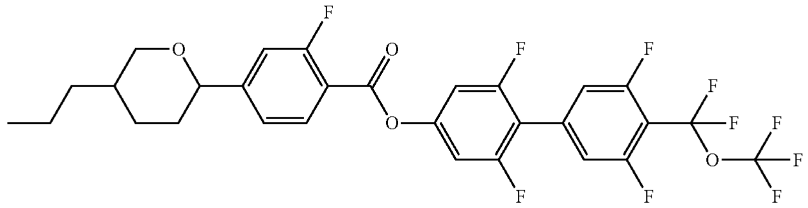 [SMILES: CCCC1CCC(c2ccc(C(=O)Oc3cc(F)c(-c4cc(F)c(C(F)(F)OC(F)(F)F)c(F)c4)c(F)c3)c(F)c2)OC1] |
| 460 | 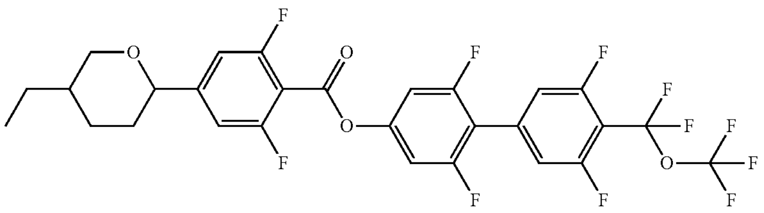 [SMILES: CCC1CCC(c2cc(F)c(C(=O)Oc3cc(F)c(-c4cc(F)c(C(F)(F)OC(F)(F)F)c(F)c4)c(F)c3)c(F)c2)OC1] |
| 461 | 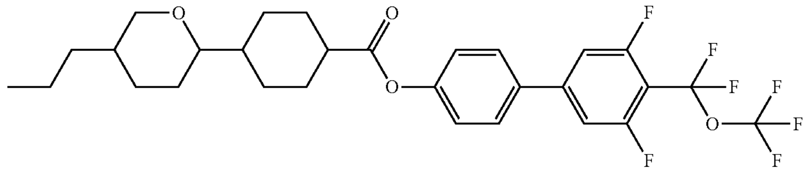 [SMILES: CCCC1CCC(C2CCC(C(=O)Oc3ccc(-c4cc(F)c(C(F)(F)OC(F)(F)F)c(F)c4)cc3)CC2)OC1] |
| 462 | 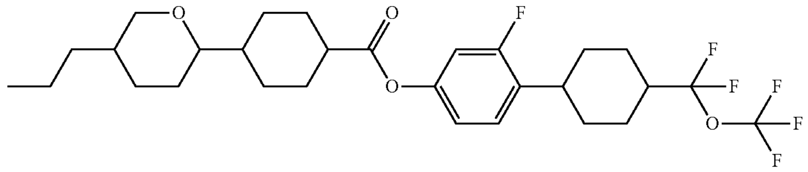 [SMILES: CCCC1CCC(C2CCC(C(=O)Oc3ccc(C4CCC(C(F)(F)OC(F)(F)F)CC4)c(F)c3)CC2)OC1] |
| 463 | 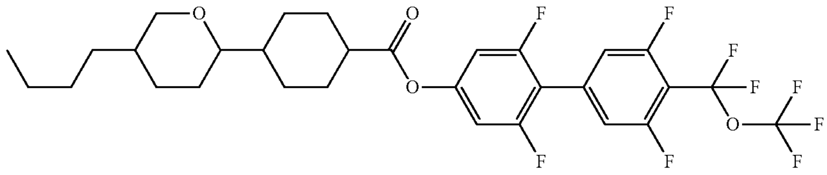 [SMILES: CCCCC1CCC(C2CCC(C(=O)Oc3cc(F)c(-c4cc(F)c(C(F)(F)OC(F)(F)F)c(F)c4)c(F)c3)CC2)OC1] |

-continued
| No. | |
|---|---|
| 464 | 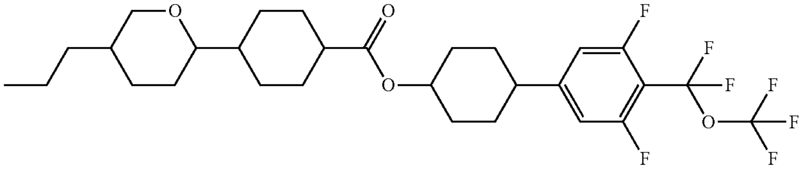 |
| 465 | 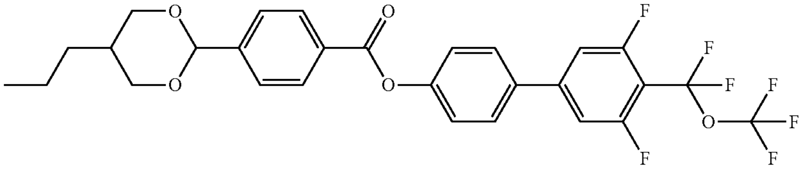 [SMILES: CCCC1COC(c2ccc(C(=O)Oc3ccc(-c4cc(F)c(C(F)(F)OC(F)(F)F)c(F)c4)cc3)cc2)OC1] |
| 466 | 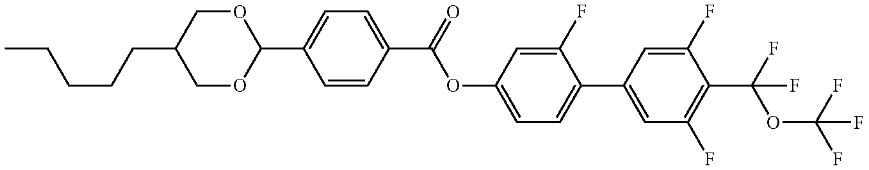 [SMILES: CCCCCC1COC(c2ccc(C(=O)Oc3ccc(-c4cc(F)c(C(F)(F)OC(F)(F)F)c(F)c4)c(F)c3)cc2)OC1] |
| 467 | 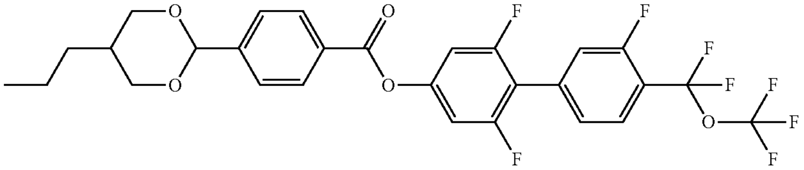 |
| 468 | 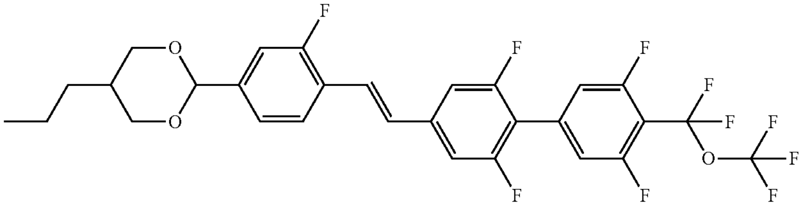 |
| 469 | 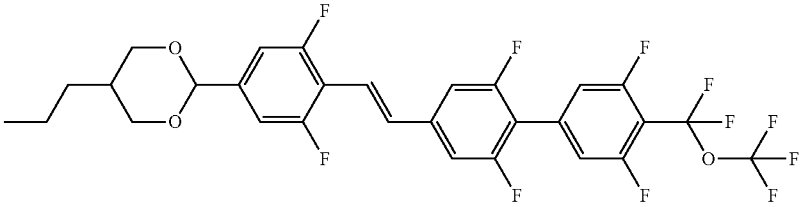 [SMILES: CCCC1COC(c2cc(F)c(/C=C/c3cc(F)c(-c4cc(F)c(C(F)(F)OC(F)(F)F)c(F)c4)c(F)c3)c(F)c2)OC1] |
| 470 | 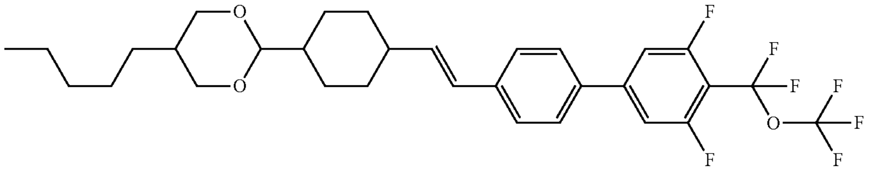 [SMILES: CCCCCC1COC(C2CCC(/C=C/c3ccc(-c4cc(F)c(C(F)(F)OC(F)(F)F)c(F)c4)cc3)CC2)OC1] |
| 471 | 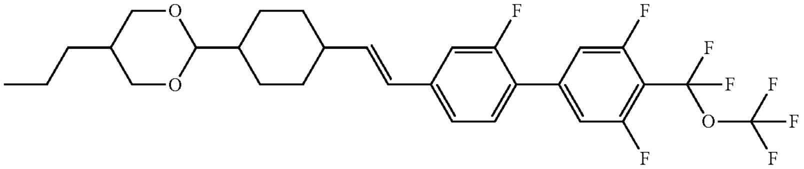 |

-continued
| No. | |
|---|---|
| 472 | 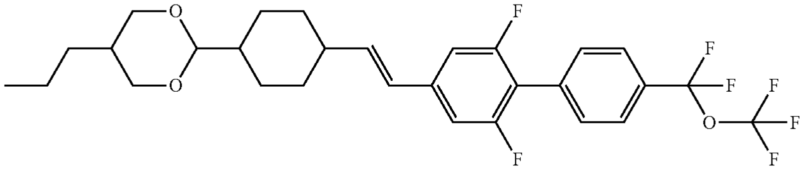 [SMILES: CCCC1COC(C2CCC(/C=C/c3cc(F)c(-c4ccc(C(F)(F)OC(F)(F)F)cc4)c(F)c3)CC2)OC1] |
| 473 | 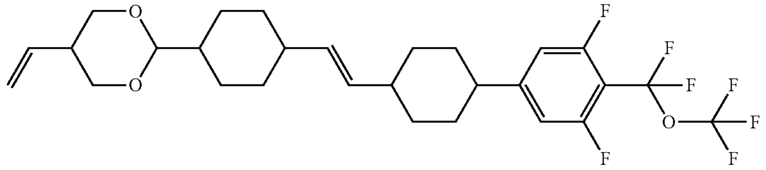 [SMILES: C=CC1COC(C2CCC(/C=C/C3CCC(c4cc(F)c(C(F)(F)OC(F)(F)F)c(F)c4)CC3)CC2)OC1] |
| 474 | 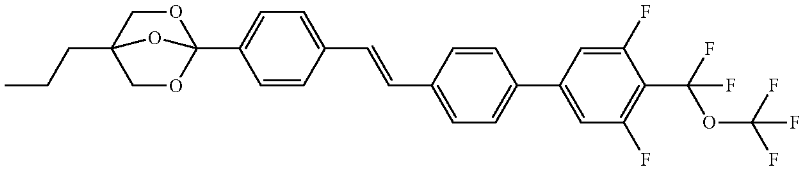 |
| 475 | 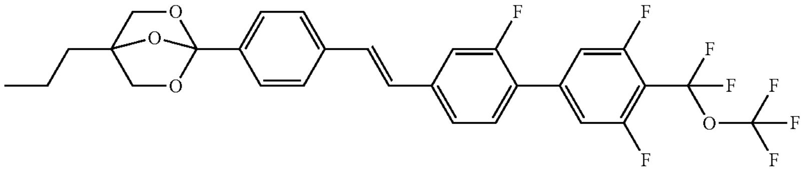 [SMILES: CCCC12COC(c3ccc(/C=C/c4ccc(-c5cc(F)c(C(F)(F)OC(F)(F)F)c(F)c5)cc4)cc3)(OC1)O2] |
| 476 | 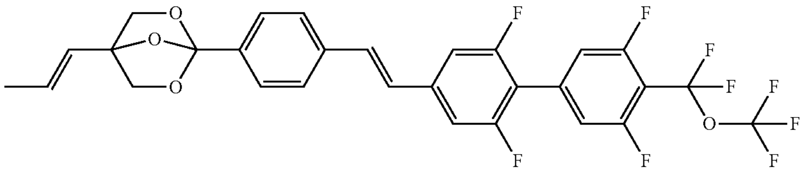 [SMILES: C/C=C/C12COC(c3ccc(/C=C/c4cc(F)c(-c5cc(F)c(C(F)(F)OC(F)(F)F)c(F)c5)c(F)c4)cc3)(OC1)O2] |
| 477 | 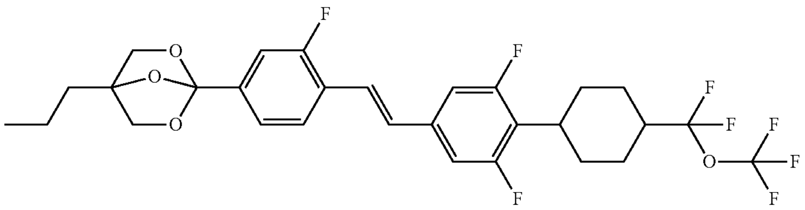 [SMILES: CCCC12COC(c3ccc(/C=C/c4cc(F)c(C5CCC(C(F)(F)OC(F)(F)F)CC5)c(F)c4)c(F)c3)(OC1)O2] |
| 478 | 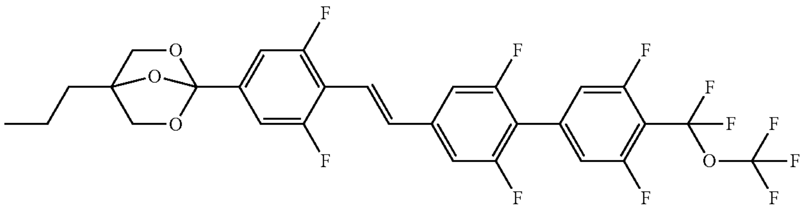 [SMILES: CCCC12COC(c3cc(F)c(/C=C/c4cc(F)c(-c5cc(F)c(C(F)(F)OC(F)(F)F)c(F)c5)c(F)c4)c(F)c3)(OC1)O2] |
| 479 | 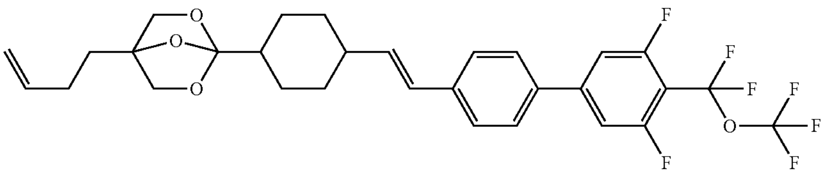 [SMILES: C=CCCC12COC(C3CCC(/C=C/c4ccc(-c5cc(F)c(C(F)(F)OC(F)(F)F)c(F)c5)cc4)CC3)(OC1)O2] |

-continued
| No. | |
|---|---|
| 480 | 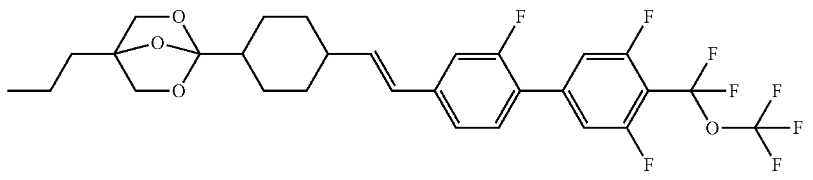 |
| 481 | 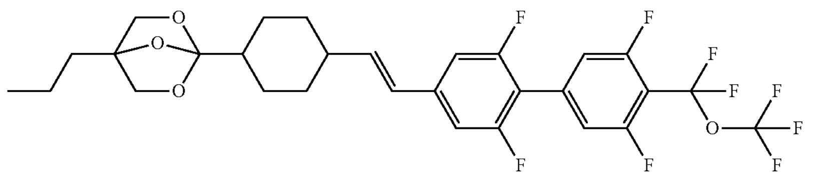 [SMILES: CCCC12COC(C3CCC(/C=C/c4cc(F)c(-c5cc(F)c(C(F)(F)OC(F)(F)F)c(F)c5)c(F)c4)CC3)(OC1)O2] |
| 482 | 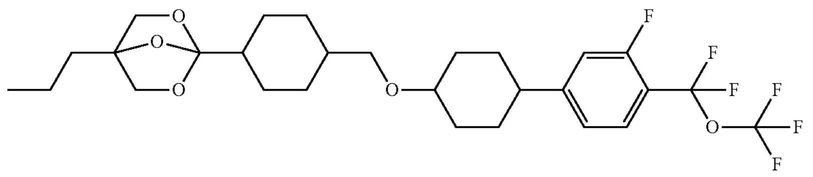 [SMILES: CCCC12COC(C3CCC(COC4CCC(c5ccc(C(F)(F)OC(F)(F)F)c(F)c5)CC4)CC3)(OC1)O2] |
| 483 | 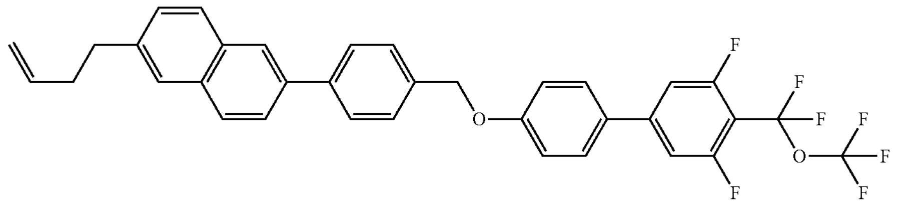 [SMILES: C=CCCc1ccc2cc(-c3ccc(COc4ccc(-c5cc(F)c(C(F)(F)OC(F)(F)F)c(F)c5)cc4)cc3)ccc2c1] |
| 484 | 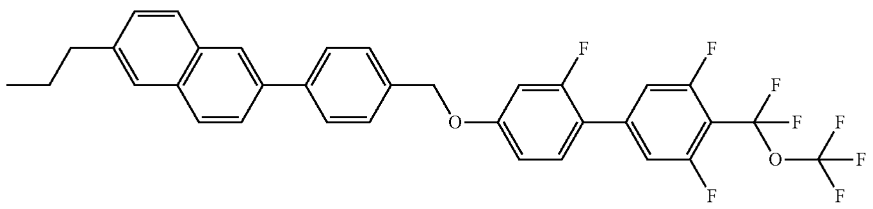 [SMILES: CCCc1ccc2cc(-c3ccc(COc4ccc(-c5cc(F)c(C(F)(F)OC(F)(F)F)c(F)c5)c(F)c4)cc3)ccc2c1] |
| 485 | 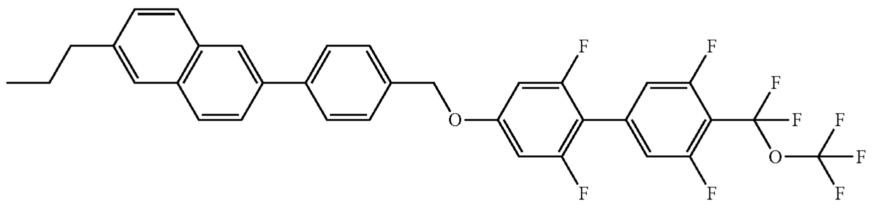 [SMILES: CCCc1ccc2cc(-c3ccc(COc4cc(F)c(-c5cc(F)c(C(F)(F)OC(F)(F)F)c(F)c5)c(F)c4)cc3)ccc2c1] |
| 486 | 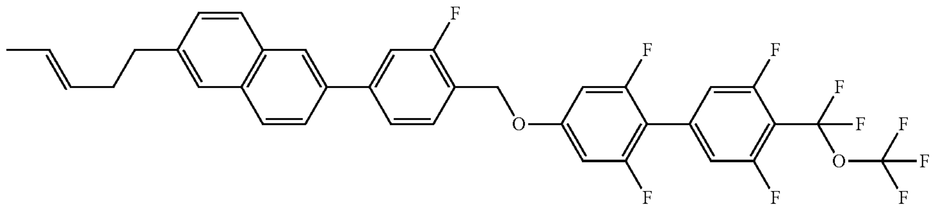 [SMILES: C/C=C/CCc1ccc2cc(-c3ccc(COc4cc(F)c(-c5cc(F)c(C(F)(F)OC(F)(F)F)c(F)c5)c(F)c4)c(F)c3)ccc2c1] |

-continued
| No. | |
|---|---|
| 487 | 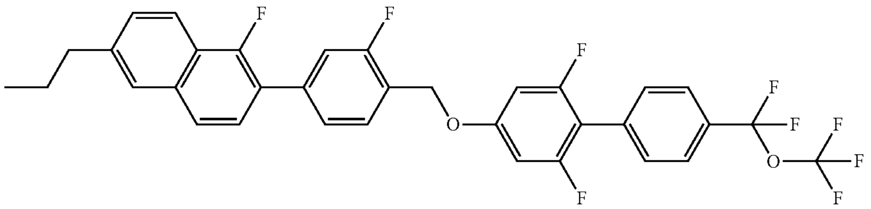 [SMILES: CCCc1ccc2c(F)c(-c3ccc(COc4cc(F)c(-c5ccc(C(F)(F)OC(F)(F)F)cc5)c(F)c4)c(F)c3)ccc2c1] |
| 488 | 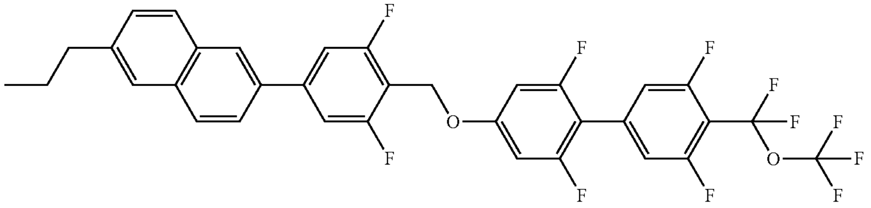 [SMILES: CCCc1ccc2c(F)c(-c3cc(F)c(COc4cc(F)c(-c5cc(F)c(C(F)(F)OC(F)(F)F)c(F)c5)c(F)c4)c(F)c3)c(F)cc2c1] |
| 489 | 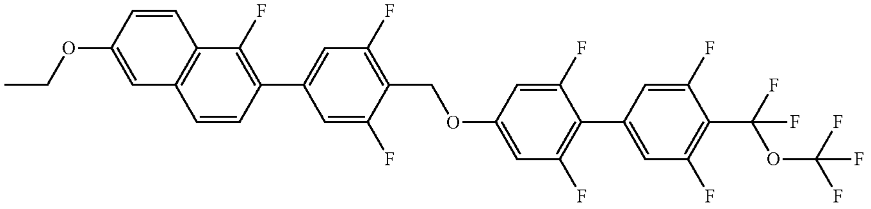 |
| 490 | 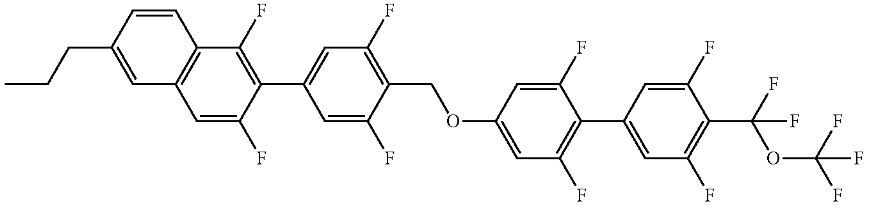 |
| 491 | 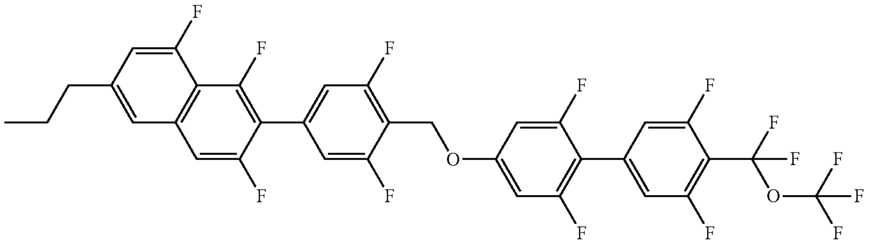 [SMILES: CCCc1cc(F)c2c(F)c(-c3cc(F)c(COc4cc(F)c(-c5cc(F)c(C(F)(F)OC(F)(F)F)c(F)c5)c(F)c4)c(F)c3)c(F)cc2c1] |
| 492 | 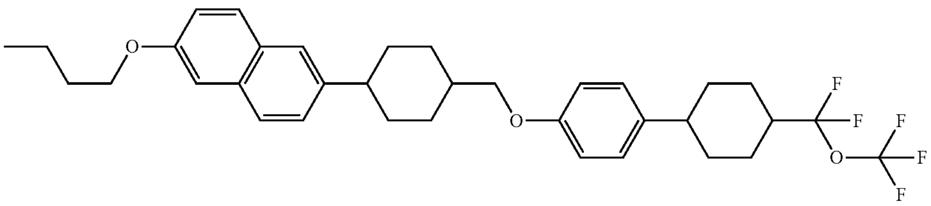 [SMILES: CCCCOc1ccc2cc(C3CCC(COc4ccc(C5CCC(C(F)(F)OC(F)(F)F)CC5)cc4)CC3)ccc2c1] |
| 493 | 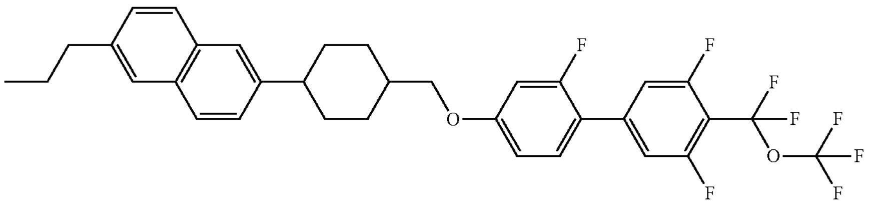 |

-continued
| No. | |
|---|---|
| 494 | 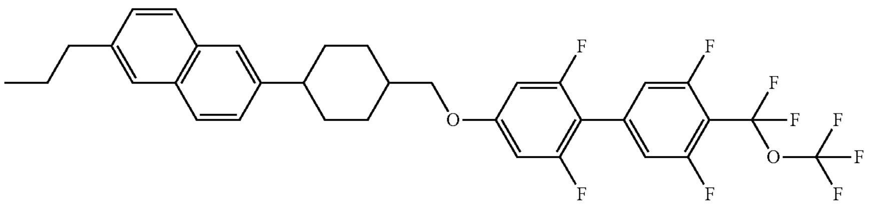 [SMILES: CCCc1ccc2cc(C3CCC(COc4cc(F)c(-c5cc(F)c(C(F)(F)OC(F)(F)F)c(F)c5)c(F)c4)CC3)ccc2c1] |
| 495 | 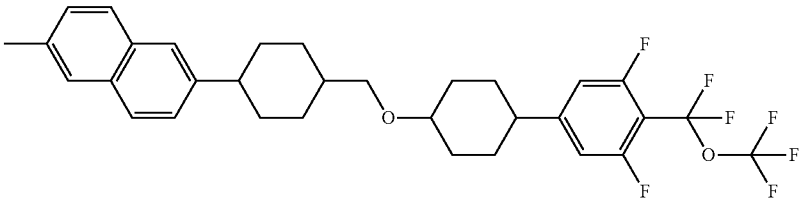 [SMILES: Cc1ccc2cc(C3CCC(COC4CCC(c5cc(F)c(C(F)(F)OC(F)(F)F)c(F)c5)CC4)CC3)ccc2c1] |
| 496 | 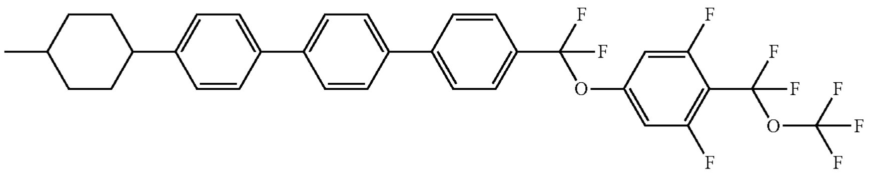 [SMILES: CC1CCC(c2ccc(-c3ccc(-c4ccc(C(F)(F)Oc5cc(F)c(C(F)(F)OC(F)(F)F)c(F)c5)cc4)cc3)cc2)CC1] |
| 497 | 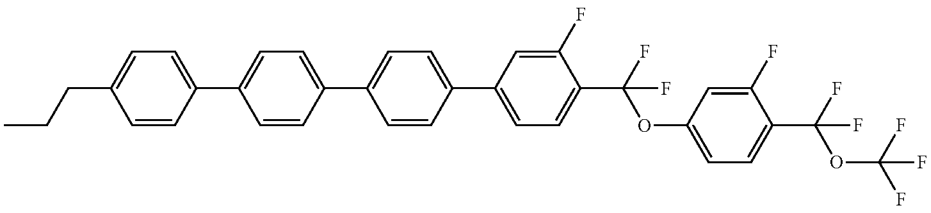 [SMILES: CCCc1ccc(-c2ccc(-c3ccc(-c4ccc(C(F)(F)Oc5ccc(C(F)(F)OC(F)(F)F)c(F)c5)c(F)c4)cc3)cc2)cc1] |
| 498 | 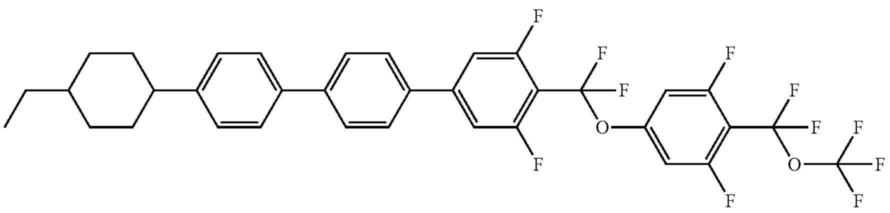 [SMILES: CCC1CCC(c2ccc(-c3ccc(-c4cc(F)c(C(F)(F)Oc5cc(F)c(C(F)(F)OC(F)(F)F)c(F)c5)c(F)c4)cc3)cc2)CC1] |
| 499 | 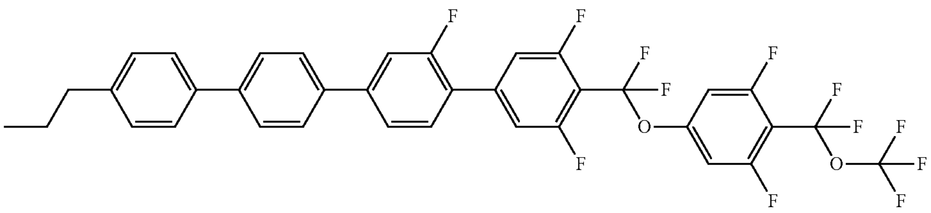 [SMILES: CCCc1ccc(-c2ccc(-c3ccc(-c4cc(F)c(C(F)(F)Oc5cc(F)c(C(F)(F)OC(F)(F)F)c(F)c5)c(F)c4)c(F)c3)cc2)cc1] |
| 500 | 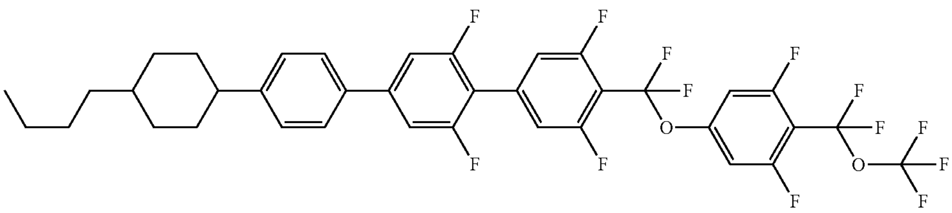 [SMILES: CCCCC1CCC(c2ccc(-c3cc(F)c(-c4cc(F)c(C(F)(F)Oc5cc(F)c(C(F)(F)OC(F)(F)F)c(F)c5)c(F)c4)c(F)c3)cc2)CC1] |

-continued
| No. | |
|---|---|
| 501 | 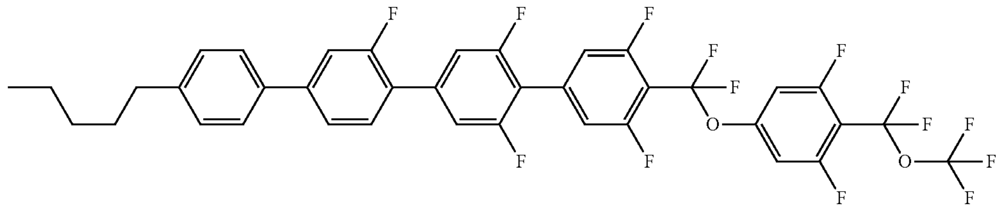 [SMILES: CCCCCc1ccc(-c2ccc(-c3cc(F)c(-c4cc(F)c(C(F)(F)Oc5cc(F)c(C(F)(F)OC(F)(F)F)c(F)c5)c(F)c4)c(F)c3)c(F)c2)cc1] |
| 502 | 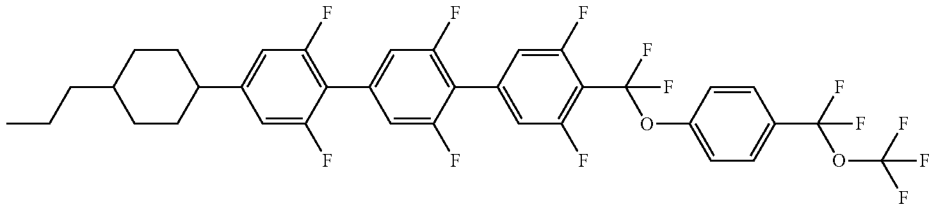 [SMILES: CCCC1CCC(c2cc(F)c(-c3cc(F)c(-c4cc(F)c(C(F)(F)Oc5ccc(C(F)(F)OC(F)(F)F)cc5)c(F)c4)c(F)c3)c(F)c2)CC1] |
| 503 | 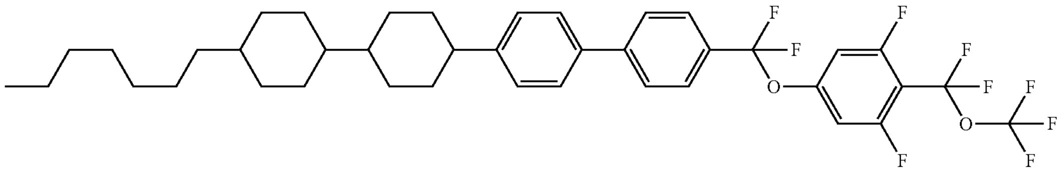 |
| 504 | 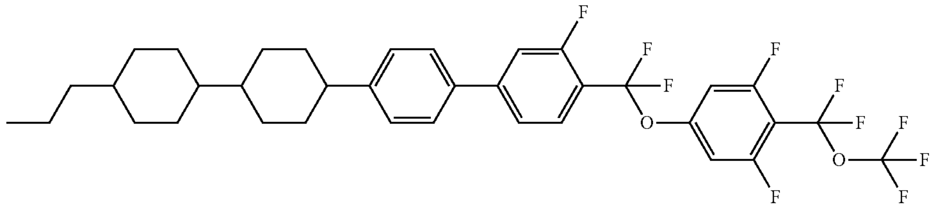 |
| 505 | 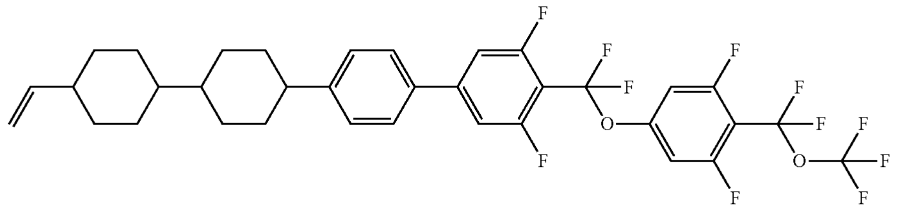 [SMILES: C=CC1CCC(C2CCC(c3ccc(-c4cc(F)c(C(F)(F)Oc5cc(F)c(C(F)(F)OC(F)(F)F)c(F)c5)c(F)c4)cc3)CC2)CC1] |
| 506 | 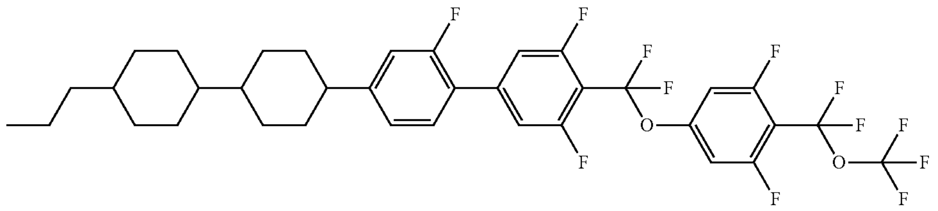 [SMILES: CCCC1CCC(C2CCC(c3ccc(-c4cc(F)c(C(F)(F)Oc5cc(F)c(C(F)(F)OC(F)(F)F)c(F)c5)c(F)c4)c(F)c3)CC2)CC1] |
| 507 | 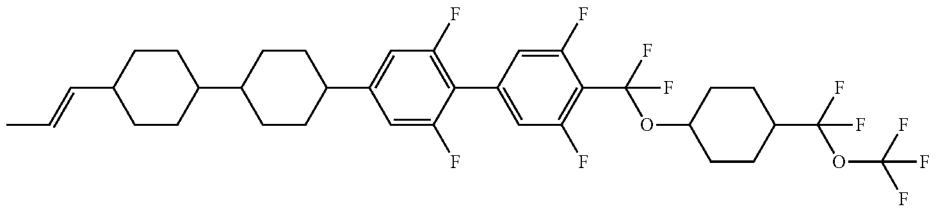 [SMILES: C/C=C/C1CCC(C2CCC(c3cc(F)c(-c4cc(F)c(C(F)(F)OC5CCC(C(F)(F)OC(F)(F)F)CC5)c(F)c4)c(F)c3)CC2)CC1] |

-continued
| No. | |
|---|---|
| 508 | 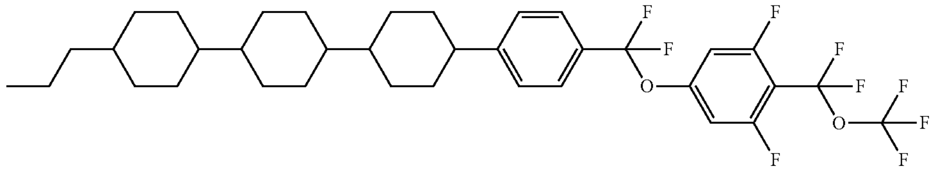 |
| 509 | 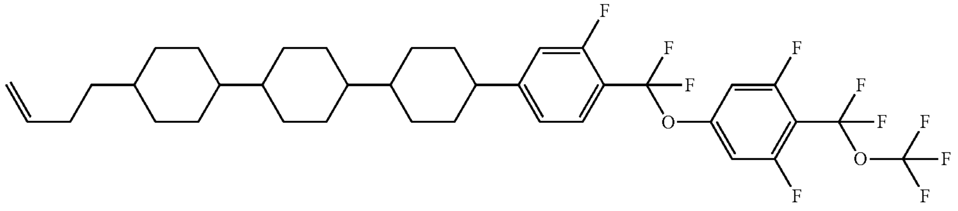 [SMILES: C=CCCC1CCC(C2CCC(C3CCC(c4ccc(C(F)(F)Oc5cc(F)c(C(F)(F)OC(F)(F)F)c(F)c5)c(F)c4)CC3)CC2)CC1] |
| 510 | 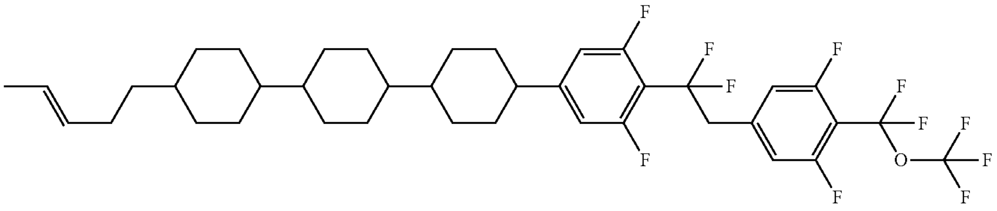 [SMILES: C/C=C/CCC1CCC(C2CCC(C3CCC(c4cc(F)c(C(F)(F)Cc5cc(F)c(C(F)(F)OC(F)(F)F)c(F)c5)c(F)c4)CC3)CC2)CC1] |
| 511 | 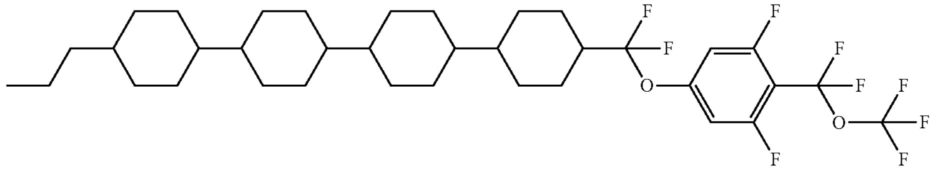 [SMILES: CCCC1CCC(C2CCC(C3CCC(C4CCC(C(F)(F)Oc5cc(F)c(C(F)(F)OC(F)(F)F)c(F)c5)CC4)CC3)CC2)CC1] |
| 512 | 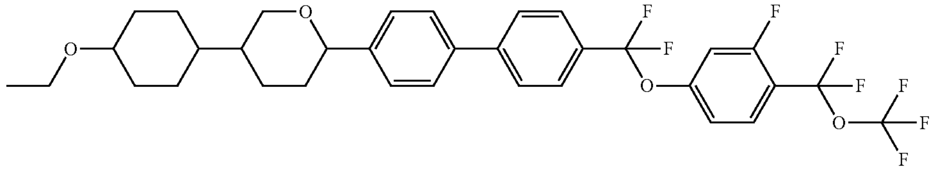 |
| 513 | 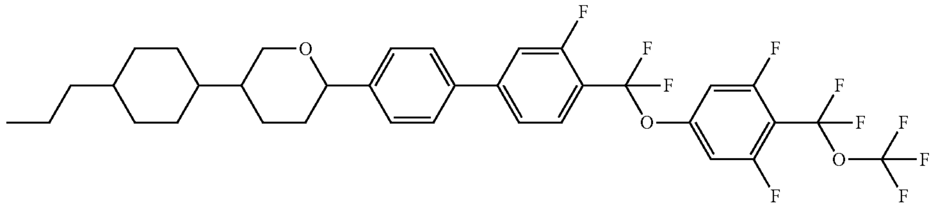 [SMILES: CCCC1CCC(C2CCC(c3ccc(-c4ccc(C(F)(F)Oc5cc(F)c(C(F)(F)OC(F)(F)F)c(F)c5)c(F)c4)cc3)OC2)CC1] |
| 514 | 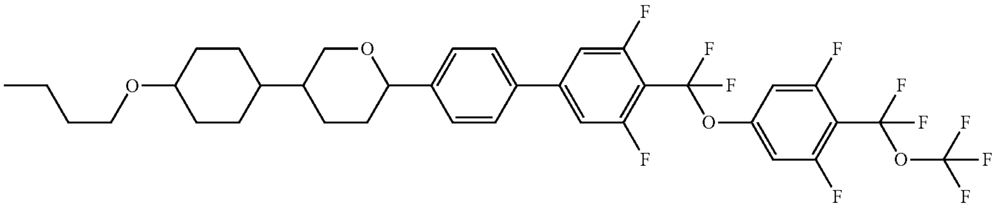 |

-continued
| No. | |
|---|---|
| 515 | 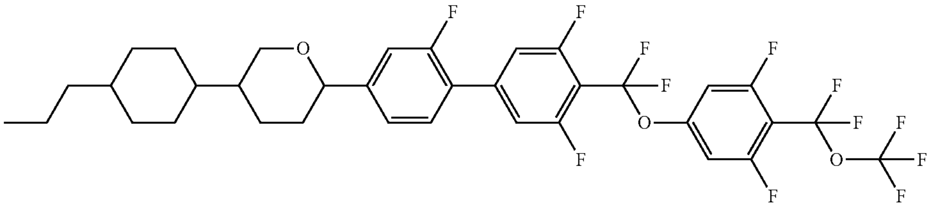 [SMILES: CCCC1CCC(C2CCC(c3ccc(-c4cc(F)c(C(F)(F)Oc5cc(F)c(C(F)(F)OC(F)(F)F)c(F)c5)c(F)c4)c(F)c3)OC2)CC1] |
| 516 | 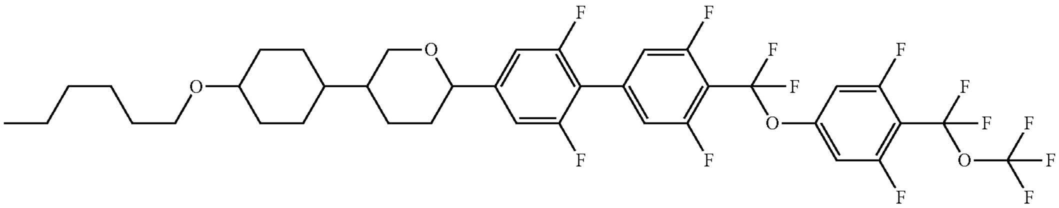 [SMILES: CCCCCCOC1CCC(C2CCC(c3cc(F)c(-c4cc(F)c(C(F)(F)Oc5cc(F)c(C(F)(F)OC(F)(F)F)c(F)c5)c(F)c4)c(F)c3)OC2)CC1] |
| 517 | 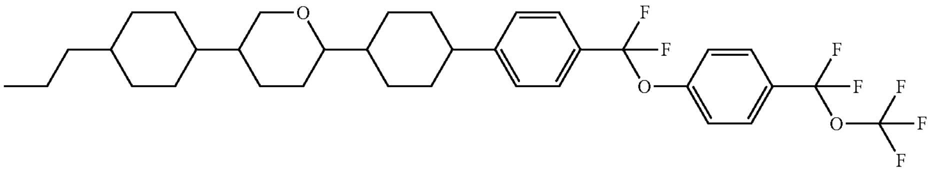 |
| 518 | 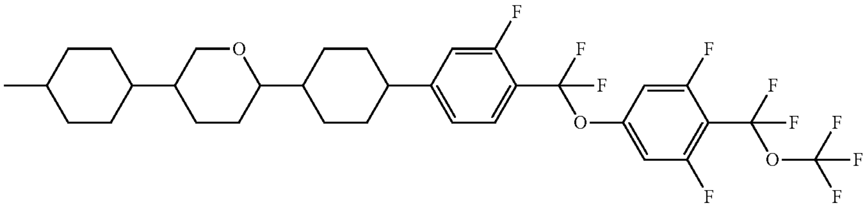 [SMILES: CC1CCC(C2CCC(C3CCC(c4ccc(C(F)(F)Oc5cc(F)c(C(F)(F)OC(F)(F)F)c(F)c5)c(F)c4)CC3)OC2)CC1] |
| 519 | 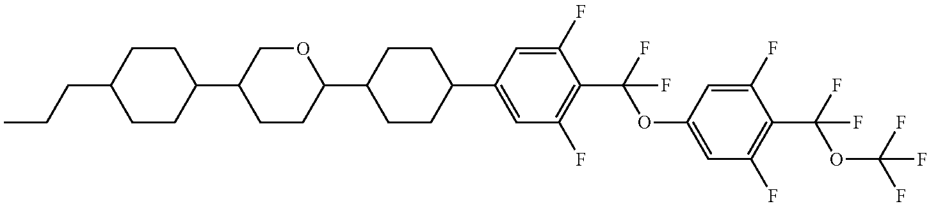 |
| 520 | 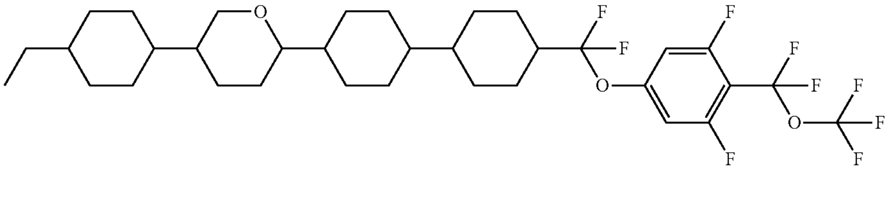 [SMILES: CCC1CCC(C2CCC(C3CCC(C4CCC(C(F)(F)Oc5cc(F)c(C(F)(F)OC(F)(F)F)c(F)c5)CC4)CC3)OC2)CC1] |
| 521 | 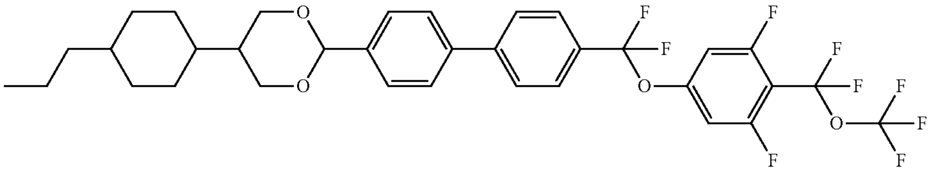 |

-continued
| No. | |
|---|---|
| 522 | 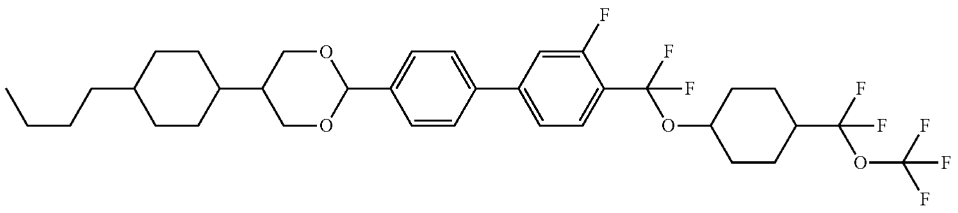 [SMILES: CCCCC1CCC(C2COC(c3ccc(-c4ccc(C(F)(F)OC5CCC(C(F)(F)OC(F)(F)F)CC5)c(F)c4)cc3)OC2)CC1] |
| 523 | 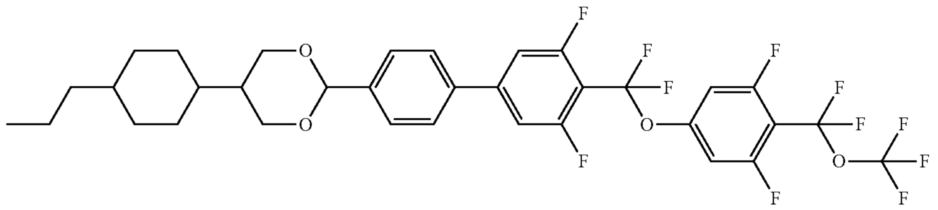 |
| 524 | 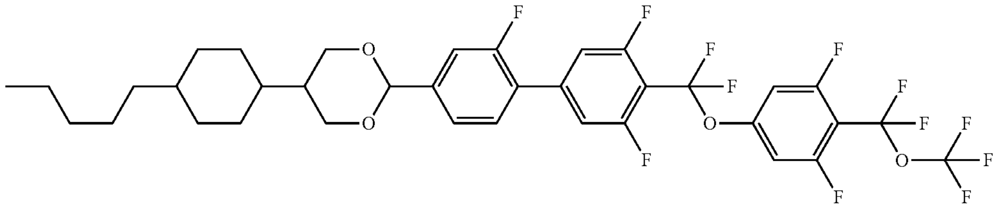 [SMILES: CCCCCC1CCC(C2COC(c3ccc(-c4cc(F)c(C(F)(F)Oc5cc(F)c(C(F)(F)OC(F)(F)F)c(F)c5)c(F)c4)c(F)c3)OC2)CC1] |
| 525 | 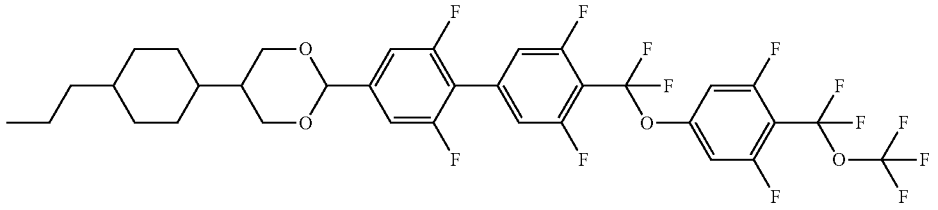 [SMILES: CCCC1CCC(C2COC(c3cc(F)c(-c4cc(F)c(C(F)(F)Oc5cc(F)c(C(F)(F)OC(F)(F)F)c(F)c5)c(F)c4)c(F)c3)OC2)CC1] |
| 526 | 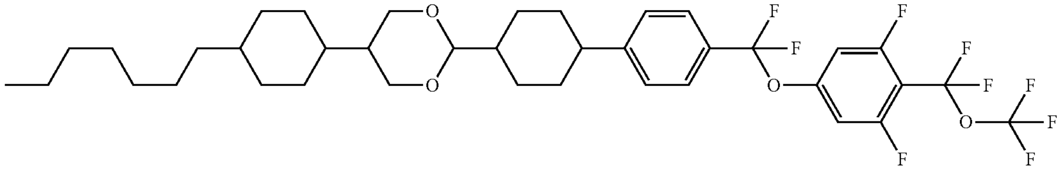 [SMILES: CCCCCCCC1CCC(C2COC(C3CCC(c4ccc(C(F)(F)Oc5cc(F)c(C(F)(F)OC(F)(F)F)c(F)c5)cc4)CC3)OC2)CC1] |
| 527 | 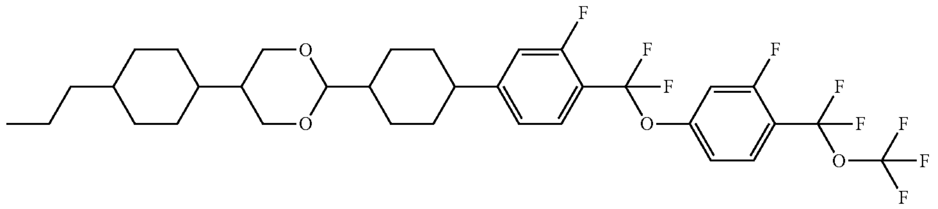 [SMILES: CCCC1CCC(C2COC(C3CCC(c4ccc(C(F)(F)Oc5ccc(C(F)(F)OC(F)(F)F)c(F)c5)c(F)c4)CC3)OC2)CC1] |
| 528 | 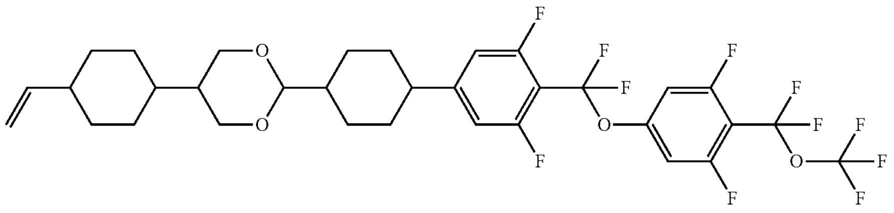 [SMILES: C=CC1CCC(C2COC(C3CCC(c4cc(F)c(C(F)(F)Oc5cc(F)c(C(F)(F)OC(F)(F)F)c(F)c5)c(F)c4)CC3)OC2)CC1] |

-continued
| No. | |
|---|---|
| 529 | 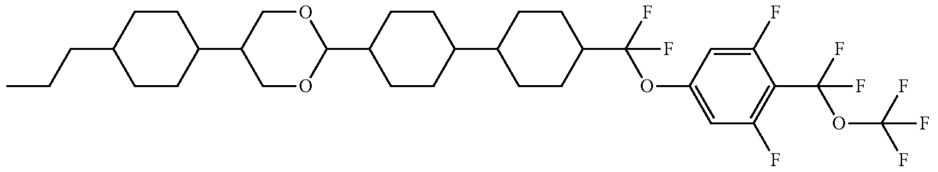 |
| 530 | 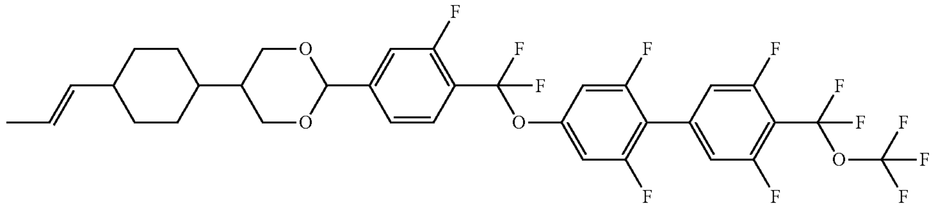 [SMILES: C/C=C/C1CCC(C2COC(c3ccc(C(F)(F)Oc4cc(F)c(-c5cc(F)c(C(F)(F)OC(F)(F)F)c(F)c5)c(F)c4)c(F)c3)OC2)CC1] |
| 531 | 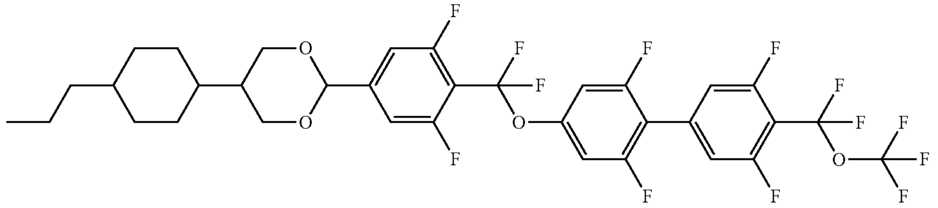 |
| 532 | 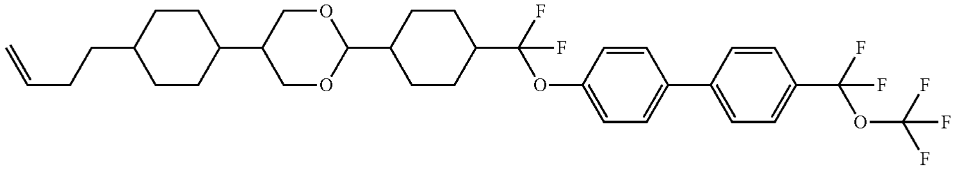 [SMILES: C=CCCC1CCC(C2COC(C3CCC(C(F)(F)Oc4ccc(-c5ccc(C(F)(F)OC(F)(F)F)cc5)cc4)CC3)OC2)CC1] |
| 533 | 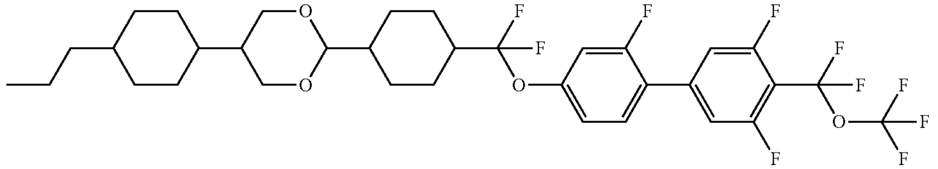 |
| 534 | 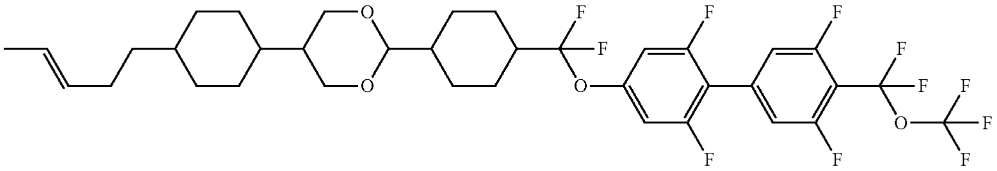 |
| 535 | 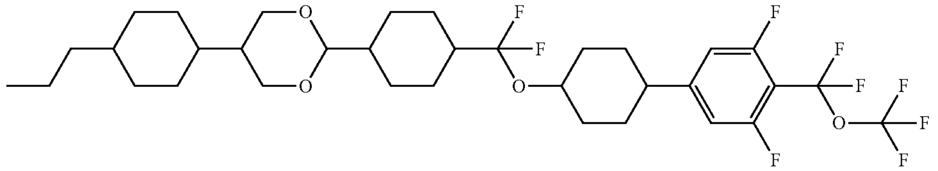 [SMILES: CCCC1CCC(C2COC(C3CCC(C(F)(F)OC4CCC(c5cc(F)c(C(F)(F)OC(F)(F)F)c(F)c5)CC4)CC3)OC2)CC1] |
| 536 | 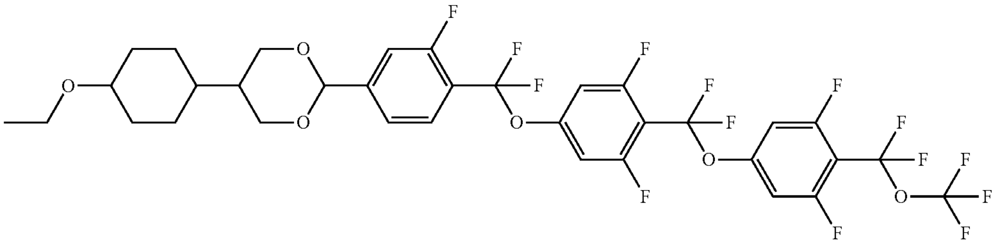 |

-continued
| No. | |
|---|---|
| 537 | 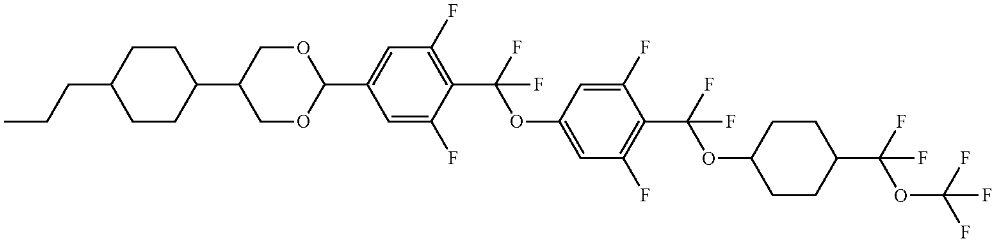 [SMILES: CCCC1CCC(C2COC(c3cc(F)c(C(F)(F)Oc4cc(F)c(C(F)(F)OC5CCC(C(F)(F)OC(F)(F)F)CC5)c(F)c4)c(F)c3)OC2)CC1] |
| 538 | 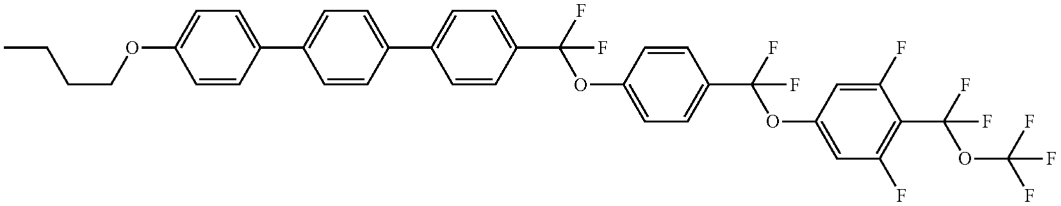 [SMILES: CCCCOc1ccc(-c2ccc(-c3ccc(C(F)(F)Oc4ccc(C(F)(F)Oc5cc(F)c(C(F)(F)OC(F)(F)F)c(F)c5)cc4)cc3)cc2)cc1] |
| 539 | 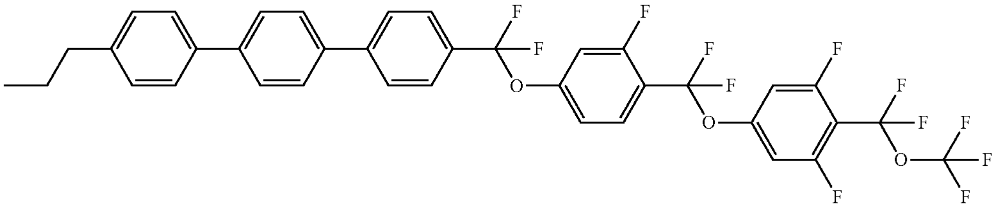 [SMILES: CCCc1ccc(-c2ccc(-c3ccc(C(F)(F)Oc4ccc(C(F)(F)Oc5cc(F)c(C(F)(F)OC(F)(F)F)c(F)c5)c(F)c4)cc3)cc2)cc1] |
| 540 | 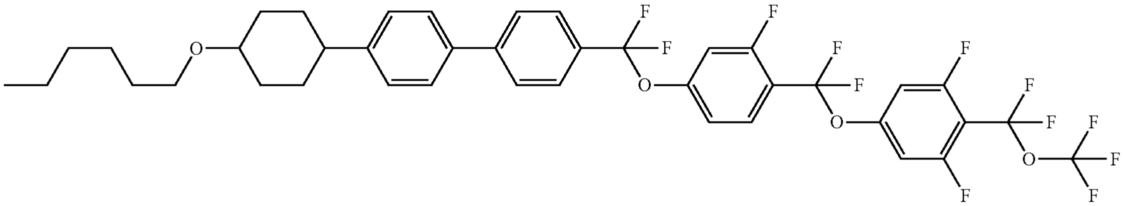 [SMILES: CCCCCCOC1CCC(c2ccc(-c3ccc(C(F)(F)Oc4ccc(C(F)(F)Oc5cc(F)c(C(F)(F)OC(F)(F)F)c(F)c5)c(F)c4)cc3)cc2)CC1] |
| 541 | 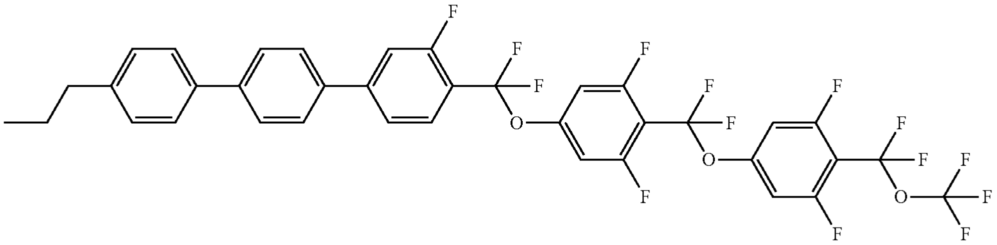 [SMILES: CCCc1ccc(-c2ccc(-c3ccc(C(F)(F)Oc4cc(F)c(C(F)(F)Oc5cc(F)c(C(F)(F)OC(F)(F)F)c(F)c5)c(F)c4)c(F)c3)cc2)cc1] |
| 542 | 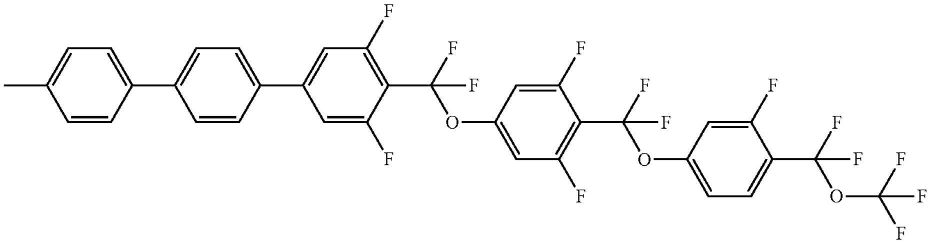 [SMILES: Cc1ccc(-c2ccc(-c3cc(F)c(C(F)(F)Oc4cc(F)c(C(F)(F)Oc5ccc(C(F)(F)OC(F)(F)F)c(F)c5)c(F)c4)c(F)c3)cc2)cc1] |

-continued
| No. | |
|---|---|
| 543 | 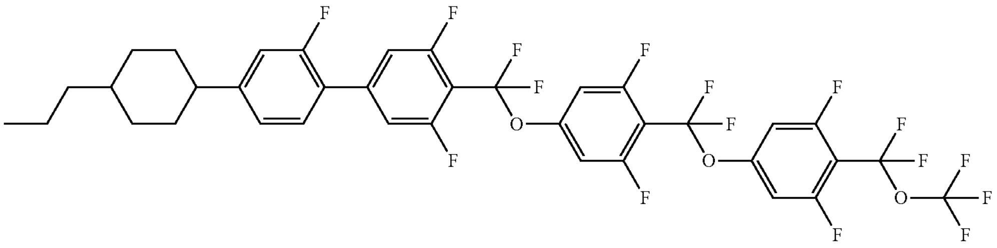 [SMILES: CCCC1CCC(c2ccc(-c3cc(F)c(C(F)(F)Oc4cc(F)c(C(F)(F)Oc5cc(F)c(C(F)(F)OC(F)(F)F)c(F)c5)c(F)c4)c(F)c3)c(F)c2)CC1] |
| 544 | 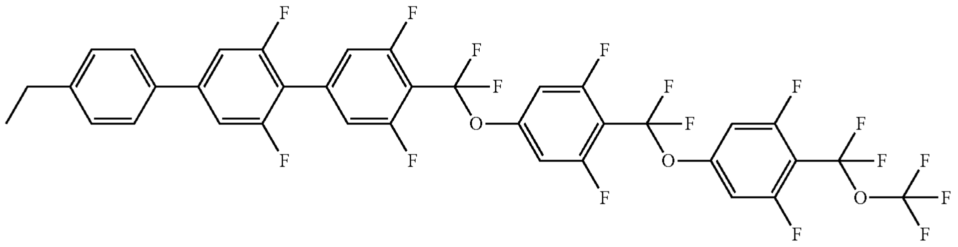 [SMILES: CCc1ccc(-c2cc(F)c(-c3cc(F)c(C(F)(F)Oc4cc(F)c(C(F)(F)Oc5cc(F)c(C(F)(F)OC(F)(F)F)c(F)c5)c(F)c4)c(F)c3)c(F)c2)cc1] |
| 545 | 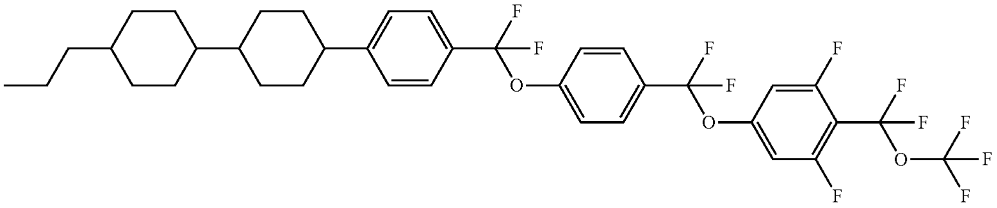 |
| 546 | 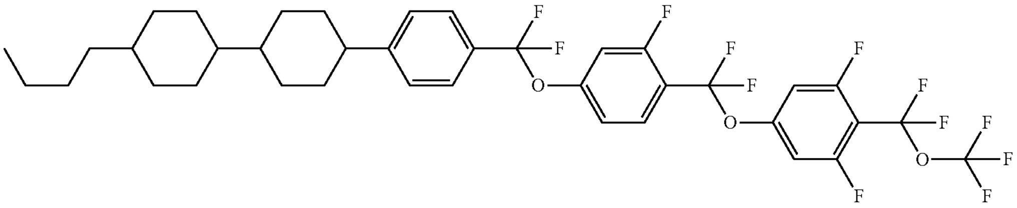 [SMILES: CCCCC1CCC(C2CCC(c3ccc(C(F)(F)Oc4ccc(C(F)(F)Oc5cc(F)c(C(F)(F)OC(F)(F)F)c(F)c5)c(F)c4)cc3)CC2)CC1] |
| 547 | 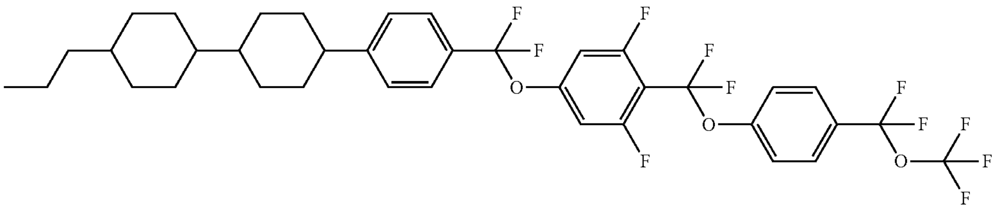 [SMILES: CCCC1CCC(C2CCC(c3ccc(C(F)(F)Oc4cc(F)c(C(F)(F)Oc5ccc(C(F)(F)OC(F)(F)F)cc5)c(F)c4)cc3)CC2)CC1] |
| 548 | 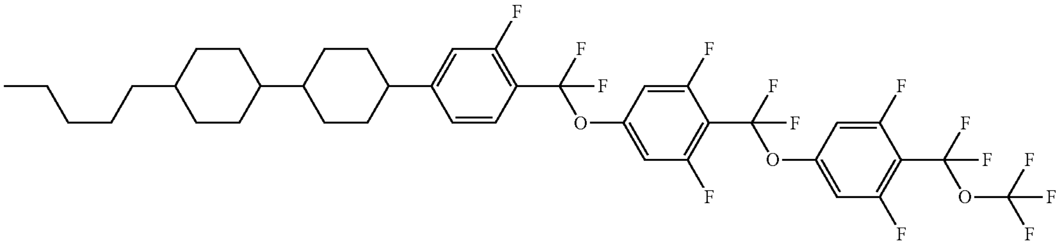 [SMILES: CCCCCC1CCC(C2CCC(c3ccc(C(F)(F)Oc4cc(F)c(C(F)(F)Oc5cc(F)c(C(F)(F)OC(F)(F)F)c(F)c5)c(F)c4)c(F)c3)CC2)CC1] |

-continued
| No. | |
|---|---|
| 549 | 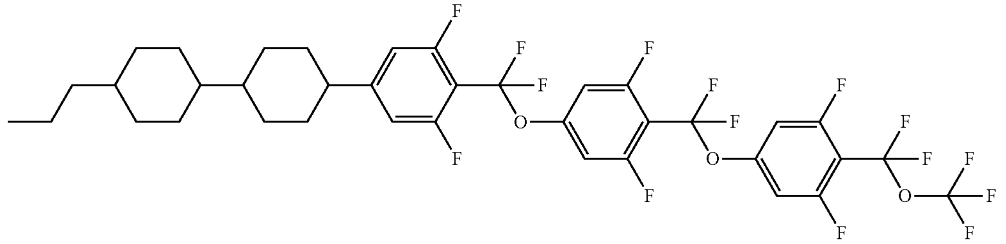 |
| 550 | 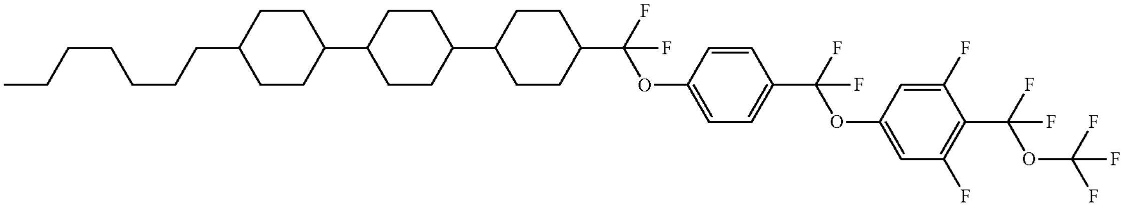 [SMILES: CCCCCCCC1CCC(C2CCC(C3CCC(C(F)(F)Oc4ccc(C(F)(F)Oc5cc(F)c(C(F)(F)OC(F)(F)F)c(F)c5)cc4)CC3)CC2)CC1] |
| 551 | 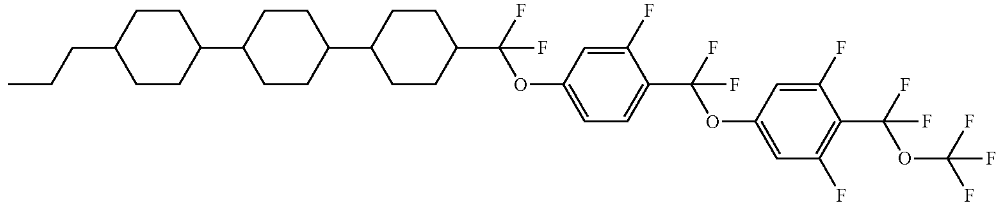 [SMILES: CCCC1CCC(C2CCC(C3CCC(C(F)(F)Oc4ccc(C(F)(F)Oc5cc(F)c(C(F)(F)OC(F)(F)F)c(F)c5)c(F)c4)CC3)CC2)CC1] |
| 552 | 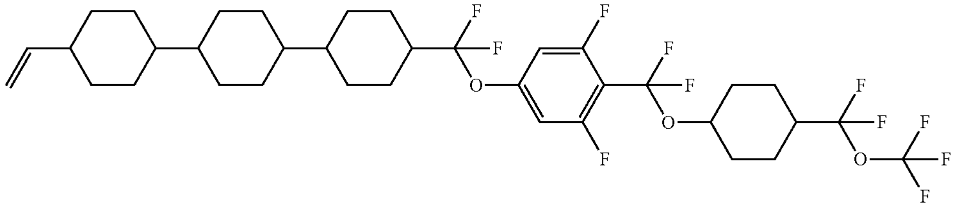 [SMILES: C=CC1CCC(C2CCC(C3CCC(C(F)(F)Oc4cc(F)c(C(F)(F)OC5CCC(C(F)(F)OC(F)(F)F)CC5)c(F)c4)CC3)CC2)CC1] |
| 553 | 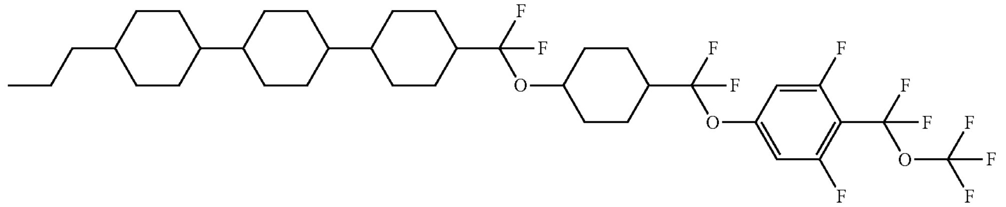 |
| 554 | 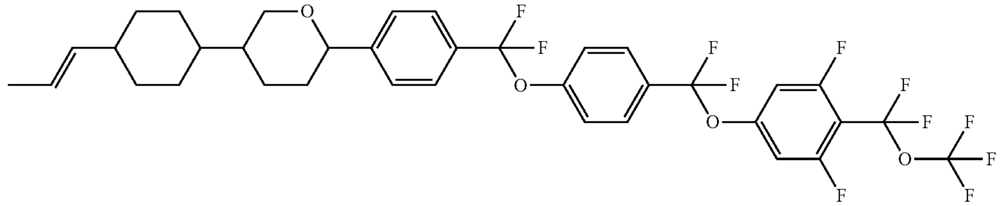 [SMILES: C/C=C/C1CCC(C2CCC(c3ccc(C(F)(F)Oc4ccc(C(F)(F)Oc5cc(F)c(C(F)(F)OC(F)(F)F)c(F)c5)cc4)cc3)OC2)CC1] |
| 555 | 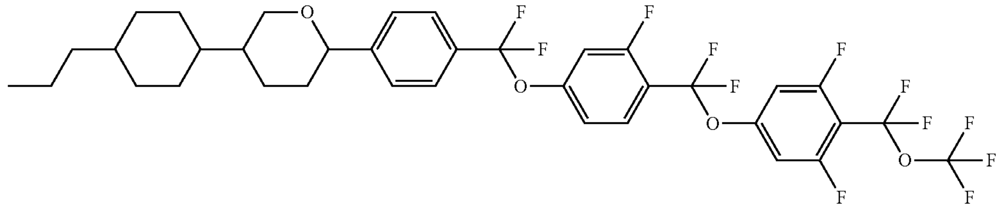 |

-continued
| No. | |
|---|---|
| 556 | 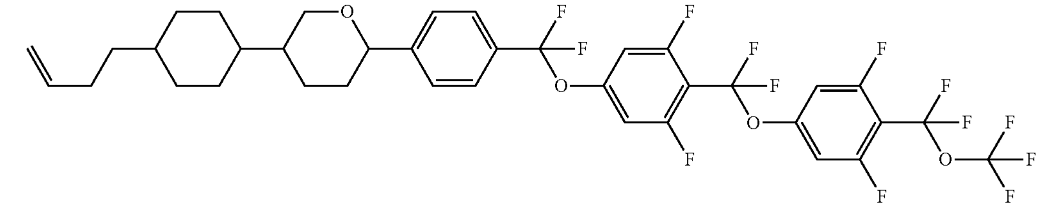 [SMILES: C=CCCC1CCC(C2CCC(c3ccc(C(F)(F)Oc4cc(F)c(C(F)(F)Oc5cc(F)c(C(F)(F)OC(F)(F)F)c(F)c5)c(F)c4)cc3)OC2)CC1] |
| 557 | 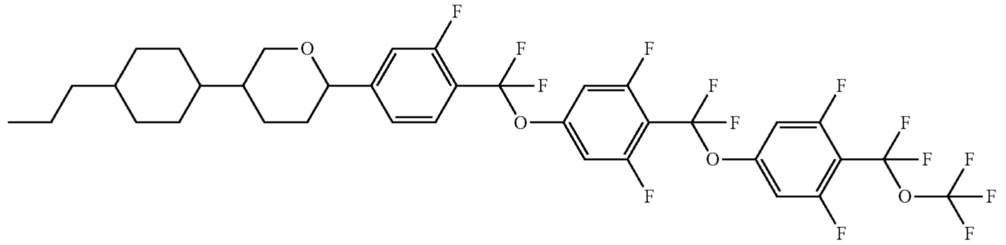 [SMILES: CCCC1CCC(C2CCC(c3ccc(C(F)(F)Oc4cc(F)c(C(F)(F)Oc5cc(F)c(C(F)(F)OC(F)(F)F)c(F)c5)c(F)c4)c(F)c3)OC2)CC1] |
| 558 | 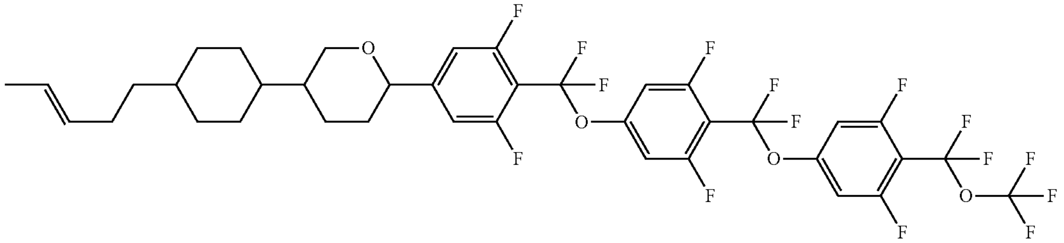 [SMILES: C/C=C/CCC1CCC(C2CCC(c3cc(F)c(C(F)(F)Oc4cc(F)c(C(F)(F)Oc5cc(F)c(C(F)(F)OC(F)(F)F)c(F)c5)c(F)c4)c(F)c3)OC2)CC1] |
| 559 | 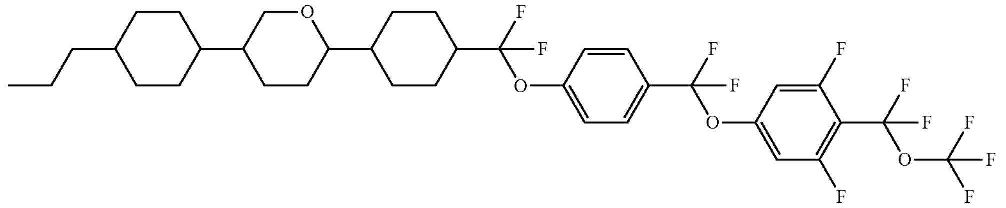 |
| 560 | 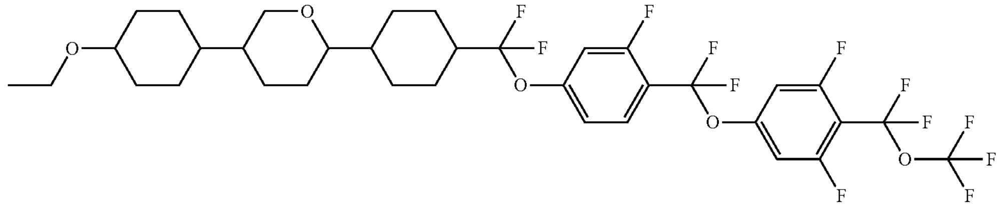 [SMILES: CCOC1CCC(C2CCC(C3CCC(C(F)(F)Oc4ccc(C(F)(F)Oc5cc(F)c(C(F)(F)OC(F)(F)F)c(F)c5)c(F)c4)CC3)OC2)CC1] |
| 561 | 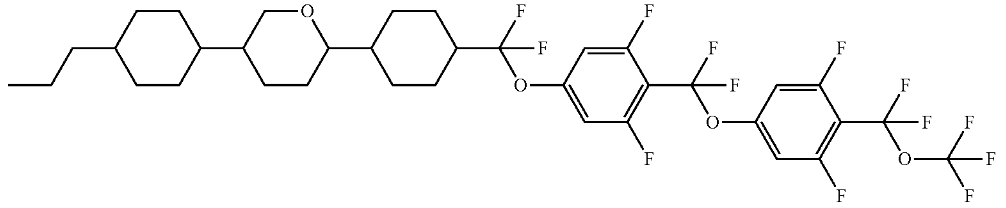 [SMILES: CCCC1CCC(C2CCC(C3CCC(C(F)(F)Oc4cc(F)c(C(F)(F)Oc5cc(F)c(C(F)(F)OC(F)(F)F)c(F)c5)c(F)c4)CC3)OC2)CC1] |
| 562 | 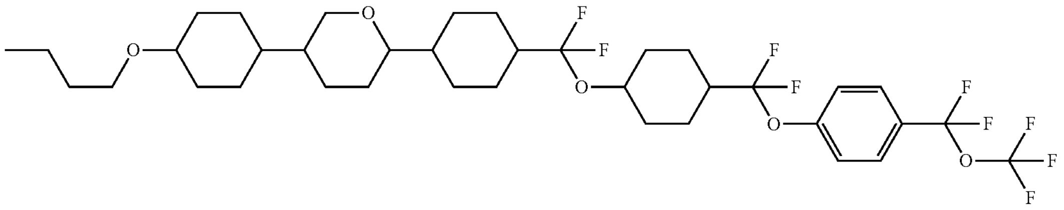 [SMILES: CCCCOC1CCC(C2CCC(C3CCC(C(F)(F)OC4CCC(C(F)(F)Oc5ccc(C(F)(F)OC(F)(F)F)cc5)CC4)CC3)OC2)CC1] |

-continued
| No. | |
|---|---|
| 563 | 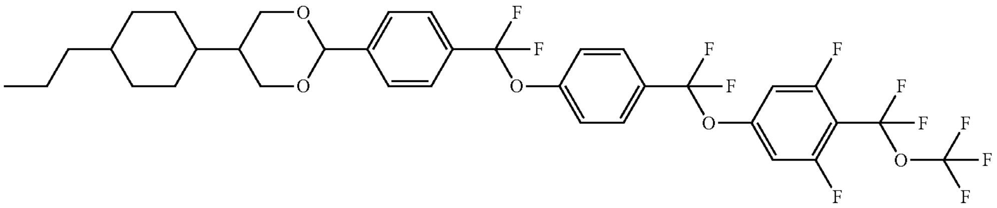 [SMILES: CCCC1CCC(C2COC(c3ccc(C(F)(F)Oc4ccc(C(F)(F)Oc5cc(F)c(C(F)(F)OC(F)(F)F)c(F)c5)cc4)cc3)OC2)CC1] |
| 564 | 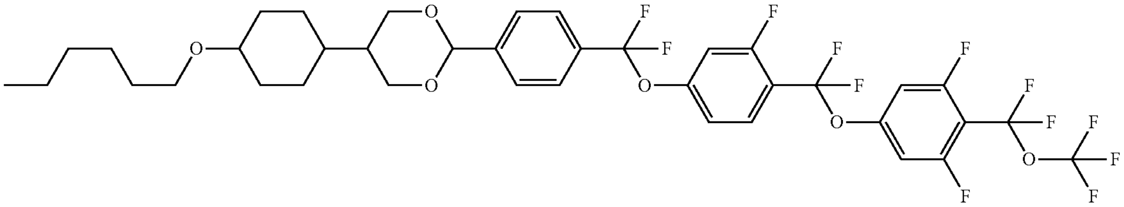 [SMILES: CCCCCCOC1CCC(C2COC(c3ccc(C(F)(F)Oc4ccc(C(F)(F)Oc5cc(F)c(C(F)(F)OC(F)(F)F)c(F)c5)c(F)c4)cc3)OC2)CC1] |
| 565 | 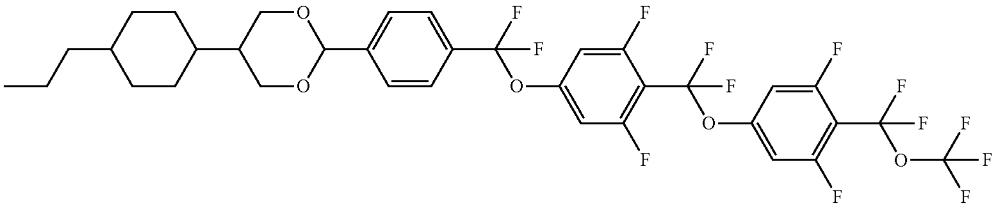 [SMILES: CCCC1CCC(C2COC(c3ccc(C(F)(F)Oc4cc(F)c(C(F)(F)Oc5cc(F)c(C(F)(F)OC(F)(F)F)c(F)c5)c(F)c4)cc3)OC2)CC1] |
| 566 | 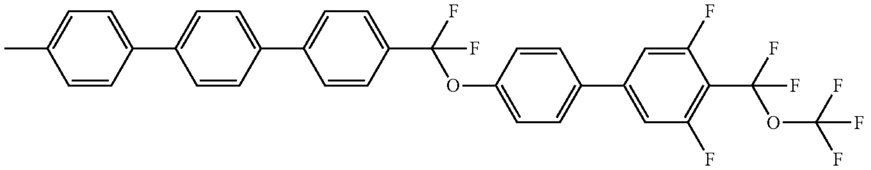 [SMILES: Cc1ccc(-c2ccc(-c3ccc(C(F)(F)Oc4ccc(-c5cc(F)c(C(F)(F)OC(F)(F)F)c(F)c5)cc4)cc3)cc2)cc1] |
| 567 | 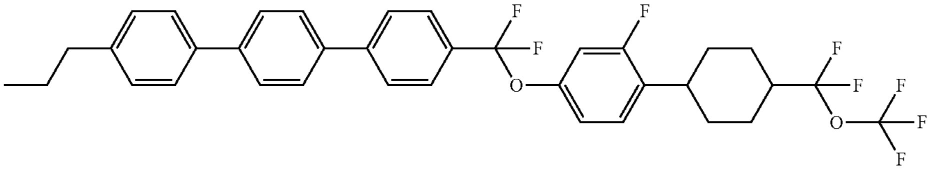 [SMILES: CCCc1ccc(-c2ccc(-c3ccc(C(F)(F)Oc4ccc(C5CCC(C(F)(F)OC(F)(F)F)CC5)c(F)c4)cc3)cc2)cc1] |
| 568 | 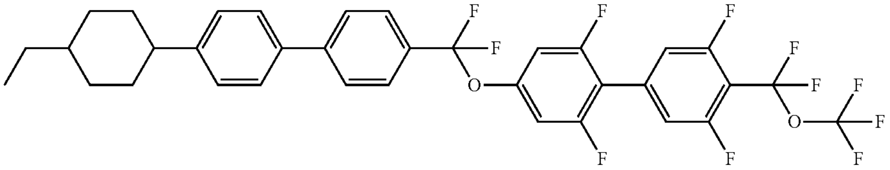 |
| 569 | 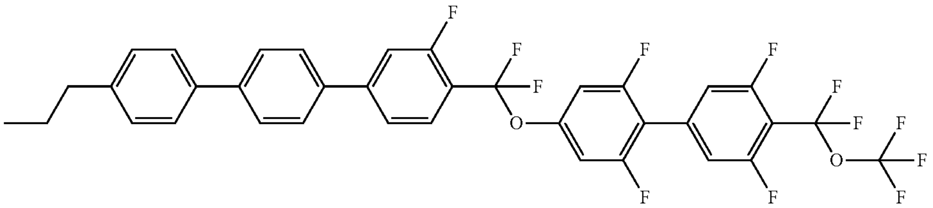 [SMILES: CCCc1ccc(-c2ccc(-c3ccc(C(F)(F)Oc4cc(F)c(-c5cc(F)c(C(F)(F)OC(F)(F)F)c(F)c5)c(F)c4)c(F)c3)cc2)cc1] |

-continued
| No. | |
|---|---|
| 570 | 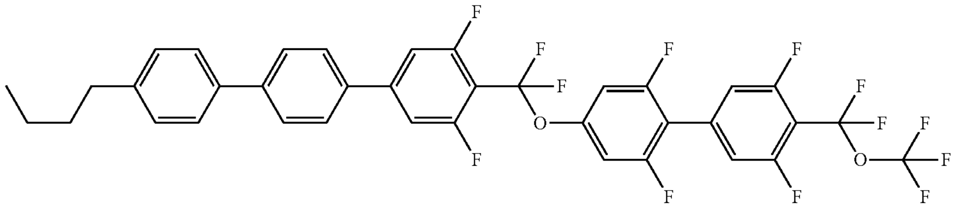 [SMILES: CCCCc1ccc(-c2ccc(-c3cc(F)c(C(F)(F)Oc4cc(F)c(-c5cc(F)c(C(F)(F)OC(F)(F)F)c(F)c5)c(F)c4)c(F)c3)cc2)cc1] |
| 571 | 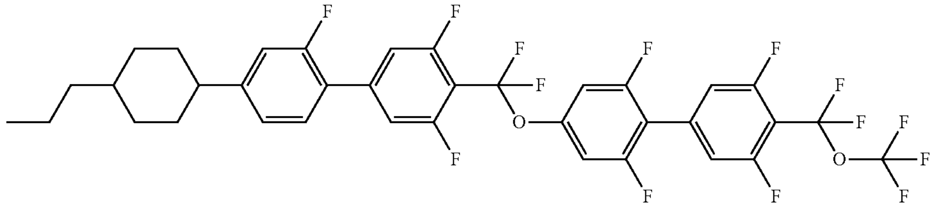 [SMILES: CCCC1CCC(c2ccc(-c3cc(F)c(C(F)(F)Oc4cc(F)c(-c5cc(F)c(C(F)(F)OC(F)(F)F)c(F)c5)c(F)c4)c(F)c3)c(F)c2)CC1] |
| 572 | 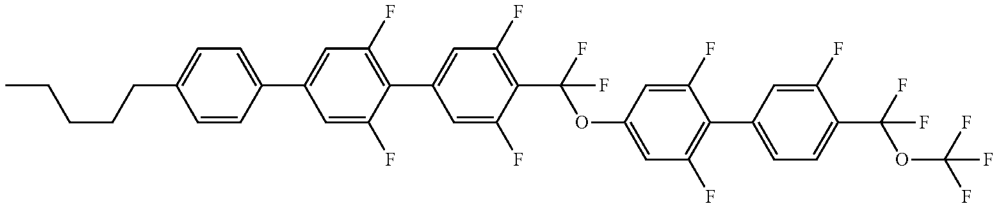 [SMILES: CCCCCc1ccc(-c2cc(F)c(-c3cc(F)c(C(F)(F)Oc4cc(F)c(-c5ccc(C(F)(F)OC(F)(F)F)c(F)c5)c(F)c4)c(F)c3)c(F)c2)cc1] |
| 573 | 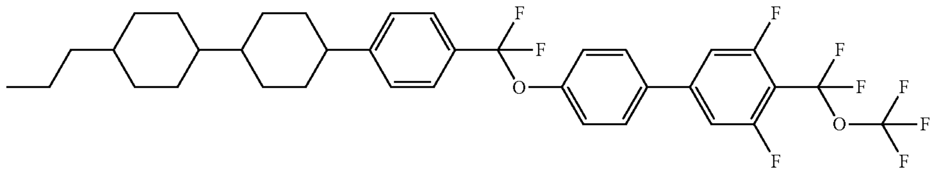 [SMILES: CCCC1CCC(C2CCC(c3ccc(C(F)(F)Oc4ccc(-c5cc(F)c(C(F)(F)OC(F)(F)F)c(F)c5)cc4)cc3)CC2)CC1] |
| 574 | 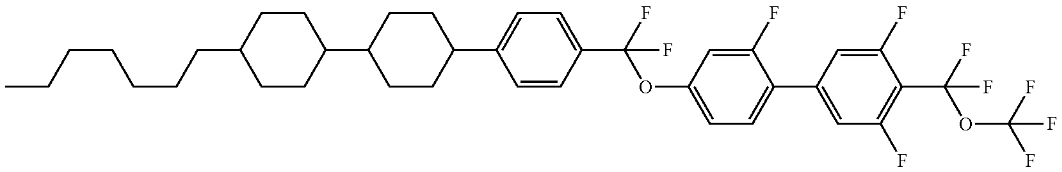 [SMILES: CCCCCCCC1CCC(C2CCC(c3ccc(C(F)(F)Oc4ccc(-c5cc(F)c(C(F)(F)OC(F)(F)F)c(F)c5)c(F)c4)cc3)CC2)CC1] |
| 575 | 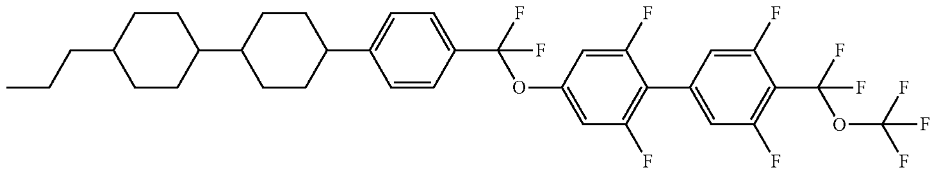 |
| 576 | 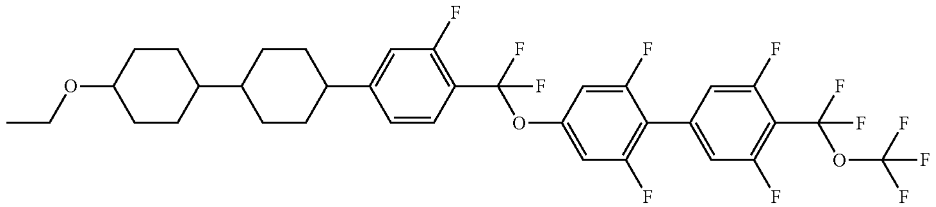 |

-continued
| No. | |
|---|---|
| 577 | 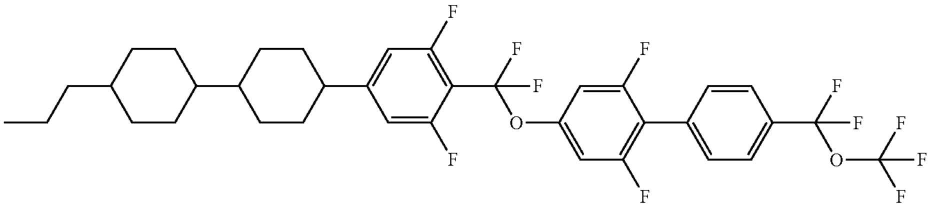 |
| 578 | 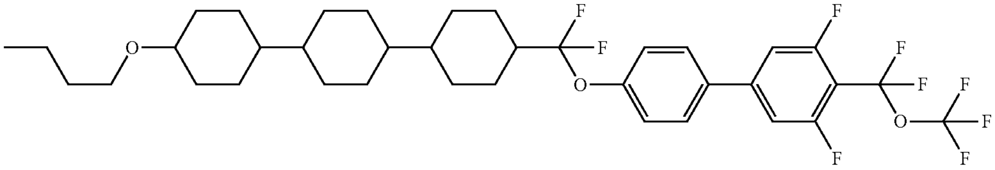 [SMILES: CCCCOC1CCC(C2CCC(C3CCC(C(F)(F)Oc4ccc(-c5cc(F)c(C(F)(F)OC(F)(F)F)c(F)c5)cc4)CC3)CC2)CC1] |
| 579 | 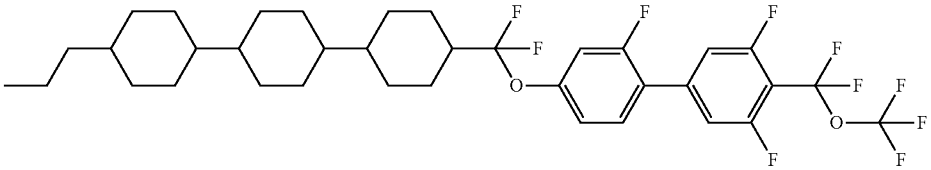 |
| 580 | 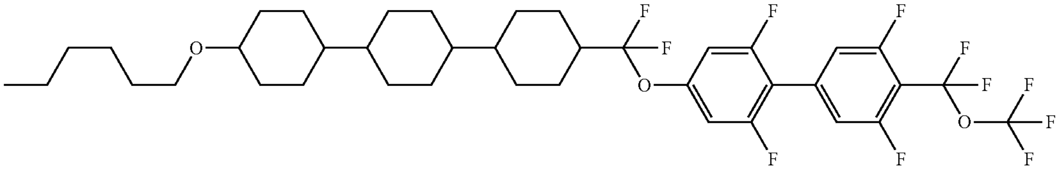 [SMILES: CCCCCCOC1CCC(C2CCC(C3CCC(C(F)(F)Oc4cc(F)c(-c5cc(F)c(C(F)(F)OC(F)(F)F)c(F)c5)c(F)c4)CC3)CC2)CC1] |
| 581 | 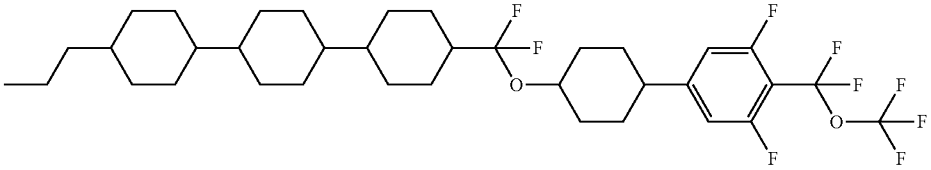 |
| 582 | 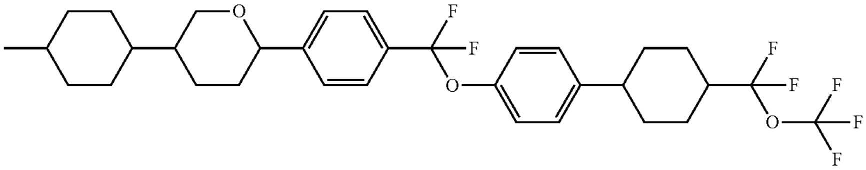 [SMILES: CC1CCC(C2CCC(c3ccc(C(F)(F)Oc4ccc(C5CCC(C(F)(F)OC(F)(F)F)CC5)cc4)cc3)OC2)CC1] |
| 583 | 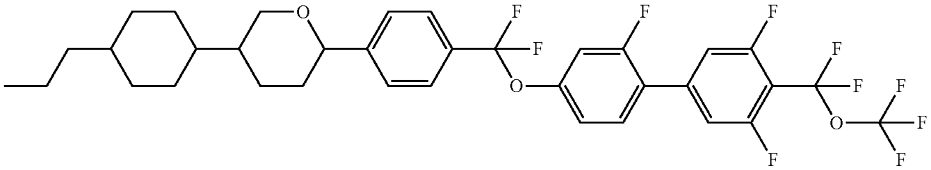 |
| 584 | 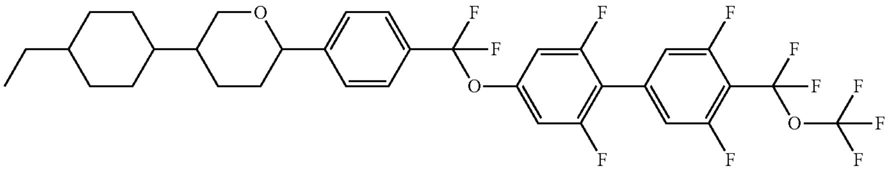 |

-continued
| No. | |
|---|---|
| 585 | 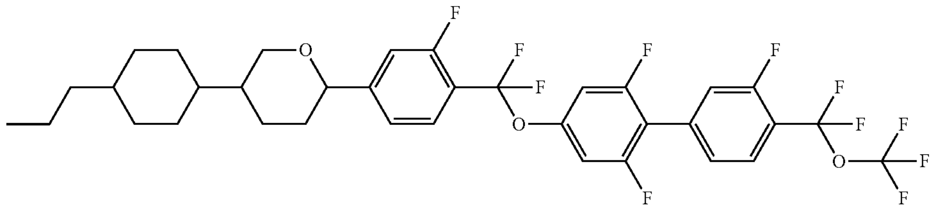 [SMILES: CCCC1CCC(C2CCC(c3ccc(C(F)(F)Oc4cc(F)c(-c5ccc(C(F)(F)OC(F)(F)F)c(F)c5)c(F)c4)c(F)c3)OC2)CC1] |
| 586 | 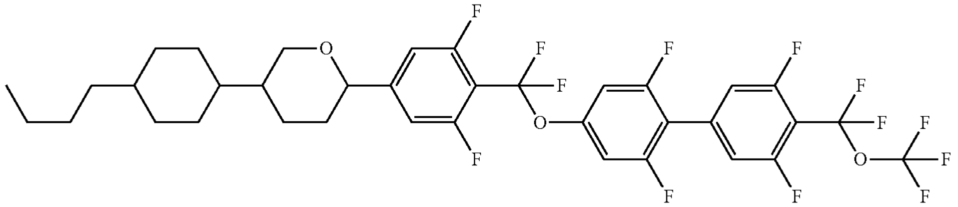 [SMILES: CCCCC1CCC(C2CCC(c3cc(F)c(C(F)(F)Oc4cc(F)c(-c5cc(F)c(C(F)(F)OC(F)(F)F)c(F)c5)c(F)c4)c(F)c3)OC2)CC1] |
| 587 | 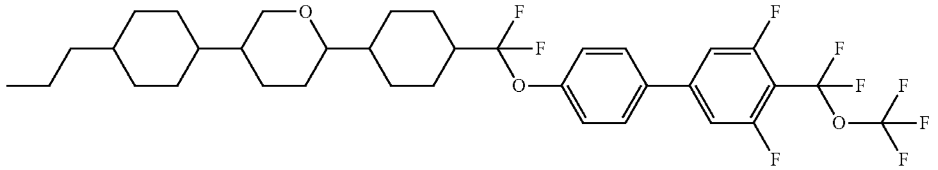 [SMILES: CCCC1CCC(C2CCC(C3CCC(C(F)(F)Oc4ccc(-c5cc(F)c(C(F)(F)OC(F)(F)F)c(F)c5)cc4)CC3)OC2)CC1] |
| 588 | 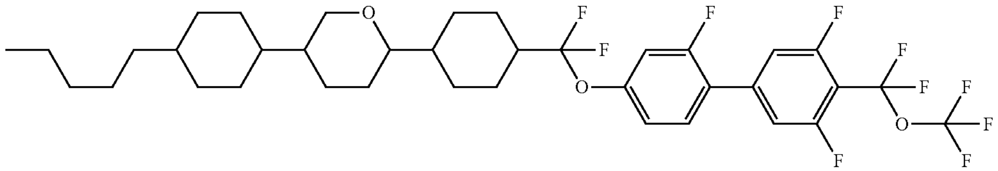 [SMILES: CCCCCC1CCC(C2CCC(C3CCC(C(F)(F)Oc4ccc(-c5cc(F)c(C(F)(F)OC(F)(F)F)c(F)c5)c(F)c4)CC3)OC2)CC1] |
| 589 | 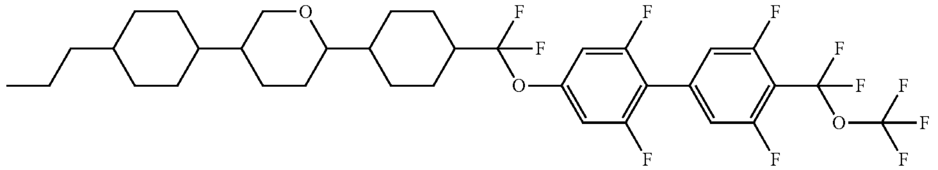 |
| 590 | 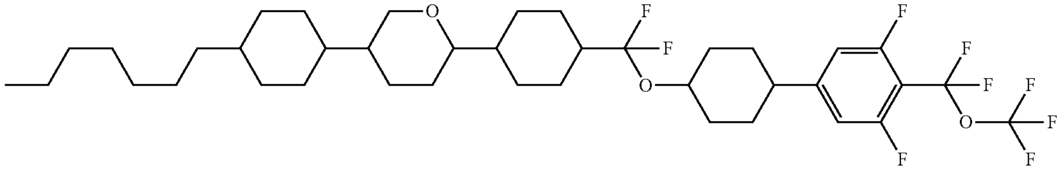 |
| 591 | 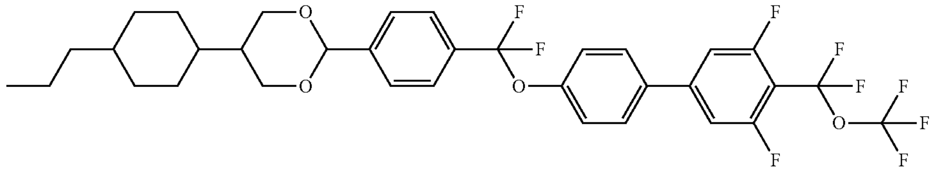 |
| 592 | 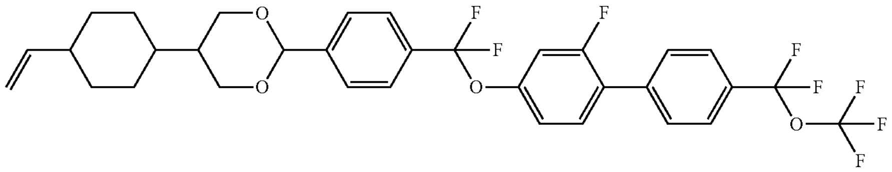 |

-continued
No.
593
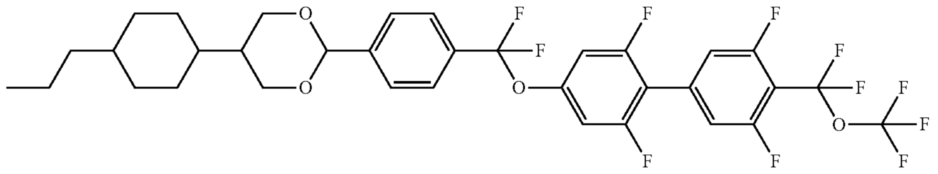 [SMILES: CCCC1CCC(C2COC(c3ccc(C(F)(F)Oc4ccc(-c5cc(F)c(C(F)(F)OC(F)(F)F)c(F)c5)cc4)cc3)OC2)CC1]
594
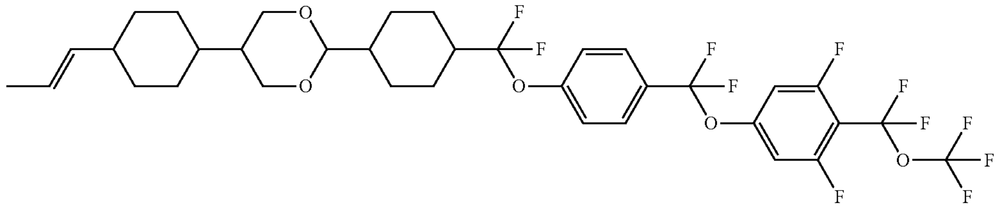 [SMILES: C/C=C/C1CCC(C2COC(C3CCC(C(F)(F)Oc4ccc(C(F)(F)Oc5cc(F)c(C(F)(F)OC(F)(F)F)c(F)c5)cc4)CC3)OC2)CC1]
595
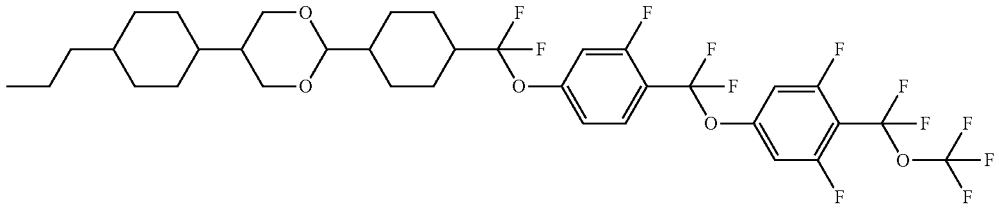
596
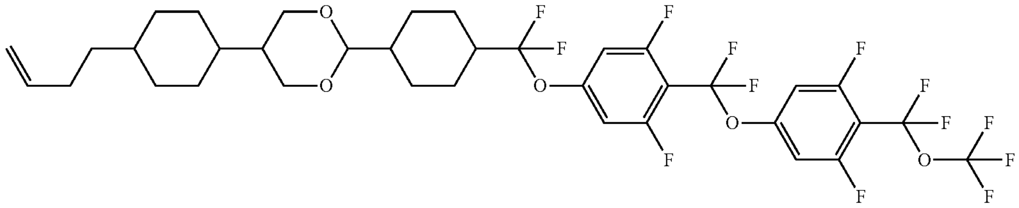
597
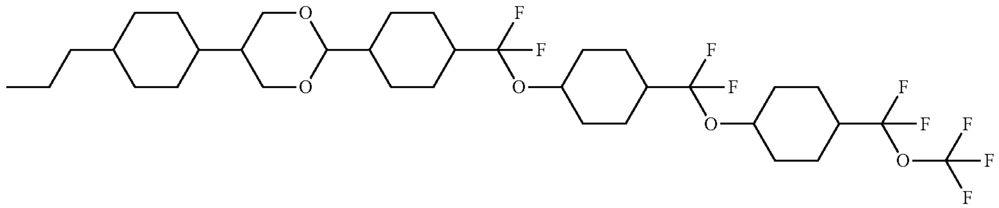 [SMILES: CCCC1CCC(C2COC(C3CCC(C(F)(F)OC4CCC(C(F)(F)OC5CCC(C(F)(F)OC(F)(F)F)CC5)CC4)CC3)OC2)CC1]
598
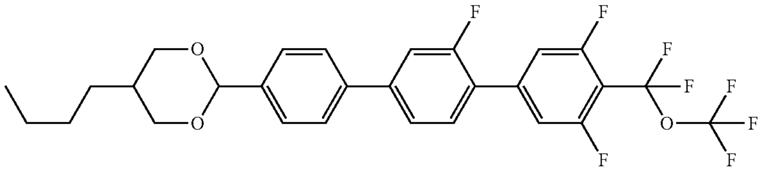 [SMILES: CCCCC1COC(c2ccc(-c3ccc(-c4cc(F)c(C(F)(F)OC(F)(F)F)c(F)c4)c(F)c3)cc2)OC1]
599
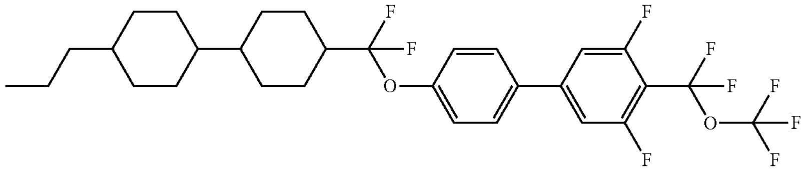 [SMILES: CCCC1CCC(C2CCC(C(F)(F)Oc3ccc(-c4cc(F)c(C(F)(F)OC(F)(F)F)c(F)c4)cc3)CC2)CC1]
600
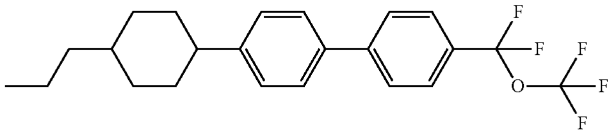 [SMILES: CCCC1CCC(c2ccc(-c3ccc(C(F)(F)OC(F)(F)F)cc3)cc2)CC1]

-continued

| No. | |
|---|---|
| 601 | 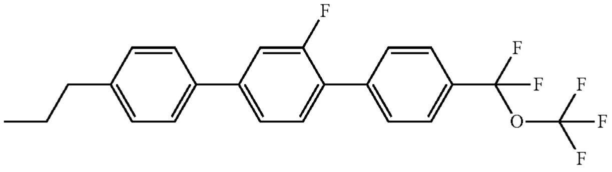 [SMILES: CCCc1ccc(-c2ccc(-c3ccc(C(F)(F)OC(F)(F)F)cc3)c(F)c2)cc1] |
| 602 | 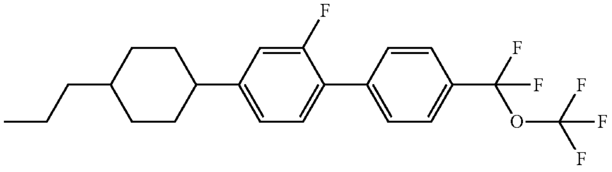 |
| 603 | 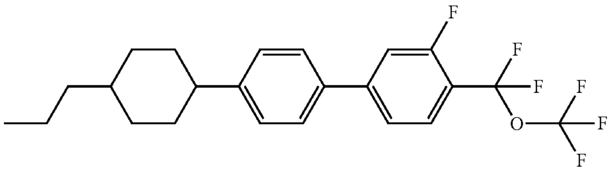 |

Comparative Example 1

Compound (F) was prepared as a comparative compound. The reason is that the compound is similar to the compound according to the present invention.

(F)

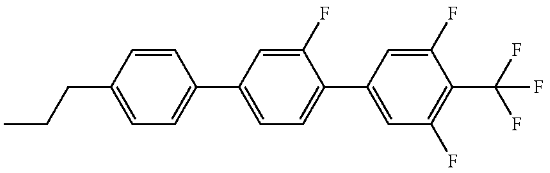

$^1$H-NMR (δ ppm; $CDCl_3$): 7.54 (d, 2H), 7.47 (d, 2H), 7.42 (d, 1H), 7.30 (d, 2H), 7.26 (d, 2H), 2.65 (t, 2H), 1.69 (sex, 2H), 0.98 (t, 3H).

Physical properties of comparative compound (F) were as described below.

Transition temperature: C, 84.2 I. $T_{NI}$=35.0° C.; η=66.9 mPa·s; Δn=0.190; Δ∈=33.63; compatibility at a low temperature: 10 wt %, holding the liquid crystal phase at −20° C. for 30 days.

TABLE 1

| Physical properties of compound (No. 32) and comparative compound (F) | |
|---|---|
| | Compound (No. 32) |
| | 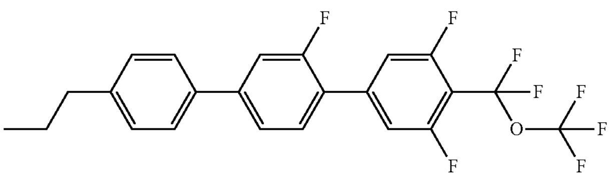 |
| Maximum temperature ($T_N$) | 35.0° C. |
| Optical anisotropy (Δn) | 0.170 |
| Dielectric anisotropy(Δϵ) | 23.9 |
| Compatibility at low temp. | 15 wt %, −20° C., 30 days |

TABLE 1-continued

| Physical properties of compound (No. 32) and comparative compound (F) | |
|---|---|
| Comparative compound (F) | |
| 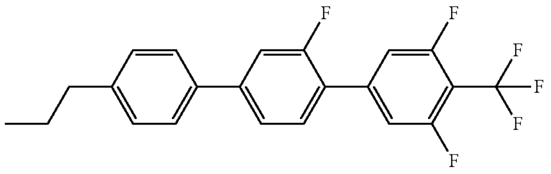 | |
| Maximum temperature ($T_N$) | 35.0° C. |
| Optical anisotropy (Δn) | 0.190 |
| Dielectric anisotropy (Δϵ) | 33.63 |
| Compatibility at low temp. | 10 wt %, −20° C., 30 days |

The physical properties of compound (No. 32) obtained in Example 1 and comparative compound (F) are summarized in Table 1. Table 1 shows that compound (No. 32) is superior in compatibility at a low temperature.

Comparative Example 2

Compound (G) was prepared as a comparative compound. The reason is that the compound is similar to the compound according to the present invention.

(G)

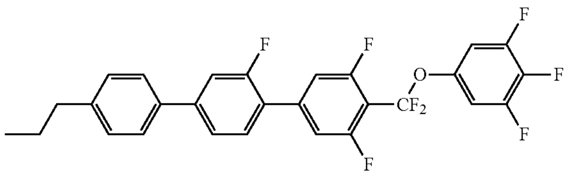

$^1$H-NMR (δ ppm; $CDCl_3$): 7.54 (d, 2H), 7.49 (d, 2H), 7.45 (d, 2H), 7.41-7.35 (m, 4H), 7.00 (d, 2H), 2.64 (t, 2H), 1.69 (sex, 2H), 0.99 (t, 3H).

Physical properties of comparative compound (G) were as described below.

Transition temperature: C, 129.2 I. $T_{NI}$=95.0° C.; η=73.4 mPa·s; Δn=0.204; Δ∈=35.03.

TABLE 2

| Physical properties of compound (No. 219) and comparative compound (G) | |
|---|---|
| Compound (No. 219) | |
| 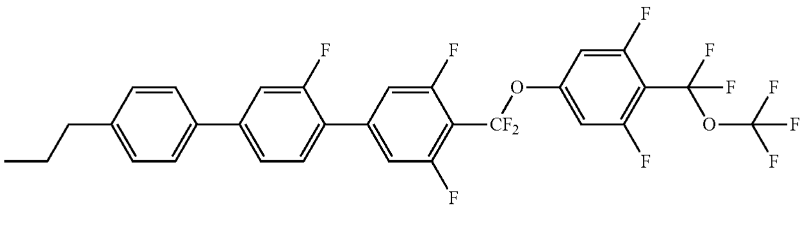 | |
| Maximum temperature ($T_N$) | 87.0° C. |
| Optical anisotropy (Δn) | 0.184 |
| Dielectric anisotropy(Δϵ) | 42.57 |

TABLE 2-continued

| Physical properties of compound (No. 219) and comparative compound (G) | |
|---|---|
| | Comparative compound (G) |
| | 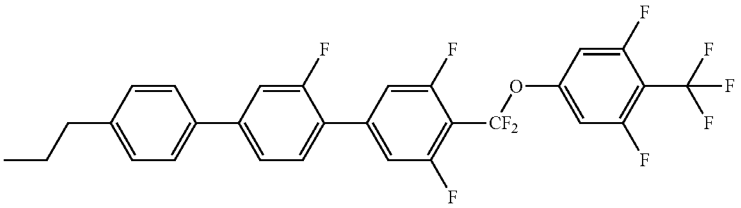 |
| Maximum temperature ($T_N$) | 95.0° C. |
| Optical anisotropy(Δn) | 0.204 |
| Dielectric anisotropy (Δε) | 35.03 |

The physical properties of compound (No. 219) obtained in Example 2 and comparative compound (G) are summarized in Table 2. Table 2 shows that compound (No. 219) is superior in view of a larger dielectric anisotropy.

Comparative Example 3

Compound (H) was prepared as a comparative compound. The reason is that the compound is similar to the compound according to the present invention.

(H)

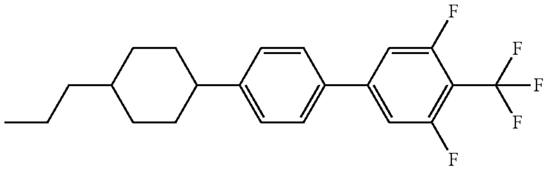

$^1$H-NMR (δ ppm; $CDCl_3$): 7.48 (d, 2H), 7.36 (d, 2H), 7.20 (d, 2H), 2.54 (t, 1H), 1.91 (t, 4H), 1.49 (q, 2H), 1.41-1.20 (m, 5H), 1.09 (q, 2H), 0.92 (t, 3H).

Physical properties of comparative compound (H) were as described below.

Transition temperature: C, 84.8 I. $T_{NI}$=49.7° C.; η=50.9 mPa·s; Δn=0.130; Δε=22.4; compatibility at low temperature: 10 wt %, −20° C., 30 days.

TABLE 3

| Physical properties of compound (No. 36) and comparative compound (H) | |
|---|---|
| | Compound (No. 36) |
| | 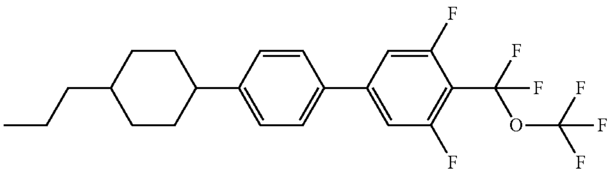 |
| Maximum temperature ($T_N$) | 42.4° C. |
| Optical anisotropy (Δn) | 0.117 |
| Dielectric anisotropy (Δε) | 15.8 |
| Compatibility at low temp. | 15 wt %, −20° C., 30 days |

TABLE 3-continued

| Physical properties of compound (No. 36) and comparative compound (H) | |
|---|---|
| Comparative compound (H) | |
| 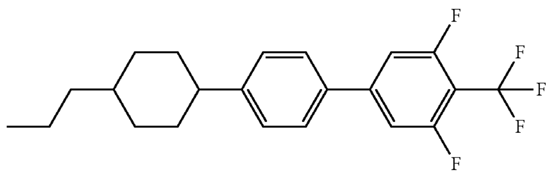 | |
| Maximum temperature ($T_N$) | 49.7° C. |
| Optical anisotropy (Δn) | 0.130 |
| Dielectric anisotropy (Δε) | 22.4 |
| Compatibility at low temp. | 10 wt %, −20° C., 30 days |

The physical properties of compound (No. 36) obtained in Example 3 and comparative compound (H) are summarized in Table 3. Table 3 shows that compound (No. 36) is superior in compatibility at a low temperature.

Comparative Example 4

Compound (I) was prepared as a comparative compound. The reason is that the compound is similar to the compound according to the present invention.

(I)

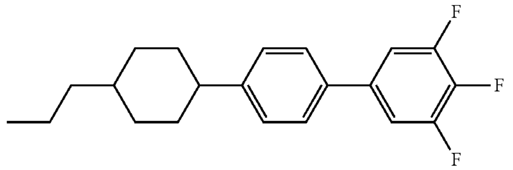

$^1$H-NMR (δ ppm; $CDCl_3$): 7.46 (d, 2H), 7.38 (d, 2H), 7.20 (d, 2H), 2.54 (t, 1H), 1.91 (t, 4H), 1.49 (q, 2H), 1.41-1.20 (m, 5H), 1.09 (q, 2H), 0.92 (t, 3H).

Physical properties of comparative compound (I) were as described below.

Transition temperature: C, 57.6; N, 75.4 I. $T_{NI}$=63.1° C.; η=47.0 mPa·s; Δn=0.110; Δε=7.7.

TABLE 4

| Physical properties of compound (No. 36) and comparative compound (I) | |
|---|---|
| Compound (No. 36) | |
| 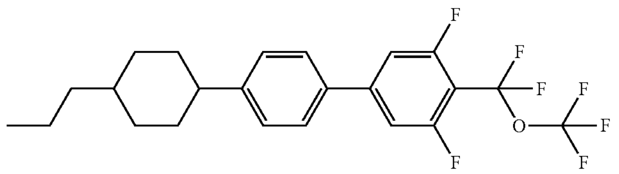 | |
| Maximum temperature ($T_N$) | 42.4° C. |
| Optical anisotropy (Δn) | 0.117 |
| Dielectric anisotropy (Δε) | 15.8 |

TABLE 4-continued

| Physical properties of compound (No. 36) and comparative compound (I) | |
|---|---|
| | Comparative compound (I) |
| | 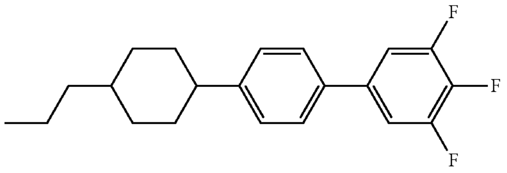 |
| Maximum temperature ($T_N$) | 63.1° C. |
| Optical anisotropy (Δn) | 0.110 |
| Dielectric anisotropy (Δε) | 7.7 |

The physical properties of compound (No. 36) obtained in Example 3 and comparative compound (I) are summarized in Table 4. Table 4 shows that compound (No. 36) is superior in view of a larger dielectric anisotropy.

Comparative Example 5

Compound (J) was prepared as a comparative compound. The reason is that the compound is similar to the compound according to the present invention.

(J)

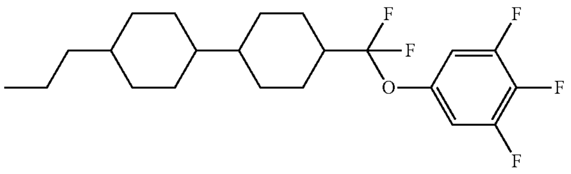

$^{1}$H-NMR (δ ppm; $CDCl_3$): 6.83 (d, 2H), 2.02 (d, 3H), 1.86 (d, 2H), 1.75 (dd, 4H), 1.31-0.80 (m, 15H), 0.88 (t, 3H).

Physical properties of comparative compound (J) were as described below.

Transition temperature: C, 42.2; N, 104.2 I. $T_{NI}$=88.4° C.; η=41.1 mPa·s; Δn=0.077; Δε=12.5.

TABLE 5

| Physical properties of compound (No. 67) and comparative compound (J) | |
|---|---|
| | Compound (No. 67) |
| | 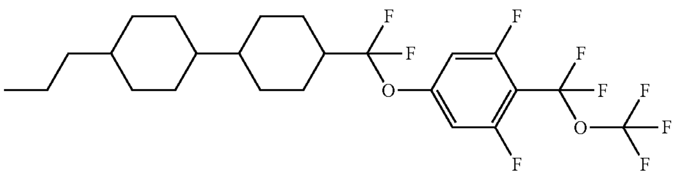 |
| Maximum temperature ($T_N$) | 72.4° C. |
| Optical anisotropy (Δn) | 0.077 |
| Dielectric anisotropy (Δε) | 17.9 |

TABLE 5-continued

| Physical properties of compound (No. 67) and comparative compound (J) | |
|---|---|
| Comparative compound (J) | |
| 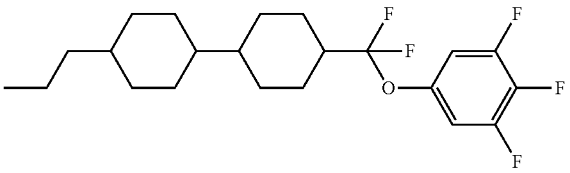 | |
| Maximum temperature ($T_N$) | 88.4° C. |
| Optical anisotropy (Δn) | 0.077 |
| Dielecctric anisotropy (Δε) | 12.5 |

The physical properties of compound (No. 67) obtained in Example 4 and comparative compound (J) are summarized in Table 5. Table 5 shows that compound (No. 67) is superior in view of a larger dielectric anisotropy.

Comparative Example 6

Compound (K) was prepared as a comparative compound. The reason is that the compound is similar to the compound according to the present invention.

(K)

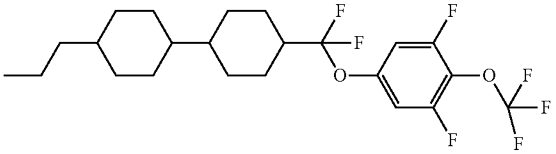

$^1$H-NMR (δ ppm; $CDCl_3$): 6.83 (d, 2H), 2.01 (d, 3H), 1.86 (d, 2H), 1.75 (dd, 4H), 1.31-0.80 (m, 15H), 0.88 (t, 3H).

Physical properties of comparative compound (K) were as described below.

Transition temperature: C, 40.7; N, 122.2 I. $T_{NI}$=91.0° C.; η=41.1 mPa·s; Δn=0.084; Δε=14.4.

TABLE 6

| Physical properties of compound (No. 67) and comparative compound (K) | |
|---|---|
| Compound (No. 67) | |
| 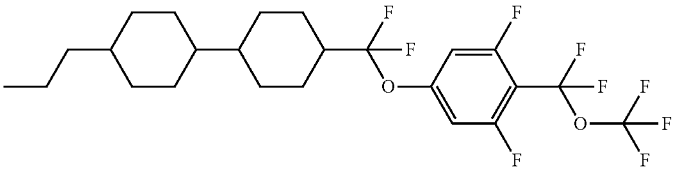 | |
| Maximum temperature ($T_N$) | 72.4° C. |
| Optical anisotropy (Δn) | 0.077 |
| Dielectric anisotropy (Δε) | 17.9 |
| Comparative compound (K) | |
| 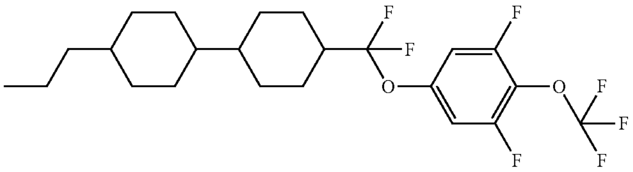 | |
| Maximum temperature ($T_N$) | 91.0° C. |
| Optical anisotropy (Δn) | 0.084 |
| Dielectric anisotropy (Δε) | 14.4 |

The physical properties of compound (No. 67) obtained in Example 4 and comparative compound (K) are summarized in Table 6. Table 6 shows that compound (No. 67) is superior in view of a larger dielectric anisotropy.

Comparative Example 7

Compound (L) was prepared as a comparative compound. The reason is that the compound is similar to the compound according to the present invention.

(L)

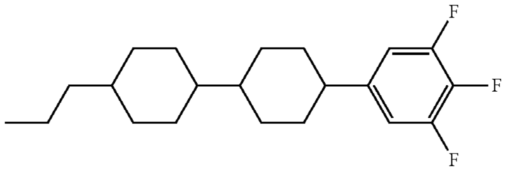

$^1$H-NMR (δ ppm; $CDCl_3$): 6.82 (d, 2H), 2.46 (tt, 1H), 1.87 (m, 4H), 1.74 (m, 4H), 1.40-0.80 (m, 18H), 0.88 (t, 3H).

Physical properties of comparative compound (L) were as described below.

Transition temperature: C, 63.8; N, 93.0 I. $T_{NI}$=74.4° C.; η=24.6 mPa·s; Δn=0.077; Δε=11.0.

The physical properties of compound (No. 39) obtained in Example 5 and comparative compound (L) are summarized in Table 7. Table 7 shows that compound (No. 39) is superior in view of a larger dielectric anisotropy.

Comparative Example 8

Compound (M) was prepared as a comparative compound. The reason is that the compound is similar to the compound according to the present invention.

(M)

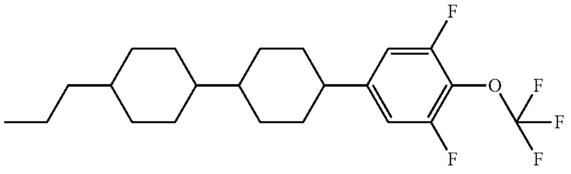

$^1$H-NMR (δ ppm; $CDCl_3$): 7.48 (d, 2H), 7.30 (d, 2H), 7.22 (d, 2H), 6.98 (d, 2H), 2.64 (t, 2H), 1.67 (sex, 2H), 0.97 (t, 3H).

Physical properties of comparative compound (M) were as described below.

Transition temperature: C, 63.1; N, 114.5 I. $T_{NI}$=73.7° C.; η=46.2 mPa·s; Δn=0.084; Δε=15.0.

TABLE 7

| Physical properties of compound (No. 39) and comparative compound (L) | |
|---|---|
| Compound (No. 39) | |
| 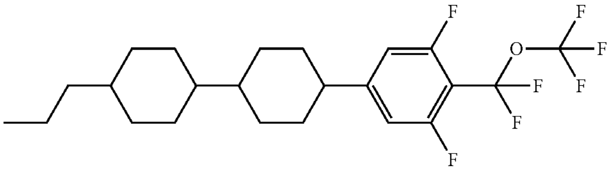 | |
| Maximum temperature ($T_N$) | 53.0° C. |
| Optical anisotropy (Δn) | 0.070 |
| Dielectric anisotropy (Δε) | 17.13 |
| Comparative compound (L) | |
| 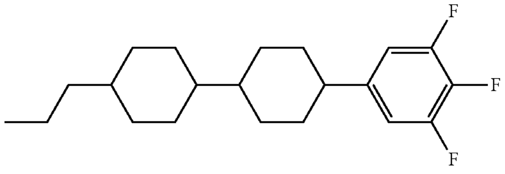 | |
| Maximum temperature ($T_N$) | 74.4° C. |
| Optical anisotropy (Δn) | 0.077 |
| Dielectric anisotropy (Δε) | 11.0 |

TABLE 8

| Physical properties of compound (No. 39) and comparative compound (M) | |
|---|---|
| Compound (No. 39) | |
| 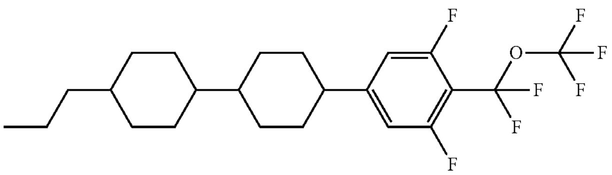 | |
| Maximum temperature ($T_N$) | 53.0° C. |
| Optical anisotropy (Δn) | 0.070 |
| Dielectric anisotropy (Δε) | 17.13 |
| Comparative compound (M) | |
| 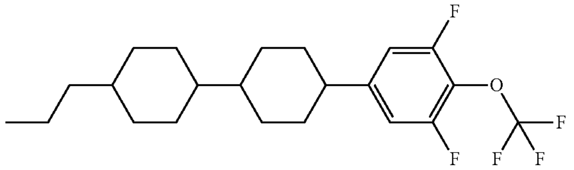 | |
| Maximum temperature ($T_N$) | 73.7° C. |
| Optical anisotropy (Δn) | 0.084 |
| Dielectric anisotropy (Δε) | 15.0 |

The physical properties of compound (No. 39) obtained in Example 5 and comparative compound (M) are summarized in Table 8. Table 8 shows that compound (No. 39) is superior in view of a larger dielectric anisotropy.

Comparative Example 9

Compound (N) was prepared as a comparative compound. The reason is that the compound is similar to the compound according to the present invention.

(N)

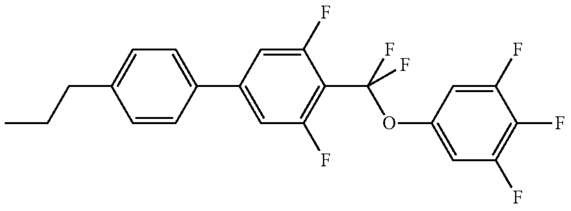

$^1$H-NMR (δ ppm; $CDCl_3$): 6.84 (d, 2H), 2.45 (tt, 1H), 1.87 (m, 4H), 1.74 (m, 4H), 1.40-0.80 (m, 18H), 0.88 (t, 3H).

Physical properties of comparative compound (N) were as described below.

Transition temperature: C, 47.0 I. $T_{NI}$=−4.3° C.; η=37.2 mPa·s; Δn=0.117; Δε=27.7.

TABLE 9

| Physical properties of compound (No. 61) and comparative compound (N) | |
|---|---|
| Compound (No. 61) | |
| 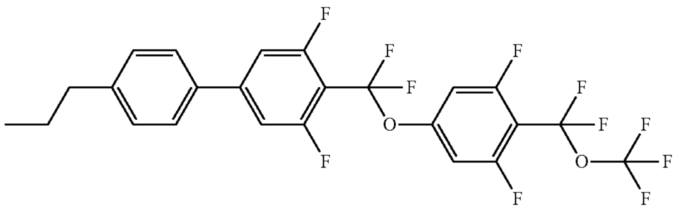 | |
| Maximum temperature ($T_N$) | −3° C. |
| Optical anisotropy (Δn) | 0.11 |
| Dielectric anisotropy (Δε) | 33.13 |
| Comparative compound (N) | |
| 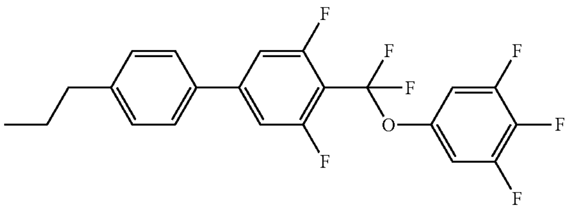 | |
| Maximum temperature ($T_N$) | −4.3° C. |
| Optical anisotropy (Δn) | 0.117 |
| Dielectric anisotropy (Δε) | 27.7 |

The physical properties of compound (No. 61) obtained in Example 6 and comparative compound (N) are summarized in Table 9. Table 9 shows that compound (No. 61) is superior in view of a larger dielectric anisotropy.

Comparative Example 10

Compound (O) was prepared as a comparative compound. The reason is that the compound is similar to the compound according to the present invention.

(O)

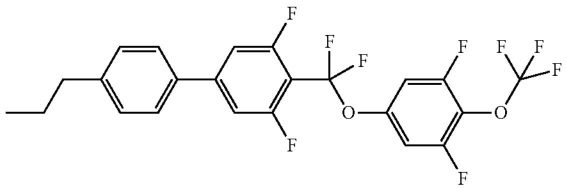

$^1$H-NMR (δ ppm; $CDCl_3$): 6.86 (d, 2H), 2.45 (tt, 1H), 1.87 (m, 4H), 1.74 (m, 4H), 1.40-0.80 (m, 18H), 0.88 (t, 3H).

Physical properties of comparative compound (0) were as described below.

Transition temperature: C, 43.0 I. $T_{NI}$=−5.6° C.; η=52.4 mPa·s; Δn=0.117; Δε=28.9.

TABLE 10

| Physical properties of compound (No. 61) and comparative compound (O) | |
|---|---|
| Compound (No. 61) | |
| 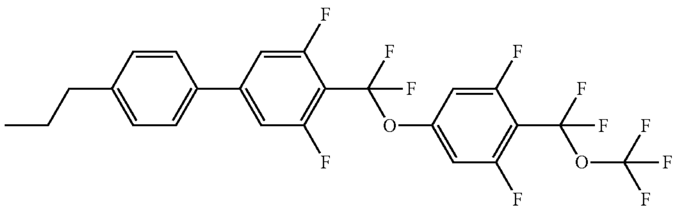 | |
| Maximum temperature ($T_N$) | −3° C. |
| Optical anisotropy (Δn) | 0.11 |
| Dielectric anisotropy (Δε) | 33.13 |
| Comparative compound (O) | |
| 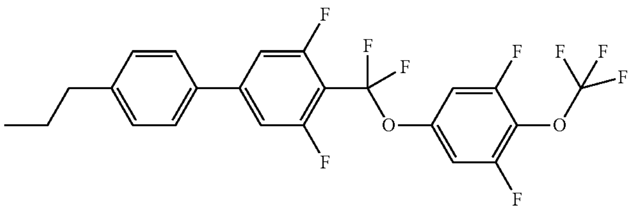 | |
| Maximum temperature ($T_N$) | −5.6° C. |
| Optical anisotropy (Δn) | 0.117 |
| Dielectric anisotropy (Δε) | 28.9 |

The physical properties of compound (No. 61) obtained in Example 6 and comparative compound (O) are summarized in Table 10. Table 10 shows that compound (No. 61) is superior in view of a larger dielectric anisotropy.

Comparative Example 11

Compound (P) was prepared as a comparative compound. The reason is that the compound is similar to the compound according to the present invention.

(P)

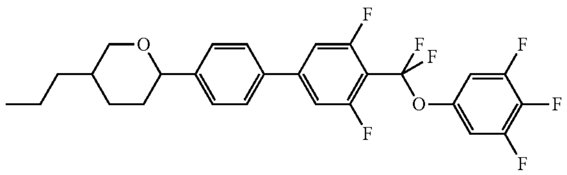

$^1$H-NMR (δ ppm; $CDCl_3$): 7.53 (d, 2H), 7.47 (d, 2H), 7.22 (d, 2H), 6.98 (d, 2H), 4.33 (d, 1H), 4.11 (d, 1H), 3.23 (t, 1H), 2.01 (d, 1H), 1.91 (d, 2H), 1.77-1.55 (m, 2H), 1.45-1.10 (m, 5H), 0.93 (t, 3H).

Physical properties of comparative compound (P) were as described below.

Transition temperature: C, 74.9; N, 118.0 I. $T_{NI}$=105° C.; η=70.4 mPa·s; Δn=0.144; Δε=26.27.

TABLE 11

| Physical properties of compound (No. 233) and comparative compound (P) | |
|---|---|
| Compound (No. 233) | |
| 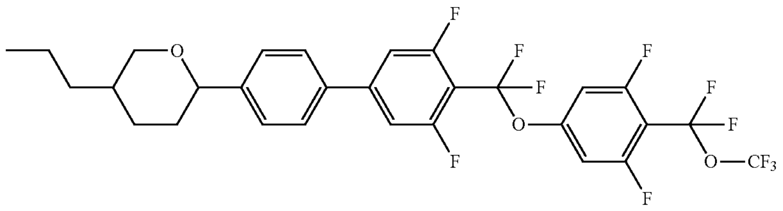 | |
| Maximum temperature ($T_N$) | 95.7° C. |
| Optical anisotropy (Δn) | 0.137 |
| Dielectric anisotropy (Δε) | 32.47 |
| Comparative compound (P) | |
| 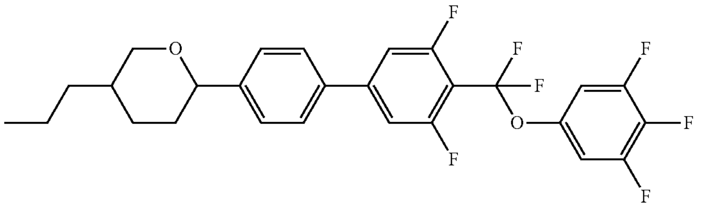 | |
| Maximum temperature ($T_N$) | 105° C. |
| Optical anisotropy (Δn) | 0.144 |
| Dielectric anisotropy (Δε) | 26.27 |

The physical properties of compound (No. 233) obtained in Example 7 and comparative compound (P) are summarized in Table 11. Table 11 shows that compound (No. 233) is superior in view of a larger dielectric anisotropy.

Comparative Example 12

Compound (Q) was prepared as a comparative compound. The reason is that the compound is similar to the compound according to the present invention.

(Q)

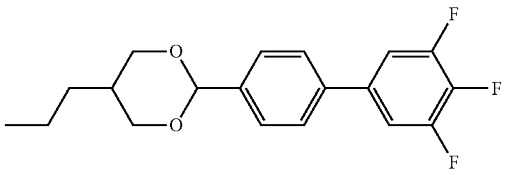

$^1$H-NMR (δ ppm; $CDCl_3$): 7.60 (d, 2H), 7.56 (d, 2H), 7.20 (d, 2H), 5.47 (s, 1H), 4.25 (dd, 2H), 3.57 (t, 2H), 2.21-2.16 (m, 1H), 1.36 (sex, 2H), 1.10 (q, 2H), 0.94 (t, 3H).

Physical properties of comparative compound (Q) were as described below.

Transition temperature: C, 78.5 I. $T_{NI}$=55.7° C.; η=68.9 mPa·s; Δn=0.117; Δε=19.67.

TABLE 12

| Physical properties of compound (No. 42) and comparative compound (Q) | | |
|---|---|---|
| | Compound (No. 42) | Comparative compound (Q) |
| | 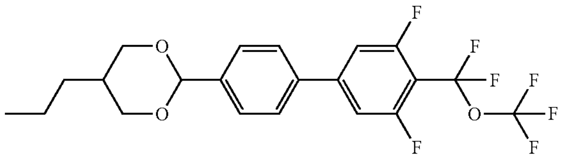 | 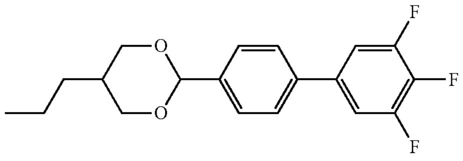 |
| Maximum temperature ($T_N$) | 56.7° C. | 55.7° C. |
| Optical anisotropy (Δn) | 0.127 | 0.117 |
| Dielectric anisotropy (Δε) | 21.8 | 19.67 |

The physical properties of compound (No. 42) obtained in Example 8 and comparative compound (Q) are summarized in Table 12. Table 12 shows that compound (No. 42) is superior in view of a larger dielectric anisotropy.

Comparative Example 13

Compound (I) was prepared as a comparative compound. The reason is that the compound is similar to the compound according to the present invention.

TABLE 13

| Physical properties of compound (No. 600) and comparative compound (I) | | |
|---|---|---|
| | Compound (No. 600) | Comparative compound (I) |
| | 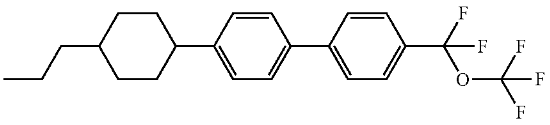 | 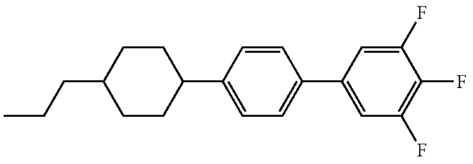 |
| Maximum temperature ($T_N$) | 69.0° C. | 63.1° C. |
| Optical anisotropy (Δn) | 0.130 | 0.110 |
| Dielectric anisotropy (Δε) | 10.6 | 7.7 |

The physical properties of compound (No. 600) obtained in Example 11 and comparative compound (I) are summarized in Table 13. Table 13 shows that compound (No. 600) is superior in larger dielectric anisotropy.

Comparative Example 14

Compound (T) was prepared as a comparative compound. The reason is that the compound is similar to the compound according to the present invention.

(T)

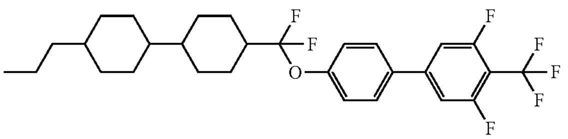

$^1$H-NMR (δ ppm; $CDCl_3$): 7.53 (d, 2H), 7.26 (d, 2H), 7.20 (d, 2H), 2.07-2.00 (m, 3H), 1.87 (d, 2H), 1.80-1.69 (m, 4H), 1.45-0.80 (m, 18H).

Physical properties of comparative compound (T) were as described below.

Transition temperature: C, 93.8; N, 228.4 I. $T_{NI}$=164° C.; η=90.1 mPa·s; Δn=0.144; Δε=19.43; compatibility at a low temperature: 5 wt %, −20° C., 30 days.

TABLE 14

Physical properties of compound (No. 599) and comparative compound (T)

Compound (No. 599)

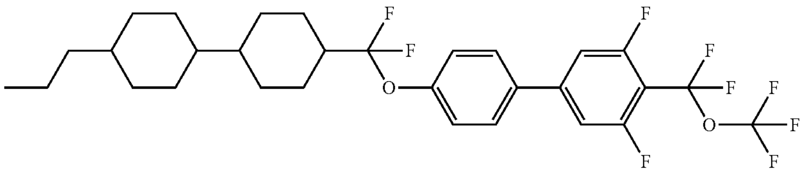

| | |
|---|---|
| Maximum temperature ($T_N$) | 150.4° C. |
| Optical anisotropy (Δn) | 0.136 |
| Dielectric anisotropy (Δε) | 15.4 |
| Compatability at low temp. | 15 wt %, −20° C., 30 days |

Comparative compound (T)

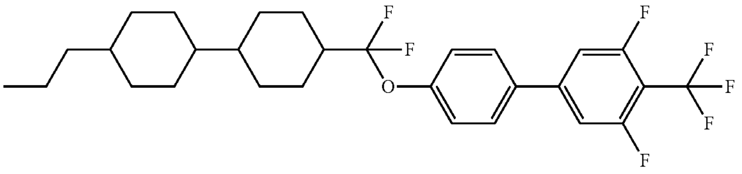

| | |
|---|---|
| Maximum temperature ($T_N$) | 163.7° C. |
| Optical anisotropy (Δn) | 0.144 |
| Dielectric anisotropy (Δε) | 19.4 |
| Compatibility at low temp. | 5 wt %, −20° C, 30 days |

The physical properties of compound (No. 599) obtained in Example 10 and comparative compound (T) are summarized in Table 14. Table 14 shows that compound (No. 599) is superior in compatibility at a low temperature.

1-2. Example of Composition (1)

Liquid crystal composition (1) of the invention will be explained in detail by way of Examples. The invention is not limited to Examples described below. Compounds in Examples were expressed using symbols according to definitions in the Table below. In the Table, a configuration with regard to 1,4-cyclohexylene is trans. A parenthesized number next to a symbolized compound in Examples corresponds to the number of the compound. A symbol (−) means any other liquid crystal compound. A ratio (percentage) of a liquid crystal compound is expressed in terms of weight percentage (% by weight) based on the total weight of the liquid crystal composition. Values of physical properties of the composition were summarized in a last part. The physical properties were measured in accordance with the methods described above, and were directly described without extrapolating the measured values.

TABLE

Method for Description of Compounds using Symbols
$R-(A_1)-Z_1-\ldots-Z_n-(A_n)-R'$

| 1) Left-terminal Group R— | Symbol |
|---|---|
| $C_nH_{2n+1}-$ | n- |
| $C_nH_{2n+1}O-$ | nO— |
| $C_mH_{2m+1}OC_nH_{2n}-$ | mOn- |
| $CH_2{=}CH-$ | V— |
| $C_nH_{2n+1}-CH{=}CH-$ | nV— |
| $CH_2{=}CH-C_nH_{2n}-$ | Vn- |
| $C_mH_{2m+1}-CH{=}CH-C_nH_{2n}-$ | mVn- |
| $CF_2{=}CH-$ | VFF— |
| $CF_2{=}CH-C_nH_{2n}-$ | VFFn- |
| **2) Right-terminal Group —R'** | **Symbol** |
| $-C_nH_{2n+1}$ | -n |
| $-OC_nH_{2n+1}$ | —On |
| $-COOCH_3$ | -EMe |
| $-CH{=}CH_2$ | —V |
| $-CH{=}CH-C_nH_{2n+1}$ | —Vn |
| $-C_nH_{2n}-CH{=}CH_2$ | -nV |
| $-C_mH_{2m}-CH{=}CH-C_nH_{2n+1}$ | -mVn |
| $-CH{=}CF_2$ | —VFF |
| —F | —F |
| —Cl | —CL |
| $-OCF_3$ | —OCF3 |
| $-OCF_2H$ | —OCF2H |
| $-CF_3$ | —CF3 |
| $-CF_2O-CF_3$ | -XCF3 |
| $-C{\equiv}N$ | —C |
| **3) Bonding Group $-Z_n-$** | **Symbol** |
| $-C_nH_{2n}-$ | n |
| —COO— | E |
| —CH═CH— | V |
| $-CH_2O-$ | 1O |
| $-OCH_2-$ | O1 |
| $-CF_2O-$ | X |
| $-C{\equiv}C-$ | T |
| **4) Ring Structure $-A_n-$** | **Symbol** |
| 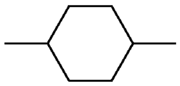 | H |
| 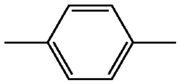 | B |
| 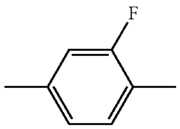 | B (F) |
| 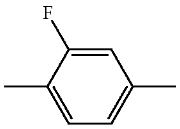 | B (2F) |
| 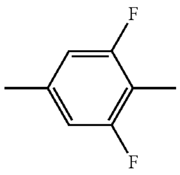 | B (F,F) |

TABLE-continued
| Method for Description of Compounds using Symbols<br>R—($A_1$)—$Z_1$—. . . —$Z_n$—($A_n$)—R' | |
|---|---|
| 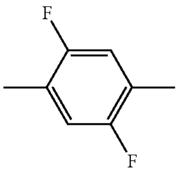 | B (2F, 5F) |
| 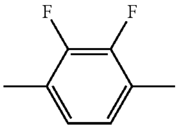 | B (2F,3F) |
| 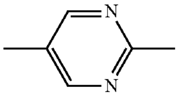 | Py |
| 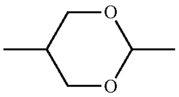 | G |
| 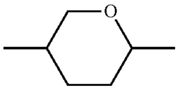 | dh |
| 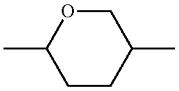 | Dh |
| 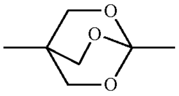 | Oe |
5) Examples of Description
Example 1 3-BB(F)B(F,F)-XCF3
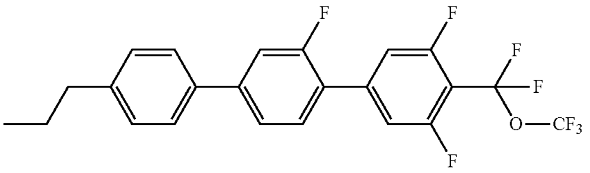
Example 2 3-HHBB(F,F)—F
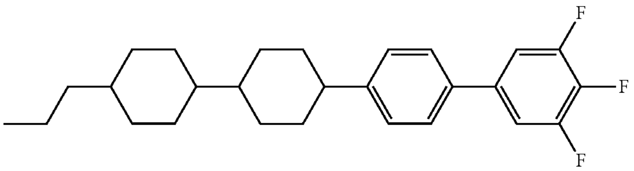

TABLE-continued

| Method for Description of Compounds using Symbols<br>R—($A_1$)—$Z_1$—. . . —$Z_n$—($A_n$)—R' |
|---|
| Example 3 3-HH-4 |
| 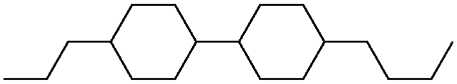 |
| Example 4 3-HBB(F,F)—F |
| 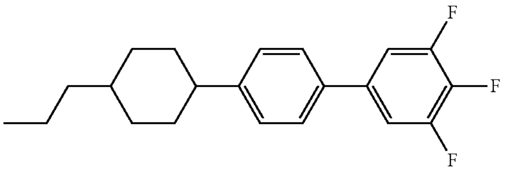 |

Example 15

| | | |
|---|---|---|
| 3-BB(F)B(F,F)-XCF3 | (No. 32) | 5% |
| 3-HBB(F,F)-XCF3 | (No. 36) | 5% |
| 5-HB-CL | (2-2) | 16% |
| 3-HH-4 | (13-1) | 12% |
| 3-HH-5 | (13-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 3% |
| 101-HBBH-5 | (14-1) | 3% |
| 3-HHBB(F,F)-F | (4-6) | 2% |
| 4-HHBB(F,F)-F | (4-6) | 2% |
| 5-HHBB(F,F)-F | (4-6) | 3% |
| 3-HH2BB(F,F)-F | (4-15) | 3% |
| 4-HH2BB(F,F)-F | (4-15) | 3% |

NI = 108.0° C.;
Δn = 0.095;
Δε = 5.1;
η = 21.6 mPa · s.

Example 16

| | | |
|---|---|---|
| 3-HHB(F,F)-XCF3 | (No. 38) | 3% |
| 3-BB(F,F)XB(F,F)-XCF3 | (No. 61) | 3% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 20% |
| 5-HBB(F,F)-F | (3-24) | 20% |
| 3-H2BB(F,F)-F | (3-27) | 5% |
| 5-HHBB(F,F)-F | (4-6) | 3% |
| 5-HHEBB-F | (4-17) | 2% |
| 3-HH2BB(F,F)-F | (4-15) | 3% |
| 101-HBBH-4 | (15-1) | 4% |
| 101-HBBH-5 | (15-1) | 4% |

NI = 96.1° C.;
Δn = 0.114;
Δε = 9.8;
η = 35.9 mPa · s.

A pitch was 62.1 micrometers when 0.25 part by weight of compound (Op-5) was added to 100 parts by weight of the composition described above.

Example 17

| | | |
|---|---|---|
| 3-HHXB(F,F)-XCF3 | (No. 67) | 7% |
| 3-BB(F)B(F,F)XB(F,F)-XCF3 | (No. 219) | 3% |
| 5-HB-CL | (2-2) | 10% |
| 3-HH-4 | (13-1) | 8% |
| 3-HHB-1 | (14-1) | 4% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 5% |
| 4-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

NI = 78.4° C.;
Δn = 0.106;
Δε = 10.2;
η = 25.6 mPa · s.

Example 18

| | | |
|---|---|---|
| 3-BB(F)B(F,F)XB(F,F)-XCF3 | (No. 219) | 3% |
| 3-dhBB(F,F)XB(F,F)-XCF3 | (No. 233) | 3% |
| 5-HB-CL | (2-2) | 3% |
| 7-HB(F)-F | (2-3) | 7% |
| 3-HH-4 | (13-1) | 9% |
| 3-HH-EMe | (13-2) | 18% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 4-HGB(F,F)-F | (3-103) | 5% |
| 5-HGB(F,F)-F | (3-103) | 6% |
| 2-H2GB(F,F)-F | (3-106) | 3% |
| 3-H2GB(F,F)-F | (3-106) | 5% |
| 5-GHB(F,F)-F | (3-109) | 7% |

NI = 81.1° C.;
Δn = 0.070;
Δε = 7.7;
η = 27.5 mPa · s.

Example 19

| | | |
|---|---|---|
| 3-HHB-XCF3 | (No. 39) | 3% |
| 3-BHH-XCF3 | (No. 40) | 3% |
| 5-HB-F | (2-2) | 6% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCF2H | (3-3) | 4% |
| 3-HHB(F,F)-OCF3 | (3-3) | 5% |
| 3-HH2B(F)-F | (3-5) | 3% |
| 3-HBB(F)-F | (3-23) | 10% |
| 5-HBB(F)-F | (3-23) | 10% |
| 5-HBBH-3 | (15-1) | 3% |
| 3-HB(F)BH-3 | (15-2) | 3% |

Example 20

| | | |
|---|---|---|
| 3-GB(F)B(F,F)-XCF3 | (No. 41) | 4% |
| 3-GBB(F,F)-XCF3 | (No. 42) | 3% |
| 3-HB-CL | (2-1) | 6% |
| 5-HB-CL | (2-1) | 4% |
| 3-HHB-OCF3 | (3-1) | 5% |
| 3-H2HB-OCF3 | (3-13) | 5% |
| 5-H4HB-OCF3 | (3-13) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 5% |
| 5-H2HB(F,F)-F | (3-15) | 5% |
| 5-H4HB(F,F)-F | (3-21) | 7% |
| 2-H2BB(F)-F | (3-26) | 5% |
| 3-H2BB(F)-F | (3-26) | 8% |
| 3-HBEB(F,F)-F | (3-29) | 5% |

Example 21

| | | |
|---|---|---|
| 3-HBB(F)B(F,F)-XCF3 | (No. 168) | 3% |
| 3-HHBB(F,F)-XCF3 | (No. 172) | 3% |
| 2-HB-C | (5-1) | 5% |
| 3-HB-C | (5-1) | 11% |
| 3-HB-O2 | (13-5) | 15% |
| 2-BTB-1 | (13-10) | 3% |
| 3-HHB-1 | (14-1) | 8% |
| 3-HHB-F | (3-1) | 4% |
| 3-HHB-O1 | (14-1) | 5% |
| 3-HHB-3 | (14-1) | 10% |
| 3-HHEB-F | (3-10) | 4% |
| 5-HHEB-F | (3-10) | 4% |
| 2-HHB(F)-F | (3-2) | 7% |
| 3-HHB(F)-F | (3-2) | 7% |
| 5-HHB(F)-F | (3-2) | 6% |
| 3-HHB(F,F)-F | (3-3) | 5% |

Example 22

| | | |
|---|---|---|
| 3-HHB(F)B(F,F)-XCF3 | (No. 173) | 3% |
| 3-dhBBB(F,F)-XCF3 | (No. 176) | 3% |
| 3-HB(F,F)XB(F,F)-XCF3 | (No. 65) | 3% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 21% |
| 5-HBB(F,F)-F | (3-24) | 17% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-5 | (15-1) | 2% |

Example 23

| | | |
|---|---|---|
| 3-HBBXB(F,F)-XCF3 | (No. 223) | 4% |
| 3-HBB(F,F)XB(F,F)-XCF3 | (No. 225) | 3% |
| 3-HHBXB(F,F)-XCF3 | (No. 228) | 3% |
| 5-HB-CL | (2-2) | 15% |
| 7-HB(F,F)-F | (2-4) | 3% |
| 3-HH-4 | (13-1) | 10% |
| 3-HH-5 | (13-1) | 5% |
| 3-HB-O2 | (13-5) | 15% |
| 3-HHB-1 | (14-1) | 6% |
| 3-HHB-O1 | (14-1) | 5% |
| 2-HHB(F)-F | (3-2) | 6% |
| 3-HHB(F)-F | (3-2) | 6% |
| 5-HHB(F)-F | (3-2) | 6% |
| 3-HHB(F,F)-F | (3-3) | 5% |
| 3-H2HB(F,F)-F | (3-15) | 4% |
| 4-H2HB(F,F)-F | (3-15) | 4% |

Example 24

| | | |
|---|---|---|
| 4-GB(F)B(F,F)XB(F,F)-XCF3 | (No. 235) | 3% |
| 3-BB(F,F)XB(F)B(F,F)-XCF3 | (No. 388) | 3% |
| 3-BBB(F)B(F,F)XB(F,F)-XCF3 | (No. 499) | 2% |
| 1V2-BEB(F,F)-C | (5-15) | 6% |
| 3-HB-C | (5-1) | 18% |
| 2-BTB-1 | (13-10) | 10% |
| 5-HH-VFF | (13-1) | 25% |
| 3-HHB-1 | (14-1) | 4% |
| VFF-HHB-1 | (14-1) | 8% |
| VFF2-HHB-1 | (14-1) | 8% |
| 3-H2BTB-2 | (14-7) | 5% |
| 3-H2BTB-3 | (14-7) | 4% |
| 3-H2BTB-4 | (14-7) | 4% |

Example 25

| | | |
|---|---|---|
| 3-HB(F,F)-XCF3 | (No. 2) | 3% |
| 3-H2HB(F,F)-XCF3 | (No. 132) | 4% |
| 3-HVHB(F,F)-XCF3 | (No. 150) | 3% |
| 5-HB-CL | (2-2) | 16% |
| 3-HH-4 | (13-1) | 11% |
| 3-HH-5 | (13-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 9% |
| 4-HHB(F)-F | (3-2) | 9% |
| 5-HHB(F)-F | (3-2) | 7% |
| 7-HHB(F)-F | (3-2) | 5% |
| 5-HBB(F)-F | (3-23) | 4% |
| 3-HHBB(F,F)-F | (4-6) | 2% |

-continued

| | | |
|---|---|---|
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

Example 26

| | | |
|---|---|---|
| 3-HH1OB(F,F)-XCF3 | (No. 107) | 4% |
| 3-HHEB(F,F)-XCF3 | (No. 99) | 4% |
| 3-HB-O2 | (13-5) | 10% |
| 5-HB-CL | (2-2) | 13% |
| 3-HBB(F,F)-F | (3-24) | 7% |
| 3-PyB(F)-F | (3-81) | 10% |
| 5-PyB(F)-F | (3-81) | 10% |
| 3-PyBB-F | (3-80) | 8% |
| 4-PyBB-F | (3-80) | 8% |
| 5-PyBB-F | (3-80) | 8% |
| 5-HBB(F)B-2 | (15-5) | 9% |
| 5-HBB(F)B-3 | (15-5) | 9% |

Example 27

| | | |
|---|---|---|
| V-HBB(F,F)-XCF3 | (No. 37) | 3% |
| 3-OeBB(F,F)-XCF3 | (No. 48) | 3% |
| 5-HB-CL | (2-2) | 3% |
| 7-HB(F)-F | (2-3) | 7% |
| 3-HH-4 | (13-1) | 10% |
| 3-HH-EMe | (13-2) | 21% |
| 3-HHEB-F | (3-10) | 8% |
| 5-HHEB-F | (3-10) | 8% |
| 3-HHEB(F,F)-F | (3-12) | 8% |
| 4-HHEB(F,F)-F | (3-12) | 5% |
| 4-HGB(F,F)-F | (3-103) | 5% |
| 5-HGB(F,F)-F | (3-103) | 4% |
| 2-H2GB(F,F)-F | (3-106) | 3% |
| 3-H2GB(F,F)-F | (3-106) | 5% |
| 5-GHB(F,F)-F | (3-109) | 7% |

Example 28

| | | |
|---|---|---|
| 4-GBB(F)B(F,F)-XCF3 | (No. 598) | 5% |
| 3-HB-O2 | (13-5) | 10% |
| 5-HB-CL | (2-2) | 13% |
| 3-HBB(F,F)-F | (3-24) | 7% |
| 3-PyB(F)-F | (3-81) | 10% |
| 5-PyB(F)-F | (3-81) | 10% |
| 3-PyBB-F | (3-80) | 10% |
| 4-PyBB-F | (3-80) | 10% |
| 5-PyBB-F | (3-80) | 10% |
| 5-HBB(F)B-2 | (15-5) | 10% |
| 5-HBB(F)B-3 | (15-5) | 5% |

NI = 95.2° C.; Δn = 0.187; Δε = 8.8; η = 51.4 mPa · s.

Example 29

| | | |
|---|---|---|
| 3-HHXBB(F,F)-XCF3 | (No. 599) | 4% |
| 3-HBB-XCF3 | (No. 600) | 5% |
| 2-HB-C | (5-1) | 5% |
| 3-HB-C | (5-1) | 12% |
| 3-HB-O2 | (13-5) | 12% |
| 2-BTB-1 | (13-10) | 3% |
| 3-HHB-F | (3-1) | 4% |
| 3-HHB-1 | (14-1) | 8% |
| 3-HHB-O1 | (14-1) | 5% |
| 3-HHB-3 | (14-1) | 14% |
| 3-HHEB-F | (3-10) | 4% |
| 2-HHB(F)-F | (3-2) | 7% |
| 3-HHB(F)-F | (3-2) | 5% |
| 5-HHB(F)-F | (3-2) | 7% |
| 3-HHB(F,F)-F | (3-3) | 5% |

NI = 97.7° C.; Δn = 0.101; Δε = 5.4; η = 19.2 mPa · s.

Example 30

| | | |
|---|---|---|
| 3-HBB-XCF3 | (No. 600) | 7% |
| 7-HB(F,F)-F | (2-4) | 3% |
| 3-HB-O2 | (13-5) | 4% |
| 2-HHB(F)-F | (3-2) | 10% |
| 3-HHB(F)-F | (3-2) | 10% |
| 5-HHB(F)-F | (3-2) | 10% |
| 2-HBB(F)-F | (3-23) | 5% |
| 3-HBB(F)-F | (3-23) | 9% |
| 5-HBB(F)-F | (3-23) | 16% |
| 2-HBB-F | (3-22) | 4% |
| 3-HBB-F | (3-22) | 4% |
| 5-HBB-F | (3-22) | 3% |
| 3-HBB(F,F)-F | (3-24) | 5% |
| 5-HBB(F,F)-F | (3-24) | 10% |

NI = 87.4° C.; Δn = 0.117; Δε = 6.2; η = 25.9 mPa · s.

Example 31

| | | |
|---|---|---|
| 3-BB(F)B-XCF3 | (No. 601) | 1% |
| 3-HB(F)B-XCF3 | (No. 602) | 5% |
| 5-HB-CL | (2-2) | 16% |
| 3-HH-4 | (13-1) | 12% |
| 3-HH-5 | (13-1) | 4% |
| 3-HHB-F | (3-1) | 4% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |

NI = 107.5° C.; Δn = 0.091; Δε = 4.1; η = 18.1 mPa · s.

Example 32

| | | |
|---|---|---|
| 3-HBB(F)-XCF3 | (No. 603) | 6% |
| 3-HHB(F,F)-F | (3-3) | 9% |
| 3-H2HB(F,F)-F | (3-27) | 8% |
| 4-H2HB(F,F)-F | (3-27) | 8% |
| 5-H2HB(F,F)-F | (3-27) | 8% |
| 3-HBB(F,F)-F | (3-24) | 18% |
| 5-HBB(F,F)-F | (3-24) | 17% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-4 | (15-1) | 4% |
| 1O1-HBBH-5 | (15-1) | 4% |

NI = 98.0° C.; Δn = 0.116; Δε = 9.1; η = 35.5 mPa · s.

Example 33

| | | |
|---|---|---|
| 3-GBB(F,F)-XCF3 | (No. 42) | 5% |
| 5-HB-CL | (2-1) | 3% |
| 7-HB(F)-F | (2-3) | 7% |
| 3-HH-4 | (13-1) | 9% |
| 3-HH-EMe | (13-2) | 22% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 4-HGB(F,F)-F | (3-103) | 5% |
| 5-HGB(F,F)-F | (3-103) | 6% |
| 2-H2GB(F,F)-F | (3-106) | 4% |
| 3-H2GB(F,F)-F | (3-106) | 4% |
| 5-GHB(F,F)-F | (3-109) | 4% |

NI = 79.9° C.; $\Delta n$ = 0.067; $\Delta\epsilon$ = 6.0; $\eta$ = 21.1 mPa · s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal compound of the invention has a high stability to heat, light and so forth, a high clearing point, a low minimum temperature of a liquid crystal phase, a small viscosity, a suitable optical anisotropy, a large dielectric anisotropy, a suitable elastic constant and an excellent compatibility with other liquid crystal compounds. A liquid crystal composition of the invention contains the compound, and has a high maximum temperature of a nematic phase, a low minimum temperature of the nematic phase, a small viscosity, a suitable optical anisotropy, a large dielectric anisotropy and a suitable elastic constant. The composition has a suitable balance regarding at least two of physical properties. A liquid crystal display device of the invention includes the composition, and has a wide temperature range in which the device can be used, a short response time, a large voltage holding ratio, a large contrast ratio and a long service life. Therefore, the device can be widely applied to a liquid crystal display device used for a personal computer, a television and so forth.

What is claimed is:

1. A compound represented by formula (1):

(1)

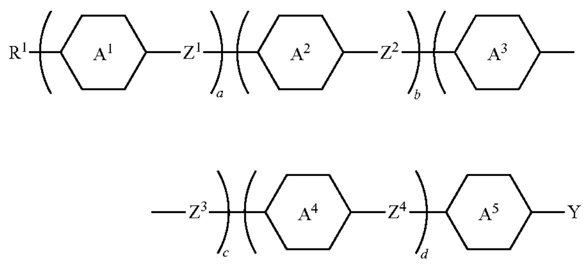

wherein, in formula (1), $R^1$ is hydrogen, halogen or alkyl having 1 to 20 carbons, and in the alkyl, at least one of $—CH_2—$ may be replaced by —O— or —S—, at least one of $—(CH_2)_2—$ may be replaced by —CH═CH—, and in the groups, at least one of hydrogen may be replaced by halogen;

ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, naphthalene-2,6-diyl in which at least one of hydrogen is replaced by halogen, or pyridine-2,5-diyl;

$Z^1$, $Z^2$, $Z^3$ and $Z^4$ are independently a single bond, $—(CH_2)_2—$, —CH═CH—, —CF═CF—, —C≡C—, —COO—, —OCO—, $—CF_2O—$, $—OCF_2—$, $—CH_2O—$, $—OCH_2—$, $—(CH_2)_4—$, $—(CH_2)_2CF_2O—$, $—(CH_2)_2OCF_2—$, $—CF_2O(CH_2)_2—$, $—OCF_2(CH_2)_2—$, $—CH═CH—(CH_2)_2—$ or $—(CH_2)_2—CH═CH—$; and a, b, c and d are independently 0 or 1, and a sum of a, b, c and d is one or more wherein Y is $—CF_2OCF_3$ wherein the compound of formula 1 has a dielectric anisotropy value that is at least 2.0 greater than a dielectric anisotropy of the same compound where Y is —F.

2. The compound according to claim 1, wherein, in formula (1), $Z^1$, $Z^2$, $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

3. The compound according to claim 1, wherein, in formula (1), $R^1$ is alkyl having 1 to 10 carbons, and in the alkyl, at least one of $—CH_2—$ may be replaced by —O— and at least one of $—(CH_2)_2—$ may be replaced by —CH═CH—; and ring $A^1$, ring $A^2$, ring $A^3$, ring $A^4$ and ring $A^5$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or naphthalene-2,6-diyl in which at least one of hydrogen is replaced by halogen, or pyridine-2,5-diyl.

4. The compound according to claim 1, represented by any one of formulas (1-1-1) to (1-1-4):

(1-1-1)

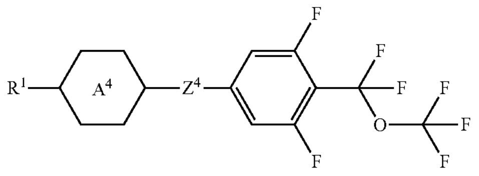

(1-1-2)

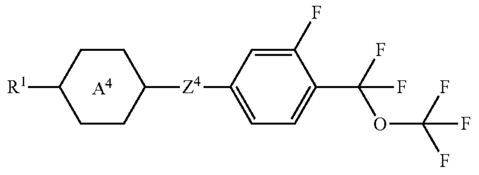

-continued (1-1-3)

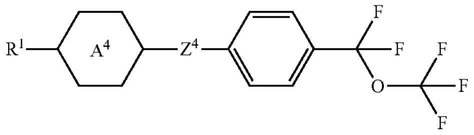

(1-1-4)

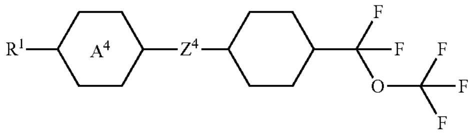

wherein, n formulas (1-1-1) to (1-1-4), $R^1$ is alkyl having 1 to 10 carbons, and in the alkyl, at least one of $—CH_2—$ may be replaced by —O— and at least one of $—(CH_2)_2—$ may be replaced by —CH═CH—;

ring $A^4$ is 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^4$ is a single bond, $—(CH_2)_2—$, —CH═CH—, —COO—, —OCO—, $—CF_2O—$, $—OCF_2—$, $—CH_2O—$ or $—OCH_2—$.

5. The compound according to claim 1, represented by any one of formulas (1-2-1) to (1-2-4):

(1-2-1)

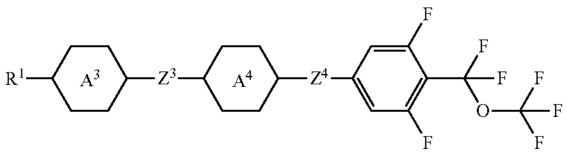

-continued (1-2-2)

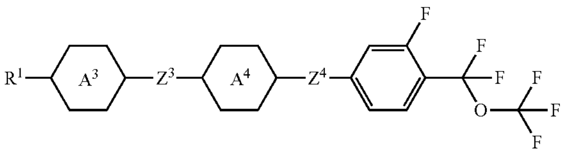

(1-2-3)

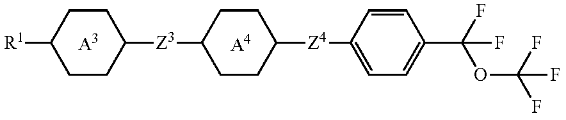

(1-2-4)

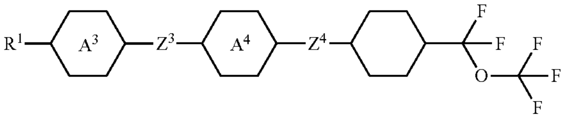

wherein, in formulas (1-2-1) to (1-2-4), $R^1$ is alkyl having 1 to 10 carbons, and in the alkyl, at least one of $—CH_2—$ may be replaced by —O—, and at least one of $—(CH_2)_2—$ may be replaced by —CH═CH—;

ring $A^3$ and ring $A^4$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

6. The compound according to claim 1 represented by any one of formulas (1-3-1) to (1-3-4):

(1-3-1)

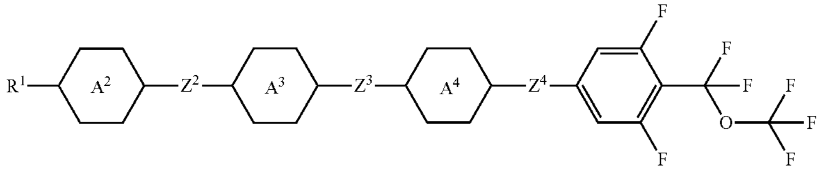

(1-3-2)

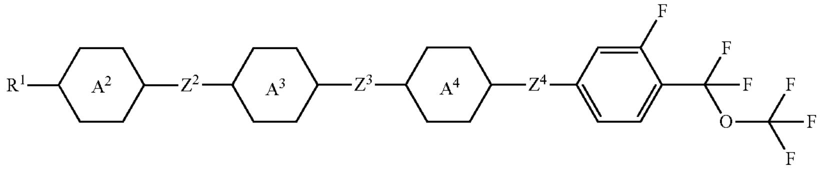

(1-3-3)

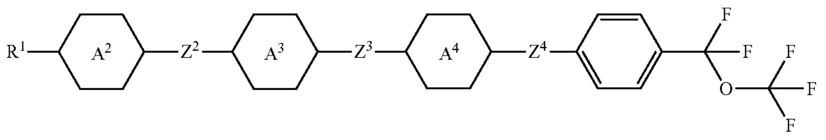

-continued (1-3-4)

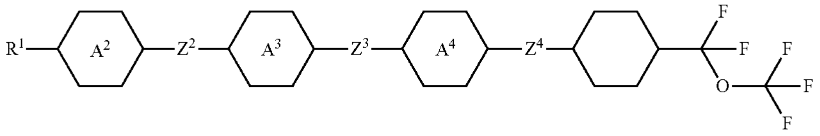

wherein, in formulas (1-3-1) to (1-3-4), $R^1$ is alkyl having 1 to 10 carbons, and in the alkyl, at least one of $—CH_2—$ may be replaced by —O— and at least one of $—(CH_2)_2—$ may be replaced by —CH═CH—;

ring $A^2$, ring $A^3$ and ring $A^4$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^2$, $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

7. The compound according to claim 1, represented by any one of formulas (1-4-1) to (1-4-4):

(1-4-1)

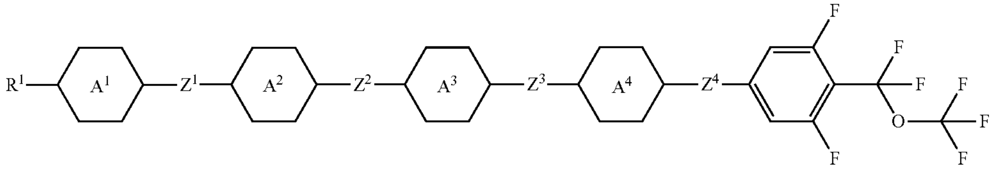

(1-4-2)

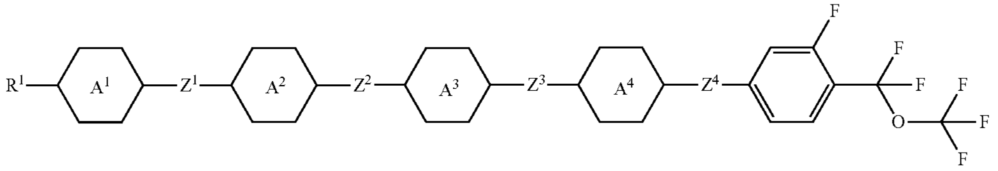

(1-4-3)

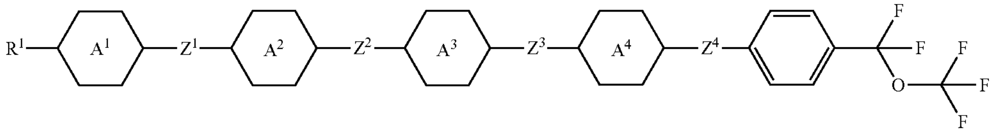

(1-4-4)

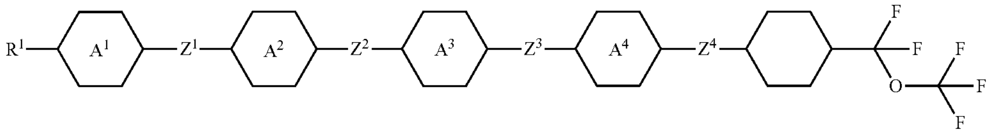

wherein, in formulas (1-4-1) to (1-4-4), $R^1$ is alkyl having 1 to 10 carbons, and in the alkyl, at least one of $—CH_2—$ may be replaced by —O— and at least one of $—(CH_2)_2—$ may be replaced by —CH═CH—;

ring $A^1$, ring $A^2$, ring $A^3$ and ring $A^4$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, 2,6,7-trioxabicyclo[2.2.2]octane-1,4-diyl, naphthalene-2,6-diyl, or naphthalene-2,6-diyl in which at least one of hydrogen is replaced by halogen; and $Z^1$, $Z^2$, $Z^3$ and $Z^4$ are independently a single bond, $—(CH_2)_2—$, —CH═CH—, —COO—, —OCO—, $—CF_2O—$, $—OCF_2—$, $—CH_2O—$ or $—OCH_2—$.

8. A liquid crystal composition, containing at least one of the compounds according to claim 1.

9. The liquid crystal composition according to claim 8, further containing at least one compound selected from the group of compounds represented by formulas (2) to (4):

(2)

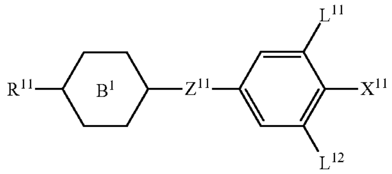

-continued (3)

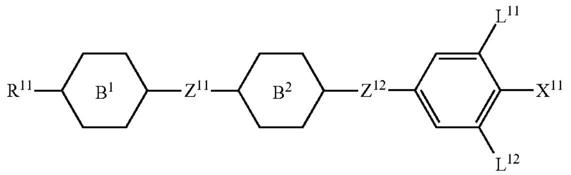

(4)

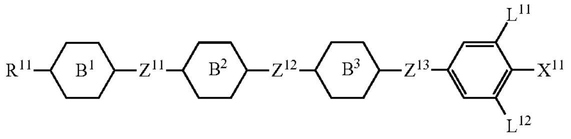

wherein, in formulas (2) to (3), $R^{11}$ is alkyl having 1 to 10 carbons or alkenyl having 2 to 10 carbons, and in the alkyl and the alkenyl, at least one of hydrogen may be replaced by fluorine and at least one of $—CH_2—$ may be replaced by —O—;

$X^{11}$ is fluorine, chlorine, $—OCF_3$, $—OCHF_2$, $—CF_3$, $—CHF_2$, $—CH_2F$, $—OCF_2CHF_2$ or $—OCF_2CHFCF_3$;

ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^{11}$, $Z^{12}$ and $Z^{13}$ are independently a single bond, $—CH_2CH_2—$, —CH═CH—, —C≡C—, —COO—, $—CF_2O—$, $—OCF_2—$, $—CH_2O—$ or $—(CH_2)_4—$; and $L^{11}$ and $L^{12}$ are independently hydrogen or fluorine.

10. The liquid crystal composition according to claim 8, further containing at least one compound selected from the group of compounds represented by formula (5):

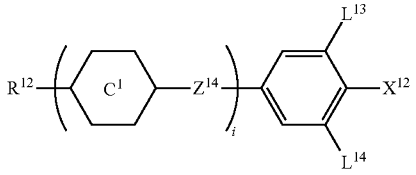

wherein, in formula (5), $R^{12}$ is alkyl having 1 to 10 carbons or alkenyl having 2 to 10 carbons, and in the alkyl and the alkenyl, at least one of hydrogen may be replaced by fluorine and at least one of $—CH_2—$ may be replaced by —O—;

$X^{12}$ is —C≡N or —C≡C—C≡N;

ring $C^1$ is 1,4-cyclohexylene, 1,4-phenylene in which at least one of hydrogen may be replaced by fluorine, tetrahydropyran-2,5-diyl, 1,3-dioxan-2,5-diyl or pyrimidine-2,5-diyl;

$Z^{14}$ is a single bond, $—CH_2CH_2—$, —COO—, $—CF_2O—$, $—OCF_2—$ or $—CH_2O—$;

$L^{13}$ and $L^{14}$ are independently hydrogen or fluorine; and i is 1, 2, 3 or 4.

11. The liquid crystal composition according to claim 8, further containing at least one compound selected from the group of compounds represented by formulas (6) to (12):

(6)

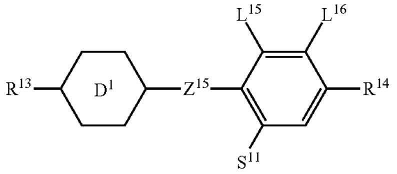

(7)

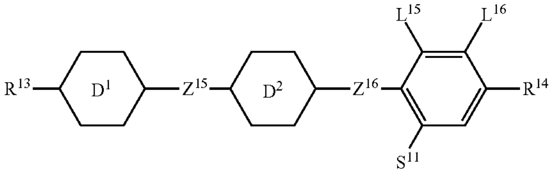

(8)

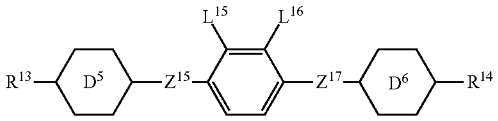

(9)

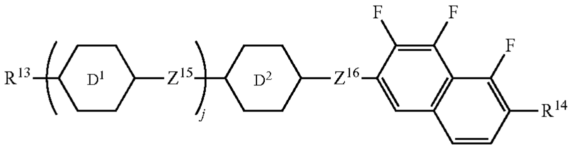

(10)

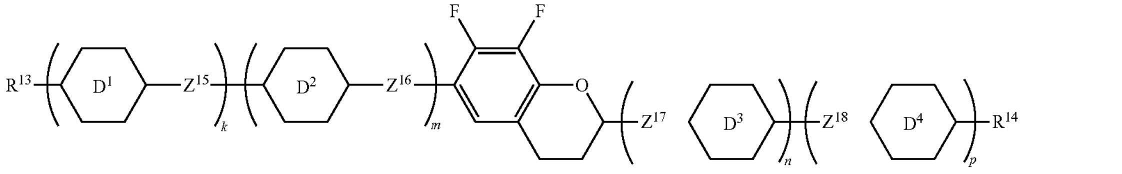

(11)

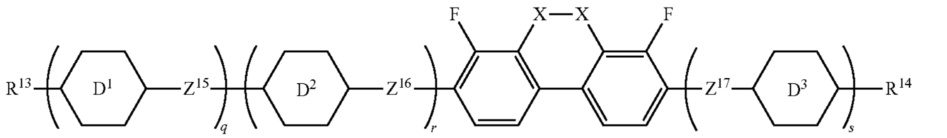

-continued (12)

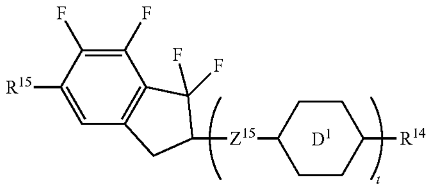

wherein in formulas (6) to (12), $R^{13}$ and $R^{14}$ are independently alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$S^{11}$ is hydrogen or methyl;

X is —$CF_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^{15}$ and $L^{16}$ independently fluorine or chlorine; and j, k, m, n, p, q, r and s are independently 0 or 1, a sum of k, m, n and p is 1 or 2, a sum of q, r and s is 0, 1, 2 or 3, and t is independently 1, 2 or 3.

12. The liquid crystal composition according to claim 8, further containing at least one compound selected from the group of compounds represented by formulas (13) to (15):

(13)

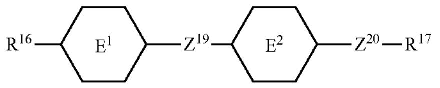

-continued (14)

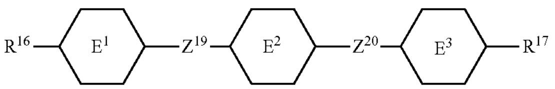

(15)

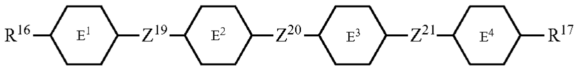

wherein, in formulas (13) to (15), $R^{16}$ and $R^{17}$ are independently alkyl having 1 to 10 carbons or alkenyl having 2 to 10 carbons, and in the alkyl or the alkenyl, at least one of —$CH_2$— may be replaced by —O— and at least one of hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —$CH_2CH_2$—, —CH=CH—, —C≡C— or —COO—.

13. The liquid crystal composition according to claim 8, further containing at least one optically active compound and/or at least one polymerizable compound.

14. The liquid crystal composition according to claim 8, further containing at least one antioxidant and/or at least one ultraviolet light absorber.

15. A liquid crystal display device, including the liquid crystal composition according to claim 8.

* * * * *